(12) United States Patent
Fujisaki

(10) Patent No.: US 8,825,090 B1
(45) Date of Patent: *Sep. 2, 2014

(54) COMMUNICATION DEVICE

(71) Applicant: Iwao Fujisaki, Tokyo (JP)

(72) Inventor: Iwao Fujisaki, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/048,044

(22) Filed: Oct. 8, 2013

Related U.S. Application Data

(63) Continuation of application No. 12/978,569, filed on Dec. 26, 2010, now Pat. No. 8,559,983, which is a continuation of application No. 11/743,776, filed on May 3, 2007, now abandoned.

(51) Int. Cl.
*H04W 24/00* (2009.01)
*H04W 4/00* (2009.01)

(52) U.S. Cl.
USPC .................................. 455/457; 455/414.2

(58) Field of Classification Search
USPC ................................ 455/406, 456.1–457, 551
See application file for complete search history.

(56) References Cited

U.S. PATENT DOCUMENTS

| | | |
|---|---|---|
| 4,934,773 A | 6/1990 | Becker |
| 5,173,881 A | 12/1992 | Sindle |
| 5,272,638 A | 12/1993 | Martin et al. |
| 5,345,272 A | 9/1994 | Ersoz et al. |
| 5,353,376 A | 10/1994 | Oh et al. |
| 5,388,147 A | 2/1995 | Grimes |
| 5,405,152 A | 4/1995 | Katanics et al. |
| 5,414,461 A | 5/1995 | Kishi et al. |
| 5,418,837 A | 5/1995 | Johansson et al. |
| 5,438,357 A | 8/1995 | McNelley |
| 5,442,453 A | 8/1995 | Takagi et al. |
| 5,446,904 A | 8/1995 | Belt et al. |
| 5,479,476 A | 12/1995 | Finke-Anlauff |
| 5,530,472 A | 6/1996 | Bregman et al. |
| 5,550,754 A | 8/1996 | McNelley et al. |
| 5,559,554 A | 9/1996 | Uekane et al. |
| 5,625,675 A | 4/1997 | Katsumaru et al. |
| 5,629,741 A | 5/1997 | Hopper |
| 5,687,331 A | 11/1997 | Volk et al. |
| 5,758,280 A | 5/1998 | Kimura |
| 5,772,586 A | 6/1998 | Heinonen et al. |

(Continued)

FOREIGN PATENT DOCUMENTS

| | | |
|---|---|---|
| GB | 2386027 A1 | 9/2003 |
| JP | 2196373 A1 | 8/1990 |

(Continued)

OTHER PUBLICATIONS

Fehily "Windows XP: Visual QuickStart Guide" published by Peachpit Press in 2003.

(Continued)

*Primary Examiner* — Lee Nguyen

(57) ABSTRACT

The communication device comprising a power-off notification implementer, a power-off location notifying implementer, a header displaying implementer, a footer displaying implementer, a zone leaving notifying implementer, and a zone entering notifying implementer.

18 Claims, 1 Drawing Sheet

(56) References Cited

U.S. PATENT DOCUMENTS

| | | |
|---|---|---|
| 5,778,304 A | 7/1998 | Grube et al. |
| 5,786,846 A | 7/1998 | Hiroaki |
| 5,825,408 A | 10/1998 | Yuyama et al. |
| 5,844,824 A | 12/1998 | Newman et al. |
| 5,902,349 A | 5/1999 | Endo et al. |
| 5,903,706 A | 5/1999 | Wakabayashi et al. |
| 5,918,180 A | 6/1999 | Dimino |
| 5,924,040 A | 7/1999 | Trompower |
| 5,940,139 A | 8/1999 | Smoot |
| 5,959,661 A | 9/1999 | Isono |
| 6,009,336 A | 12/1999 | Harris et al. |
| 6,034,715 A | 3/2000 | Ishida et al. |
| 6,069,648 A | 5/2000 | Suso et al. |
| 6,073,034 A | 6/2000 | Jacobsen et al. |
| 6,081,265 A | 6/2000 | Nakayama et al. |
| 6,085,112 A | 7/2000 | Kleinschmidt et al. |
| 6,094,237 A | 7/2000 | Hashimoto |
| 6,115,597 A | 9/2000 | Kroll et al. |
| 6,128,594 A | 10/2000 | Gulli et al. |
| 6,144,848 A | 11/2000 | Walsh et al. |
| 6,148,212 A | 11/2000 | Park et al. |
| 6,161,134 A | 12/2000 | Wang et al. |
| 6,167,283 A | 12/2000 | Korpela et al. |
| 6,192,343 B1 | 2/2001 | Morgan et al. |
| 6,195,089 B1 | 2/2001 | Chaney et al. |
| 6,198,942 B1 | 3/2001 | Hayashi et al. |
| 6,202,060 B1 | 3/2001 | Tran |
| 6,216,013 B1 | 4/2001 | Moore et al. |
| 6,216,158 B1 | 4/2001 | Luo et al. |
| 6,222,482 B1 | 4/2001 | Gueziec |
| 6,225,944 B1 | 5/2001 | Hayes |
| 6,243,039 B1 | 6/2001 | Elliot |
| 6,253,075 B1 | 6/2001 | Beghtol et al. |
| 6,265,988 B1 | 7/2001 | LeMense et al. |
| 6,282,435 B1 | 8/2001 | Wagner et al. |
| 6,285,317 B1 | 9/2001 | Ong |
| 6,285,757 B1 | 9/2001 | Carroll et al. |
| 6,292,666 B1 | 9/2001 | Siddiqui et al. |
| 6,311,077 B1 | 10/2001 | Bien |
| 6,366,651 B1 | 4/2002 | Griffith et al. |
| 6,385,465 B1 | 5/2002 | Yoshioka |
| 6,385,654 B1 | 5/2002 | Tanaka |
| 6,405,033 B1 | 6/2002 | Kennedy, III et al. |
| 6,411,198 B1 | 6/2002 | Hirai et al. |
| 6,421,470 B1 | 7/2002 | Nozaki et al. |
| 6,421,602 B1 | 7/2002 | Bullock et al. |
| 6,438,380 B1 | 8/2002 | Bi et al. |
| 6,442,404 B1 | 8/2002 | Sakajiri |
| 6,445,802 B1 | 9/2002 | Dan |
| 6,487,422 B1 | 11/2002 | Lee |
| 6,507,643 B1 | 1/2003 | Groner |
| 6,510,325 B1 | 1/2003 | Mack, II et al. |
| 6,512,919 B2 | 1/2003 | Ogasawara |
| 6,518,956 B1 | 2/2003 | Sato |
| 6,519,566 B1 | 2/2003 | Boyer et al. |
| 6,526,293 B1 | 2/2003 | Matsuo |
| 6,528,533 B2 | 3/2003 | Lauffer |
| 6,529,742 B1 | 3/2003 | Yang |
| 6,542,750 B2 | 4/2003 | Hendrey et al. |
| 6,549,215 B2 | 4/2003 | Jouppi |
| 6,549,756 B1 | 4/2003 | Engstrom |
| 6,553,309 B2 | 4/2003 | Uchida et al. |
| 6,587,547 B1 | 7/2003 | Zirngibl et al. |
| 6,615,186 B1 | 9/2003 | Kolls |
| 6,618,704 B2 | 9/2003 | Kanevsky et al. |
| 6,630,958 B2 | 10/2003 | Tanaka et al. |
| 6,647,251 B1 | 11/2003 | Siegle et al. |
| 6,650,877 B1 | 11/2003 | Tarbouriech et al. |
| 6,650,894 B1 | 11/2003 | Berstis et al. |
| 6,658,272 B1 | 12/2003 | Lenchik et al. |
| 6,658,461 B1 | 12/2003 | Mazo |
| 6,662,023 B1 | 12/2003 | Helle |
| 6,665,711 B1 | 12/2003 | Boyle et al. |
| 6,668,177 B2 | 12/2003 | Salmimaa et al. |
| 6,681,120 B1 | 1/2004 | Kim |
| 6,687,515 B1 | 2/2004 | Kosaka |
| 6,690,932 B1 | 2/2004 | Barnier et al. |
| 6,694,143 B1 | 2/2004 | Beamish et al. |
| 6,701,148 B1 | 3/2004 | Wilson et al. |
| 6,701,162 B1 | 3/2004 | Everett |
| 6,707,942 B1 | 3/2004 | Cortopassi et al. |
| 6,711,399 B1 | 3/2004 | Granier |
| 6,725,022 B1 | 4/2004 | Clayton et al. |
| 6,728,533 B2 | 4/2004 | Ishii |
| 6,763,226 B1 | 7/2004 | McZeal, Jr. |
| 6,772,174 B1 | 8/2004 | Pettersson |
| 6,775,361 B1 | 8/2004 | Arai et al. |
| 6,779,030 B1 | 8/2004 | Dugan et al. |
| 6,782,412 B2 | 8/2004 | Brophy et al. |
| 6,788,332 B1 | 9/2004 | Cook |
| 6,788,928 B2 | 9/2004 | Kohinata et al. |
| 6,795,715 B1 | 9/2004 | Kubo et al. |
| 6,812,954 B1 | 11/2004 | Priestman et al. |
| 6,813,501 B2 | 11/2004 | Kinnunen et al. |
| 6,819,939 B2 | 11/2004 | Masamura |
| 6,820,055 B2 | 11/2004 | Saindon et al. |
| 6,850,209 B2 | 2/2005 | Mankins et al. |
| 6,865,372 B2 | 3/2005 | Mauney et al. |
| 6,870,828 B1 | 3/2005 | Giordano, III |
| 6,876,379 B1 | 4/2005 | Fisher |
| 6,883,000 B1 | 4/2005 | Gropper |
| 6,888,927 B1 | 5/2005 | Cruickshank et al. |
| 6,891,525 B2 | 5/2005 | Ogoro |
| 6,895,084 B1 | 5/2005 | Saylor et al. |
| 6,895,259 B1 | 5/2005 | Blank et al. |
| 6,898,321 B1 | 5/2005 | Knee et al. |
| 6,901,383 B1 | 5/2005 | Ricketts et al. |
| 6,912,544 B1 | 6/2005 | Weiner |
| 6,922,212 B2 | 7/2005 | Nakakubo et al. |
| 6,937,868 B2 | 8/2005 | Himmel et al. |
| 6,947,728 B2 | 9/2005 | Tagawa et al. |
| 6,954,645 B2 | 10/2005 | Tsai et al. |
| 6,958,675 B2 | 10/2005 | Maeda et al. |
| 6,961,559 B1 | 11/2005 | Chow et al. |
| 6,970,178 B2 | 11/2005 | Tanioka et al. |
| 6,970,703 B2 | 11/2005 | Fuchs et al. |
| 6,973,628 B2 | 12/2005 | Asami |
| 6,992,699 B1 | 1/2006 | Vance et al. |
| 6,999,757 B2 | 2/2006 | Bates et al. |
| 7,003,598 B2 | 2/2006 | Kavanagh |
| 7,007,239 B1 | 2/2006 | Hawkins et al. |
| 7,012,999 B2 | 3/2006 | Ruckart et al. |
| 7,019,770 B1 | 3/2006 | Katz |
| 7,028,077 B2 | 4/2006 | Toshimitsu et al. |
| 7,030,880 B2 | 4/2006 | Tanioka et al. |
| 7,035,666 B2 | 4/2006 | Silberfenig et al. |
| 7,058,356 B2 | 6/2006 | Slotznick |
| 7,065,525 B1 | 6/2006 | Sasaki et al. |
| 7,076,052 B2 | 7/2006 | Yoshimura |
| 7,081,832 B2 | 7/2006 | Nelson et al. |
| 7,085,578 B2 | 8/2006 | Barclay et al. |
| 7,085,739 B1 | 8/2006 | Winter et al. |
| 7,089,298 B2 | 8/2006 | Nyman et al. |
| 7,106,846 B2 | 9/2006 | Nguyen et al. |
| 7,107,081 B1 | 9/2006 | Fujisaki |
| 7,113,981 B2 | 9/2006 | Slate |
| 7,117,152 B1 | 10/2006 | Mukherji et al. |
| 7,126,951 B2 | 10/2006 | Belcea et al. |
| 7,127,238 B2 | 10/2006 | Vandermeijden et al. |
| 7,127,271 B1 | 10/2006 | Fujisaki |
| 7,130,630 B1 | 10/2006 | Moton, Jr. et al. |
| 7,139,555 B2 | 11/2006 | Apfel |
| 7,142,810 B2 | 11/2006 | Oesterling |
| 7,142,890 B2 | 11/2006 | Irimajiri et al. |
| 7,146,179 B2 | 12/2006 | Parulski et al. |
| 7,148,911 B1 | 12/2006 | Mitsui et al. |
| 7,224,792 B2 | 5/2007 | Fusco |
| 7,224,851 B2 | 5/2007 | Kinjo |
| 7,224,987 B1 | 5/2007 | Bhela et al. |
| 7,231,231 B2 | 6/2007 | Kokko et al. |
| 7,233,781 B2 | 6/2007 | Hunter et al. |
| 7,233,795 B1 | 6/2007 | Ryden |

(56) References Cited

U.S. PATENT DOCUMENTS

| | | | |
|---|---|---|---|
| 7,245,293 B2 | 7/2007 | Hoshino et al. | |
| 7,251,255 B1 | 7/2007 | Young | |
| 7,254,408 B2 | 8/2007 | Kim | |
| 7,260,416 B2 | 8/2007 | Shippee | |
| 7,266,186 B1 | 9/2007 | Henderson | |
| 7,277,711 B2 | 10/2007 | Nyu | |
| 7,321,783 B2 | 1/2008 | Kim | |
| 7,346,373 B2 | 3/2008 | Kim | |
| 7,372,447 B1 | 5/2008 | Jacobsen et al. | |
| 7,383,067 B2 | 6/2008 | Phillips et al. | |
| 7,418,346 B2 | 8/2008 | Breed et al. | |
| 7,433,845 B1 | 10/2008 | Flitcroft et al. | |
| 7,444,168 B2 | 10/2008 | Nakagawa et al. | |
| 7,450,709 B2 | 11/2008 | Gonzalez et al. | |
| 7,451,084 B2 | 11/2008 | Funakura | |
| 7,532,879 B1 | 5/2009 | Fujisaki | |
| 7,551,899 B1 | 6/2009 | Nicolas et al. | |
| 7,642,929 B1 | 1/2010 | Pinkus et al. | |
| 7,643,037 B1 | 1/2010 | Langmacher et al. | |
| 7,657,252 B2 | 2/2010 | Futami | |
| 7,707,592 B2 | 4/2010 | Wesslen et al. | |
| 7,707,602 B2 | 4/2010 | Cragun et al. | |
| 7,725,077 B2 | 5/2010 | Jung et al. | |
| 7,769,364 B2 | 8/2010 | Logan et al. | |
| 7,787,857 B2 | 8/2010 | Peterman | |
| 7,787,887 B2 | 8/2010 | Gupta et al. | |
| 7,853,295 B1 | 12/2010 | Fujisaki | |
| 7,853,297 B1 | 12/2010 | Fujisaki | |
| 7,865,567 B1 | 1/2011 | Hendricks et al. | |
| 7,873,349 B1 | 1/2011 | Smith et al. | |
| 7,890,089 B1 | 2/2011 | Fujisaki | |
| 7,899,410 B2 | 3/2011 | Rakshani et al. | |
| 7,922,086 B2 | 4/2011 | Jung et al. | |
| 7,941,141 B2 | 5/2011 | Shoykhet et al. | |
| 7,953,439 B2 | 5/2011 | Rofougaran | |
| 7,970,414 B1 | 6/2011 | Werden et al. | |
| 8,099,108 B2 | 1/2012 | Camp et al. | |
| 8,126,400 B2 | 2/2012 | Jung et al. | |
| 8,145,040 B2 | 3/2012 | Toyoshima | |
| 8,208,954 B1 | 6/2012 | Fujisaki | |
| 8,433,300 B1 | 4/2013 | Fujisaki | |
| 8,559,983 B1 * | 10/2013 | Fujisaki | 455/457 |
| 2001/0005826 A1 | 6/2001 | Shibuya | |
| 2001/0011293 A1 | 8/2001 | Murakami et al. | |
| 2001/0028350 A1 | 10/2001 | Matsuoka et al. | |
| 2001/0029425 A1 | 10/2001 | Myr | |
| 2001/0035829 A1 | 11/2001 | Yu et al. | |
| 2001/0048364 A1 | 12/2001 | Kalthoff et al. | |
| 2001/0049470 A1 | 12/2001 | Mault et al. | |
| 2002/0002044 A1 | 1/2002 | Naruse et al. | |
| 2002/0002705 A1 | 1/2002 | Byrnes et al. | |
| 2002/0006804 A1 | 1/2002 | Mukai et al. | |
| 2002/0009978 A1 | 1/2002 | Dukach et al. | |
| 2002/0016724 A1 | 2/2002 | Yang et al. | |
| 2002/0019225 A1 | 2/2002 | Miyashita | |
| 2002/0026348 A1 | 2/2002 | Fowler et al. | |
| 2002/0028690 A1 | 3/2002 | McKenna et al. | |
| 2002/0031120 A1 | 3/2002 | Rakib | |
| 2002/0034292 A1 | 3/2002 | Tuoriniemi et al. | |
| 2002/0036231 A1 | 3/2002 | Monaghan et al. | |
| 2002/0037738 A1 | 3/2002 | Wycherley et al. | |
| 2002/0038219 A1 | 3/2002 | Yanay et al. | |
| 2002/0039914 A1 | 4/2002 | Hama et al. | |
| 2002/0041262 A1 | 4/2002 | Mukai et al. | |
| 2002/0047787 A1 | 4/2002 | Mikkola et al. | |
| 2002/0049630 A1 | 4/2002 | Furuta et al. | |
| 2002/0052754 A1 | 5/2002 | Joyce et al. | |
| 2002/0054068 A1 | 5/2002 | Ellis et al. | |
| 2002/0055872 A1 | 5/2002 | LaBrie et al. | |
| 2002/0061767 A1 | 5/2002 | Sladen et al. | |
| 2002/0065037 A1 | 5/2002 | Messina et al. | |
| 2002/0066115 A1 | 5/2002 | Wendelrup | |
| 2002/0068558 A1 | 6/2002 | Janik | |
| 2002/0068585 A1 | 6/2002 | Chan et al. | |
| 2002/0068599 A1 | 6/2002 | Rodriguez et al. | |
| 2002/0072395 A1 | 6/2002 | Miramontes | |
| 2002/0077808 A1 | 6/2002 | Liu et al. | |
| 2002/0080163 A1 | 6/2002 | Morey | |
| 2002/0085700 A1 | 7/2002 | Metcalf | |
| 2002/0094806 A1 | 7/2002 | Kamimura | |
| 2002/0097984 A1 | 7/2002 | Abecassis | |
| 2002/0098857 A1 | 7/2002 | Ishii | |
| 2002/0102960 A1 | 8/2002 | Lechner | |
| 2002/0103872 A1 | 8/2002 | Watanabe | |
| 2002/0104095 A1 | 8/2002 | Nguyen et al. | |
| 2002/0110246 A1 | 8/2002 | Gosior et al. | |
| 2002/0115469 A1 | 8/2002 | Rekimoto et al. | |
| 2002/0120718 A1 | 8/2002 | Lee | |
| 2002/0123336 A1 | 9/2002 | Kamada | |
| 2002/0127997 A1 | 9/2002 | Karlstedt et al. | |
| 2002/0128000 A1 | 9/2002 | do Nascimento | |
| 2002/0133342 A1 | 9/2002 | McKenna | |
| 2002/0137470 A1 | 9/2002 | Baron et al. | |
| 2002/0137503 A1 | 9/2002 | Roderique | |
| 2002/0137526 A1 | 9/2002 | Shinohara | |
| 2002/0141086 A1 | 10/2002 | Lang et al. | |
| 2002/0142763 A1 | 10/2002 | Kolsky | |
| 2002/0147645 A1 | 10/2002 | Alao et al. | |
| 2002/0151326 A1 | 10/2002 | Awada et al. | |
| 2002/0151327 A1 | 10/2002 | Levitt | |
| 2002/0160724 A1 | 10/2002 | Arai et al. | |
| 2002/0164975 A1 | 11/2002 | Lu | |
| 2002/0164996 A1 | 11/2002 | Dorenbosch | |
| 2002/0165850 A1 | 11/2002 | Roberts et al. | |
| 2002/0173344 A1 | 11/2002 | Cupps et al. | |
| 2002/0177407 A1 | 11/2002 | Mitsumoto | |
| 2002/0178225 A1 | 11/2002 | Madenberg et al. | |
| 2002/0183045 A1 | 12/2002 | Emmerson et al. | |
| 2002/0183098 A1 | 12/2002 | Lee et al. | |
| 2002/0191951 A1 | 12/2002 | Sodeyama et al. | |
| 2002/0198017 A1 | 12/2002 | Babasaki et al. | |
| 2002/0198813 A1 | 12/2002 | Patterson, Jr. et al. | |
| 2002/0198936 A1 | 12/2002 | McIntyre et al. | |
| 2003/0003967 A1 | 1/2003 | Ito | |
| 2003/0005056 A1 | 1/2003 | Yamamoto et al. | |
| 2003/0006879 A1 | 1/2003 | Kang et al. | |
| 2003/0007556 A1 | 1/2003 | Oura et al. | |
| 2003/0013483 A1 | 1/2003 | Ausems et al. | |
| 2003/0014286 A1 | 1/2003 | Cappellini | |
| 2003/0016189 A1 | 1/2003 | Abe et al. | |
| 2003/0017857 A1 | 1/2003 | Kitson et al. | |
| 2003/0018744 A1 | 1/2003 | Johanson et al. | |
| 2003/0025788 A1 | 2/2003 | Beardsley | |
| 2003/0032406 A1 | 2/2003 | Minear et al. | |
| 2003/0037265 A1 | 2/2003 | Sameshima et al. | |
| 2003/0038800 A1 | 2/2003 | Kawahara | |
| 2003/0038893 A1 | 2/2003 | Rajamaki et al. | |
| 2003/0045311 A1 | 3/2003 | Larikka et al. | |
| 2003/0045329 A1 | 3/2003 | Kinoshita | |
| 2003/0052964 A1 | 3/2003 | Priestman et al. | |
| 2003/0055994 A1 | 3/2003 | Herrmann et al. | |
| 2003/0061606 A1 | 3/2003 | Hartwig et al. | |
| 2003/0063580 A1 | 4/2003 | Pond | |
| 2003/0063732 A1 | 4/2003 | Mcknight | |
| 2003/0065784 A1 | 4/2003 | Herrod | |
| 2003/0065805 A1 | 4/2003 | Barnes, Jr. | |
| 2003/0069693 A1 | 4/2003 | Snapp et al. | |
| 2003/0070162 A1 | 4/2003 | Oshima et al. | |
| 2003/0073432 A1 | 4/2003 | Meade, II | |
| 2003/0083055 A1 | 5/2003 | Riordan et al. | |
| 2003/0084104 A1 | 5/2003 | Salem et al. | |
| 2003/0084121 A1 | 5/2003 | De Boor et al. | |
| 2003/0093503 A1 | 5/2003 | Yamaki et al. | |
| 2003/0093790 A1 | 5/2003 | Logan et al. | |
| 2003/0099367 A1 | 5/2003 | Okamura | |
| 2003/0107580 A1 | 6/2003 | Egawa et al. | |
| 2003/0110450 A1 | 6/2003 | Sakai | |
| 2003/0117376 A1 | 6/2003 | Ghulam | |
| 2003/0119479 A1 | 6/2003 | Arima et al. | |
| 2003/0119485 A1 | 6/2003 | Ogasawara | |
| 2003/0119562 A1 | 6/2003 | Kokubo | |

(56) References Cited

U.S. PATENT DOCUMENTS

| | | |
|---|---|---|
| 2003/0120784 A1 | 6/2003 | Johnson et al. |
| 2003/0125008 A1 | 7/2003 | Shimamura |
| 2003/0132928 A1 | 7/2003 | Kori |
| 2003/0135563 A1 | 7/2003 | Bodin et al. |
| 2003/0137970 A1 | 7/2003 | Odman |
| 2003/0144024 A1 | 7/2003 | Luo |
| 2003/0148772 A1 | 8/2003 | Ben-Ari |
| 2003/0149662 A1 | 8/2003 | Shore |
| 2003/0153355 A1 | 8/2003 | Warren |
| 2003/0156208 A1 | 8/2003 | Obradovich |
| 2003/0166399 A1 | 9/2003 | Tokkonen et al. |
| 2003/0169329 A1 | 9/2003 | Parker et al. |
| 2003/0201982 A1 | 10/2003 | Iesaka |
| 2003/0204562 A1 | 10/2003 | Hwang |
| 2003/0208541 A1 | 11/2003 | Musa |
| 2003/0220835 A1 | 11/2003 | Barnes, Jr. |
| 2003/0222762 A1 | 12/2003 | Beigl et al. |
| 2003/0222982 A1 | 12/2003 | Hamdan et al. |
| 2003/0223554 A1 | 12/2003 | Zhang |
| 2003/0224760 A1 | 12/2003 | Day |
| 2003/0227570 A1 | 12/2003 | Kim et al. |
| 2003/0229900 A1 | 12/2003 | Reisman |
| 2003/0236709 A1 | 12/2003 | Hendra et al. |
| 2003/0236866 A1 | 12/2003 | Light |
| 2004/0003307 A1 | 1/2004 | Tsuji |
| 2004/0004616 A1 | 1/2004 | Konya et al. |
| 2004/0027369 A1 | 2/2004 | Kellock et al. |
| 2004/0029640 A1 | 2/2004 | Masuyama et al. |
| 2004/0033795 A1 | 2/2004 | Walsh et al. |
| 2004/0034692 A1 | 2/2004 | Eguchi et al. |
| 2004/0052504 A1 | 3/2004 | Yamada et al. |
| 2004/0060061 A1 | 3/2004 | Parker |
| 2004/0068399 A1 | 4/2004 | Ding |
| 2004/0072595 A1 | 4/2004 | Anson et al. |
| 2004/0082321 A1 | 4/2004 | Kontianinen |
| 2004/0087326 A1 | 5/2004 | Dunko et al. |
| 2004/0092255 A1 | 5/2004 | Ji et al. |
| 2004/0103303 A1 | 5/2004 | Yamauchi et al. |
| 2004/0107072 A1 | 6/2004 | Dietrich et al. |
| 2004/0114732 A1 | 6/2004 | Choe et al. |
| 2004/0117108 A1 | 6/2004 | Nemeth |
| 2004/0128359 A1 | 7/2004 | Horvitz et al. |
| 2004/0137893 A1 | 7/2004 | Muthuswamy et al. |
| 2004/0139208 A1 | 7/2004 | Tuli |
| 2004/0142678 A1 | 7/2004 | Krasner |
| 2004/0150725 A1 | 8/2004 | Taguchi |
| 2004/0157664 A1 | 8/2004 | Link |
| 2004/0166832 A1 | 8/2004 | Portman et al. |
| 2004/0166879 A1 | 8/2004 | Meadows et al. |
| 2004/0174863 A1 | 9/2004 | Caspi et al. |
| 2004/0183937 A1 | 9/2004 | Viinikanoja et al. |
| 2004/0185865 A1 | 9/2004 | Maanoja |
| 2004/0189827 A1 | 9/2004 | Kim et al. |
| 2004/0198374 A1 | 10/2004 | Bajikar |
| 2004/0203520 A1 | 10/2004 | Schirtzinger et al. |
| 2004/0203904 A1 | 10/2004 | Gwon et al. |
| 2004/0203909 A1 | 10/2004 | Koster |
| 2004/0204018 A1 | 10/2004 | Kuo |
| 2004/0204035 A1 | 10/2004 | Raghuram et al. |
| 2004/0204126 A1 | 10/2004 | Reyes et al. |
| 2004/0216037 A1 | 10/2004 | Hishida et al. |
| 2004/0218738 A1 | 11/2004 | Arai et al. |
| 2004/0219951 A1 | 11/2004 | Holder |
| 2004/0223049 A1 | 11/2004 | Taniguchi et al. |
| 2004/0235520 A1 | 11/2004 | Cadiz et al. |
| 2004/0242240 A1 | 12/2004 | Lin |
| 2004/0248586 A1 | 12/2004 | Patel et al. |
| 2004/0252197 A1 | 12/2004 | Fraley et al. |
| 2004/0259537 A1 | 12/2004 | Ackley |
| 2004/0264662 A1 | 12/2004 | Silver |
| 2004/0266418 A1 | 12/2004 | Kotzin |
| 2004/0267628 A1 | 12/2004 | Stillman |
| 2005/0004749 A1 | 1/2005 | Park |
| 2005/0032527 A1 | 2/2005 | Sheha et al. |
| 2005/0036509 A1 | 2/2005 | Acharya et al. |
| 2005/0046584 A1 | 3/2005 | Breed |
| 2005/0048987 A1 | 3/2005 | Glass |
| 2005/0070257 A1 | 3/2005 | Saarinen et al. |
| 2005/0075097 A1 | 4/2005 | Lehikoinen et al. |
| 2005/0090768 A1 | 4/2005 | Brattesani et al. |
| 2005/0113080 A1 | 5/2005 | Nishimura |
| 2005/0113113 A1 | 5/2005 | Reed |
| 2005/0120225 A1 | 6/2005 | Kirsch et al. |
| 2005/0136949 A1 | 6/2005 | Barnes, Jr. |
| 2005/0144560 A1 | 6/2005 | Gruen et al. |
| 2005/0151877 A1 | 7/2005 | Fisher |
| 2005/0159189 A1 | 7/2005 | Iyer |
| 2005/0163289 A1 | 7/2005 | Caspi et al. |
| 2005/0164684 A1 | 7/2005 | Chen et al. |
| 2005/0165871 A1 | 7/2005 | Barrs, II et al. |
| 2005/0166242 A1 | 7/2005 | Matsumoto et al. |
| 2005/0186954 A1 | 8/2005 | Kenney |
| 2005/0192030 A1 | 9/2005 | Asthana et al. |
| 2005/0207555 A1 | 9/2005 | Lee et al. |
| 2005/0227731 A1 | 10/2005 | Kall |
| 2005/0235312 A1 | 10/2005 | Karaoguz et al. |
| 2005/0261945 A1 | 11/2005 | Mougin et al. |
| 2005/0272504 A1 | 12/2005 | Eguchi et al. |
| 2005/0282582 A1 | 12/2005 | Slotznick et al. |
| 2006/0003813 A1 | 1/2006 | Seligmann et al. |
| 2006/0031407 A1 | 2/2006 | Dispensa et al. |
| 2006/0033809 A1 | 2/2006 | Farley |
| 2006/0041923 A1 | 2/2006 | McQuaide |
| 2006/0052100 A1 | 3/2006 | Almgren |
| 2006/0059038 A1 | 3/2006 | Iuchi et al. |
| 2006/0084413 A1 | 4/2006 | Myoung |
| 2006/0114100 A1 | 6/2006 | Ghabra et al. |
| 2006/0121986 A1 | 6/2006 | Pelkey et al. |
| 2006/0126284 A1 | 6/2006 | Moscovitch |
| 2006/0133590 A1 | 6/2006 | Jiang |
| 2006/0140173 A1 | 6/2006 | Hoover |
| 2006/0140387 A1 | 6/2006 | Boldt |
| 2006/0143655 A1 | 6/2006 | Ellis et al. |
| 2006/0166650 A1 | 7/2006 | Berger et al. |
| 2006/0167677 A1 | 7/2006 | Bitzer |
| 2006/0206913 A1 | 9/2006 | Jerding et al. |
| 2006/0229114 A2 | 10/2006 | Kim |
| 2006/0234693 A1 | 10/2006 | Isidore et al. |
| 2006/0234758 A1 | 10/2006 | Parupudi et al. |
| 2006/0262911 A1 | 11/2006 | Chin et al. |
| 2006/0276172 A1 | 12/2006 | Rydgren et al. |
| 2006/0284732 A1 | 12/2006 | Brock-Fisher |
| 2007/0005809 A1 | 1/2007 | Kobayashi et al. |
| 2007/0015550 A1 | 1/2007 | Kayanuma |
| 2007/0037605 A1 | 2/2007 | Logan |
| 2007/0050832 A1 | 3/2007 | Wright et al. |
| 2007/0061845 A1 | 3/2007 | Barnes |
| 2007/0097879 A1 | 5/2007 | Bleckert et al. |
| 2007/0109262 A1 | 5/2007 | Oshima et al. |
| 2007/0135145 A1 | 6/2007 | Lee et al. |
| 2007/0135150 A1 | 6/2007 | Ushiki et al. |
| 2007/0142047 A1 | 6/2007 | Heeschen et al. |
| 2007/0190944 A1 | 8/2007 | Doan et al. |
| 2007/0191029 A1 | 8/2007 | Zarem et al. |
| 2007/0204014 A1 | 8/2007 | Greer et al. |
| 2007/0216760 A1 | 9/2007 | Kondo et al. |
| 2007/0218891 A1 | 9/2007 | Cox |
| 2007/0262848 A1 | 11/2007 | Berstis et al. |
| 2007/0293240 A1 | 12/2007 | Drennan et al. |
| 2008/0014917 A1 | 1/2008 | Rhoads et al. |
| 2008/0016534 A1 | 1/2008 | Ortiz et al. |
| 2008/0058005 A1 | 3/2008 | Zicker et al. |
| 2008/0070588 A1 | 3/2008 | Morin |
| 2008/0104544 A1 | 5/2008 | Collins et al. |
| 2008/0109840 A1 | 5/2008 | Walter et al. |
| 2008/0146272 A1 | 6/2008 | Rao et al. |
| 2008/0151696 A1 | 6/2008 | Giroud et al. |
| 2008/0172173 A1 | 7/2008 | Chang et al. |
| 2008/0176545 A1 | 7/2008 | Dicke et al. |
| 2008/0242271 A1 | 10/2008 | Schmidt et al. |
| 2008/0242283 A1 | 10/2008 | Ruckart |
| 2008/0254811 A1 | 10/2008 | Stewart |
| 2008/0299989 A1 | 12/2008 | King et al. |
| 2009/0047972 A1 | 2/2009 | Neeraj |

(56) References Cited

U.S. PATENT DOCUMENTS

| | | |
|---|---|---|
| 2009/0111486 A1 | 4/2009 | Burstrom |
| 2009/0124243 A1 | 5/2009 | Routley et al. |
| 2009/0150807 A1 | 6/2009 | George et al. |
| 2009/0153490 A1 | 6/2009 | Nymark et al. |
| 2009/0186628 A1 | 7/2009 | Yonker et al. |
| 2009/0221330 A1 | 9/2009 | Tomimori |
| 2009/0290369 A1 | 11/2009 | Schofield et al. |
| 2010/0030557 A1 | 2/2010 | Molloy et al. |
| 2010/0062740 A1 | 3/2010 | Ellis et al. |
| 2010/0079267 A1 | 4/2010 | Lin |
| 2010/0145700 A1 | 6/2010 | Kennewick et al. |
| 2012/0059545 A1 | 3/2012 | Furuno et al. |

FOREIGN PATENT DOCUMENTS

| | | |
|---|---|---|
| JP | H11/195137 A1 | 7/1999 |
| JP | 2002/252691 A1 | 9/2002 |
| JP | 2003/078977 A1 | 3/2003 |
| JP | 2003/228726 A1 | 8/2003 |
| JP | 2003/263656 A1 | 9/2003 |
| JP | 2005/216149 A1 | 8/2005 |
| WO | 03001457 A1 | 1/2003 |
| WO | 03096660 A1 | 11/2003 |

OTHER PUBLICATIONS

Casio, "Pocket PC User's Guide" published on Feb. 3, 2000.
Audiovox, "Pocket PC Phone User Manual" published on Mar. 19, 2004.
Palm, "Using your Treo" published in Feb. 2004.
Palm, "Palm Treo 600 Support Knowledge Library, Solution ID 29492" published in Jan. 2004.
Dataviz, "Documents to Go included on Treo 600 Smartphone from palmOne" published in Nov. 2003.
Palm, "Treo 600 smartphone" published in 2003.
FCC's wireless Enhanced 911 (E911) rules, Phase I and Phase II.
HI Corporation's company history (http://www.hicorp.co.jp/english/corporate/history.html) Copyright notice on the web: (c) 2007-2011 HI Corporation. All Rights Reserved.
HI Corporation to Offer 3D Graphics to Motorola Mobile Phone Platform Customers (http://www.wirelessdevnet.com/news/2003/203/news7.html) Published on the web on: Jul. 21, 2003.
Development of NTT docomo Mova N504i—NEC Gi-Ho (Technology Magazine) vol. 56 No. 5/2003, p. 144 Published in: May 2003.
Winners of Tokyo Venture Technology Grand Prize in 2000-2009 (http://www.sangyo-rodo.metro.tokyo.jp/shoko/sogyo/venture/2000-2009winners.pdf) Published in: 2000-2009.

* cited by examiner

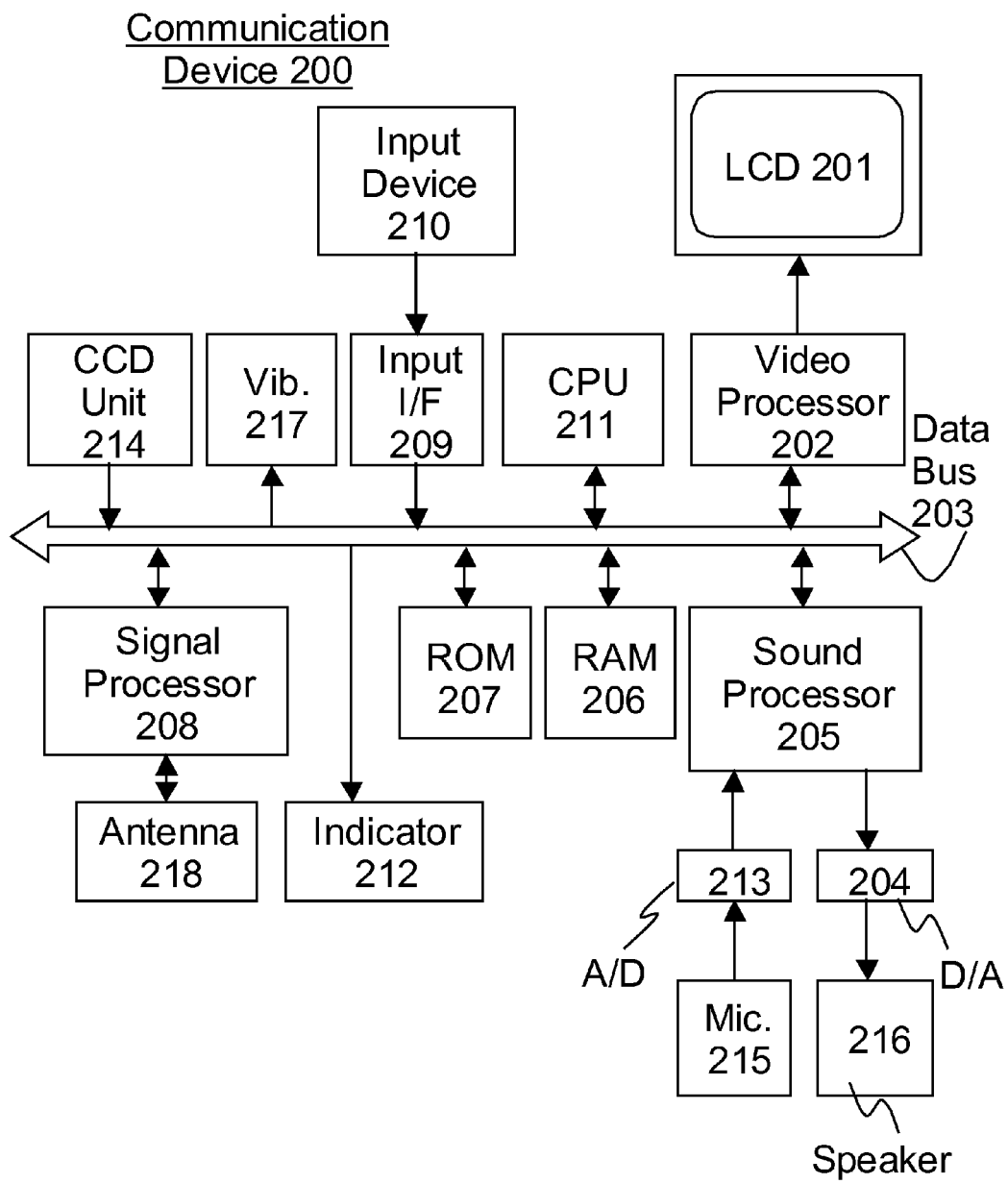

COMMUNICATION DEVICE

CROSS REFERENCE TO RELATED APPLICATIONS

This application is a continuation of U.S. Ser. No. 12/978,569 filed 2010 Dec. 26, which is a continuation of U.S. Ser. No. 11/743,776 filed 2007 May 3, all of which are hereby incorporated herein by reference in their entirety.

BACKGROUND OF INVENTION

The invention relates to communication device and more particularly to the communication device which is capable to communicate with another communication device in a wireless fashion.

U.S. Patent Publication No. 20030045301 is introduced as a prior art of the present invention of which the summary is the following: "The present invention is directed to an electronic system and method for managing location, calendar, and event information. The system comprises at least two hand portable electronic devices, each having a display device to display personal profile, location, and event information, and means for processing, storing, and wirelessly communicating data. A software program running in the electronic device can receive local and remote input data; store, process, and update personal profile, event, time, and location information; and convert location information into coordinates of a graphic map display. The system additionally includes at least one earth orbiting satellite device using remote sensing technology to determine the location coordinates of the electronic device. The electronic devices receive synchronization messages broadcast by the satellite device, causing the software program to update the personal profile, event, time, and location information stored in each hand portable electronic device". However, this prior art does not disclose the communication device comprising a power-off notification implementer, a power-off location notifying implementer, a header displaying implementer, a footer displaying implementer, a zone leaving notifying implementer, and a zone entering notifying implementer.

For the avoidance of doubt, the number of the prior arts introduced herein (and/or in IDS) may be of a large one, however, applicant has no intent to hide the more relevant prior art(s) in the less relevant ones.

SUMMARY OF INVENTION

It is an object of the present invention to provide a device capable to implement a plurality of functions.

It is another object of the present invention to provide merchandise to merchants attractive to the customers in the U.S.

It is another object of the present invention to provide mobility to the users of communication device.

It is another object of the present invention to provide more convenience to the customers in the U.S.

It is another object of the present invention to provide more convenience to the users of communication device or any tangible thing in which the communication device is fixedly or detachably (i.e., removably) installed.

It is another object of the present invention to overcome the shortcomings associated with the foregoing prior arts.

It is another object of the present invention to provide a device capable to implement a plurality of functions.

The present invention introduces the communication device comprising a power-off notification implementer, a power-off location notifying implementer, a header displaying implementer, a footer displaying implementer, a zone leaving notifying implementer, and a zone entering notifying implementer.

BRIEF DESCRIPTION OF DRAWINGS

The above and other aspects, features, and advantages of the invention will be better understood by reading the following more particular description of the invention, presented in conjunction with the following drawing, wherein:

FIG. 1 is a block diagram illustrating an exemplary embodiment of the present invention.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrate(s) only one function or mode in order to avoid complexity in its explanation, however, such description does not mean that only one function or mode can be implemented at a time. In other words, more than one function or mode can be implemented simultaneously by way of utilizing the same random access memory. In addition, the figure number is cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

This paragraph illustrate(s) the elements of Communication Device 200. The elements of Communication Device 200 described in this paragraph is identical to the ones described in FIG. 1, except Communication Device 200 has new element, i.e., LED 219. Here, LED 219 receives infra red signals from other wireless devices, which are transferred to CPU 211 via Data Bus 203. LED 219 also sends infra red signals in a wireless fashion which are composed by CPU 211 and transferred via Data Bus 203. As the second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 described in FIG. 1 except that LED 219 utilizes infra red signals for implementing wireless communication in the second embodiment. For the avoidance of doubt, the reference to FIG. 1 (e.g., referring to FIG. 1 in parenthesis) automatically refers to this paragraph in this specification.

This paragraph illustrate(s) the data stored in Host H. In the present embodiment, Host H includes Host Information Storage Area H00a which stores various types of data to assist and/or co-operate with Communication Device 200 to implement all modes, functions, and systems described in this specification. As another embodiment, Host H may be composed of a plurality of computers, i.e., one master computer and a plurality of slave computers, wherein the master computer is connected to the plurality of slave computers. As another embodiment, Host H may also be composed of a plurality of master computers by way of utilizing peer-to-peer connection.

<<Header Displaying Function>>

The following paragraphs illustrate the header displaying function, wherein when a document is displayed on LCD 201 (FIG. 1), the header is displayed in the document. The text of the header is identified by Communication Device 200. The font type of the header is identified by Communication Device 200. The font size of the header is identified by Communication Device 200. The font color of the header is identified by Communication Device 200. The location of the header displayed in the document is identified by Communication Device 200. The document and the text, font type, font size, font color, and location of the header are transferred to another device, and the another device displays the document with the header in accordance with the text, font type, font size, font color, and location received. Here, the header (or the document header) is the common text displayed at the upper portion of each page of a document. The header may indicate the title of the document.

This paragraph illustrates the major elements utilized to implement the present function. In this embodiment, Host H is connected to Network NT (e.g., the Internet). Device A, a Communication Device 200, is connected to Network NT (e.g., the Internet) in a wireless fashion. Device B, another Communication Device 200, is connected to Network NT (e.g., the Internet) in a wireless fashion. Host H, Device A, and Device B are capable to communicate with each other via Network NT (e.g., the Internet) to implement the present function. Device A and Device B are also capable to communicate with each other directly in a wireless fashion to implement the present function.

This paragraph illustrates the storage area included in Host H. In this embodiment, Host H includes Header Displaying Information Storage Area H549a of which the data and the software program(s) stored therein are described hereinafter.

This paragraph illustrates the storage area(s) included in Header Displaying Information Storage Area H549a. In this embodiment, Header Displaying Information Storage Area H549a includes Header Displaying Data Storage Area H549b and Header Displaying Software Storage Area H549c. Header Displaying Data Storage Area H549b stores the data necessary to implement the present function on the side of Host H, such as the one(s) described hereinafter. Header Displaying Software Storage Area H549c stores the software program(s) necessary to implement the present function on the side of Host H, such as the one(s) described hereinafter.

This paragraph illustrates the storage area(s) included in Header Displaying Data Storage Area H549b. In this embodiment, Header Displaying Data Storage Area H549b includes Document Data Storage Area H549b1, Header Preselected Data Storage Area H549b2, User Selected Data Storage Area H549b3, and Work Area H549b4. Document Data Storage Area H549b1 stores the document data which is the document capable to be displayed on LCD 201 (FIG. 1). The document may be the one which is produced by a word processing software (e.g., MS Word). Header Preselected Data Storage Area H549b2 stores the data described hereinafter. User Selected Data Storage Area H549b3 stores the data described hereinafter. Work Area H549b4 is utilized as a work area to perform calculation and temporarily store data.

This paragraph illustrates the storage area(s) included in Header Preselected Data Storage Area H549b2. In this embodiment, Header Preselected Data Storage Area H549b2 includes Header Preselected Text Data Storage Area H549b2a, Header Preselected Font Type Data Storage Area H549b2b, Header Preselected Font Size Data Storage Area H549b2c, Header Preselected Font Color Data Storage Area H549b2d, and Header Preselected Location Data Storage Area H549b2e. Header Preselected Text Data Storage Area H549b2a stores the data described hereinafter. Header Preselected Font Type Data Storage Area H549b2b stores the data described hereinafter. Header Preselected Font Size Data Storage Area H549b2c stores the data described hereinafter. Header Preselected Font Color Data Storage Area H549b2d stores the data described hereinafter. Header Preselected Location Data Storage Area H549b2e stores the data described hereinafter.

This paragraph illustrates the data stored in Header Preselected Text Data Storage Area H549b2a. In this embodiment, Header Preselected Text Data Storage Area H549b2a comprises two columns, i.e., 'Header Preselected Text ID' and 'Header Preselected Text Data'. Column 'Header Preselected Text ID' stores the header preselected text IDs, and each header preselected text ID is an identification of the corresponding header preselected text data stored in column 'Header Preselected Text Data'. Each header preselected text ID may indicate the name or title of the corresponding header preselected text data. Column 'Header Preselected Text Data' stores the header preselected text data, and each header preselected text data is the text data capable to be utilized as header of a document. In this embodiment, Header Preselected Text Data Storage Area H549b2a stores the following data: 'Header Preselected Text#1' and the corresponding 'Header Preselected Text Data#1'; 'Header Preselected Text#2' and the corresponding 'Header Preselected Text Data#2'; 'Header Preselected Text#3' and the corresponding 'Header Preselected Text Data#3'; and 'Header Preselected Text#4' and the corresponding 'Header Preselected Text Data#4'.

This paragraph illustrates the data stored in Header Preselected Font Type Data Storage Area H549b2b. In this embodiment, Header Preselected Font Type Data Storage Area H549b2b comprises two columns, i.e., 'Header Preselected Font Type ID' and 'Header Preselected Font Type Data'. Column 'Header Preselected Font Type ID' stores the header preselected font type IDs, and each header preselected font type ID is an identification of the corresponding header preselected font type data stored in column 'Header Preselected Font Type Data'. Each header preselected font type ID may indicate the name or title of the corresponding header preselected font type data. Column 'Header Preselected Font Type Data' stores the header preselected font type data, and each header preselected font type data indicates a specific font type, such as Arial, Times New Roman, Tahoma, or Gothic. In this embodiment, Header Preselected Font Type Data Storage Area H549b2b stores the following data: 'Header Preselected Font Type#1' and the corresponding 'Header Preselected Font Type Data#1'; 'Header Preselected Font Type#2' and the corresponding 'Header Preselected Font Type Data#2'; 'Header Preselected Font Type#3' and the corresponding 'Header Preselected Font Type Data#3'; and 'Header Preselected Font Type#4' and the corresponding 'Header Preselected Font Type Data#4'.

This paragraph illustrates the data stored in Header Preselected Font Size Data Storage Area H549b2c. In this embodiment, Header Preselected Font Size Data Storage Area H549b2c comprises two columns, i.e., 'Header Preselected Font Size ID' and 'Header Preselected Font Size Data'. Column 'Header Preselected Font Size ID' stores the header preselected font size IDs, and each header preselected font size ID is an identification of the corresponding header preselected font size data stored in column 'Header Preselected Font Size Data'. Each header preselected font size ID may indicate the name or title of the corresponding header preselected font size data. Column 'Header Preselected Font Size Data' stores the header preselected font size data, and each header preselected font size data indicates a specific font size, such as 8 points, 10 points, 14 points, or 18 points. In this embodiment, Header Preselected Font Size Data Storage Area H549b2c stores the following data: 'Header Preselected Font Size#1' and the corresponding 'Header Preselected Font Size Data#1'; 'Header Preselected Font Size#2' and the corresponding 'Header Preselected Font Size Data#2'; 'Header Preselected Font Size#3' and the corresponding 'Header Preselected Font Size Data#3'; and 'Header Preselected Font Size#4' and the corresponding 'Header Preselected Font Size Data#4'.

This paragraph illustrates the data stored in Header Preselected Font Color Data Storage Area H549b2d. In this embodiment, Header Preselected Font Color Data Storage Area H549b2d comprises two columns, i.e., 'Header Preselected Font Color ID' and 'Header Preselected Font Color Data'. Column 'Header Preselected Font Color ID' stores the header preselected font color IDs, and each header preselected font color ID is an identification of the corresponding header preselected font color data stored in column 'Header Preselected Font Color Data'. Each header preselected font color ID may indicate the name or title of the corresponding header preselected font color data. Column 'Header Preselected Font Color Data' stores the header preselected font color data, and each header preselected font color data indicates a specific font color, such as red, blue, green or yellow. In this embodiment, Header Preselected Font Color Data Storage Area H549b2d stores the following data: 'Header Preselected Font Color#1' and the corresponding 'Header Preselected Font Color Data#1'; 'Header Preselected Font Color#2' and the corresponding 'Header Preselected Font Color Data#2; Header Preselected Font Color#3' and the corresponding 'Header Preselected Font Color Data#3'; and 'Header Preselected Font Color#4' and the corresponding 'Header Preselected Font Color Data#4'.

This paragraph illustrates the data stored in Header Preselected Location Data Storage Area H549b2e. In this embodiment, Header Preselected Location Data Storage Area H549b2e comprises two columns, i.e., 'Header Preselected Location ID' and 'Header Preselected Location Data'. Column 'Header Preselected Location ID' stores the header preselected location IDs, and each header preselected location ID is an identification of the corresponding header preselected location data stored in column 'Header Preselected Location Data'. Each header preselected location ID indicates the name or title of the corresponding header preselected location data. Column 'Header Preselected Location Data' stores the header preselected location data, and each header preselected location data indicates the location at which the header is displayed in the document data. In this embodiment, Header Preselected Location Data Storage Area H549b2e stores the following data: 'Header Preselected Location#1' and the corresponding 'Header Preselected Location Data#1'; 'Header Preselected Location#2' and the corresponding 'Header Preselected Location Data#2; Header Preselected Location#3' and the corresponding 'Header Preselected Location Data#3'; and 'Header Preselected Location#4' and the corresponding 'Header Preselected Location Data#4'.

This paragraph illustrates the storage area(s) included in User Selected Data Storage Area H549b3. In this embodiment, User Selected Data Storage Area H549b3 includes Header Text Data Storage Area H549b3a, Header Font Type Data Storage Area H549b3b, Header Font Size Data Storage Area H549b3c, Header Font Color Data Storage Area H549b3d, and Header Location Data Storage Area H549b3e.

Header Text Data Storage Area H549b3a stores the header text data which is one of the header preselected text data selected by the user. Header Font Type Data Storage Area H549b3b stores the header font type data which is one of the header preselected font type data selected by the user. Header Font Size Data Storage Area H549b3c stores the header font size data which is one of the header preselected font size data selected by the user. Header Font Color Data Storage Area H549b3d stores the header font color data which is one of the header preselected font color data selected by the user. Header Location Data Storage Area H549b3e stores the header location data which is one of the header preselected location data selected by the user.

This paragraph illustrates the software program(s) stored in Header Displaying Software Storage Area H549c. In this embodiment, Header Displaying Software Storage Area H549c stores Header Text Data Producing Software H549c1, Header Font Type Data Producing Software H549c2, Header Font Size Data Producing Software H549c3, Header Font Color Data Producing Software H549c4, Header Location Data Producing Software H549c5, Document Header Displaying Software H549c6, Document Data Transferring Software H549c7, Header Text Data Transferring Software H549c8, Header Font Type Data Transferring Software H549c9, Header Font Size Data Transferring Software H549c10, Header Font Color Data Transferring Software H549c11, Header Location Data Transferring Software H549c12, and Document Package Data Transferring Software H549c13. Header Text Data Producing Software H549c1 is the software program described hereinafter. Header Font Type Data Producing Software H549c2 is the software program described hereinafter. Header Font Size Data Producing Software H549c3 is the software program described hereinafter. Header Font Color Data Producing Software H549c4 is the software program described hereinafter. Header Location Data Producing Software H549c5 is the software program described hereinafter. Document Header Displaying Software H549c6 is the software program described hereinafter. Document Data Transferring Software H549c7 is the software program described hereinafter. Header Text Data Transferring Software H549c8 is the software program described hereinafter. Header Font Type Data Transferring Software H549c9 is the software program described hereinafter. Header Font Size Data Transferring Software H549c10 is the software program described hereinafter. Header Font Color Data Transferring Software H549c11 is the software program described hereinafter. Header Location Data Transferring Software H549c12 is the software program described hereinafter. Document Package Data Transferring Software H549c13 is the software program described hereinafter.

This paragraph illustrates the storage area included in RAM 206 (FIG. 1) of Device A. In this embodiment, RAM 206 includes Header Displaying Information Storage Area 206A549a of which the data and the software program(s) stored therein are described hereinafter.

The data and/or the software program(s) necessary to implement the present function may be downloaded from Host H to Device A.

This paragraph illustrates the storage area(s) included in Header Displaying Information Storage Area 206A549a. In this embodiment, Header Displaying Information Storage Area 206A549a includes Header Displaying Data Storage Area 206A549b and Header Displaying Software Storage Area 206A549c. Header Displaying Data Storage Area 206A549b stores the data necessary to implement the present function on the side of Device A, such as the one(s) described hereinafter. Header Displaying Software Storage Area 206A549c stores the software program(s) necessary to implement the present function on the side of Device A, such as the one(s) described hereinafter.

This paragraph illustrates the storage area(s) included in Header Displaying Data Storage Area 206A549b. In this embodiment, Header Displaying Data Storage Area 206A549b includes Document Data Storage Area 206A549b1, Header Preselected Data Storage Area 206A549b2, User Selected Data Storage Area 206A549b3, and Work Area 206A549b4. Document Data Storage Area 206A549b1 stores the document data which is the document capable to be displayed on LCD 201 (FIG. 1). The document may be the one which is produced by a word processing software (e.g., MS Word). Header Preselected Data Storage Area 206A549b2 stores the data described hereinafter. User Selected Data Storage Area 206A549b3 stores the data described hereinafter. Work Area 206A549b4 is utilized as a work area to perform calculation and temporarily store data.

This paragraph illustrates the storage area(s) included in Header Preselected Data Storage Area 206A549b2. In this embodiment, Header Preselected Data Storage Area 206A549b2 includes Header Preselected Text Data Storage Area 206A549b2a, Header Preselected Font Type Data Storage Area 206A549b2b, Header Preselected Font Size Data Storage Area 206A549b2c, Header Preselected Font Color Data Storage Area 206A549b2d, and Header Preselected Location Data Storage Area 206A549b2e. Header Preselected Text Data Storage Area 206A549b2a stores the data described hereinafter. Header Preselected Font Type Data Storage Area 206A549b2b stores the data described hereinafter. Header Preselected Font Size Data Storage Area 206A549b2c stores the data described hereinafter. Header Preselected Font Color Data Storage Area 206A549b2d stores the data described hereinafter. Header Preselected Location Data Storage Area 206A549b2e stores the data described hereinafter.

This paragraph illustrates the data stored in Header Preselected Text Data Storage Area 206A549b2a. In this embodiment, Header Preselected Text Data Storage Area 206A549b2a comprises two columns, i.e., 'Header Preselected Text ID' and 'Header Preselected Text Data'. Column 'Header Preselected Text ID' stores the header preselected text IDs, and each header preselected text ID is an identification of the corresponding header preselected text data stored in column 'Header Preselected Text Data'. Each header preselected text ID may indicate the name or title of the corresponding header preselected text data. Column 'Header Preselected Text Data' stores the header preselected text data, and each header preselected text data is the text data capable to be utilized as header of a document. In this embodiment, Header Preselected Text Data Storage Area 206A549b2a stores the following data: 'Header Preselected Text#1' and the corresponding 'Header Preselected Text Data#1'; 'Header Preselected Text#2' and the corresponding Header Preselected Text Data#2; 'Header Preselected Text#3' and the corresponding 'Header Preselected Text Data#3'; and 'Header Preselected Text#4' and the corresponding 'Header Preselected Text Data#4'.

This paragraph illustrates the data stored in Header Preselected Font Type Data Storage Area 206A549b2b. In this embodiment, Header Preselected Font Type Data Storage Area 206A549b2b comprises two columns, i.e., 'Header Preselected Font Type ID' and 'Header Preselected Font Type Data'. Column 'Header Preselected Font Type ID' stores the header preselected font type IDs, and each header preselected font type ID is an identification of the corresponding header preselected font type data stored in column 'Header Preselected Font Type Data'. Each header preselected font type ID may indicate the name or title of the corresponding header preselected font type data. Column 'Header Preselected Font Type Data' stores the header preselected font type data, and each header preselected font type data indicates a specific font type, such as Arial, Times New Roman, Tahoma, or Gothic. In this embodiment, Header Preselected Font Type Data Storage Area 206A549b2b stores the following data: 'Header Preselected Font Type#1' and the corresponding 'Header Preselected Font Type Data#1'; 'Header Preselected Font Type#2' and the corresponding 'Header Preselected Font Type Data#2; Header Preselected Font Type#3' and the corresponding 'Header Preselected Font Type Data#3'; and 'Header Preselected Font Type#4' and the corresponding 'Header Preselected Font Type Data#4'.

This paragraph illustrates the data stored in Header Preselected Font Size Data Storage Area 206A549b2c. In this embodiment, Header Preselected Font Size Data Storage Area 206A549b2c comprises two columns, i.e., 'Header Preselected Font Size ID' and 'Header Preselected Font Size Data'. Column 'Header Preselected Font Size ID' stores the header preselected font size IDs, and each header preselected font size ID is an identification of the corresponding header preselected font size data stored in column 'Header Preselected Font Size Data'. Each header preselected font size ID may indicate the name or title of the corresponding header preselected font size data. Column 'Header Preselected Font Size Data' stores the header preselected font size data, and each header preselected font size data indicates a specific font size, such as 8 points, 10 points, 14 points, or 18 points. In this embodiment, Header Preselected Font Size Data Storage Area 206A549b2c stores the following data: 'Header Preselected Font Size#1' and the corresponding 'Header Preselected Font Size Data#1'; 'Header Preselected Font Size#2' and the corresponding 'Header Preselected Font Size Data#2'; 'Header Preselected Font Size#3' and the corresponding 'Header Preselected Font Size Data#3'; and 'Header Preselected Font Size#4' and the corresponding 'Header Preselected Font Size Data#4'.

This paragraph illustrates the data stored in Header Preselected Font Color Data Storage Area 206A549b2d. In this embodiment, Header Preselected Font Color Data Storage Area 206A549b2d comprises two columns, i.e., 'Header Preselected Font Color ID' and 'Header Preselected Font Color Data'. Column 'Header Preselected Font Color ID' stores the header preselected font color IDs, and each header preselected font color ID is an identification of the corresponding header preselected font color data stored in column 'Header Preselected Font Color Data'. Each header preselected font color ID may indicate the name or title of the corresponding header preselected font color data. Column 'Header Preselected Font Color Data' stores the header preselected font color data, and each header preselected font color data indicates a specific font color, such as red, blue, green or yellow. In this embodiment, Header Preselected Font Color Data Storage Area 206A549b2d stores the following data: 'Header Preselected Font Color#1' and the corresponding 'Header Preselected Font Color Data#1'; 'Header Preselected Font Color#2' and the corresponding 'Header Preselected Font Color Data#2; Header Preselected Font Color#3' and the corresponding 'Header Preselected Font Color Data#3'; and 'Header Preselected Font Color#4' and the corresponding 'Header Preselected Font Color Data#4'.

This paragraph illustrates the data stored in Header Preselected Location Data Storage Area 206A549b2e. In this embodiment, Header Preselected Location Data Storage Area 206A549b2e comprises two columns, i.e., 'Header Preselected Location ID' and 'Header Preselected Location Data'. Column 'Header Preselected Location ID' stores the header preselected location IDs, and each header preselected location ID is an identification of the corresponding header preselected location data stored in column 'Header Preselected Location Data'. Each header preselected location ID indicates the name or title of the corresponding header preselected location data. Column 'Header Preselected Location Data' stores the header preselected location data, and each header preselected location data indicates the location at which the header is displayed in the document data. In this embodiment, Header Preselected Location Data Storage Area 206A549b2e stores the following data: 'Header Preselected Location#1' and the corresponding 'Header Preselected Location Data#1'; 'Header Preselected Location#2' and the corresponding 'Header Preselected Location Data#2'; 'Header Preselected Location#3' and the corresponding 'Header Preselected Location Data#3'; and 'Header Preselected Location#4' and the corresponding 'Header Preselected Location Data#4'.

This paragraph illustrates the storage area(s) included in User Selected Data Storage Area 206A549b3. In this embodiment, User Selected Data Storage Area 206A549b3 includes Header Text Data Storage Area 206A549b3a, Header Font Type Data Storage Area 206A549b3b, Header Font Size Data Storage Area 206A549b3c, Header Font Color Data Storage Area 206A549b3d, and Header Location Data Storage Area 206A549b3e. Header Text Data Storage Area 206A549b3a stores the header text data which is one of the header preselected text data selected by the user. Header Font Type Data Storage Area 206A549b3b stores the header font type data which is one of the header preselected font type data selected by the user. Header Font Size Data Storage Area 206A549b3c stores the header font size data which is one of the header preselected font size data selected by the user. Header Font Color Data Storage Area 206A549b3d stores the header font color data which is one of the header preselected font color data selected by the user. Header Location Data Storage Area 206A549b3e stores the header location data which is one of the header preselected location data selected by the user.

This paragraph illustrates the software program(s) stored in Header Displaying Software Storage Area 206A549c. In this embodiment, Header Displaying Software Storage Area 206A549c stores Header Text Data Producing Software 206A549c1, Header Font Type Data Producing Software 206A549c2, Header Font Size Data Producing Software 206A549c3, Header Font Color Data Producing Software 206A549c4, Header Location Data Producing Software 206A549c5, Document Header Displaying Software 206A549c6, Document Data Transferring Software 206A549c7, Header Text Data Transferring Software 206A549c8, Header Font Type Data Transferring Software 206A549c9, Header Font Size Data Transferring Software 206A549c10, Header Font Color Data Transferring Software 206A549c11, Header Location Data Transferring Software 206A549c12, and Document Package Data Transferring Software 206A549c13. Header Text Data Producing Software 206A549c1 is the software program described hereinafter. Header Font Type Data Producing Software 206A549c2 is the software program described hereinafter. Header Font Size Data Producing Software 206A549c3 is the software program described hereinafter. Header Font Color Data Producing Software 206A549c4 is the software program described hereinafter. Header Location Data Producing Software 206A549c5 is the software program described hereinafter. Document Header Displaying Software 206A549c6 is the software program described hereinafter. Document Data Transferring Software 206A549c7 is the software program described hereinafter. Header Text Data Transferring Software 206A549c8 is the software program described hereinafter. Header Font Type Data Transferring Software 206A549c9 is the software program described hereinafter. Header Font Size Data Transferring Software 206A549c10 is the software program described hereinafter. Header Font Color Data Transferring Software 206A549c11 is the software program described hereinafter. Header Location Data Transferring Software 206A549c12 is the software program described hereinafter. Document Package Data Transferring Software 206A549c13 is the software program described hereinafter.

This paragraph illustrates the storage area included in RAM 206 (FIG. 1) of Device B. In this embodiment, RAM 206 includes Header Displaying Information Storage Area 206B549a of which the data and the software program(s) stored therein are described hereinafter.

The data and/or the software program(s) necessary to implement the present function may be downloaded from Host H to Device B.

This paragraph illustrates the storage area(s) included in Header Displaying Information Storage Area 206B549a. In this embodiment, Header Displaying Information Storage Area 206B549a includes Header Displaying Data Storage Area 206B549b and Header Displaying Software Storage Area 206B549c. Header Displaying Data Storage Area 206B549b stores the data necessary to implement the present function on the side of Device B, such as the one(s) described hereinafter. Header Displaying Software Storage Area 206B549c stores the software program(s) necessary to implement the present function on the side of Device B, such as the one(s) described hereinafter.

This paragraph illustrates the storage area(s) included in Header Displaying Data Storage Area 206B549b. In this embodiment, Header Displaying Data Storage Area 206B549b includes Document Data Storage Area 206B549b1, Header Preselected Data Storage Area 206B549b2, User Selected Data Storage Area 206B549b3, and Work Area 206B549b4. Document Data Storage Area 206B549b1 stores the document data which is the document capable to be displayed on LCD 201 (FIG. 1). The document may be the one which is produced by a word processing software (e.g., MS Word). Header Preselected Data Storage Area 206B549b2 stores the data described hereinafter. User Selected Data Storage Area 206B549b3 stores the data described hereinafter. Work Area 206B549b4 is utilized as a work area to perform calculation and temporarily store data.

This paragraph illustrates the storage area(s) included in Header Preselected Data Storage Area 206B549b2. In this embodiment, Header Preselected Data Storage Area 206B549b2 includes Header Preselected Text Data Storage Area 206B549b2a, Header Preselected Font Type Data Storage Area 206B549b2b, Header Preselected Font Size Data Storage Area 206B549b2c, Header Preselected Font Color Data Storage Area 206B549b2d, and Header Preselected Location Data Storage Area 206B549b2e. Header Preselected Text Data Storage Area 206B549b2a stores the data described hereinafter. Header Preselected Font Type Data Storage Area 206B549b2b stores the data described hereinafter. Header Preselected Font Size Data Storage Area 206B549b2c stores the data described hereinafter. Header Preselected Font Color Data Storage Area 206B549b2d stores the data described hereinafter. Header Preselected Location Data Storage Area 206B549b2e stores the data described hereinafter.

This paragraph illustrates the data stored in Header Preselected Text Data Storage Area 206B549b2a. In this embodiment, Header Preselected Text Data Storage Area 206B549b2a comprises two columns, i.e., 'Header Preselected Text ID' and 'Header Preselected Text Data'. Column 'Header Preselected Text ID' stores the header preselected text IDs, and each header preselected text ID is an identification of the corresponding header preselected text data stored in column 'Header Preselected Text Data'. Each header preselected text ID may indicate the name or title of the corresponding header preselected text data. Column 'Header Preselected Text Data' stores the header preselected text data, and each header preselected text data is the text data capable to be utilized as header of a document. In this embodiment, Header Preselected Text Data Storage Area 206B549b2a stores the following data: 'Header Preselected Text#1' and the corresponding 'Header Preselected Text Data#1'; 'Header Preselected Text#2' and the corresponding Header Preselected Text Data#2; 'Header Preselected Text#3' and the corresponding 'Header Preselected Text Data#3'; and 'Header Preselected Text#4' and the corresponding 'Header Preselected Text Data#4'.

This paragraph illustrates the data stored in Header Preselected Font Type Data Storage Area 206B549b2b. In this embodiment, Header Preselected Font Type Data Storage Area 206B549b2b comprises two columns, i.e., 'Header Preselected Font Type ID' and 'Header Preselected Font Type Data'. Column 'Header Preselected Font Type ID' stores the header preselected font type IDs, and each header preselected font type ID is an identification of the corresponding header preselected font type data stored in column 'Header Preselected Font Type Data'. Each header preselected font type ID may indicate the name or title of the corresponding header preselected font type data. Column 'Header Preselected Font Type Data' stores the header preselected font type data, and each header preselected font type data indicates a specific font type, such as Arial, Times New Roman, Tahoma, or Gothic. In this embodiment, Header Preselected Font Type Data Storage Area 206B549b2b stores the following data: 'Header Preselected Font Type#1' and the corresponding 'Header Preselected Font Type Data#1'; 'Header Preselected Font Type#2' and the corresponding Header Preselected Font Type Data#2; 'Header Preselected Font Type#3' and the corresponding 'Header Preselected Font Type Data#3'; and 'Header Preselected Font Type#4' and the corresponding 'Header Preselected Font Type Data#4'.

This paragraph illustrates the data stored in Header Preselected Font Size Data Storage Area 206B549b2c. In this embodiment, Header Preselected Font Size Data Storage Area 206B549b2c comprises two columns, i.e., 'Header Preselected Font Size ID' and 'Header Preselected Font Size Data'. Column 'Header Preselected Font Size ID' stores the header preselected font size IDs, and each header preselected font size ID is an identification of the corresponding header preselected font size data stored in column 'Header Preselected Font Size Data'. Each header preselected font size ID may indicate the name or title of the corresponding header preselected font size data. Column 'Header Preselected Font Size Data' stores the header preselected font size data, and each header preselected font size data indicates a specific font size, such as 8 points, 10 points, 14 points, or 18 points. In this embodiment, Header Preselected Font Size Data Storage Area 206B549b2c stores the following data: 'Header Preselected Font Size 1' and the corresponding 'Header Preselected Font Size Data#1'; 'Header Preselected Font Size#2' and the corresponding 'Header Preselected Font Size Data#2'; 'Header Preselected Font Size#3' and the corresponding 'Header Preselected Font Size Data#3'; and 'Header Preselected Font Size#4' and the corresponding 'Header Preselected Font Size Data#4'.

This paragraph illustrates the data stored in Header Preselected Font Color Data Storage Area 206B549b2d. In this embodiment, Header Preselected Font Color Data Storage Area 206B549b2d comprises two columns, i.e., 'Header Preselected Font Color ID' and 'Header Preselected Font Color Data'. Column 'Header Preselected Font Color ID' stores the header preselected font color IDs, and each header preselected font color ID is an identification of the corresponding header preselected font color data stored in column 'Header Preselected Font Color Data'. Each header preselected font color ID may indicate the name or title of the corresponding header preselected font color data. Column 'Header Preselected Font Color Data' stores the header preselected font color data, and each header preselected font color data indicates a specific font color, such as red, blue, green or yellow. In this embodiment, Header Preselected Font Color Data Storage Area 206B549b2d stores the following data: 'Header Preselected Font Color#1' and the corresponding 'Header Preselected Font Color Data#1'; 'Header Preselected Font Color#2' and the corresponding 'Header Preselected Font Color Data#2'; 'Header Preselected Font Color#3' and the corresponding 'Header Preselected Font Color Data#3'; and 'Header Preselected Font Color#4' and the corresponding 'Header Preselected Font Color Data#4'.

This paragraph illustrates the data stored in Header Preselected Location Data Storage Area 206B549b2e. In this embodiment, Header Preselected Location Data Storage Area 206B549b2e comprises two columns, i.e., 'Header Preselected Location ID' and 'Header Preselected Location Data'. Column 'Header Preselected Location ID' stores the header preselected location IDs, and each header preselected location ID is an identification of the corresponding header preselected location data stored in column 'Header Preselected Location Data'. Each header preselected location ID indicates the name or title of the corresponding header preselected location data. Column 'Header Preselected Location Data' stores the header preselected location data, and each header preselected location data indicates the location at which the header is displayed in the document data. In this embodiment, Header Preselected Location Data Storage Area 206B549b2e stores the following data: 'Header Preselected Location#1' and the corresponding 'Header Preselected Location Data#1'; 'Header Preselected Location#2' and the corresponding 'Header Preselected Location Data#2'; 'Header Preselected Location#3' and the corresponding 'Header Preselected Location Data#3'; and 'Header Preselected Location#4' and the corresponding 'Header Preselected Location Data#4'.

This paragraph illustrates the storage area(s) included in User Selected Data Storage Area 206B549b3. In this embodiment, User Selected Data Storage Area 206B549b3 includes Header Text Data Storage Area 206B549b3a, Header Font Type Data Storage Area 206B549b3b, Header Font Size Data Storage Area 206B549b3c, Header Font Color Data Storage Area 206B549b3d, and Header Location Data Storage Area 206B549b3e. Header Text Data Storage Area 206B549b3a stores the header text data which is one of the header preselected text data selected by the user. Header Font Type Data Storage Area 206B549b3b stores the header font type data which is one of the header preselected font type data selected by the user. Header Font Size Data Storage Area 206B549b3c stores the header font size data which is one of the header preselected font size data selected by the user. Header Font Color Data Storage Area 206B549b3d stores the header font color data which is one of the header preselected font color data selected by the user. Header Location Data Storage Area 206B549b3e stores the header location data which is one of the header preselected location data selected by the user.

This paragraph illustrates the software program(s) stored in Header Displaying Software Storage Area 206B549c. In this embodiment, Header Displaying Software Storage Area 206B549c stores Document Header Displaying Software 206B549c6, Document Data Transferring Software 206B549c7, Header Text Data Transferring Software 206B549c8, Header Font Type Data Transferring Software 206B549c9, Header Font Size Data Transferring Software 206B549c10, Header Font Color Data Transferring Software 206B549c11, Header Location Data Transferring Software 206B549c12, and Document Package Data Transferring Software 206B549c13. Document Header Displaying Software 206B549c6 is the software program described hereinafter. Document Data Transferring Software 206B549c7 is the software program described hereinafter. Header Text Data Transferring Software 206B549c8 is the software program described hereinafter. Header Font Type Data Transferring Software 206B549c9 is the software program described hereinafter. Header Font Size Data Transferring Software 206B549c10 is the software program described hereinafter. Header Font Color Data Transferring Software 206B549c11 is the software program described hereinafter. Header Location Data Transferring Software 206B549c12 is the software program described hereinafter. Document Package Data Transferring Software 206B549c13 is the software program described hereinafter.

This paragraph illustrate(s) Header Text Data Producing Software H549c1 of Host H and Header Text Data Producing Software 206A549c1 of Device A, which produce(s) the header text data. In this embodiment, Host H retrieves all header preselected text IDs (e.g., Header Preselected Text#1 through #4) from Header Preselected Text Data Storage Area H549b2a and sends the data to Device A (S1). CPU 211 (FIG. 1) of Device A receives the header preselected text IDs (e.g., Header Preselected Text#1 through #4) from Host H in a wireless fashion and displays the data on LCD 201 (FIG. 1) of Device A (S2). The user of Device A selects, by utilizing Input Device 210 (FIG. 1) or via voice recognition system, a header preselected text ID (e.g., Header Preselected Text#1) (S3). CPU 211 (FIG. 1) of Device A sends the header preselected text ID (e.g., Header Preselected Text#1) selected in the previous step to Host H in a wireless fashion (S4). Host H receives the header preselected text ID (e.g., Header Preselected Text#1) from Device A (S5). Host H retrieves the header preselected text data (e.g., Header Preselected Text Data#1) corresponding to the header preselected text ID (e.g., Header Preselected Text#1) received in the previous step from Header Preselected Text Data Storage Area H549b2a (S6). Host H stores the header preselected text data (e.g., Header Preselected Text Data#1) retrieved in the previous step as the header text data in Header Text Data Storage Area H549b3a (S7).

This paragraph illustrate(s) Header Font Type Data Producing Software H549c2 of Host H and Header Font Type Data Producing Software 206A549c2 of Device A, which produce(s) the header font type data. In this embodiment, Host H retrieves all header preselected font type IDs (e.g., Header Preselected Font Type#1 through #4) from Header Preselected Font Type Data Storage Area H549b2b and sends the data to Device A (S1). CPU 211 (FIG. 1) of Device A receives the header preselected font type IDs (e.g., Header Preselected Font Type#1 through #4) from Host H in a wireless fashion and displays the data on LCD 201 (FIG. 1) of Device A (S2). The user of Device A selects, by utilizing Input Device 210 (FIG. 1) or via voice recognition system, a header preselected font type ID (e.g., Header Preselected Font Type#1) (S3). CPU 211 (FIG. 1) of Device A sends the header preselected font type ID (e.g., Header Preselected Font Type#1) selected in the previous step to Host H in a wireless fashion (S4). Host H receives the header preselected font type ID (e.g., Header Preselected Font Type#1) from Device A (S5). Host H retrieves the header preselected font type data (e.g., Header Preselected Font Type Data#1) corresponding to the header preselected font type ID (e.g., Header Preselected Font Type#1) received in the previous step from Header Preselected Font Type Data Storage Area H549b2b (S6). Host H stores the header preselected font type data (e.g., Header Preselected Font Type Data#1) retrieved in the previous step as the header font type data in Header Font Type Data Storage Area H549b3b (S7).

This paragraph illustrate(s) Header Font Size Data Producing Software H549c3 of Host H and Header Font Size Data Producing Software 206A549c3 of Device A, which produce(s) the header font size data. In this embodiment, Host H retrieves all header preselected font size IDs (e.g., Header Preselected Font Size#1 through #4) from Header Preselected Font Size Data Storage Area H549b2c and sends the data to Device A (S1). CPU 211 (FIG. 1) of Device A receives the header preselected font size IDs (e.g., Header Preselected Font Size#1 through #4) from Host H in a wireless fashion and displays the data on LCD 201 (FIG. 1) of Device A (S2). The user of Device A selects, by utilizing Input Device 210 (FIG. 1) or via voice recognition system, a header preselected font size ID (e.g., Header Preselected Font Size#1) (S3). CPU 211 (FIG. 1) of Device A sends the header preselected font size ID (e.g., Header Preselected Font Size#1) selected in the previous step to Host H in a wireless fashion (S4). Host H receives the header preselected font size ID (e.g., Header Preselected Font Size#1) from Device A (S5). Host H retrieves the header preselected font size data (e.g., Header Preselected Font Size Data#1) corresponding to the header preselected font size ID (e.g., Header Preselected Font Size#1) received in the previous step from Header Preselected Font Size Data Storage Area H549b2c (S6). Host H stores the header preselected font size data (e.g., Header Preselected Font Size Data#1) retrieved in the previous step as the header font size data in Header Font Size Data Storage Area H549b3c (S7).

This paragraph illustrate(s) Header Font Color Data Producing Software H549c4 of Host H and Header Font Color Data Producing Software 206A549c4 of Device A, which produce(s) the header font color data. In this embodiment, Host H retrieves all header preselected font color IDs (e.g., Header Preselected Font Color#1 through #4) from Header Preselected Font Color Data Storage Area H549b2d and sends the data to Device A (S1). CPU 211 (FIG. 1) of Device A receives the header preselected font color IDs (e.g., Header Preselected Font Color#1 through #4) from Host H in a wireless fashion and displays the data on LCD 201 (FIG. 1) of Device A (S2). The user of Device A selects, by utilizing Input Device 210 (FIG. 1) or via voice recognition system, a header preselected font color ID (e.g., Header Preselected Font Color#1) (S3). CPU 211 (FIG. 1) of Device A sends the header preselected font color ID (e.g., Header Preselected Font Color#1) selected in the previous step to Host H in a wireless fashion (S4). Host H receives the header preselected font color ID (e.g., Header Preselected Font Color#1) from Device A (S5). Host H retrieves the header preselected font color data (e.g., Header Preselected Font Color Data#1) corresponding to the header preselected font color ID (e.g., Header Preselected Font Color#1) received in the previous step from Header Preselected Font Color Data Storage Area H549b2d (S6). Host H stores the header preselected font color data (e.g., Header Preselected Font Color Data#1) retrieved in the previous step as the header font color data in Header Font Color Data Storage Area H549b3d (S7).

This paragraph illustrate(s) Header Location Data Producing Software H549c5 of Host H and Header Location Data Producing Software 206A549c5 of Device A, which produce(s) the header location data. In this embodiment, Host H retrieves all header preselected location IDs (e.g., Header Preselected Location#1 through #4) from Header Preselected Location Data Storage Area H549b2e and sends the data to Device A (S1). CPU 211 (FIG. 1) of Device A receives the header preselected location IDs (e.g., Header Preselected Location#1 through #4) from Host H in a wireless fashion and displays the data on LCD 201 (FIG. 1) of Device A (S2). The user of Device A selects, by utilizing Input Device 210 (FIG. 1) or via voice recognition system, a header preselected location ID (e.g., Header Preselected Location#1) (S3). CPU 211 (FIG. 1) of Device A sends the header preselected location ID (e.g., Header Preselected Location#1) selected in the previous step to Host H in a wireless fashion (S4). Host H receives the header preselected location ID (e.g., Header Preselected Location#1) from Device A (S5). Host H retrieves the header preselected location data (e.g., Header Preselected Location Data#1) corresponding to the header preselected location ID (e.g., Header Preselected Location#1) received in the previous step from Header Preselected Location Data Storage Area H549b2e (S6). Host H stores the header preselected location data (e.g., Header Preselected Location Data#1) retrieved in the previous step as the header location data in Header Location Data Storage Area H549b3e (S7).

This paragraph illustrate(s) Document Header Displaying Software H549c6 of Host H and Document Header Displaying Software 206A549c6 of Device A, which display(s) the header. In this embodiment, the user of Device A inputs, by utilizing Input Device 210 (FIG. 1) or via voice recognition system, the document header displaying command (S1). Here, the document header displaying command is the command to display the header. CPU 211 (FIG. 1) of Device A sends the document header displaying command input in the previous step to Host H in a wireless fashion (S2). Host H receives the document header displaying command from Device A (S3). Host H retrieves the document data from Document Data Storage Area H549b1 and sends the data to Device A (S4). CPU 211 (FIG. 1) of Device A receives the document data from Host H in a wireless fashion and stores the data in Document Data Storage Area 206A549b1 (S5). Host H retrieves the header text data from Header Text Data Storage Area H549b3a and sends the data to Device A (S6). CPU 211 (FIG. 1) of Device A receives the header text data from Host H in a wireless fashion and stores the data in Header Text Data Storage Area 206A549b3a (S7). Host H retrieves the header font type data from Header Font Type Data Storage Area H549b3b and sends the data to Device A (S8). CPU 211 (FIG. 1) of Device A receives the header font type data from Host H in a wireless fashion and stores the data in Header Font Type Data Storage Area 206A549b3b (S9). Host H retrieves the header font size data from Header Font Size Data Storage Area H549b3c and sends the data to Device A (S10). CPU 211 (FIG. 1) of Device A receives the header font size data from Host H in a wireless fashion and stores the data in Header Font Size Data Storage Area 206A549b3c (S11). Host H retrieves the header font color data from Header Font Color Data Storage Area H549b3d and sends the data to Device A (S12). CPU 211 (FIG. 1) of Device A receives the header font color data from Host H in a wireless fashion and stores the data in Header Font Color Data Storage Area 206A549b3d (S13). Host H retrieves the header location data from Header Location Data Storage Area H549b3e and sends the data to Device A (S14). CPU 211 (FIG. 1) of Device A receives the header location data from Host H in a wireless fashion and stores the data in Header Location Data Storage Area 206A549b3e (S15). CPU 211 (FIG. 1) of Device A retrieves the document data from Document Data Storage Area 206A549b1 (S16). CPU 211 (FIG. 1) of Device A displays the document data retrieved in the previous step on LCD 201 (FIG. 1) of Device A (S17). CPU 211 (FIG. 1) of Device A retrieves the header text data from Header Text Data Storage Area 206A549b3a (S18). CPU 211 (FIG. 1) of Device A retrieves the header font type data from Header Font Type Data Storage Area 206A549b3b (S19). CPU 211 (FIG. 1) of Device A retrieves the header font size data from Header Font Size Data Storage Area 206A549b3c (S20). CPU 211 (FIG. 1) of Device A retrieves the header font color data from Header Font Color Data Storage Area 206A549b3d (S21). CPU 211 (FIG. 1) of Device A retrieves the header location data from Header Location Data Storage Area 206A549b3e (S22). CPU 211 (FIG. 1) of Device A displays the header text data retrieved in S18 in accordance with the header font type data retrieved in S19, Header Font Size Data retrieved in S20, and the header font color data retrieved in S21 at the location indicated by the header location data retrieved in S22 on Document Data displayed in S17 (S23).

This paragraph illustrate(s) Document Data Transferring Software H549c7 of Host H, Document Data Transferring Software 206A549c7 of Device A, and Document Data Transferring Software 206B549c7 of Device B, which transfer(s) the document data. In this embodiment, the user of Device A inputs, by utilizing Input Device 210 (FIG. 1) or via voice recognition system, the document data transferring command (S1). Here, the document data transferring command is the command to transfer the document data. CPU 211 (FIG. 1) of Device A sends the document data transferring command input in the previous step to Host H in a wireless fashion (S2). Host H receives the document data transferring command from Device A (S3). Host H retrieves the document data from Document Data Storage Area H549b1 and sends the data to Device B (S4). CPU 211 (FIG. 1) of Device B receives the document data from Host H in a wireless fashion and stores the data in Document Data Storage Area 206B549b1 (S5).

This paragraph illustrate(s) Header Text Data Transferring Software H549c8 of Host H, Header Text Data Transferring Software 206A549c8 of Device A, and Header Text Data Transferring Software 206B549c8 of Device B, which transfer(s) the header text data. In this embodiment, the user of Device A inputs, by utilizing Input Device 210 (FIG. 1) or via voice recognition system, the header text data transferring command (S1). Here, the header text data transferring command is the command to transfer the header text data. CPU 211 (FIG. 1) of Device A sends the header text data transferring command input in the previous step to Host H in a wireless fashion (S2). Host H receives the header text data transferring command from Device A (S3). Host H retrieves the header text data from Header Text Data Storage Area H549b3a and sends the data to Device B (S4). CPU 211 (FIG. 1) of Device B receives the header text data from Host H in a wireless fashion and stores the data in Header Text Data Storage Area 206B549b3a (S5).

This paragraph illustrate(s) Header Font Type Data Transferring Software H549c9 of Host H, Header Font Type Data Transferring Software 206A549c9 of Device A, and Header Font Type Data Transferring Software 206B549c9 of Device B, which transfer(s) the header font type data. In this embodiment, the user of Device A inputs, by utilizing Input Device 210 (FIG. 1) or via voice recognition system, the header font type data transferring command (S1). Here, the header font type data transferring command is the command to transfer the header font type data. CPU 211 (FIG. 1) of Device A sends the header font type data transferring command input in the previous step to Host H in a wireless fashion (S2). Host H receives the header font type data transferring command from Device A (S3). Host H retrieves the header font type data from Header Font Type Data Storage Area H549b3b and sends the data to Device B (S4). CPU 211 (FIG. 1) of Device B receives the header font type data from Host H in a wireless fashion and stores the data in Header Font Type Data Storage Area 206B549b3b (S5).

This paragraph illustrate(s) Header Font Size Data Transferring Software H549c10 of Host H, Header Font Size Data Transferring Software 206A549c10 of Device A, and Header Font Size Data Transferring Software 206B549c10 of Device B, which transfer(s) the header font size data. In this embodiment, the user of Device A inputs, by utilizing Input Device 210 (FIG. 1) or via voice recognition system, the header font size data transferring command (S1). Here, the header font size data transferring command is the command to transfer the header font size data. CPU 211 (FIG. 1) of Device A sends the header font size data transferring command input in the previous step to Host H in a wireless fashion (S2). Host H receives the header font size data transferring command from Device A (S3). Host H retrieves the header font size data from Header Font Size Data Storage Area H549b3c and sends the data to Device B (S4). CPU 211 (FIG. 1) of Device B receives the header font size data from Host H in a wireless fashion and stores the data in Header Font Size Data Storage Area 206B549b3c (S5).

This paragraph illustrate(s) Header Font Color Data Transferring Software H549c11 of Host H, Header Font Color Data Transferring Software 206A549c11 of Device A, and Header Font Color Data Transferring Software 206B549c11 of Device B, which transfer(s) the header font color data. In this embodiment, the user of Device A inputs, by utilizing Input Device 210 (FIG. 1) or via voice recognition system, the header font color data transferring command (S1). Here, the header font color data transferring command is the command to transfer the header font color data. CPU 211 (FIG. 1) of Device A sends the header font color data transferring command input in the previous step to Host H in a wireless fashion (S2). Host H receives the header font color data transferring command from Device A (S3). Host H retrieves the header font color data from Header Font Color Data Storage Area H549b3d and sends the data to Device B (S4). CPU 211 (FIG. 1) of Device B receives the header font color data from Host H in a wireless fashion and stores the data in Header Font Color Data Storage Area 206B549b3d (S5).

This paragraph illustrate(s) Header Location Data Transferring Software H549c12 of Host H, Header Location Data Transferring Software 206A549c12 of Device A, and Header Location Data Transferring Software 206B549c12 of Device B, which transfer(s) the header location data. In this embodiment, the user of Device A inputs, by utilizing Input Device 210 (FIG. 1) or via voice recognition system, the header location data transferring command (S1). Here, the header location data transferring command is the command to transfer the header location data. CPU 211 (FIG. 1) of Device A sends the header location data transferring command input in the previous step to Host H in a wireless fashion (S2). Host H receives the header location data transferring command from Device A (S3). Host H retrieves the header location data from Header Location Data Storage Area H549b3e and sends the data to Device B (S4). CPU 211 (FIG. 1) of Device B receives the header location data from Host H in a wireless fashion and stores the data in Header Location Data Storage Area 206B549b3e (S5).

This paragraph illustrate(s) Document Package Data Transferring Software H549c13 of Host H, Document Package Data Transferring Software 206A549c13 of Device A, and Document Package Data Transferring Software 206B549c13 of Device B, which transfer(s) the document data and all relevant data. In this embodiment, the user of Device A inputs, by utilizing Input Device 210 (FIG. 1) or via voice recognition system, the document package data transferring command (S1). Here, the document package data transferring command is the command to transfer the document data and all relevant data. CPU 211 (FIG. 1) of Device A sends the document package data transferring command to Host H in a wireless fashion (S2). Host H receives the document package data transferring command from Device A (S3). Host H retrieves the document data from Document Data Storage Area H549b1 and sends the data to Device B in a wireless fashion (S4). CPU 211 (FIG. 1) of Device B receives the document data from Host H in a wireless fashion and stores the data in Document Data Storage Area 206B549b1 (S5). Host H retrieves the header text data from Header Text Data Storage Area H549b3a and sends the data to Device B in a wireless fashion (S6). CPU 211 (FIG. 1) of Device B receives the header text data from Host H in a wireless fashion and stores the data in Header Text Data Storage Area 206B549b3a (S7). Host H retrieves the header font type data from Header Font Type Data Storage Area H549b3b and sends the data to Device B in a wireless fashion (S8). CPU 211 (FIG. 1) of Device B receives the header font type data from Host H in a wireless fashion and stores the data in Header Font Type Data Storage Area 206B549b3b (S9). Host H retrieves the header font size data from Header Font Size Data Storage Area H549b3c and sends the data to Device B in a wireless fashion (S10). CPU 211 (FIG. 1) of Device B receives the header font size data from Host H in a wireless fashion and stores the data in Header Font Size Data Storage Area 206B549b3c (S11). Host H retrieves the header font color data from Header Font Color Data Storage Area H549b3d and sends the data to Device B in a wireless fashion (S12). CPU 211 (FIG. 1) of Device B receives the header font color data from Host H in a wireless fashion and stores the data in Header Font Color Data Storage Area 206B549b3d (S13). Host H retrieves the header location data from Header Location Data Storage Area H549b3e and sends the data to Device B in a wireless fashion (S14). CPU 211 (FIG. 1) of Device B receives the header location data from Host H in a wireless fashion and stores the data in Header Location Data Storage Area 206B549b3e (S15).

This paragraph illustrate(s) Document Header Displaying Software 206B549c6 of Device B, which display(s) the header. In this embodiment, the user of Device B inputs, by utilizing Input Device 210 (FIG. 1) or via voice recognition system, the document header displaying command (S1). Here, the document header displaying command is the command to display the header. CPU 211 (FIG. 1) of Device B retrieves the document data from Document Data Storage Area 206B549b1 (S2). CPU 211 (FIG. 1) of Device B displays the document data retrieved in the previous step on LCD 201 (FIG. 1) of Device B (S3). CPU 211 (FIG. 1) of Device B retrieves the header text data from Header Text Data Storage Area 206B549b3a (S4). CPU 211 (FIG. 1) of Device B retrieves the header font type data from Header Font Type Data Storage Area 206B549b3b (S5). CPU 211 (FIG. 1) of Device B retrieves the header font size data from Header Font Size Data Storage Area 206B549b3c (S6). CPU 211 (FIG. 1) of Device B retrieves the header font color data from Header Font Color Data Storage Area 206B549b3d (S7). CPU 211 (FIG. 1) of Device B retrieves the header location data from Header Location Data Storage Area 206B549b3e (S8). CPU 211 (FIG. 1) of Device B displays the header text data retrieved in S4 in accordance with the header font type data retrieved in S5, Header Font Size Data retrieved in S6, and the header font color data retrieved in S7 at the location indicated by the header location data retrieved in S8 on Document Data displayed in S3 (S9).

The following paragraphs illustrate another embodiment wherein Device A plays the major role in implementing the present function.

This paragraph illustrate(s) Header Text Data Producing Software 206A549c1 of Device A, which produce(s) the header text data. In this embodiment, CPU 211 (FIG. 1) of Device A retrieves all header preselected text IDs (e.g., Header Preselected Text#1 through #4) from Header Preselected Text Data Storage Area 206A549b2a (S1). CPU 211 (FIG. 1) of Device A displays the header preselected text IDs (e.g., Header Preselected Text#1 through #4) retrieved in the previous step on LCD 201 (FIG. 1) of Device A (S2). The user of Device A selects, by utilizing Input Device 210 (FIG. 1) or via voice recognition system, a header preselected text ID (e.g., Header Preselected Text#1) (S3). CPU 211 (FIG. 1) of Device A retrieves the header preselected text data (e.g., Header Preselected Text Data#1) corresponding to the header preselected text ID (e.g., Header Preselected Text#1) selected in the previous step from Header Preselected Text Data Storage Area 206A549b2a (S4). CPU 211 (FIG. 1) of Device A stores the header preselected text data (e.g., Header Preselected Text Data#1) retrieved in the previous step as the header text data in Header Text Data Storage Area 206A549b3a (S5).

This paragraph illustrate(s) Header Font Type Data Producing Software 206A549c2 of Device A, which produce(s) the header font type data. In this embodiment, CPU 211 (FIG. 1) of Device A retrieves all header preselected font type IDs (e.g., Header Preselected Font Type#1 through #4) from Header Preselected Font Type Data Storage Area 206A549b2b (S1). CPU 211 (FIG. 1) of Device A displays the header preselected font type IDs (e.g., Header Preselected Font Type#1 through #4) retrieved in the previous step on LCD 201 (FIG. 1) of Device A (S2). The user of Device A selects, by utilizing Input Device 210 (FIG. 1) or via voice recognition system, a header preselected font type ID (e.g., Header Preselected Font Type#1) (S3). CPU 211 (FIG. 1) of Device A retrieves the header preselected font type data (e.g., Header Preselected Font Type Data#1) corresponding to the header preselected font type ID (e.g., Header Preselected Font Type#1) selected in the previous step from Header Preselected Font Type Data Storage Area 206A549b2b (S4). CPU 211 (FIG. 1) of Device A stores the header preselected font type data (e.g., Header Preselected Font Type Data#1) retrieved in the previous step as the header font type data in Header Font Type Data Storage Area 206A549b3b (S5).

This paragraph illustrate(s) Header Font Size Data Producing Software 206A549c3 of Device A, which produce(s) the header font size data. In this embodiment, CPU 211 (FIG. 1) of Device A retrieves all header preselected font size IDs (e.g., Header Preselected Font Size#1 through #4) from Header Preselected Font Size Data Storage Area 206A549b2c (S1). CPU 211 (FIG. 1) of Device A displays the header preselected font size IDs (e.g., Header Preselected Font Size#1 through #4) retrieved in the previous step on LCD 201 (FIG. 1) of Device A (S2). The user of Device A selects, by utilizing Input Device 210 (FIG. 1) or via voice recognition system, a header preselected font size ID (e.g., Header Preselected Font Size#1) (S3). CPU 211 (FIG. 1) of Device A retrieves the header preselected font size data (e.g., Header Preselected Font Size Data#1) corresponding to the header preselected font size ID (e.g., Header Preselected Font Size#1) selected in the previous step from Header Preselected Font Size Data Storage Area 206A549b2c (S4). CPU 211 (FIG. 1) of Device A stores the header preselected font size data (e.g., Header Preselected Font Size Data#1) retrieved in the previous step as the header font size data in Header Font Size Data Storage Area 206A549b3c (S5).

This paragraph illustrate(s) Header Font Color Data Producing Software 206A549c4 of Device A, which produce(s) the header font color data. In this embodiment, CPU 211 (FIG. 1) of Device A retrieves all header preselected font color IDs (e.g., Header Preselected Font Color#1 through #4) from Header Preselected Font Color Data Storage Area 206A549b2d (S1). CPU 211 (FIG. 1) of Device A displays the header preselected font color IDs (e.g., Header Preselected Font Color#1 through #4) retrieved in the previous step on LCD 201 (FIG. 1) of Device A (S2). The user of Device A selects, by utilizing Input Device 210 (FIG. 1) or via voice recognition system, a header preselected font color ID (e.g., Header Preselected Font Color#1) (S3). CPU 211 (FIG. 1) of Device A retrieves the header preselected font color data (e.g., Header Preselected Font Color Data#1) corresponding to the header preselected font color ID (e.g., Header Preselected Font Color#1) selected in the previous step from Header Preselected Font Color Data Storage Area 206A549b2d (S4). CPU 211 (FIG. 1) of Device A stores the header preselected font color data (e.g., Header Preselected Font Color Data#1) retrieved in the previous step as the header font color data in Header Font Color Data Storage Area 206A549b3d (S5).

This paragraph illustrate(s) Header Location Data Producing Software 206A549c5 of Device A, which produce(s) the header location data. In this embodiment, CPU 211 (FIG. 1) of Device A retrieves all header preselected location IDs (e.g., Header Preselected Location#1 through #4) from Header Preselected Location Data Storage Area 206A549b2e (S1). CPU 211 (FIG. 1) of Device A displays the header preselected location IDs (e.g., Header Preselected Location#1 through #4) retrieved in the previous step on LCD 201 (FIG. 1) of Device A (S2). The user of Device A selects, by utilizing Input Device 210 (FIG. 1) or via voice recognition system, a header preselected location ID (e.g., Header Preselected Location#1) (S3). CPU 211 (FIG. 1) of Device A retrieves the header preselected location data (e.g., Header Preselected Location Data#1) corresponding to the header preselected location ID (e.g., Header Preselected Location#1) selected in the previous step from Header Preselected Location Data Storage Area 206A549b2e (S4). CPU 211 (FIG. 1) of Device A stores the header preselected location data (e.g., Header Preselected Location Data#1) retrieved in the previous step as the header location data in Header Location Data Storage Area 206A549b3e (S5).

This paragraph illustrate(s) Document Header Displaying Software 206A549c6 of Device A, which display(s) the header. In this embodiment, the user of Device A inputs, by utilizing Input Device 210 (FIG. 1) or via voice recognition system, the document header displaying command (S1). Here, the document header displaying command is the command to display the header. CPU 211 (FIG. 1) of Device A retrieves the document data from Document Data Storage Area 206A549b1 (S2). CPU 211 (FIG. 1) of Device A displays the document data retrieved in the previous step on LCD 201 (FIG. 1) of Device A (S3). CPU 211 (FIG. 1) of Device A retrieves the header text data from Header Text Data Storage Area 206A549b3a (S4). CPU 211 (FIG. 1) of Device A retrieves the header font type data from Header Font Type Data Storage Area 206A549b3b (S5). CPU 211 (FIG. 1) of Device A retrieves the header font size data from Header Font Size Data Storage Area 206A549b3c (S6). CPU 211 (FIG. 1) of Device A retrieves the header font color data from Header Font Color Data Storage Area 206A549b3d (S7). CPU 211 (FIG. 1) of Device A retrieves the header location data from Header Location Data Storage Area 206A549b3e (S8). CPU 211 (FIG. 1) of Device A displays the header text data retrieved in S4 in accordance with the header font type data retrieved in S5, Header Font Size Data retrieved in S6, and the header font color data retrieved in S7 at the location indicated by the header location data retrieved in S8 on Document Data displayed in S3 (S9).

This paragraph illustrate(s) Document Data Transferring Software 206A549c7 of Device A and Document Data Transferring Software 206B549c7 of Device B, which transfer(s) the document data. In this embodiment, the user of Device A inputs, by utilizing Input Device 210 (FIG. 1) or via voice recognition system, the document data transferring command (S1). Here, the document data transferring command is the command to transfer the document data. CPU 211 (FIG. 1) of Device A retrieves the document data from Document Data Storage Area 206A549b1 and sends the data to Device B in a wireless fashion (S2). CPU 211 (FIG. 1) of Device B receives the document data from Device A in a wireless fashion and stores the data in Document Data Storage Area 206B549b1 (S3).

This paragraph illustrate(s) Header Text Data Transferring Software 206A549c8 of Device A and Header Text Data Transferring Software 206B549c8 of Device B, which transfer(s) the header text data. In this embodiment, the user of Device A inputs, by utilizing Input Device 210 (FIG. 1) or via voice recognition system, the header text data transferring command (S1). Here, the header text data transferring command is the command to transfer the header text data. CPU 211 (FIG. 1) of Device A retrieves the header text data from Header Text Data Storage Area 206A549b3a and sends the data to Device B in a wireless fashion (S2). CPU 211 (FIG. 1) of Device B receives the header text data from Device A in a wireless fashion and stores the data in Header Text Data Storage Area 206B549b3a (S3).

This paragraph illustrate(s) Header Font Type Data Transferring Software 206A549c9 of Device A and Header Font Type Data Transferring Software 206B549c9 of Device B, which transfer(s) the header font type data. In this embodiment, the user of Device A inputs, by utilizing Input Device 210 (FIG. 1) or via voice recognition system, the header font type data transferring command (S1). Here, the header font type data transferring command is the command to transfer the header font type data. CPU 211 (FIG. 1) of Device A retrieves the header font type data from Header Font Type Data Storage Area 206A549b3b and sends the data to Device B in a wireless fashion (S2). CPU 211 (FIG. 1) of Device B receives the header font type data from Device A in a wireless fashion and stores the data in Header Font Type Data Storage Area 206B549b3b (S3).

This paragraph illustrate(s) Header Font Size Data Transferring Software 206A549c10 of Device A and Header Font Size Data Transferring Software 206B549c10 of Device B, which transfer(s) the header font size data. In this embodiment, the user of Device A inputs, by utilizing Input Device 210 (FIG. 1) or via voice recognition system, the header font size data transferring command (S1). Here, the header font size data transferring command is the command to transfer the header font size data. CPU 211 (FIG. 1) of Device A retrieves the header font size data from Header Font Size Data Storage Area 206A549*b*3*c* and sends the data to Device B in a wireless fashion (S2). CPU 211 (FIG. 1) of Device B receives the header font size data from Device A in a wireless fashion and stores the data in Header Font Size Data Storage Area 206B549*b*3*c* (S3).

This paragraph illustrate(s) Header Font Color Data Transferring Software 206A549*c*11 of Device A and Header Font Color Data Transferring Software 206B549*c*11 of Device B, which transfer(s) the header font color data. In this embodiment, the user of Device A inputs, by utilizing Input Device 210 (FIG. 1) or via voice recognition system, the header font color data transferring command (S1). Here, the header font color data transferring command is the command to transfer the header font color data. CPU 211 (FIG. 1) of Device A retrieves the header font color data from Header Font Color Data Storage Area 206A549*b*3*d* and sends the data to Device B in a wireless fashion (S2). CPU 211 (FIG. 1) of Device B receives the header font color data from Device A in a wireless fashion and stores the data in Header Font Color Data Storage Area 206B549*b*3*d* (S3).

This paragraph illustrate(s) Header Location Data Transferring Software 206A549*c*12 of Device A and Header Location Data Transferring Software 206B549*c*12 of Device B, which transfer(s) the header location data. In this embodiment, the user of Device A inputs, by utilizing Input Device 210 (FIG. 1) or via voice recognition system, the header location data transferring command (S1). Here, the header location data transferring command is the command to transfer the header location data. CPU 211 (FIG. 1) of Device A retrieves the header location data from Header Location Data Storage Area 206A549*b*3*e* and sends the data to Device B in a wireless fashion (S2). CPU 211 (FIG. 1) of Device B receives the header location data from Device A in a wireless fashion and stores the data in Header Location Data Storage Area 206B549*b*3*e* (S3).

This paragraph illustrate(s) Document Package Data Transferring Software 206A549*c*13 of Device A and Document Package Data Transferring Software 206B549*c*13 of Device B, which transfer(s) the document data and all relevant data. In this embodiment, the user of Device A inputs, by utilizing Input Device 210 (FIG. 1) or via voice recognition system, the document package data transferring command (S1). Here, the document package data transferring command is the command to transfer the document data and all relevant data. CPU 211 (FIG. 1) of Device A retrieves the document data from Document Data Storage Area 206A549*b*1 and sends the data to Device B in a wireless fashion (S2). CPU 211 (FIG. 1) of Device B receives the document data from Device A in a wireless fashion and stores the data in Document Data Storage Area 206B549*b*1 (S3). CPU 211 (FIG. 1) of Device A retrieves the header text data from Header Text Data Storage Area 206A549*b*3*a* and sends the data to Device B in a wireless fashion (S4). CPU 211 (FIG. 1) of Device B receives the header text data from Device A in a wireless fashion and stores the data in Header Text Data Storage Area 206B549*b*3*a* (S5). CPU 211 (FIG. 1) of Device A retrieves the header font type data from Header Font Type Data Storage Area 206A549*b*3*b* and sends the data to Device B in a wireless fashion (S6). CPU 211 (FIG. 1) of Device B receives the header font type data from Device A in a wireless fashion and stores the data in Header Font Type Data Storage Area 206B549*b*3*b* (S7). CPU 211 (FIG. 1) of Device A retrieves the header font size data from Header Font Size Data Storage Area 206A549*b*3*c* and sends the data to Device B in a wireless fashion (S 8). CPU 211 (FIG. 1) of Device B receives the header font size data from Device A in a wireless fashion and stores the data in Header Font Size Data Storage Area 206B549*b*3*c* (S9). CPU 211 (FIG. 1) of Device A retrieves the header font color data from Header Font Color Data Storage Area 206A549*b*3*d* and sends the data to Device B in a wireless fashion (S10). CPU 211 (FIG. 1) of Device B receives the header font color data from Device A in a wireless fashion and stores the data in Header Font Color Data Storage Area 206B549*b*3*d* (S11). CPU 211 (FIG. 1) of Device A retrieves the header location data from Header Location Data Storage Area 206A549*b*3*e* and sends the data to Device B in a wireless fashion (S12). CPU 211 (FIG. 1) of Device B receives the header location data from Device A in a wireless fashion and stores the data in Header Location Data Storage Area 206B549*b*3*e* (S13).

This paragraph illustrate(s) Document Header Displaying Software 206B549*c*6 of Device B, which display(s) the header. In this embodiment, the user of Device B inputs, by utilizing Input Device 210 (FIG. 1) or via voice recognition system, the document header displaying command (S1). Here, the document header displaying command is the command to display the header. CPU 211 (FIG. 1) of Device B retrieves the document data from Document Data Storage Area 206B549*b*1 (S2). CPU 211 (FIG. 1) of Device B displays the document data retrieved in the previous step on LCD 201 (FIG. 1) of Device B (S3). CPU 211 (FIG. 1) of Device B retrieves the header text data from Header Text Data Storage Area 206B549*b*3*a* (S4). CPU 211 (FIG. 1) of Device B retrieves the header font type data from Header Font Type Data Storage Area 206B549*b*3*b* (S5). CPU 211 (FIG. 1) of Device B retrieves the header font size data from Header Font Size Data Storage Area 206B549*b*3*c* (S6). CPU 211 (FIG. 1) of Device B retrieves the header font color data from Header Font Color Data Storage Area 206B549*b*3*d* (S7). CPU 211 (FIG. 1) of Device B retrieves the header location data from Header Location Data Storage Area 206B549*b*3*e* (S8). CPU 211 (FIG. 1) of Device B displays the header text data retrieved in S4 in accordance with the header font type data retrieved in S5, Header Font Size Data retrieved in S6, and the header font color data retrieved in S7 at the location indicated by the header location data retrieved in S8 on Document Data displayed in S3 (S9).

<<Footer Displaying Function>>

The following paragraphs illustrate the footer displaying function, wherein when a document is displayed on LCD 201 (FIG. 1), the footer is displayed in the document. The text of the footer is identified by Communication Device 200. The font type of the footer is identified by Communication Device 200. The font size of the footer is identified by Communication Device 200. The font color of the footer is identified by Communication Device 200. The location of the footer displayed in the document is identified by Communication Device 200. The document and the text, font type, font size, font color, and location of the footer are transferred to another device, and the another device displays the document with the footer in accordance with the text, font type, font size, font color, and location received. Here, the footer (or the document footer) is the common text displayed at the lower portion of each page of a document. The footer may indicate the page number of the corresponding page of the document.

This paragraph illustrates the major elements utilized to implement the present function. In this embodiment, Host H is connected to Network NT (e.g., the Internet). Device A, a Communication Device 200, is connected to Network NT (e.g., the Internet) in a wireless fashion. Device B, another Communication Device 200, is connected to Network NT (e.g., the Internet) in a wireless fashion. Host H, Device A, and Device B are capable to communicate with each other via Network NT (e.g., the Internet) to implement the present function. Device A and Device B are also capable to communicate with each other directly in a wireless fashion to implement the present function.

This paragraph illustrates the storage area included in Host H. In this embodiment, Host H includes Footer Displaying Information Storage Area H550a of which the data and the software program(s) stored therein are described hereinafter.

This paragraph illustrates the storage area(s) included in Footer Displaying Information Storage Area H550a. In this embodiment, Footer Displaying Information Storage Area H550a includes Footer Displaying Data Storage Area H550b and Footer Displaying Software Storage Area H550c. Footer Displaying Data Storage Area H550b stores the data necessary to implement the present function on the side of Host H, such as the one(s) described hereinafter. Footer Displaying Software Storage Area H550c stores the software program(s) necessary to implement the present function on the side of Host H, such as the one(s) described hereinafter.

This paragraph illustrates the storage area(s) included in Footer Displaying Data Storage Area H550b. In this embodiment, Footer Displaying Data Storage Area H550b includes Document Data Storage Area H550b1, Footer Preselected Data Storage Area H550b2, User Selected Data Storage Area H550b3, and Work Area H550b4. Document Data Storage Area H550b1 stores the document data which is the document capable to be displayed on LCD 201 (FIG. 1). The document may be the one which is produced by a word processing software (e.g., MS Word). Footer Preselected Data Storage Area H550b2 stores the data described hereinafter. User Selected Data Storage Area H550b3 stores the data described hereinafter. Work Area H550b4 is utilized as a work area to perform calculation and temporarily store data.

This paragraph illustrates the storage area(s) included in Footer Preselected Data Storage Area H550b2. In this embodiment, Footer Preselected Data Storage Area H550b2 includes Footer Preselected Text Data Storage Area H550b2a, Footer Preselected Font Type Data Storage Area H550b2b, Footer Preselected Font Size Data Storage Area H550b2c, Footer Preselected Font Color Data Storage Area H550b2d, and Footer Preselected Location Data Storage Area H550b2e. Footer Preselected Text Data Storage Area H550b2a stores the data described hereinafter. Footer Preselected Font Type Data Storage Area H550b2b stores the data described hereinafter. Footer Preselected Font Size Data Storage Area H550b2c stores the data described hereinafter. Footer Preselected Font Color Data Storage Area H550b2d stores the data described hereinafter. Footer Preselected Location Data Storage Area H550b2e stores the data described hereinafter.

This paragraph illustrates the data stored in Footer Preselected Text Data Storage Area H550b2a. In this embodiment, Footer Preselected Text Data Storage Area H550b2a comprises two columns, i.e., 'Footer Preselected Text ID' and 'Footer Preselected Text Data'. Column 'Footer Preselected Text ID' stores the footer preselected text IDs, and each footer preselected text ID is an identification of the corresponding footer preselected text data stored in column 'Footer Preselected Text Data'. Each footer preselected text ID may indicate the name or title of the corresponding footer preselected text data. Column 'Footer Preselected Text Data' stores the footer preselected text data, and each footer preselected text data is the text data capable to be utilized as footer of a document. In this embodiment, Footer Preselected Text Data Storage Area H550b2a stores the following data: Footer Preselected Text#1' and the corresponding 'Footer Preselected Text Data#1'; Footer Preselected Text#2' and the corresponding 'Footer Preselected Text Data#2'; Footer Preselected Text#3' and the corresponding 'Footer Preselected Text Data#3'; and Footer Preselected Text#4' and the corresponding 'Footer Preselected Text Data#4'.

This paragraph illustrates the data stored in Footer Preselected Font Type Data Storage Area H550b2b. In this embodiment, Footer Preselected Font Type Data Storage Area H550b2b comprises two columns, i.e., 'Footer Preselected Font Type ID' and 'Footer Preselected Font Type Data'. Column 'Footer Preselected Font Type ID' stores the footer preselected font type IDs, and each footer preselected font type ID is an identification of the corresponding footer preselected font type data stored in column 'Footer Preselected Font Type Data'. Each footer preselected font type ID may indicate the name or title of the corresponding footer preselected font type data. Column 'Footer Preselected Font Type Data' stores the footer preselected font type data, and each footer preselected font type data indicates a specific font type, such as Arial, Times New Roman, Tahoma, or Gothic. In this embodiment, Footer Preselected Font Type Data Storage Area H550b2b stores the following data: Footer Preselected Font Type#1' and the corresponding 'Footer Preselected Font Data#1'; Footer Preselected Font Type#2' and the corresponding 'Footer Preselected Font Type Data#2; Footer Preselected Font Type#3' and the corresponding 'Footer Preselected Font Type Data#3'; and Footer Preselected Font Type#4' and the corresponding 'Footer Preselected Font Type Data#4'.

This paragraph illustrates the data stored in Footer Preselected Font Size Data Storage Area H550b2c. In this embodiment, Footer Preselected Font Size Data Storage Area H550b2c comprises two columns, i.e., 'Footer Preselected Font Size ID' and 'Footer Preselected Font Size Data'. Column 'Footer Preselected Font Size ID' stores the footer preselected font size IDs, and each footer preselected font size ID is an identification of the corresponding footer preselected font size data stored in column 'Footer Preselected Font Size Data'. Each footer preselected font size ID may indicate the name or title of the corresponding footer preselected font size data. Column 'Footer Preselected Font Size Data' stores the footer preselected font size data, and each footer preselected font size data indicates a specific font size, such as 8 points, 10 points, 14 points, or 18 points. In this embodiment, Footer Preselected Font Size Data Storage Area H550b2c stores the following data: Footer Preselected Font Size#1' and the corresponding 'Footer Preselected Font Size Data#1'; Footer Preselected Font Size#2' and the corresponding 'Footer Preselected Font Size Data#2; Footer Preselected Font Size#3' and the corresponding 'Footer Preselected Font Size Data#3'; and Footer Preselected Font Size#4' and the corresponding 'Footer Preselected Font Size Data#4'.

This paragraph illustrates the data stored in Footer Preselected Font Color Data Storage Area H550b2d. In this embodiment, Footer Preselected Font Color Data Storage Area H550b2d comprises two columns, i.e., 'Footer Preselected Font Color ID' and 'Footer Preselected Font Color Data'. Column 'Footer Preselected Font Color ID' stores the footer preselected font color IDs, and each footer preselected font color ID is an identification of the corresponding footer preselected font color data stored in column 'Footer Preselected Font Color Data'. Each footer preselected font color ID may indicate the name or title of the corresponding footer preselected font color data. Column 'Footer Preselected Font Color Data' stores the footer preselected font color data, and each footer preselected font color data indicates a specific font color, such as red, blue, green or yellow. In this embodiment, Footer Preselected Font Color Data Storage Area H550b2d stores the following data: Footer Preselected Font Color#1' and the corresponding 'Footer Preselected Font Color Data#1'; Footer Preselected Font Color#2' and the corresponding 'Footer Preselected Font Color Data#2; Footer Preselected Font Color#3' and the corresponding 'Footer Preselected Font Color Data#3'; and Footer Preselected Font Color#4' and the corresponding 'Footer Preselected Font Color Data#4'.

This paragraph illustrates the data stored in Footer Preselected Location Data Storage Area H550b2e. In this embodiment, Footer Preselected Location Data Storage Area H550b2e comprises two columns, i.e., 'Footer Preselected Location ID' and 'Footer Preselected Location Data'. Column 'Footer Preselected Location ID' stores the footer preselected location IDs, and each footer preselected location ID is an identification of the corresponding footer preselected location data stored in column 'Footer Preselected Location Data'. Each footer preselected location ID indicates the name or title of the corresponding footer preselected location data. Column 'Footer Preselected Location Data' stores the footer preselected location data, and each footer preselected location data indicates the location at which the footer is displayed in the document data. In this embodiment, Footer Preselected Location Data Storage Area H550b2e stores the following data: Footer Preselected Location#1' and the corresponding 'Footer Preselected Location Data#1'; Footer Preselected Location#2' and the corresponding 'Footer Preselected Location Data#2'; Footer Preselected Location#3' and the corresponding 'Footer Preselected Location Data#3'; and Footer Preselected Location#4' and the corresponding 'Footer Preselected Location Data#4'.

This paragraph illustrates the storage area(s) included in User Selected Data Storage Area H550b3. In this embodiment, User Selected Data Storage Area H550b3 includes Footer Text Data Storage Area H550b3a, Footer Font Type Data Storage Area H550b3b, Footer Font Size Data Storage Area H550b3c, Footer Font Color Data Storage Area H550b3d, and Footer Location Data Storage Area H550b3e. Footer Text Data Storage Area H550b3a stores the footer text data which is one of the footer preselected text data selected by the user. Footer Font Type Data Storage Area H550b3b stores the footer font type data which is one of the footer preselected font type data selected by the user. Footer Font Size Data Storage Area H550b3c stores the footer font size data which is one of the footer preselected font size data selected by the user. Footer Font Color Data Storage Area H550b3d stores the footer font color data which is one of the footer preselected font color data selected by the user. Footer Location Data Storage Area H550b3e stores the footer location data which is one of the footer preselected location data selected by the user.

This paragraph illustrates the software program(s) stored in Footer Displaying Software Storage Area H550c. In this embodiment, Footer Displaying Software Storage Area H550c stores Footer Text Data Producing Software H550c1, Footer Font Type Data Producing Software H550c2, Footer Font Size Data Producing Software H550c3, Footer Font Color Data Producing Software H550c4, Footer Location Data Producing Software H550c5, Document Footer Displaying Software H550c6, Document Data Transferring Software H550c7, Footer Text Data Transferring Software H550c8, Footer Font Type Data Transferring Software H550c9, Footer Font Size Data Transferring Software H550c10, Footer Font Color Data Transferring Software H550c11, Footer Location Data Transferring Software H550c12, and Document Package Data Transferring Software H550c13. Footer Text Data Producing Software H550c1 is the software program described hereinafter. Footer Font Type Data Producing Software H550c2 is the software program described hereinafter. Footer Font Size Data Producing Software H550c3 is the software program described hereinafter. Footer Font Color Data Producing Software H550c4 is the software program described hereinafter. Footer Location Data Producing Software H550c5 is the software program described hereinafter. Document Footer Displaying Software H550c6 is the software program described hereinafter. Document Data Transferring Software H550c7 is the software program described hereinafter. Footer Text Data Transferring Software H550c8 is the software program described hereinafter. Footer Font Type Data Transferring Software H550c9 is the software program described hereinafter. Footer Font Size Data Transferring Software H550c10 is the software program described hereinafter. Footer Font Color Data Transferring Software H550c11 is the software program described hereinafter. Footer Location Data Transferring Software H550c12 is the software program described hereinafter. Document Package Data Transferring Software H550c13 is the software program described hereinafter.

This paragraph illustrates the storage area included in RAM 206 (FIG. 1) of Device A. In this embodiment, RAM 206 includes Footer Displaying Information Storage Area 206A550a of which the data and the software program(s) stored therein are described hereinafter.

The data and/or the software program(s) necessary to implement the present function may be downloaded from Host H to Device A.

This paragraph illustrates the storage area(s) included in Footer Displaying Information Storage Area 206A550a. In this embodiment, Footer Displaying Information Storage Area 206A550a includes Footer Displaying Data Storage Area 206A550b and Footer Displaying Software Storage Area 206A550c. Footer Displaying Data Storage Area 206A550b stores the data necessary to implement the present function on the side of Device A, such as the one(s) described hereinafter. Footer Displaying Software Storage Area 206A550c stores the software program(s) necessary to implement the present function on the side of Device A, such as the one(s) described hereinafter.

This paragraph illustrates the storage area(s) included in Footer Displaying Data Storage Area 206A550b. In this embodiment, Footer Displaying Data Storage Area 206A550b includes Document Data Storage Area 206A550b1, Footer Preselected Data Storage Area 206A550b2, User Selected Data Storage Area 206A550b3, and Work Area 206A550b4. Document Data Storage Area 206A550b1 stores the document data which is the document capable to be displayed on LCD 201 (FIG. 1). The document may be the one which is produced by a word processing software (e.g., MS Word). Footer Preselected Data Storage Area 206A550b2 stores the data described hereinafter. User Selected Data Storage Area 206A550b3 stores the data described hereinafter. Work Area 206A550b4 is utilized as a work area to perform calculation and temporarily store data.

This paragraph illustrates the storage area(s) included in Footer Preselected Data Storage Area 206A550b2. In this embodiment, Footer Preselected Data Storage Area 206A550b2 includes Footer Preselected Text Data Storage Area 206A550b2a, Footer Preselected Font Type Data Storage Area 206A550b2b, Footer Preselected Font Size Data Storage Area 206A550b2c, Footer Preselected Font Color Data Storage Area 206A550b2d, and Footer Preselected Location Data Storage Area 206A550b2e. Footer Preselected Text Data Storage Area 206A550b2a stores the data described hereinafter. Footer Preselected Font Type Data Storage Area 206A550b2b stores the data described hereinafter. Footer Preselected Font Size Data Storage Area 206A550b2c stores the data described hereinafter. Footer Preselected Font Color Data Storage Area 206A550b2d stores the data described hereinafter. Footer Preselected Location Data Storage Area 206A550b2e stores the data described hereinafter.

This paragraph illustrates the data stored in Footer Preselected Text Data Storage Area 206A550b2a. In this embodiment, Footer Preselected Text Data Storage Area 206A550b2a comprises two columns, i.e., 'Footer Preselected Text ID' and 'Footer Preselected Text Data'. Column 'Footer Preselected Text ID' stores the footer preselected text IDs, and each footer preselected text ID is an identification of the corresponding footer preselected text data stored in column 'Footer Preselected Text Data'. Each footer preselected text ID may indicate the name or title of the corresponding footer preselected text data. Column 'Footer Preselected Text Data' stores the footer preselected text data, and each footer preselected text data is the text data capable to be utilized as footer of a document. In this embodiment, Footer Preselected Text Data Storage Area 206A550b2a stores the following data: Footer Preselected Text#1' and the corresponding 'Footer Preselected Text Data#1'; Footer Preselected Text#2' and the corresponding 'Footer Preselected Text Data#2'; Footer Preselected Text#3' and the corresponding 'Footer Preselected Text Data#3'; and Footer Preselected Text#4' and the corresponding 'Footer Preselected Text Data#4'.

This paragraph illustrates the data stored in Footer Preselected Font Type Data Storage Area 206A550b2b. In this embodiment, Footer Preselected Font Type Data Storage Area 206A550b2b comprises two columns, i.e., 'Footer Preselected Font Type ID' and 'Footer Preselected Font Type Data'. Column 'Footer Preselected Font Type ID' stores the footer preselected font type IDs, and each footer preselected font type ID is an identification of the corresponding footer preselected font type data stored in column 'Footer Preselected Font Type Data'. Each footer preselected font type ID may indicate the name or title of the corresponding footer preselected font type data. Column 'Footer Preselected Font Type Data' stores the footer preselected font type data, and each footer preselected font type data indicates a specific font type, such as Arial, Times New Roman, Tahoma, or Gothic. In this embodiment, Footer Preselected Font Type Data Storage Area 206A550b2b stores the following data: Footer Preselected Font Type#1' and the corresponding 'Footer Preselected Font Type Data#1'; Footer Preselected Font Type#2' and the corresponding 'Footer Preselected Font Type Data#2; Footer Preselected Font Type#3' and the corresponding 'Footer Preselected Font Type Data#3'; and Footer Preselected Font Type#4' and the corresponding 'Footer Preselected Font Type Data#4'.

This paragraph illustrates the data stored in Footer Preselected Font Size Data Storage Area 206A550b2c. In this embodiment, Footer Preselected Font Size Data Storage Area 206A550b2c comprises two columns, i.e., 'Footer Preselected Font Size ID' and 'Footer Preselected Font Size Data'. Column 'Footer Preselected Font Size ID' stores the footer preselected font size IDs, and each footer preselected font size ID is an identification of the corresponding footer preselected font size data stored in column 'Footer Preselected Font Size Data'. Each footer preselected font size ID may indicate the name or title of the corresponding footer preselected font size data. Column 'Footer Preselected Font Size Data' stores the footer preselected font size data, and each footer preselected font size data indicates a specific font size, such as 8 points, 10 points, 14 points, or 18 points. In this embodiment, Footer Preselected Font Size Data Storage Area 206A550b2c stores the following data: Footer Preselected Font Size#1' and the corresponding 'Footer Preselected Font Size Data#1'; Footer Preselected Font Size#2' and the corresponding 'Footer Preselected Font Size Data#2; Footer Preselected Font Size#3' and the corresponding 'Footer Preselected Font Size Data#3'; and Footer Preselected Font Size#4' and the corresponding 'Footer Preselected Font Size Data#4'.

This paragraph illustrates the data stored in Footer Preselected Font Color Data Storage Area 206A550b2d. In this embodiment, Footer Preselected Font Color Data Storage Area 206A550b2d comprises two columns, i.e., 'Footer Preselected Font Color ID' and 'Footer Preselected Font Color Data'. Column 'Footer Preselected Font Color ID' stores the footer preselected font color IDs, and each footer preselected font color ID is an identification of the corresponding footer preselected font color data stored in column 'Footer Preselected Font Color Data'. Each footer preselected font color ID may indicate the name or title of the corresponding footer preselected font color data. Column 'Footer Preselected Font Color Data' stores the footer preselected font color data, and each footer preselected font color data indicates a specific font color, such as red, blue, green or yellow. In this embodiment, Footer Preselected Font Color Data Storage Area 206A550b2d stores the following data: Footer Preselected Font Color#1' and the corresponding 'Footer Preselected Font Color Data#1'; Footer Preselected Font Color#2' and the corresponding 'Footer Preselected Font Color Data#2; Footer Preselected Font Color#3' and the corresponding 'Footer Preselected Font Color Data#3'; and Footer Preselected Font Color#4' and the corresponding 'Footer Preselected Font Color Data#4'.

This paragraph illustrates the data stored in Footer Preselected Location Data Storage Area 206A550b2e. In this embodiment, Footer Preselected Location Data Storage Area 206A550b2e comprises two columns, i.e., 'Footer Preselected Location ID' and 'Footer Preselected Location Data'. Column 'Footer Preselected Location ID' stores the footer preselected location IDs, and each footer preselected location ID is an identification of the corresponding footer preselected location data stored in column 'Footer Preselected Location Data'. Each footer preselected location ID indicates the name or title of the corresponding footer preselected location data. Column 'Footer Preselected Location Data' stores the footer preselected location data, and each footer preselected location data indicates the location at which the footer is displayed in the document data. In this embodiment, Footer Preselected Location Data Storage Area 206A550b2e stores the following data: Footer Preselected Location#1' and the corresponding 'Footer Preselected Location Data#1'; Footer Preselected Location#2' and the corresponding 'Footer Preselected Location Data#2; Footer Preselected Location#3' and the corresponding 'Footer Preselected Location Data#3'; and Footer Preselected Location#4' and the corresponding 'Footer Preselected Location Data#4'.

This paragraph illustrates the storage area(s) included in User Selected Data Storage Area 206A550b3. In this embodiment, User Selected Data Storage Area 206A550b3 includes Footer Text Data Storage Area 206A550b3a, Footer Font Type Data Storage Area 206A550b3b, Footer Font Size Data Storage Area 206A550b3c, Footer Font Color Data Storage Area 206A550b3d, and Footer Location Data Storage Area 206A550b3e. Footer Text Data Storage Area 206A550b3a stores the footer text data which is one of the footer preselected text data selected by the user. Footer Font Type Data Storage Area 206A550*b*3*b* stores the footer font type data which is one of the footer preselected font type data selected by the user. Footer Font Size Data Storage Area 206A550*b*3*c* stores the footer font size data which is one of the footer preselected font size data selected by the user. Footer Font Color Data Storage Area 206A550*b*3*d* stores the footer font color data which is one of the footer preselected font color data selected by the user. Footer Location Data Storage Area 206A550*b*3*e* stores the footer location data which is one of the footer preselected location data selected by the user.

This paragraph illustrates the software program(s) stored in Footer Displaying Software Storage Area 206A550*c*. In this embodiment, Footer Displaying Software Storage Area 206A550*c* stores Footer Text Data Producing Software 206A550*c*1, Footer Font Type Data Producing Software 206A550*c*2, Footer Font Size Data Producing Software 206A550*c*3, Footer Font Color Data Producing Software 206A550*c*4, Footer Location Data Producing Software 206A550*c*5, Document Footer Displaying Software 206A550*c*6, Document Data Transferring Software 206A550*c*7, Footer Text Data Transferring Software 206A550*c*8, Footer Font Type Data Transferring Software 206A550*c*9, Footer Font Size Data Transferring Software 206A550*c*10, Footer Font Color Data Transferring Software 206A550*c*11, Footer Location Data Transferring Software 206A550*c*12, and Document Package Data Transferring Software 206A550*c*13. Footer Text Data Producing Software 206A550*c*1 is the software program described hereinafter. Footer Font Type Data Producing Software 206A550*c*2 is the software program described hereinafter. Footer Font Size Data Producing Software 206A550*c*3 is the software program described hereinafter. Footer Font Color Data Producing Software 206A550*c*4 is the software program described hereinafter. Footer Location Data Producing Software 206A550*c*5 is the software program described hereinafter. Document Footer Displaying Software 206A550*c*6 is the software program described hereinafter. Document Data Transferring Software 206A550*c*7 is the software program described hereinafter. Footer Text Data Transferring Software 206A550*c*8 is the software program described hereinafter. Footer Font Type Data Transferring Software 206A550*c*9 is the software program described hereinafter. Footer Font Size Data Transferring Software 206A550*c*10 is the software program described hereinafter. Footer Font Color Data Transferring Software 206A550*c*11 is the software program described hereinafter. Footer Location Data Transferring Software 206A550*c*12 is the software program described hereinafter. Document Package Data Transferring Software 206A550*c*13 is the software program described hereinafter.

This paragraph illustrates the storage area included in RAM 206 (FIG. 1) of Device B. In this embodiment, RAM 206 includes Footer Displaying Information Storage Area 206B550*a* of which the data and the software program(s) stored therein are described hereinafter.

The data and/or the software program(s) necessary to implement the present function may be downloaded from Host H to Device B.

This paragraph illustrates the storage area(s) included in Footer Displaying Information Storage Area 206B550*a*. In this embodiment, Footer Displaying Information Storage Area 206B550*a* includes Footer Displaying Data Storage Area 206B550*b* and Footer Displaying Software Storage Area 206B550*c*. Footer Displaying Data Storage Area 206B550*b* stores the data necessary to implement the present function on the side of Device B, such as the one(s) described hereinafter. Footer Displaying Software Storage Area 206B550*c* stores the software program(s) necessary to implement the present function on the side of Device B, such as the one(s) described hereinafter.

This paragraph illustrates the storage area(s) included in Footer Displaying Data Storage Area 206B550*b*. In this embodiment, Footer Displaying Data Storage Area 206B550*b* includes Document Data Storage Area 206B550*b*1, Footer Preselected Data Storage Area 206B550*b*2, User Selected Data Storage Area 206B550*b*3, and Work Area 206B550*b*4. Document Data Storage Area 206B550*b*1 stores the document data which is the document capable to be displayed on LCD 201 (FIG. 1). The document may be the one which is produced by a word processing software (e.g., MS Word). Footer Preselected Data Storage Area 206B550*b*2 stores the data described hereinafter. User Selected Data Storage Area 206B550*b*3 stores the data described hereinafter. Work Area 206B550*b*4 is utilized as a work area to perform calculation and temporarily store data.

This paragraph illustrates the storage area(s) included in Footer Preselected Data Storage Area 206B550*b*2. In this embodiment, Footer Preselected Data Storage Area 206B550*b*2 includes Footer Preselected Text Data Storage Area 206B550*b*2*a*, Footer Preselected Font Type Data Storage Area 206B550*b*2*b*, Footer Preselected Font Size Data Storage Area 206B550*b*2*c*, Footer Preselected Font Color Data Storage Area 206B550*b*2*d*, and Footer Preselected Location Data Storage Area 206B550*b*2*e*. Footer Preselected Text Data Storage Area 206B550*b*2*a* stores the data described hereinafter. Footer Preselected Font Type Data Storage Area 206B550*b*2*b* stores the data described hereinafter. Footer Preselected Font Size Data Storage Area 206B550*b*2*c* stores the data described hereinafter. Footer Preselected Font Color Data Storage Area 206B550*b*2*d* stores the data described hereinafter. Footer Preselected Location Data Storage Area 206B550*b*2*e* stores the data described hereinafter.

This paragraph illustrates the data stored in Footer Preselected Text Data Storage Area 206B550*b*2*a*. In this embodiment, Footer Preselected Text Data Storage Area 206B550*b*2*a* comprises two columns, i.e., 'Footer Preselected Text ID' and 'Footer Preselected Text Data'. Column 'Footer Preselected Text ID' stores the footer preselected text IDs, and each footer preselected text ID is an identification of the corresponding footer preselected text data stored in column 'Footer Preselected Text Data'. Each footer preselected text ID may indicate the name or title of the corresponding footer preselected text data. Column 'Footer Preselected Text Data' stores the footer preselected text data, and each footer preselected text data is the text data capable to be utilized as footer of a document. In this embodiment, Footer Preselected Text Data Storage Area 206B550*b*2*a* stores the following data: Footer Preselected Text#1' and the corresponding 'Footer Preselected Text Data#1'; Footer Preselected Text#2' and the corresponding 'Footer Preselected Text Data#2; Footer Preselected Text#3' and the corresponding 'Footer Preselected Text Data#3'; and Footer Preselected Text#4' and the corresponding 'Footer Preselected Text Data#4'.

This paragraph illustrates the data stored in Footer Preselected Font Type Data Storage Area 206B550*b*2*b*. In this embodiment, Footer Preselected Font Type Data Storage Area 206B550*b*2*b* comprises two columns, i.e., 'Footer Preselected Font Type ID' and 'Footer Preselected Font Type Data'. Column 'Footer Preselected Font Type ID' stores the footer preselected font type IDs, and each footer preselected font type ID is an identification of the corresponding footer preselected font type data stored in column 'Footer Preselected Font Type Data'. Each footer preselected font type ID may indicate the name or title of the corresponding footer preselected font type data. Column 'Footer Preselected Font Type Data' stores the footer preselected font type data, and each footer preselected font type data indicates a specific font type, such as Arial, Times New Roman, Tahoma, or Gothic. In this embodiment, Footer Preselected Font Type Data Storage Area 206B550$b2b$ stores the following data: Footer Preselected Font Type#1' and the corresponding 'Footer Preselected Font Type Data#1'; Footer Preselected Font Type#2' and the corresponding 'Footer Preselected Font Type Data#2; Footer Preselected Font Type#3' and the corresponding 'Footer Preselected Font Type Data#3'; and Footer Preselected Font Type#4' and the corresponding 'Footer Preselected Font Type Data#4'.

This paragraph illustrates the data stored in Footer Preselected Font Size Data Storage Area 206B550$b2c$. In this embodiment, Footer Preselected Font Size Data Storage Area 206B550$b2c$ comprises two columns, i.e., 'Footer Preselected Font Size ID' and 'Footer Preselected Font Size Data'. Column 'Footer Preselected Font Size ID' stores the footer preselected font size IDs, and each footer preselected font size ID is an identification of the corresponding footer preselected font size data stored in column 'Footer Preselected Font Size Data'. Each footer preselected font size ID may indicate the name or title of the corresponding footer preselected font size data. Column 'Footer Preselected Font Size Data' stores the footer preselected font size data, and each footer preselected font size data indicates a specific font size, such as 8 points, 10 points, 14 points, or 18 points. In this embodiment, Footer Preselected Font Size Data Storage Area 206B550$b2c$ stores the following data: Footer Preselected Font Size#1' and the corresponding 'Footer Preselected Font Size Data#1'; Footer Preselected Font Size#2' and the corresponding 'Footer Preselected Font Size Data#2; Footer Preselected Font Size#3' and the corresponding 'Footer Preselected Font Size Data#3'; and Footer Preselected Font Size#4' and the corresponding 'Footer Preselected Font Size Data#4'.

This paragraph illustrates the data stored in Footer Preselected Font Color Data Storage Area 206B550$b2d$. In this embodiment, Footer Preselected Font Color Data Storage Area 206B550$b2d$ comprises two columns, i.e., 'Footer Preselected Font Color ID' and 'Footer Preselected Font Color Data'. Column 'Footer Preselected Font Color ID' stores the footer preselected font color IDs, and each footer preselected font color ID is an identification of the corresponding footer preselected font color data stored in column 'Footer Preselected Font Color Data'. Each footer preselected font color ID may indicate the name or title of the corresponding footer preselected font color data. Column 'Footer Preselected Font Color Data' stores the footer preselected font color data, and each footer preselected font color data indicates a specific font color, such as red, blue, green or yellow. In this embodiment, Footer Preselected Font Color Data Storage Area 206B550$b2d$ stores the following data: Footer Preselected Font Color#1' and the corresponding 'Footer Preselected Font Color Data#1'; Footer Preselected Font Color#2' and the corresponding 'Footer Preselected Font Color Data#2; Footer Preselected Font Color#3' and the corresponding 'Footer Preselected Font Color Data#3'; and Footer Preselected Font Color#4' and the corresponding 'Footer Preselected Font Color Data#4'.

This paragraph illustrates the data stored in Footer Preselected Location Data Storage Area 206B550$b2e$. In this embodiment, Footer Preselected Location Data Storage Area 206B550$b2e$ comprises two columns, i.e., 'Footer Preselected Location ID' and 'Footer Preselected Location Data'. Column 'Footer Preselected Location ID' stores the footer preselected location IDs, and each footer preselected location ID is an identification of the corresponding footer preselected location data stored in column 'Footer Preselected Location Data'. Each footer preselected location ID indicates the name or title of the corresponding footer preselected location data. Column 'Footer Preselected Location Data' stores the footer preselected location data, and each footer preselected location data indicates the location at which the footer is displayed in the document data. In this embodiment, Footer Preselected Location Data Storage Area 206B550$b2e$ stores the following data: Footer Preselected Location#1' and the corresponding 'Footer Preselected Location Data#1'; Footer Preselected Location#2' and the corresponding 'Footer Preselected Location Data#2; Footer Preselected Location#3' and the corresponding 'Footer Preselected Location Data#3'; and Footer Preselected Location#4' and the corresponding 'Footer Preselected Location Data#4'.

This paragraph illustrates the storage area(s) included in User Selected Data Storage Area 206B550$b3$. In this embodiment, User Selected Data Storage Area 206B550$b3$ includes Footer Text Data Storage Area 206B550$b3a$, Footer Font Type Data Storage Area 206B550$b3b$, Footer Font Size Data Storage Area 206B550$b3c$, Footer Font Color Data Storage Area 206B550$b3d$, and Footer Location Data Storage Area 206B550$b3e$. Footer Text Data Storage Area 206B550$b3a$ stores the footer text data which is one of the footer preselected text data selected by the user. Footer Font Type Data Storage Area 206B550$b3b$ stores the footer font type data which is one of the footer preselected font type data selected by the user. Footer Font Size Data Storage Area 206B550$b3c$ stores the footer font size data which is one of the footer preselected font size data selected by the user. Footer Font Color Data Storage Area 206B550$b3d$ stores the footer font color data which is one of the footer preselected font color data selected by the user. Footer Location Data Storage Area 206B550$b3e$ stores the footer location data which is one of the footer preselected location data selected by the user.

This paragraph illustrates the software program(s) stored in Footer Displaying Software Storage Area 206B550$c$. In this embodiment, Footer Displaying Software Storage Area 206B550$c$ stores Document Footer Displaying Software 206B550$c6$, Document Data Transferring Software 206B550$c7$, Footer Text Data Transferring Software 206B550$c8$, Footer Font Type Data Transferring Software 206B550$c9$, Footer Font Size Data Transferring Software 206B550$c10$, Footer Font Color Data Transferring Software 206B550$c11$, Footer Location Data Transferring Software 206B550$c12$, and Document Package Data Transferring Software 206B550$c13$. Document Footer Displaying Software 206B550$c6$ is the software program described hereinafter. Document Data Transferring Software 206B550$c7$ is the software program described hereinafter. Footer Text Data Transferring Software 206B550$c8$ is the software program described hereinafter. Footer Font Type Data Transferring Software 206B550$c9$ is the software program described hereinafter. Footer Font Size Data Transferring Software 206B550$c10$ is the software program described hereinafter. Footer Font Color Data Transferring Software 206B550$c11$ is the software program described hereinafter. Footer Location Data Transferring Software 206B550$c12$ is the software program described hereinafter. Document Package Data Transferring Software 206B550$c13$ is the software program described hereinafter.

This paragraph illustrate(s) Footer Text Data Producing Software H550$c1$ of Host H and Footer Text Data Producing Software 206A550c1 of Device A, which produce(s) the footer text data. In this embodiment, Host H retrieves all footer preselected text IDs (e.g., Footer Preselected Text#1 through #4) from Footer Preselected Text Data Storage Area H550b2a and sends the data to Device A (S1). CPU 211 (FIG. 1) of Device A receives the footer preselected text IDs (e.g., Footer Preselected Text#1 through #4) from Host H in a wireless fashion and displays the data on LCD 201 (FIG. 1) of Device A (S2). The user of Device A selects, by utilizing Input Device 210 (FIG. 1) or via voice recognition system, a footer preselected text ID (e.g., Footer Preselected Text#1) (S3). CPU 211 (FIG. 1) of Device A sends the footer preselected text ID (e.g., Footer Preselected Text#1) selected in the previous step to Host H in a wireless fashion (S4). Host H receives the footer preselected text ID (e.g., Footer Preselected Text#1) from Device A (S5). Host H retrieves the footer preselected text data (e.g., Footer Preselected Text Data#1) corresponding to the footer preselected text ID (e.g., Footer Preselected Text#1) received in the previous step from Footer Preselected Text Data Storage Area H550b2a (S6). Host H stores the footer preselected text data (e.g., Footer Preselected Text Data#1) retrieved in the previous step as the footer text data in Footer Text Data Storage Area H550b3a (S7).

This paragraph illustrate(s) Footer Font Type Data Producing Software H550c2 of Host H and Footer Font Type Data Producing Software 206A550c2 of Device A, which produce(s) the footer font type data. In this embodiment, Host H retrieves all footer preselected font type IDs (e.g., Footer Preselected Font Type#1 through #4) from Footer Preselected Font Type Data Storage Area H550b2b and sends the data to Device A (S1). CPU 211 (FIG. 1) of Device A receives the footer preselected font type IDs (e.g., Footer Preselected Font Type#1 through #4) from Host H in a wireless fashion and displays the data on LCD 201 (FIG. 1) of Device A (S2). The user of Device A selects, by utilizing Input Device 210 (FIG. 1) or via voice recognition system, a footer preselected font type ID (e.g., Footer Preselected Font Type#1) (S3). CPU 211 (FIG. 1) of Device A sends the footer preselected font type ID (e.g., Footer Preselected Font Type#1) selected in the previous step to Host H in a wireless fashion (S4). Host H receives the footer preselected font type ID (e.g., Footer Preselected Font Type#1) from Device A (S5). Host H retrieves the footer preselected font type data (e.g., Footer Preselected Font Type Data#1) corresponding to the footer preselected font type ID (e.g., Footer Preselected Font Type#1) received in the previous step from Footer Preselected Font Type Data Storage Area H550b2b (S6). Host H stores the footer preselected font type data (e.g., Footer Preselected Font Type Data#1) retrieved in the previous step as the footer font type data in Footer Font Type Data Storage Area H550b3b (S7).

This paragraph illustrate(s) Footer Font Size Data Producing Software H550c3 of Host H and Footer Font Size Data Producing Software 206A550c3 of Device A, which produce(s) the footer font size data. In this embodiment, Host H retrieves all footer preselected font size IDs (e.g., Footer Preselected Font Size#1 through #4) from Footer Preselected Font Size Data Storage Area H550b2c and sends the data to Device A (S1). CPU 211 (FIG. 1) of Device A receives the footer preselected font size IDs (e.g., Footer Preselected Font Size#1 through #4) from Host H in a wireless fashion and displays the data on LCD 201 (FIG. 1) of Device A (S2). The user of Device A selects, by utilizing Input Device 210 (FIG. 1) or via voice recognition system, a footer preselected font size ID (e.g., Footer Preselected Font Size#1) (S3). CPU 211 (FIG. 1) of Device A sends the footer preselected font size ID (e.g., Footer Preselected Font Size#1) selected in the previous step to Host H in a wireless fashion (S4). Host H receives the footer preselected font size ID (e.g., Footer Preselected Font Size#1) from Device A (S5). Host H retrieves the footer preselected font size data (e.g., Footer Preselected Font Size Data#1) corresponding to the footer preselected font size ID (e.g., Footer Preselected Font Size#1) received in the previous step from Footer Preselected Font Size Data Storage Area H550b2c (S6). Host H stores the footer preselected font size data (e.g., Footer Preselected Font Size Data#1) retrieved in the previous step as the footer font size data in Footer Font Size Data Storage Area H550b3c (S7).

This paragraph illustrate(s) Footer Font Color Data Producing Software H550c4 of Host H and Footer Font Color Data Producing Software 206A550c4 of Device A, which produces) the footer font color data. In this embodiment, Host H retrieves all footer preselected font color IDs (e.g., Footer Preselected Font Color#1 through #4) from Footer Preselected Font Color Data Storage Area H550b2d and sends the data to Device A (S1). CPU 211 (FIG. 1) of Device A receives the footer preselected font color IDs (e.g., Footer Preselected Font Color#1 through #4) from Host H in a wireless fashion and displays the data on LCD 201 (FIG. 1) of Device A (S2). The user of Device A selects, by utilizing Input Device 210 (FIG. 1) or via voice recognition system, a footer preselected font color ID (e.g., Footer Preselected Font Color#1) (S3). CPU 211 (FIG. 1) of Device A sends the footer preselected font color ID (e.g., Footer Preselected Font Color#1) selected in the previous step to Host H in a wireless fashion (S4). Host H receives the footer preselected font color ID (e.g., Footer Preselected Font Color#1) from Device A (S5). Host H retrieves the footer preselected font color data (e.g., Footer Preselected Font Color Data#1) corresponding to the footer preselected font color ID (e.g., Footer Preselected Font Color#1) received in the previous step from Footer Preselected Font Color Data Storage Area H550b2d (S6). Host H stores the footer preselected font color data (e.g., Footer Preselected Font Color Data#1) retrieved in the previous step as the footer font color data in Footer Font Color Data Storage Area H550b3d (S7).

This paragraph illustrate(s) Footer Location Data Producing Software H550c5 of Host H and Footer Location Data Producing Software 206A550c5 of Device A, which produces) the footer location data. In this embodiment, Host H retrieves all footer preselected location IDs (e.g., Footer Preselected Location#1 through #4) from Footer Preselected Location Data Storage Area H550b2e and sends the data to Device A (S1). CPU 211 (FIG. 1) of Device A receives the footer preselected location IDs (e.g., Footer Preselected Location#1 through #4) from Host H in a wireless fashion and displays the data on LCD 201 (FIG. 1) of Device A (S2). The user of Device A selects, by utilizing Input Device 210 (FIG. 1) or via voice recognition system, a footer preselected location ID (e.g., Footer Preselected Location#1) (S3). CPU 211 (FIG. 1) of Device A sends the footer preselected location ID (e.g., Footer Preselected Location#1) selected in the previous step to Host H in a wireless fashion (S4). Host H receives the footer preselected location ID (e.g., Footer Preselected Location#1) from Device A (S5). Host H retrieves the footer preselected location data (e.g., Footer Preselected Location Data#1) corresponding to the footer preselected location ID (e.g., Footer Preselected Location#1) received in the previous step from Footer Preselected Location Data Storage Area H550b2e (S6). Host H stores the footer preselected location data (e.g., Footer Preselected Location Data#1) retrieved in the previous step as the footer location data in Footer Location Data Storage Area H550b3e (S7).

This paragraph illustrate(s) Document Footer Displaying Software H550c6 of Host H and Document Footer Displaying Software 206A550*c*6 of Device A, which display(s) the footer. In this embodiment, the user of Device A inputs, by utilizing Input Device 210 (FIG. 1) or via voice recognition system, the document footer displaying command (S1). Here, the document footer displaying command is the command to display the footer. CPU 211 (FIG. 1) of Device A sends the document footer displaying command input in the previous step to Host H in a wireless fashion (S2). Host H receives the document footer displaying command from Device A (S3). Host H retrieves the document data from Document Data Storage Area H550*b*1 and sends the data to Device A (S4). CPU 211 (FIG. 1) of Device A receives the document data from Host H in a wireless fashion and stores the data in Document Data Storage Area 206A550*b*1 (S5). Host H retrieves the footer text data from Footer Text Data Storage Area H550*b*3*a* and sends the data to Device A (S6). CPU 211 (FIG. 1) of Device A receives the footer text data from Host H in a wireless fashion and stores the data in Footer Text Data Storage Area 206A550*b*3*a* (S7). Host H retrieves the footer font type data from Footer Font Type Data Storage Area H550*b*3*b* and sends the data to Device A (S8). CPU 211 (FIG. 1) of Device A receives the footer font type data from Host H in a wireless fashion and stores the data in Footer Font Type Data Storage Area 206A550*b*3*b* (S9). Host H retrieves the footer font size data from Footer Font Size Data Storage Area H550*b*3*c* and sends the data to Device A (S10). CPU 211 (FIG. 1) of Device A receives the footer font size data from Host H in a wireless fashion and stores the data in Footer Font Size Data Storage Area 206A550*b*3*c* (S11). Host H retrieves the footer font color data from Footer Font Color Data Storage Area H550*b*3*d* and sends the data to Device A (S12). CPU 211 (FIG. 1) of Device A receives the footer font color data from Host H in a wireless fashion and stores the data in Footer Font Color Data Storage Area 206A550*b*3*d* (S13). Host H retrieves the footer location data from Footer Location Data Storage Area H550*b*3*e* and sends the data to Device A (S14). CPU 211 (FIG. 1) of Device A receives the footer location data from Host H in a wireless fashion and stores the data in Footer Location Data Storage Area 206A550*b*3*e* (S15). CPU 211 (FIG. 1) of Device A retrieves the document data from Document Data Storage Area 206A550*b*1 (S16). CPU 211 (FIG. 1) of Device A displays the document data retrieved in the previous step on LCD 201 (FIG. 1) of Device A (S17). CPU 211 (FIG. 1) of Device A retrieves the footer text data from Footer Text Data Storage Area 206A550*b*3*a* (S18). CPU 211 (FIG. 1) of Device A retrieves the footer font type data from Footer Font Type Data Storage Area 206A550*b*3*b* (S19). CPU 211 (FIG. 1) of Device A retrieves the footer font size data from Footer Font Size Data Storage Area 206A550*b*3*c* (S20). CPU 211 (FIG. 1) of Device A retrieves the footer font color data from Footer Font Color Data Storage Area 206A550*b*3*d* (S21). CPU 211 (FIG. 1) of Device A retrieves the footer location data from Footer Location Data Storage Area 206A550*b*3*e* (S22). CPU 211 (FIG. 1) of Device A displays the footer text data retrieved in S18 in accordance with the footer font type data retrieved in S19, Footer Font Size Data retrieved in S20, and the footer font color data retrieved in S21 at the location indicated by the footer location data retrieved in S22 on Document Data displayed in S17 (S23).

This paragraph illustrate(s) Document Data Transferring Software H550*c*7 of Host H, Document Data Transferring Software 206A550*c*7 of Device A, and Document Data Transferring Software 206B550*c*7 of Device B, which transfer(s) the document data. In this embodiment, the user of Device A inputs, by utilizing Input Device 210 (FIG. 1) or via voice recognition system, the document data transferring command (S1). Here, the document data transferring command is the command to transfer the document data. CPU 211 (FIG. 1) of Device A sends the document data transferring command input in the previous step to Host H in a wireless fashion (S2). Host H receives the document data transferring command from Device A (S3). Host H retrieves the document data from Document Data Storage Area H550*b*1 and sends the data to Device B (S4). CPU 211 (FIG. 1) of Device B receives the document data from Host H in a wireless fashion and stores the data in Document Data Storage Area 206B550*b*1 (S5).

This paragraph illustrate(s) Footer Text Data Transferring Software H550*c*8 of Host H, Footer Text Data Transferring Software 206A550*c*8 of Device A, and Footer Text Data Transferring Software 206B550*c*8 of Device B, which transfer(s) the footer text data. In this embodiment, the user of Device A inputs, by utilizing Input Device 210 (FIG. 1) or via voice recognition system, the footer text data transferring command (S1). Here, the footer text data transferring command is the command to transfer the footer text data. CPU 211 (FIG. 1) of Device A sends the footer text data transferring command input in the previous step to Host H in a wireless fashion (S2). Host H receives the footer text data transferring command from Device A (S3). Host H retrieves the footer text data from Footer Text Data Storage Area H550*b*3*a* and sends the data to Device B (S4). CPU 211 (FIG. 1) of Device B receives the footer text data from Host H in a wireless fashion and stores the data in Footer Text Data Storage Area 206B550*b*3*a* (S5).

This paragraph illustrate(s) Footer Font Type Data Transferring Software H550*c*9 of Host H, Footer Font Type Data Transferring Software 206A550*c*9 of Device A, and Footer Font Type Data Transferring Software 206B550*c*9 of Device B, which transfer(s) the footer font type data. In this embodiment, the user of Device A inputs, by utilizing Input Device 210 (FIG. 1) or via voice recognition system, the footer font type data transferring command (S1). Here, the footer font type data transferring command is the command to transfer the footer font type data. CPU 211 (FIG. 1) of Device A sends the footer font type data transferring command input in the previous step to Host H in a wireless fashion (S2). Host H receives the footer font type data transferring command from Device A (S3). Host H retrieves the footer font type data from Footer Font Type Data Storage Area H550*b*3*b* and sends the data to Device B (S4). CPU 211 (FIG. 1) of Device B receives the footer font type data from Host H in a wireless fashion and stores the data in Footer Font Type Data Storage Area 206B550*b*3*b* (S5).

This paragraph illustrate(s) Footer Font Size Data Transferring Software H550*c*10 of Host H, Footer Font Size Data Transferring Software 206A550*c*10 of Device A, and Footer Font Size Data Transferring Software 206B550*c*10 of Device B, which transfer(s) the footer font size data. In this embodiment, the user of Device A inputs, by utilizing Input Device 210 (FIG. 1) or via voice recognition system, the footer font size data transferring command (S1). Here, the footer font size data transferring command is the command to transfer the footer font size data. CPU 211 (FIG. 1) of Device A sends the footer font size data transferring command input in the previous step to Host H in a wireless fashion (S2). Host H receives the footer font size data transferring command from Device A (S3). Host H retrieves the footer font size data from Footer Font Size Data Storage Area H550*b*3*c* and sends the data to Device B (S4). CPU 211 (FIG. 1) of Device B receives the footer font size data from Host H in a wireless fashion and stores the data in Footer Font Size Data Storage Area 206B550*b*3*c* (S5).

This paragraph illustrate(s) Footer Font Color Data Transferring Software H550c11 of Host H, Footer Font Color Data Transferring Software 206A550c11 of Device A, and Footer Font Color Data Transferring Software 206B550c11 of Device B, which transfer(s) the footer font color data. In this embodiment, the user of Device A inputs, by utilizing Input Device 210 (FIG. 1) or via voice recognition system, the footer font color data transferring command (S1). Here, the footer font color data transferring command is the command to transfer the footer font color data. CPU 211 (FIG. 1) of Device A sends the footer font color data transferring command input in the previous step to Host H in a wireless fashion (S2). Host H receives the footer font color data transferring command from Device A (S3). Host H retrieves the footer font color data from Footer Font Color Data Storage Area H550b3d and sends the data to Device B (S4). CPU 211 (FIG. 1) of Device B receives the footer font color data from Host H in a wireless fashion and stores the data in Footer Font Color Data Storage Area 206B550b3d (S5).

This paragraph illustrate(s) Footer Location Data Transferring Software H550c12 of Host H, Footer Location Data Transferring Software 206A550c12 of Device A, and Footer Location Data Transferring Software 206B550c12 of Device B, which transfer(s) the footer location data. In this embodiment, the user of Device A inputs, by utilizing Input Device 210 (FIG. 1) or via voice recognition system, the footer location data transferring command (S1). Here, the footer location data transferring command is the command to transfer the footer location data. CPU 211 (FIG. 1) of Device A sends the footer location data transferring command input in the previous step to Host H in a wireless fashion (S2). Host H receives the footer location data transferring command from Device A (S3). Host H retrieves the footer location data from Footer Location Data Storage Area H550b3e and sends the data to Device B (S4). CPU 211 (FIG. 1) of Device B receives the footer location data from Host H in a wireless fashion and stores the data in Footer Location Data Storage Area 206B550b3e (S5).

This paragraph illustrate(s) Document Package Data Transferring Software H550c13 of Host H, Document Package Data Transferring Software 206A550c13 of Device A, and Document Package Data Transferring Software 206B550c13 of Device B, which transfer(s) the document data and all relevant data. In this embodiment, the user of Device A inputs, by utilizing Input Device 210 (FIG. 1) or via voice recognition system, the document package data transferring command (S1). Here, the document package data transferring command is the command to transfer the document data and all relevant data. CPU 211 (FIG. 1) of Device A sends the document package data transferring command to Host H in a wireless fashion (S2). Host H receives the document package data transferring command from Device A (S3). Host H retrieves the document data from Document Data Storage Area H550b1 and sends the data to Device B in a wireless fashion (S4). CPU 211 (FIG. 1) of Device B receives the document data from Host H in a wireless fashion and stores the data in Document Data Storage Area 206B550b1 (S5). Host H retrieves the footer text data from Footer Text Data Storage Area H550b3a and sends the data to Device B in a wireless fashion (S6). CPU 211 (FIG. 1) of Device B receives the footer text data from Host H in a wireless fashion and stores the data in Footer Text Data Storage Area 206B550b3a (S7). Host H retrieves the footer font type data from Footer Font Type Data Storage Area H550b3b and sends the data to Device B in a wireless fashion (S8). CPU 211 (FIG. 1) of Device B receives the footer font type data from Host H in a wireless fashion and stores the data in Footer Font Type Data Storage Area 206B550b3b (S9). Host H retrieves the footer font size data from Footer Font Size Data Storage Area H550b3c and sends the data to Device B in a wireless fashion (S10). CPU 211 (FIG. 1) of Device B receives the footer font size data from Host H in a wireless fashion and stores the data in Footer Font Size Data Storage Area 206B550b3c (S11). Host H retrieves the footer font color data from Footer Font Color Data Storage Area H550b3d and sends the data to Device B in a wireless fashion (S12). CPU 211 (FIG. 1) of Device B receives the footer font color data from Host H in a wireless fashion and stores the data in Footer Font Color Data Storage Area 206B550b3d (S13). Host H retrieves the footer location data from Footer Location Data Storage Area H550b3e and sends the data to Device B in a wireless fashion (S14). CPU 211 (FIG. 1) of Device B receives the footer location data from Host H in a wireless fashion and stores the data in Footer Location Data Storage Area 206B550b3e (S15).

This paragraph illustrate(s) Document Footer Displaying Software 206B550c6 of Device B, which display(s) the footer. In this embodiment, the user of Device B inputs, by utilizing Input Device 210 (FIG. 1) or via voice recognition system, the document footer displaying command (S1). Here, the document footer displaying command is the command to display the footer. CPU 211 (FIG. 1) of Device B retrieves the document data from Document Data Storage Area 206B550b1 (S2). CPU 211 (FIG. 1) of Device B displays the document data retrieved in the previous step on LCD 201 (FIG. 1) of Device B (S3). CPU 211 (FIG. 1) of Device B retrieves the footer text data from Footer Text Data Storage Area 206B550b3a (S4). CPU 211 (FIG. 1) of Device B retrieves the footer font type data from Footer Font Type Data Storage Area 206B550b3b (S5). CPU 211 (FIG. 1) of Device B retrieves the footer font size data from Footer Font Size Data Storage Area 206B550b3c (S6). CPU 211 (FIG. 1) of Device B retrieves the footer font color data from Footer Font Color Data Storage Area 206B550b3d (S7). CPU 211 (FIG. 1) of Device B retrieves the footer location data from Footer Location Data Storage Area 206B550b3e (S8). CPU 211 (FIG. 1) of Device B displays the footer text data retrieved in S4 in accordance with the footer font type data retrieved in S5, Footer Font Size Data retrieved in S6, and the footer font color data retrieved in S7 at the location indicated by the footer location data retrieved in S8 on Document Data displayed in S3 (S9).

The following paragraphs illustrate another embodiment wherein Device A plays the major role in implementing the present function.

This paragraph illustrate(s) Footer Text Data Producing Software 206A550c1 of Device A, which produce(s) the footer text data. In this embodiment, CPU 211 (FIG. 1) of Device A retrieves all footer preselected text IDs (e.g., Footer Preselected Text#1 through #4) from Footer Preselected Text Data Storage Area 206A550b2a (S1). CPU 211 (FIG. 1) of Device A displays the footer preselected text IDs (e.g., Footer Preselected Text#1 through #4) retrieved in the previous step on LCD 201 (FIG. 1) of Device A (S2). The user of Device A selects, by utilizing Input Device 210 (FIG. 1) or via voice recognition system, a footer preselected text ID (e.g., Footer Preselected Text#1) (S3). CPU 211 (FIG. 1) of Device A retrieves the footer preselected text data (e.g., Footer Preselected Text Data#1) corresponding to the footer preselected text ID (e.g., Footer Preselected Text#1) selected in the previous step from Footer Preselected Text Data Storage Area 206A550b2a (S4). CPU 211 (FIG. 1) of Device A stores the footer preselected text data (e.g., Footer Preselected Text Data#1) retrieved in the previous step as the footer text data in Footer Text Data Storage Area 206A550*b*3*a* (S5).

This paragraph illustrate(s) Footer Font Type Data Producing Software 206A550*c*2 of Device A, which produce(s) the footer font type data. In this embodiment, CPU 211 (FIG. 1) of Device A retrieves all footer preselected font type IDs (e.g., Footer Preselected Font Type#1 through #4) from Footer Preselected Font Type Data Storage Area 206A550*b*2*b* (S1). CPU 211 (FIG. 1) of Device A displays the footer preselected font type IDs (e.g., Footer Preselected Font Type#1 through #4) retrieved in the previous step on LCD 201 (FIG. 1) of Device A (S2). The user of Device A selects, by utilizing Input Device 210 (FIG. 1) or via voice recognition system, a footer preselected font type ID (e.g., Footer Preselected Font Type#1) (S3). CPU 211 (FIG. 1) of Device A retrieves the footer preselected font type data (e.g., Footer Preselected Font Type Data#1) corresponding to the footer preselected font type ID (e.g., Footer Preselected Font Type#1) selected in the previous step from Footer Preselected Font Type Data Storage Area 206A550*b*2*b* (S4). CPU 211 (FIG. 1) of Device A stores the footer preselected font type data (e.g., Footer Preselected Font Type Data#1) retrieved in the previous step as the footer font type data in Footer Font Type Data Storage Area 206A550*b*3*b* (S5).

This paragraph illustrate(s) Footer Font Size Data Producing Software 206A550*c*3 of Device A, which produce(s) the footer font size data. In this embodiment, CPU 211 (FIG. 1) of Device A retrieves all footer preselected font size IDs (e.g., Footer Preselected Font Size#1 through #4) from Footer Preselected Font Size Data Storage Area 206A550*b*2*c* (S1). CPU 211 (FIG. 1) of Device A displays the footer preselected font size IDs (e.g., Footer Preselected Font Size#1 through #4) retrieved in the previous step on LCD 201 (FIG. 1) of Device A (S2). The user of Device A selects, by utilizing Input Device 210 (FIG. 1) or via voice recognition system, a footer preselected font size ID (e.g., Footer Preselected Font Size#1) (S3). CPU 211 (FIG. 1) of Device A retrieves the footer preselected font size data (e.g., Footer Preselected Font Size Data#1) corresponding to the footer preselected font size ID (e.g., Footer Preselected Font Size#1) selected in the previous step from Footer Preselected Font Size Data Storage Area 206A550*b*2*c* (S4). CPU 211 (FIG. 1) of Device A stores the footer preselected font size data (e.g., Footer Preselected Font Size Data#1) retrieved in the previous step as the footer font size data in Footer Font Size Data Storage Area 206A550*b*3*c* (S5).

This paragraph illustrate(s) Footer Font Color Data Producing Software 206A550*c*4 of Device A, which produce(s) the footer font color data. In this embodiment, CPU 211 (FIG. 1) of Device A retrieves all footer preselected font color IDs (e.g., Footer Preselected Font Color#1 through #4) from Footer Preselected Font Color Data Storage Area 206A550*b*2*d* (S1). CPU 211 (FIG. 1) of Device A displays the footer preselected font color IDs (e.g., Footer Preselected Font Color#1 through #4) retrieved in the previous step on LCD 201 (FIG. 1) of Device A (S2). The user of Device A selects, by utilizing Input Device 210 (FIG. 1) or via voice recognition system, a footer preselected font color ID (e.g., Footer Preselected Font Color#1) (S3). CPU 211 (FIG. 1) of Device A retrieves the footer preselected font color data (e.g., Footer Preselected Font Color Data#1) corresponding to the footer preselected font color ID (e.g., Footer Preselected Font Color#1) selected in the previous step from Footer Preselected Font Color Data Storage Area 206A550*b*2*d* (S4). CPU 211 (FIG. 1) of Device A stores the footer preselected font color data (e.g., Footer Preselected Font Color Data#1) retrieved in the previous step as the footer font color data in Footer Font Color Data Storage Area 206A550*b*3*d* (S5).

This paragraph illustrate(s) Footer Location Data Producing Software 206A550*c*5 of Device A, which produce(s) the footer location data. In this embodiment, CPU 211 (FIG. 1) of Device A retrieves all footer preselected location IDs (e.g., Footer Preselected Location#1 through #4) from Footer Preselected Location Data Storage Area 206A550*b*2*e* (S1). CPU 211 (FIG. 1) of Device A displays the footer preselected location IDs (e.g., Footer Preselected Location#1 through #4) retrieved in the previous step on LCD 201 (FIG. 1) of Device A (S2). The user of Device A selects, by utilizing Input Device 210 (FIG. 1) or via voice recognition system, a footer preselected location ID (e.g., Footer Preselected Location#1) (S3). CPU 211 (FIG. 1) of Device A retrieves the footer preselected location data (e.g., Footer Preselected Location Data#1) corresponding to the footer preselected location ID (e.g., Footer Preselected Location#1) selected in the previous step from Footer Preselected Location Data Storage Area 206A550*b*2*e* (S4). CPU 211 (FIG. 1) of Device A stores the footer preselected location data (e.g., Footer Preselected Location Data#1) retrieved in the previous step as the footer location data in Footer Location Data Storage Area 206A550*b*3*e* (S5).

This paragraph illustrate(s) Document Footer Displaying Software 206A550*c*6 of Device A, which display(s) the footer. In this embodiment, the user of Device A inputs, by utilizing Input Device 210 (FIG. 1) or via voice recognition system, the document footer displaying command (S1). Here, the document footer displaying command is the command to display the footer. CPU 211 (FIG. 1) of Device A retrieves the document data from Document Data Storage Area 206A550*b*1 (S2). CPU 211 (FIG. 1) of Device A displays the document data retrieved in the previous step on LCD 201 (FIG. 1) of Device A (S3). CPU 211 (FIG. 1) of Device A retrieves the footer text data from Footer Text Data Storage Area 206A550*b*3*a* (S4). CPU 211 (FIG. 1) of Device A retrieves the footer font type data from Footer Font Type Data Storage Area 206A550*b*3*b* (S5). CPU 211 (FIG. 1) of Device A retrieves the footer font size data from Footer Font Size Data Storage Area 206A550*b*3*c* (S6). CPU 211 (FIG. 1) of Device A retrieves the footer font color data from Footer Font Color Data Storage Area 206A550*b*3*d* (S7). CPU 211 (FIG. 1) of Device A retrieves the footer location data from Footer Location Data Storage Area 206A550*b*3*e* (S8). CPU 211 (FIG. 1) of Device A displays the footer text data retrieved in S4 in accordance with the footer font type data retrieved in S5, Footer Font Size Data retrieved in S6, and the footer font color data retrieved in S7 at the location indicated by the footer location data retrieved in S8 on Document Data displayed in S3 (S9).

This paragraph illustrate(s) Document Data Transferring Software 206A550*c*7 of Device A and Document Data Transferring Software 206B550*c*7 of Device B, which transfer(s) the document data. In this embodiment, the user of Device A inputs, by utilizing Input Device 210 (FIG. 1) or via voice recognition system, the document data transferring command (S1). Here, the document data transferring command is the command to transfer the document data. CPU 211 (FIG. 1) of Device A retrieves the document data from Document Data Storage Area 206A550*b*1 and sends the data to Device B in a wireless fashion (S2). CPU 211 (FIG. 1) of Device B receives the document data from Device A in a wireless fashion and stores the data in Document Data Storage Area 206B550*b*1 (S3).

This paragraph illustrate(s) Footer Text Data Transferring Software 206A550*c*8 of Device A and Footer Text Data Transferring Software 206B550c8 of Device B, which transfer(s) the footer text data. In this embodiment, the user of Device A inputs, by utilizing Input Device 210 (FIG. 1) or via voice recognition system, the footer text data transferring command (S1). Here, the footer text data transferring command is the command to transfer the footer text data. CPU 211 (FIG. 1) of Device A retrieves the footer text data from Footer Text Data Storage Area 206A550b3a and sends the data to Device B in a wireless fashion (S2). CPU 211 (FIG. 1) of Device B receives the footer text data from Device A in a wireless fashion and stores the data in Footer Text Data Storage Area 206B550b3a (S3).

This paragraph illustrate(s) Footer Font Type Data Transferring Software 206A550c9 of Device A and Footer Font Type Data Transferring Software 206B550c9 of Device B, which transfer(s) the footer font type data. In this embodiment, the user of Device A inputs, by utilizing Input Device 210 (FIG. 1) or via voice recognition system, the footer font type data transferring command (S1). Here, the footer font type data transferring command is the command to transfer the footer font type data. CPU 211 (FIG. 1) of Device A retrieves the footer font type data from Footer Font Type Data Storage Area 206A550b3b and sends the data to Device B in a wireless fashion (S2). CPU 211 (FIG. 1) of Device B receives the footer font type data from Device A in a wireless fashion and stores the data in Footer Font Type Data Storage Area 206B550b3b (S3).

This paragraph illustrate(s) Footer Font Size Data Transferring Software 206A550c10 of Device A and Footer Font Size Data Transferring Software 206B550c10 of Device B, which transfer(s) the footer font size data. In this embodiment, the user of Device A inputs, by utilizing Input Device 210 (FIG. 1) or via voice recognition system, the footer font size data transferring command (S1). Here, the footer font size data transferring command is the command to transfer the footer font size data. CPU 211 (FIG. 1) of Device A retrieves the footer font size data from Footer Font Size Data Storage Area 206A550b3c and sends the data to Device B in a wireless fashion (S2). CPU 211 (FIG. 1) of Device B receives the footer font size data from Device A in a wireless fashion and stores the data in Footer Font Size Data Storage Area 206B550b3c (S3).

This paragraph illustrate(s) Footer Font Color Data Transferring Software 206A550c11 of Device A and Footer Font Color Data Transferring Software 206B550c11 of Device B, which transfer(s) the footer font color data. In this embodiment, the user of Device A inputs, by utilizing Input Device 210 (FIG. 1) or via voice recognition system, the footer font color data transferring command (S1). Here, the footer font color data transferring command is the command to transfer the footer font color data. CPU 211 (FIG. 1) of Device A retrieves the footer font color data from Footer Font Color Data Storage Area 206A550b3d and sends the data to Device B in a wireless fashion (S2). CPU 211 (FIG. 1) of Device B receives the footer font color data from Device A in a wireless fashion and stores the data in Footer Font Color Data Storage Area 206B550b3d (S3).

This paragraph illustrate(s) Footer Location Data Transferring Software 206A550c12 of Device A and Footer Location Data Transferring Software 206B550c12 of Device B, which transfer(s) the footer location data. In this embodiment, the user of Device A inputs, by utilizing Input Device 210 (FIG. 1) or via voice recognition system, the footer location data transferring command (S1). Here, the footer location data transferring command is the command to transfer the footer location data. CPU 211 (FIG. 1) of Device A retrieves the footer location data from Footer Location Data Storage Area 206A550b3e and sends the data to Device B in a wireless fashion (S2). CPU 211 (FIG. 1) of Device B receives the footer location data from Device A in a wireless fashion and stores the data in Footer Location Data Storage Area 206B550b3e (S3).

This paragraph illustrate(s) Document Package Data Transferring Software 206A550c13 of Device A and Document Package Data Transferring Software 206B550c13 of Device B, which transfer(s) the document data and all relevant data. In this embodiment, the user of Device A inputs, by utilizing Input Device 210 (FIG. 1) or via voice recognition system, the document package data transferring command (S1). Here, the document package data transferring command is the command to transfer the document data and all relevant data. CPU 211 (FIG. 1) of Device A retrieves the document data from Document Data Storage Area 206A550b1 and sends the data to Device B in a wireless fashion (S2). CPU 211 (FIG. 1) of Device B receives the document data from Device A in a wireless fashion and stores the data in Document Data Storage Area 206B550b1 (S3). CPU 211 (FIG. 1) of Device A retrieves the footer text data from Footer Text Data Storage Area 206A550b3a and sends the data to Device B in a wireless fashion (S4). CPU 211 (FIG. 1) of Device B receives the footer text data from Device A in a wireless fashion and stores the data in Footer Text Data Storage Area 206B550b3a (S5). CPU 211 (FIG. 1) of Device A retrieves the footer font type data from Footer Font Type Data Storage Area 206A550b3b and sends the data to Device B in a wireless fashion (S6). CPU 211 (FIG. 1) of Device B receives the footer font type data from Device A in a wireless fashion and stores the data in Footer Font Type Data Storage Area 206B550b3b (S7). CPU 211 (FIG. 1) of Device A retrieves the footer font size data from Footer Font Size Data Storage Area 206A550b3c and sends the data to Device B in a wireless fashion (S8). CPU 211 (FIG. 1) of Device B receives the footer font size data from Device A in a wireless fashion and stores the data in Footer Font Size Data Storage Area 206B550b3c (S9). CPU 211 (FIG. 1) of Device A retrieves the footer font color data from Footer Font Color Data Storage Area 206A550b3d and sends the data to Device B in a wireless fashion (S10). CPU 211 (FIG. 1) of Device B receives the footer font color data from Device A in a wireless fashion and stores the data in Footer Font Color Data Storage Area 206B550b3d (S11). CPU 211 (FIG. 1) of Device A retrieves the footer location data from Footer Location Data Storage Area 206A550b3e and sends the data to Device B in a wireless fashion (S12). CPU 211 (FIG. 1) of Device B receives the footer location data from Device A in a wireless fashion and stores the data in Footer Location Data Storage Area 206B550b3e (S13).

This paragraph illustrate(s) Document Footer Displaying Software 206B550c6 of Device B, which display(s) the footer. In this embodiment, the user of Device B inputs, by utilizing Input Device 210 (FIG. 1) or via voice recognition system, the document footer displaying command (S1). Here, the document footer displaying command is the command to display the footer. CPU 211 (FIG. 1) of Device B retrieves the document data from Document Data Storage Area 206B550b1 (S2). CPU 211 (FIG. 1) of Device B displays the document data retrieved in the previous step on LCD 201 (FIG. 1) of Device B (S3). CPU 211 (FIG. 1) of Device B retrieves the footer text data from Footer Text Data Storage Area 206B550b3a (S4). CPU 211 (FIG. 1) of Device B retrieves the footer font type data from Footer Font Type Data Storage Area 206B550b3b (S5). CPU 211 (FIG. 1) of Device B retrieves the footer font size data from Footer Font Size Data Storage Area 206B550b3c (S6). CPU 211 (FIG. 1) of Device B retrieves the footer font color data from Footer Font Color Data Storage Area 206B550b3d (S7). CPU 211 (FIG. 1) of Device B retrieves the footer location data from Footer Location Data Storage Area 206B550b3e (S8). CPU 211 (FIG. 1) of Device B displays the footer text data retrieved in S4 in accordance with the footer font type data retrieved in S5, Footer Font Size Data retrieved in S6, and the footer font color data retrieved in S7 at the location indicated by the footer location data retrieved in S8 on Document Data displayed in S3 (S9).

<<Location Scheduled Notifying Function>>

The following paragraphs illustrate the location scheduled notifying function, wherein the 1st location which indicates the current geographic location of Device A is displayed on Device A at the time and date identified by Device A. Further, the 2nd location which indicates the current geographic location of Device B is displayed on Device A at the time and date identified by Device A. In addition, the 1st location and the 2nd location are displayed on Device A at the time and date identified by Device A. The notification which notifies that the current geographic location of Device A is displayed on Device B is output from Device A.

This paragraph illustrates the major elements utilized to implement the present function. In this embodiment, Host H is connected to Network NT (e.g., the Internet). Device A, a Communication Device 200, is connected to Network NT (e.g., the Internet) in a wireless fashion. Device B, another Communication Device 200, is connected to Network NT (e.g., the Internet) in a wireless fashion. Host H, Device A, and Device B are capable to communicate with each other via Network NT (e.g., the Internet) to implement the present function. Device A and Device B are also capable to communicate with each other directly in a wireless fashion to implement the present function.

This paragraph illustrates the storage area included in Host H. In this embodiment, Host H includes Location Scheduled Notifying Information Storage Area H551a of which the data and the software program(s) stored therein are described hereinafter.

This paragraph illustrates the storage area(s) included in Location Scheduled Notifying Information Storage Area H551a. In this embodiment, Location Scheduled Notifying Information Storage Area H551a includes Location Scheduled Notifying Data Storage Area H551b and Location Scheduled Notifying Software Storage Area H551c. Location Scheduled Notifying Data Storage Area H551b stores the data necessary to implement the present function on the side of Host H, such as the one(s) described hereinafter. Location Scheduled Notifying Software Storage Area H551c stores the software program(s) necessary to implement the present function on the side of Host H, such as the one(s) described hereinafter.

This paragraph illustrates the storage area(s) included in Location Scheduled Notifying Data Storage Area H551b. In this embodiment, Location Scheduled Notifying Data Storage Area H551b includes Party Location Data Storage Area H551b1, Party Location Notifying Time Data Storage Area H551b2, Map Data Storage Area H551b3, Party Icon Image Data Storage Area H551b4, Party Location Notifying Data Storage Area H551b5, and Work Area H551b6. Party Location Data Storage Area H551b1 stores the data described hereinafter. Party Location Notifying Time Data Storage Area H551b2 stores the data described hereinafter. Map Data Storage Area H551b3 stores the map data which is the image data indicating a map. Party Icon Image Data Storage Area H551b4 stores the data described hereinafter. Party Location Notifying Data Storage Area H551b5 stores the data described hereinafter. Work Area H551b6 is utilized as a work area to perform calculation and temporarily store data.

This paragraph illustrates the storage area(s) included in Party Location Data Storage Area H551b1. In this embodiment, Party Location Data Storage Area H551b1 includes 1st Location Data Storage Area H551b1a and 2nd Location Data Storage Area H551b1b. 1st Location Data Storage Area H551b1a stores the 1st location data which indicates the current geographic location of Device A in (x,y,z) format. 2nd Location Data Storage Area H551b1b stores the 2nd location data which indicates the current geographic location of Device B in (x,y,z) format.

This paragraph illustrates the storage area(s) included in Party Location Notifying Time Data Storage Area H551b2. In this embodiment, Party Location Notifying Time Data Storage Area H551b2 includes 1st Location Notifying Time Data Storage Area H551b2a, 2nd Location Notifying Time Data Storage Area H551b2b, and Both Location Notifying Time Data Storage Area H551b2c. 1st Location Notifying Time Data Storage Area H551b2a stores the 1st location notifying time data which indicates the time and date at which the current geographic location of Device A is notified. 2nd Location Notifying Time Data Storage Area H551b2b stores the 2nd location notifying time data which indicates the time and date at which the current geographic location of Device B is notified. Both Location Notifying Time Data Storage Area H551b2c stores the both location notifying time data which indicates the time and date at which the current geographic locations of Device A and Device B are notified.

This paragraph illustrates the storage area(s) included in Party Icon Image Data Storage Area H551b4. In this embodiment, Party Icon Image Data Storage Area H551b4 includes 1st Icon Image Data Storage Area H551b4a and 2nd Icon Image Data Storage Area H551b4b. 1st Icon Image Data Storage Area H551b4a stores the 1st icon image data which is the image data of the icon indicating the current geographic location of Device A on the map data. 2nd Icon Image Data Storage Area H551b4b stores the 2nd icon image data which is the image data of the icon indicating the current geographic location of Device B on the map data.

This paragraph illustrates the storage area(s) included in Party Location Notifying Data Storage Area H551b5. In this embodiment, Party Location Notifying Data Storage Area H551b5 includes 1st Location Notifying Data Storage Area H551b5a, 2nd Location Notifying Data Storage Area H551b5b, and Both Location Notifying Data Storage Area H551b5c. 1st Location Notifying Data Storage Area H551b5a stores the 1st location notifying data which is the audiovisual data notifying that the current geographic location of Device A is notified. 2nd Location Notifying Data Storage Area H551b5b stores the 2nd location notifying data which is the audiovisual data notifying that the current geographic location of Device B is notified. Both Location Notifying Data Storage Area H551b5c stores the both location notifying data which is the audiovisual data notifying that the current geographic location of Device A and Device B are notified.

This paragraph illustrates the software program(s) stored in Location Scheduled Notifying Software Storage Area H551c. In this embodiment, Location Scheduled Notifying Software Storage Area H551c stores 1st Location Notifying Time Data Producing Software H551c1, 2nd Location Notifying Time Data Producing Software H551c2, Both Location Notifying Time Data Producing Software H551c3, 1st Location Data Producing Software H551c4, 1st Location Data Notifying Software H551c6, 2nd Location Data Notifying Software H551c7, and Both Location Data Notifying Software H551c8. 1st Location Notifying Time Data Producing Software H551c1 is the software program described hereinafter. 2nd Location Notifying Time Data Producing Software H551c2 is the software program described hereinafter. Both Location Notifying Time Data Producing Software H551c3 is the software program described hereinafter. 1st Location Data Producing Software H551c4 is the software program described hereinafter. 1st Location Data Notifying Software H551c6 is the software program described hereinafter. 2nd Location Data Notifying Software H551c7 is the software program described hereinafter. Both Location Data Notifying Software H551c8 is the software program described hereinafter.

This paragraph illustrates the storage area included in RAM 206 (FIG. 1) of Device A. In this embodiment, RAM 206 includes Location Scheduled Notifying Information Storage Area 206A551a of which the data and the software program(s) stored therein are described hereinafter.

The data and/or the software program(s) necessary to implement the present function may be downloaded from Host H to Device A.

This paragraph illustrates the storage area(s) included in Location Scheduled Notifying Information Storage Area 206A551a. In this embodiment, Location Scheduled Notifying Information Storage Area 206A551a includes Location Scheduled Notifying Data Storage Area 206A551b and Location Scheduled Notifying Software Storage Area 206A551c. Location Scheduled Notifying Data Storage Area 206A551b stores the data necessary to implement the present function on the side of Device A, such as the one(s) described in hereinafter. Location Scheduled Notifying Software Storage Area 206A551c stores the software program(s) necessary to implement the present function on the side of Device A, such as the one(s) described hereinafter.

This paragraph illustrates the storage area(s) included in Location Scheduled Notifying Data Storage Area 206A551b. In this embodiment, Location Scheduled Notifying Data Storage Area 206A551b includes Party Location Data Storage Area 206A551b1, Party Location Notifying Time Data Storage Area 206A551b2, Map Data Storage Area 206A551b3, Party Icon Image Data Storage Area 206A551b4, Party Location Notifying Data Storage Area 206A551b5, and Work Area 206A551b6. Party Location Data Storage Area 206A551b1 stores the data described hereinafter. Party Location Notifying Time Data Storage Area 206A551b2 stores the data described hereinafter. Map Data Storage Area 206A551b3 stores the map data which is the image data indicating a map. Party Icon Image Data Storage Area 206A551b4 stores the data described hereinafter. Party Location Notifying Data Storage Area 206A551b5 stores the data described hereinafter. Work Area 206A551b6 is utilized as a work area to perform calculation and temporarily store data.

This paragraph illustrates the storage area(s) included in Party Location Data Storage Area 206A551b1. In this embodiment, Party Location Data Storage Area 206A551b1 includes 1st Location Data Storage Area 206A551b1a and 2nd Location Data Storage Area 206A551b1b. 1st Location Data Storage Area 206A551b1a stores the 1st location data which indicates the current geographic location of Device A in (x,y,z) format. 2nd Location Data Storage Area 206A551b1b stores the 2nd location data which indicates the current geographic location of Device B in (x,y,z) format.

This paragraph illustrates the storage area(s) included in Party Location Notifying Time Data Storage Area 206A551b2. In this embodiment, Party Location Notifying Time Data Storage Area 206A551b2 includes 1st Location Notifying Time Data Storage Area 206A551b2a, 2nd Location Notifying Time Data Storage Area 206A551b2b, and Both Location Notifying Time Data Storage Area 206A551b2c. 1st Location Notifying Time Data Storage Area 206A551b2a stores the 1st location notifying time data which indicates the time and date at which the current geographic location of Device A is notified. 2nd Location Notifying Time Data Storage Area 206A551b2b stores the 2nd location notifying time data which indicates the time and date at which the current geographic location of Device B is notified. Both Location Notifying Time Data Storage Area 206A551b2c stores the both location notifying time data which indicates the time and date at which the current geographic locations of Device A and Device B are notified.

This paragraph illustrates the storage area(s) included in Party Icon Image Data Storage Area 206A551b4. In this embodiment, Party Icon Image Data Storage Area 206A551b4 includes 1st Icon Image Data Storage Area 206A551b4a and 2nd Icon Image Data Storage Area 206A551b4b. 1st Icon Image Data Storage Area 206A551b4a stores the 1st icon image data which is the image data of the icon indicating the current geographic location of Device A on the map data. 2nd Icon Image Data Storage Area 206A551b4b stores the 2nd icon image data which is the image data of the icon indicating the current geographic location of Device B on the map data.

This paragraph illustrates the storage area(s) included in Party Location Notifying Data Storage Area 206A551b5. In this embodiment, Party Location Notifying Data Storage Area 206A551b5 includes 1st Location Notifying Data Storage Area 206A551b5a, 2nd Location Notifying Data Storage Area 206A551b5b, and Both Location Notifying Data Storage Area 206A551b5c. 1st Location Notifying Data Storage Area 206A551b5a stores the 1st location notifying data which is the audiovisual data notifying that the current geographic location of Device A is notified. 2nd Location Notifying Data Storage Area 206A551b5b stores the 2nd location notifying data which is the audiovisual data notifying that the current geographic location of Device B is notified. Both Location Notifying Data Storage Area 206A551b5c stores the both location notifying data which is the audiovisual data notifying that the current geographic location of Device A and Device B are notified.

This paragraph illustrates the software program(s) stored in Location Scheduled Notifying Software Storage Area 206A551c. In this embodiment, Location Scheduled Notifying Software Storage Area 206A5511c stores 1st Location Notifying Time Data Producing Software 206A551c1, 2nd Location Notifying Time Data Producing Software 206A551c2, Both Location Notifying Time Data Producing Software 206A551c3, 1st Location Data Producing Software 206A551c4, 1st Location Data Notifying Software 206A551c6, 2nd Location Data Notifying Software 206A551c7, and Both Location Data Notifying Software 206A551c8. 1st Location Notifying Time Data Producing Software 206A551c1 is the software program described hereinafter. 2nd Location Notifying Time Data Producing Software 206A551c2 is the software program described hereinafter. Both Location Notifying Time Data Producing Software 206A551c3 is the software program described hereinafter. 1st Location Data Producing Software 206A551c4 is the software program described hereinafter. 1st Location Data Notifying Software 206A551c6 is the software program described hereinafter. 2nd Location Data Notifying Software 206A551c7 is the software program described hereinafter. Both Location Data Notifying Software 206A551c8 is the software program described hereinafter.

This paragraph illustrates the storage area included in RAM 206 (FIG. 1) of Device B. In this embodiment, RAM 206 includes Location Scheduled Notifying Information Storage Area 206B551a of which the data and the software program(s) stored therein are described hereinafter.

The data and/or the software program(s) necessary to implement the present function may be downloaded from Host H to Device B.

This paragraph illustrates the storage area(s) included in Location Scheduled Notifying Information Storage Area 206B551a. In this embodiment, Location Scheduled Notifying Information Storage Area 206B551a includes Location Scheduled Notifying Data Storage Area 206B551b and Location Scheduled Notifying Software Storage Area 206B551c. Location Scheduled Notifying Data Storage Area 206B551b stores the data necessary to implement the present function on the side of Device B, such as the one(s) described hereinafter. Location Scheduled Notifying Software Storage Area 206B551c stores the software program(s) necessary to implement the present function on the side of Device B, such as the one(s) described hereinafter.

This paragraph illustrates the storage area(s) included in Location Scheduled Notifying Data Storage Area 206B551b. In this embodiment, Location Scheduled Notifying Data Storage Area 206B551b includes Party Location Data Storage Area 206B551b1, Party Location Notifying Time Data Storage Area 206B551b2, Map Data Storage Area 206B551b3, Party Icon Image Data Storage Area 206B551b4, Party Location Notifying Data Storage Area 206B551b5, and Work Area 206B551b6. Party Location Data Storage Area 206B551b1 stores the data described hereinafter. Party Location Notifying Time Data Storage Area 206B551b2 stores the data described hereinafter. Map Data Storage Area 206B551b3 stores the map data which is the image data indicating a map. Party Icon Image Data Storage Area 206B551b4 stores the data described hereinafter. Party Location Notifying Data Storage Area 206B551b5 stores the data described hereinafter. Work Area 206B551b6 is utilized as a work area to perform calculation and temporarily store data.

This paragraph illustrates the storage area(s) included in Party Location Data Storage Area 206B551b1. In this embodiment, Party Location Data Storage Area 206B551b1 includes 1st Location Data Storage Area 206B551b1a and 2nd Location Data Storage Area 206B551b1b. 1st Location Data Storage Area 206B551b1a stores the 1st location data which indicates the current geographic location of Device A in (x,y,z) format. 2nd Location Data Storage Area 206B551b1b stores the 2nd location data which indicates the current geographic location of Device B in (x,y,z) format.

This paragraph illustrates the storage area(s) included in Party Location Notifying Time Data Storage Area 206B551b2. In this embodiment, Party Location Notifying Time Data Storage Area 206B551b2 includes 1st Location Notifying Time Data Storage Area 206B551b2a, 2nd Location Notifying Time Data Storage Area 206B551b2b, and Both Location Notifying Time Data Storage Area 206B551b2c. 1st Location Notifying Time Data Storage Area 206B551b2a stores the 1st location notifying time data which indicates the time and date at which the current geographic location of Device A is notified. 2nd Location Notifying Time Data Storage Area 206B551b2b stores the 2nd location notifying time data which indicates the time and date at which the current geographic location of Device B is notified. Both Location Notifying Time Data Storage Area 206B551b2c stores the both location notifying time data which indicates the time and date at which the current geographic locations of Device A and Device B are notified.

This paragraph illustrates the storage area(s) included in Party Icon Image Data Storage Area 206B551b4. In this embodiment, Party Icon Image Data Storage Area 206B551b4 includes 1st Icon Image Data Storage Area 206B551b4a and 2nd Icon Image Data Storage Area 206B551b4b. 1st Icon Image Data Storage Area 206B551b4a stores the 1st icon image data which is the image data of the icon indicating the current geographic location of Device A on the map data. 2nd Icon Image Data Storage Area 206B551b4b stores the 2nd icon image data which is the image data of the icon indicating the current geographic location of Device B on the map data.

This paragraph illustrates the storage area(s) included in Party Location Notifying Data Storage Area 206B551b5. In this embodiment, Party Location Notifying Data Storage Area 206B551b5 includes 1st Location Notifying Data Storage Area 206B551b5a, 2nd Location Notifying Data Storage Area 206B551b5b, and Both Location Notifying Data Storage Area 206B551b5c. 1st Location Notifying Data Storage Area 206B551b5a stores the 1st location notifying data which is the audiovisual data notifying that the current geographic location of Device A is notified. 2nd Location Notifying Data Storage Area 206B551b5b stores the 2nd location notifying data which is the audiovisual data notifying that the current geographic location of Device B is notified. Both Location Notifying Data Storage Area 206B551b5c stores the both location notifying data which is the audiovisual data notifying that the current geographic location of Device A and Device B are notified.

This paragraph illustrates the software program(s) stored in Location Scheduled Notifying Software Storage Area 206B551c. In this embodiment, Location Scheduled Notifying Software Storage Area 206B551c stores 1st Location Notifying Time Data Producing Software 206B551c1, 2nd Location Notifying Time Data Producing Software 206B551c2, Both Location Notifying Time Data Producing Software 206B551c3, 2nd Location Data Producing Software 206B551c5, 1st Location Data Notifying Software 206B551c6, 2nd Location Data Notifying Software 206B551c7, and Both Location Data Notifying Software 206B551c8. 1st Location Notifying Time Data Producing Software 206B551c1 is the software program described hereinafter. 2nd Location Notifying Time Data Producing Software 206B551c2 is the software program described hereinafter. Both Location Notifying Time Data Producing Software 206B551c3 is the software program described hereinafter. 2nd Location Data Producing Software 206B551c5 is the software program described hereinafter. 1st Location Data Notifying Software 206B551c6 is the software program described hereinafter. 2nd Location Data Notifying Software 206B551c7 is the software program described hereinafter. Both Location Data Notifying Software 206B551c8 is the software program described hereinafter.

This paragraph illustrate(s) 1st Location Notifying Time Data Producing Software H551c1 of Host H and 1st Location Notifying Time Data Producing Software 206A551c1 of Device A, which produce(s) the 1st location notifying time data. In this embodiment, CPU 211 (FIG. 1) of Device A displays the 1st location notifying time data entering area on LCD 201 (FIG. 1) of Device A (S1). Here, the 1st location notifying time data entering area is the area to input the 1st location notifying time data. The user of Device A inputs, by utilizing Input Device 210 (FIG. 1) or via voice recognition system, the 1st location notifying time data in the 1st location notifying time data entering area displayed in the previous step (S2). CPU 211 (FIG. 1) of Device A sends the 1st location notifying time data input in the previous step to Host H in a wireless fashion (S3). Host H receives the 1st location notifying time data from Device A and stores the data in 1st Location Notifying Time Data Storage Area H551$b2a$ (S4).

This paragraph illustrate(s) 1st Location Notifying Time Data Producing Software 206B551$c_1$ of Device B, which produce(s) the 1st location notifying time data. In this embodiment, CPU 211 (FIG. 1) of Device B displays the 1st location notifying time data entering area on LCD 201 (FIG. 1) of Device B (S1). Here, the 1st location notifying time data entering area is the area to input the 1st location notifying time data. The user of Device B inputs, by utilizing Input Device 210 (FIG. 1) or via voice recognition system, the 1st location notifying time data in the 1st location notifying time data entering area displayed in the previous step (S2). CPU 211 (FIG. 1) of Device B stores the 1st location notifying time data input in the previous step in 1st Location Notifying Time Data Storage Area 206B551$b2a$ (S3).

This paragraph illustrate(s) 2nd Location Notifying Time Data Producing Software H551$c2$ of Host H and 2nd Location Notifying Time Data Producing Software 206A551$c2$ of Device A, which produce(s) the 2nd location notifying time data. In this embodiment, CPU 211 (FIG. 1) of Device A displays the 2nd location notifying time data entering area on LCD 201 (FIG. 1) of Device A (S1). Here, the 2nd location notifying time data entering area is the area to input the 2nd location notifying time data. The user of Device A inputs, by utilizing Input Device 210 (FIG. 1) or via voice recognition system, the 2nd location notifying time data in the 2nd location notifying time data entering area displayed in the previous step (S2). CPU 211 (FIG. 1) of Device A sends the 2nd location notifying time data input in the previous step to Host H in a wireless fashion (S3). Host H receives the 2nd location notifying time data from Device A and stores the data in 2nd Location Notifying Time Data Storage Area H551$b2b$ (S4).

This paragraph illustrate(s) 2nd Location Notifying Time Data Producing Software 206B551$c2$ of Device B, which produce(s) the 2nd location notifying time data. In this embodiment, CPU 211 (FIG. 1) of Device B displays the 2nd location notifying time data entering area on LCD 201 (FIG. 1) of Device B (S1). Here, the 2nd location notifying time data entering area is the area to input the 2nd location notifying time data. The user of Device B inputs, by utilizing Input Device 210 (FIG. 1) or via voice recognition system, the 2nd location notifying time data in the 2nd location notifying time data entering area displayed in the previous step (S2). CPU 211 (FIG. 1) of Device B stores the 2nd location notifying time data input in the previous step in 2nd Location Notifying Time Data Storage Area 206B551$b2b$ (S3).

This paragraph illustrate(s) Both Location Notifying Time Data Producing Software H551$c3$ of Host H and Both Location Notifying Time Data Producing Software 206A551$c3$ of Device A, which produce(s) the both location notifying time data. In this embodiment, CPU 211 (FIG. 1) of Device A displays the both location notifying time data entering area on LCD 201 (FIG. 1) of Device A (S1). Here, the both location notifying time data entering area is the area to input the both location notifying time data. The user of Device A inputs, by utilizing Input Device 210 (FIG. 1) or via voice recognition system, the both location notifying time data in the both location notifying time data entering area displayed in the previous step (S2). CPU 211 (FIG. 1) of Device A sends the both location notifying time data input in the previous step to Host H in a wireless fashion (S3). Host H receives the both location notifying time data from Device A and stores the data in Both Location Notifying Time Data Storage Area H551$b2c$ (S4).

This paragraph illustrate(s) Both Location Notifying Time Data Producing Software 206B551$c3$ of Device B, which produce(s) the both location notifying time data. In this embodiment, CPU 211 (FIG. 1) of Device B displays the both location notifying time data entering area on LCD 201 (FIG. 1) of Device B (S1). Here, the both location notifying time data entering area is the area to input the both location notifying time data. The user of Device B inputs, by utilizing Input Device 210 (FIG. 1) or via voice recognition system, the both location notifying time data in the both location notifying time data entering area displayed in the previous step (S2). CPU 211 (FIG. 1) of Device B stores the both location notifying time data input in the previous step in Both Location Notifying Time Data Storage Area 206B551$b2c$ (S3).

This paragraph illustrate(s) 1st Location Data Producing Software H551$c4$ of Host H and 1st Location Data Producing Software 206A551$c4$ of Device A, which produce(s) the 1st location data. In this embodiment, CPU 211 (FIG. 1) of Device A identifies the current location of Device A (S1). CPU 211 (FIG. 1) of Device A produces the 1st location data by utilizing the current location identified in the previous step (S2). CPU 211 (FIG. 1) of Device A sends the 1st location data produced in the previous step to Host H in a wireless fashion (S3). Host H receives the 1st location data from Device A and stores the data in 1st Location Data Storage Area H551$b1a$ (S4). The foregoing sequence is repeated periodically.

This paragraph illustrate(s) 2nd Location Data Producing Software 206B551$c5$ of Device B, which produce(s) the 2nd location data. In this embodiment, CPU 211 (FIG. 1) of Device B identifies the current location of Device B (S1). CPU 211 (FIG. 1) of Device B produces the 2nd location data by utilizing the current location identified in the previous step (S2). CPU 211 (FIG. 1) of Device B stores the 2nd location data produced in the previous step in 2nd Location Data Storage Area 206B551$b1b$ (S3). The foregoing sequence is repeated periodically.

This paragraph illustrate(s) 1st Location Data Notifying Software H551$c6$ of Host H and 1st Location Data Notifying Software 206A551$c6$ of Device A, which notify(s) the 1st location data. In this embodiment, Host H identifies the current time (S1). Host H retrieves the 1st location notifying time data from 1st Location Notifying Time Data Storage Area H551$b2a$ (S2). If the current time identified in S1 matches with the 1st location notifying time data retrieved in the previous step, Host H proceeds to the next step (S3). Host H retrieves the map data from Map Data Storage Area H551$b3$ and sends the data to Device A (S4). CPU 211 (FIG. 1) of Device A receives the map data from Host H in a wireless fashion and displays the data on LCD 201 (FIG. 1) of Device A (S5). Host H retrieves the 1st location data from 1st Location Data Storage Area H551$b1a$ and sends the data to Device A (S6). CPU 211 (FIG. 1) of Device A receives the 1st location data from Host H in a wireless fashion (S7). Host H retrieves the 1st icon image data from 1st Icon Image Data Storage Area H551$b4a$ and sends the data to Device A (S8). CPU 211 (FIG. 1) of Device A receives the 1st icon image data from Host H in a wireless fashion (S9). CPU 211 (FIG. 1) of Device A displays the 1st icon image data received in the previous step at the location indicated by the 1st location data received in S7 on the map data displayed in S5 (S10). Host H retrieves the 1st location notifying data from 1st Location Notifying Data Storage Area H551$b5a$ and sends the data to Device A (S11). CPU 211 (FIG. 1) of Device A receives the 1st location notifying data from Host H in a wireless fashion and outputs the data from Speaker 216 (FIG. 1) and LCD 201 (FIG. 1) of Device A (S12).

This paragraph illustrate(s) 1st Location Data Notifying Software H551c6 of Host H, 1st Location Data Notifying Software 206A551c6 of Device A, and 1st Location Data Notifying Software 206B551c6 of Device B, which notify(s) the 1st location data. In this embodiment, CPU 211 (FIG. 1) of Device B identifies the current time (S1). CPU 211 (FIG. 1) of Device B retrieves the 1st location notifying time data from 1st Location Notifying Time Data Storage Area 206B551b2a (S2). If the current time identified in S1 matches with the 1st location notifying time data retrieved in the previous step, CPU 211 (FIG. 1) of Device B proceeds to the next step (S3). CPU 211 (FIG. 1) of Device B sends the 1st location data transferring request to Host H in a wireless fashion (S4). Here, the 1st location data transferring request is the request to transfer the 1st location data. Host H receives the 1st location data transferring request from Device B (S5). Host H retrieves the 1st location data from 1st Location Data Storage Area H551b1a and sends the data to Device B (S6). CPU 211 (FIG. 1) of Device B receives the 1st location data from Host H in a wireless fashion and stores the data in 1st Location Data Storage Area 206B551b1a (S7). CPU 211 (FIG. 1) of Device B retrieves the map data from Map Data Storage Area 206B551b3 (S8). CPU 211 (FIG. 1) of Device B displays the map data retrieved in the previous step on LCD 201 (FIG. 1) of Device B (S9). CPU 211 (FIG. 1) of Device B retrieves the 1st location data from 1st Location Data Storage Area 206B551b1a (S10). CPU 211 (FIG. 1) of Device B retrieves the 1st icon image data from 1st Icon Image Data Storage Area 206B551b4a (S11). CPU 211 (FIG. 1) of Device B displays the 1st icon image data retrieved in the previous step at the location indicated by the 1st location data retrieved in S10 on the map data displayed in S9 (S12). CPU 211 (FIG. 1) of Device B retrieves the 1st location notifying data from 1st Location Notifying Data Storage Area 206B551b5a (S13). CPU 211 (FIG. 1) of Device B outputs the 1st location notifying data retrieved in the previous step from Speaker 216 (FIG. 1) and LCD 201 (FIG. 1) of Device B (S14). CPU 211 (FIG. 1) of Device B sends the 1st location notifying notice to Host H in a wireless fashion (S15). Here, the 1st location notifying notice indicates that the current geographic location of Device A is displayed on Device B. Host H receives the 1st location notifying notice from Device B (S16). Host H retrieves the 1st location notifying data from 1st Location Notifying Data Storage Area H551b5a and sends the data to Device A (S17). CPU 211 (FIG. 1) of Device A receives the 1st location notifying data from Host H in a wireless fashion and outputs the data from Speaker 216 (FIG. 1) and LCD 201 (FIG. 1) of Device A (S18).

This paragraph illustrate(s) 2nd Location Data Notifying Software H551c7 of Host H, 2nd Location Data Notifying Software 206A551c7 of Device A, and 2nd Location Data Notifying Software 206B551c7 of Device B, which notify(s) the 2nd location data. In this embodiment, Host H identifies the current time (S1). Host H retrieves the 2nd location notifying time data from 2nd Location Notifying Time Data Storage Area H551b2b (S2). If the current time identified in S1 matches with the 2nd location notifying time data retrieved in the previous step, Host H proceeds to the next step (S3). Host H sends the 2nd location data transferring request to Device B (S4). Here, the 2nd location data transferring request is the request to transfer the 2nd location data. CPU 211 (FIG. 1) of Device B receives the 2nd location data transferring request from Host H in a wireless fashion (S5). CPU 211 (FIG. 1) of Device B retrieves the 2nd location data from 2nd Location Data Storage Area 206B551b1b and sends the data to Host H in a wireless fashion (S6). Host H receives the 2nd location data from Device B and stores the data in 2nd Location Data Storage Area H551b1b (S7). Host H retrieves the map data from Map Data Storage Area H551b3 and sends the data to Device A (S8). CPU 211 (FIG. 1) of Device A receives the map data from Host H in a wireless fashion and displays the data on LCD 201 (FIG. 1) of Device A (S9). Host H retrieves the 2nd location data from 2nd Location Data Storage Area H551b1b and sends the data to Device A (S10). CPU 211 (FIG. 1) of Device A receives the 2nd location data from Host H in a wireless fashion (S11). Host H retrieves the 2nd icon image data from 2nd Icon Image Data Storage Area H551b4b and sends the data to Device A (S12). CPU 211 (FIG. 1) of Device A receives the 2nd icon image data from Host H in a wireless fashion (S13). CPU 211 (FIG. 1) of Device A displays the 2nd icon image data received in the previous step at the location indicated by the 2nd location data received in S11 on the map data displayed in S9 (S14). Host H retrieves the 2nd location notifying data from 2nd Location Notifying Data Storage Area H551b5b and sends the data to Device A (S15). CPU 211 (FIG. 1) of Device A receives the 2nd location notifying data from Host H in a wireless fashion and outputs the data from Speaker 216 (FIG. 1) and LCD 201 (FIG. 1) of Device A (S16). Host H sends the 2nd location notifying notice to Device B (S17). Here, the 2nd location notifying notice indicates that the current geographic location of Device B is displayed on Device A. CPU 211 (FIG. 1) of Device B receives the 2nd location notifying notice from Host H in a wireless fashion (S18). CPU 211 (FIG. 1) of Device B retrieves the 2nd location notifying data from 2nd Location Notifying Data Storage Area 206B551b5b (S19). CPU 211 (FIG. 1) of Device B outputs the 2nd location notifying data retrieved in the previous step from Speaker 216 (FIG. 1) and LCD 201 (FIG. 1) of Device B (S20).

This paragraph illustrate(s) 2nd Location Data Notifying Software 206B551c7 of Device B, which notify(s) the 2nd location data. In this embodiment, CPU 211 (FIG. 1) of Device B identifies the current time (S1). CPU 211 (FIG. 1) of Device B retrieves the 2nd location notifying time data from 2nd Location Notifying Time Data Storage Area 206B551b2b (S2). If the current time identified in S1 matches with the 2nd location notifying time data retrieved in the previous step, CPU 211 (FIG. 1) of Device B proceeds to the next step (S3). CPU 211 (FIG. 1) of Device B retrieves the map data from Map Data Storage Area 206B551b3 (S4). CPU 211 (FIG. 1) of Device B displays the map data retrieved in the previous step on LCD 201 (FIG. 1) of Device B (S5). CPU 211 (FIG. 1) of Device B retrieves the 2nd location data from 2nd Location Data Storage Area 206B551b1b (S6). CPU 211 (FIG. 1) of Device B retrieves the 2nd icon image data from 2nd Icon Image Data Storage Area 206B551b4b (S7). CPU 211 (FIG. 1) of Device B displays the 2nd icon image data retrieved in the previous step at the location indicated by the 2nd location data retrieved in S6 on the map data displayed in S5 (S8). CPU 211 (FIG. 1) of Device B retrieves the 2nd location notifying data from 2nd Location Notifying Data Storage Area 206B551b5b (S9). CPU 211 (FIG. 1) of Device B outputs the 2nd location notifying data retrieved in the previous step from Speaker 216 (FIG. 1) and LCD 201 (FIG. 1) of Device B (S10).

This paragraph illustrate(s) Both Location Data Notifying Software H551c8 of Host H, Both Location Data Notifying Software 206A551c8 of Device A, and Both Location Data Notifying Software 206B551c8 of Device B, which notify(s) the both location data. In this embodiment, Host H identifies the current time (S1). Host H retrieves the both location notifying time data from Both Location Notifying Time Data Storage Area H551b2c (S2). If the current time identified in S1 matches with the both location notifying time data retrieved in the previous step, Host H proceeds to the next step (S3). Host H sends the 2nd location data transferring request to Device B (S4). Here, the 2nd location data transferring request is the request to transfer the 2nd location data. CPU 211 (FIG. 1) of Device B receives the 2nd location data transferring request from Host H in a wireless fashion (S5). CPU 211 (FIG. 1) of Device B retrieves the 2nd location data from 2nd Location Data Storage Area 206B551b1b and sends the data to Host H in a wireless fashion (S6). Host H receives the 2nd location data from Device B and stores the data in 2nd Location Data Storage Area H551b1b (S7). Host H retrieves the map data from Map Data Storage Area H551b3 and sends the data to Device A (S8). CPU 211 (FIG. 1) of Device A receives the map data from Host H in a wireless fashion and displays the data on LCD 201 (FIG. 1) of Device A (S9). Host H retrieves the 1st location data from 1st Location Data Storage Area H551b1a and sends the data to Device A (S10). CPU 211 (FIG. 1) of Device A receives the 1st location data from Host H in a wireless fashion (S11). Host H retrieves the 1st icon image data from 1st Icon Image Data Storage Area H551b4a and sends the data to Device A (S12). CPU 211 (FIG. 1) of Device A receives the 1st icon image data from Host H in a wireless fashion (S13). CPU 211 (FIG. 1) of Device A displays the 1st icon image data received in the previous step at the location indicated by the 1st location data received in S11 on the map data displayed in S9 (S14). Host H retrieves the 2nd location data from 2nd Location Data Storage Area H551b1b and sends the data to Device A (S15). CPU 211 (FIG. 1) of Device A receives the 2nd location data from Host H in a wireless fashion (S16). Host H retrieves the 2nd icon image data from 2nd Icon Image Data Storage Area H551b4b and sends the data to Device A (S17). CPU 211 (FIG. 1) of Device A receives the 2nd icon image data from Host H in a wireless fashion (S18). CPU 211 (FIG. 1) of Device A displays the 2nd icon image data received in the previous step at the location indicated by the 2nd location data received in S16 on the map data displayed in S9 (S19). Thus, the 1st icon image data and the 2nd icon image data are displayed simultaneously on the map data. Host H retrieves the both location notifying data from Both Location Notifying Data Storage Area H551b5c and sends the data to Device A (S20). CPU 211 (FIG. 1) of Device A receives the both location notifying data from Host H in a wireless fashion and outputs the data from Speaker 216 (FIG. 1) and LCD 201 (FIG. 1) of Device A (S21). Host H sends the 2nd location notifying notice to Device B (S22). Here, the 2nd location notifying notice indicates that the current geographic location of Device B is displayed on Device A. CPU 211 (FIG. 1) of Device B receives the 2nd location notifying notice from Host H in a wireless fashion (S23). CPU 211 (FIG. 1) of Device B retrieves the 2nd location notifying data from 2nd Location Notifying Data Storage Area 206B551b5b (S24). CPU 211 (FIG. 1) of Device B outputs the 2nd location notifying data retrieved in the previous step from Speaker 216 (FIG. 1) and LCD 201 (FIG. 1) of Device B (S25).

This paragraph illustrate(s) Both Location Data Notifying Software H551c8 of Host H, Both Location Data Notifying Software 206A551c8 of Device A, and Both Location Data Notifying Software 206B551c8 of Device B, which notify(s) the both location data. In this embodiment, CPU 211 (FIG. 1) of Device B identifies the current time (S1). CPU 211 (FIG. 1) of Device B retrieves the both location notifying time data from Both Location Notifying Time Data Storage Area 206B551b2c (S2). If the current time identified in S1 matches with the both location notifying time data retrieved in the previous step, CPU 211 (FIG. 1) of Device B proceeds to the next step (S3). CPU 211 (FIG. 1) of Device B sends the 1st location data transferring request to Host H in a wireless fashion (S4). Here, the 1st location data transferring request is the request to transfer the 1st location data. Host H receives the 1st location data transferring request from Device B (S5). Host H retrieves the 1st location data from 1st Location Data Storage Area H551b1a and sends the data to Device B (S6). CPU 211 (FIG. 1) of Device B receives the 1st location data from Host H in a wireless fashion and stores the data in 1st Location Data Storage Area 206B551b1a (S7). CPU 211 (FIG. 1) of Device B retrieves the map data from Map Data Storage Area 206B551b3 (S8). CPU 211 (FIG. 1) of Device B displays the map data retrieved in the previous step on LCD 201 (FIG. 1) of Device B (S9). CPU 211 (FIG. 1) of Device B retrieves the 1st location data from 1st Location Data Storage Area 206B551b1a (S10). CPU 211 (FIG. 1) of Device B retrieves the 1st icon image data from 1st Icon Image Data Storage Area 206B551b4a (S11). CPU 211 (FIG. 1) of Device B displays the 1st icon image data retrieved in the previous step at the location indicated by the 1st location data retrieved in S10 on the map data displayed in S9 (S12). CPU 211 (FIG. 1) of Device B retrieves the 2nd location data from 2nd Location Data Storage Area 206B551b1b (S13). CPU 211 (FIG. 1) of Device B retrieves the 2nd icon image data from 2nd Icon Image Data Storage Area 206B551b4b (S14). CPU 211 (FIG. 1) of Device B displays the 2nd icon image data retrieved in the previous step at the location indicated by the 2nd location data retrieved in S13 on the map data displayed in S9 (S15). Thus, the 1st icon image data and the 2nd icon image data are displayed simultaneously on the map data. CPU 211 (FIG. 1) of Device B retrieves the both location notifying data from Both Location Notifying Data Storage Area 206B551b5c (S16). CPU 211 (FIG. 1) of Device B outputs the both location notifying data retrieved in the previous step from Speaker 216 (FIG. 1) and LCD 201 (FIG. 1) of Device B (S17). CPU 211 (FIG. 1) of Device B sends the 1st location notifying notice to Host H in a wireless fashion (S18). Here, the 1st location notifying notice indicates that the current geographic location of Device A is displayed on Device B. Host H receives the 1st location notifying notice from Device B (S19). Host H retrieves the 1st location notifying data from 1st Location Notifying Data Storage Area H551b5a and sends the data to Device A (S20). CPU 211 (FIG. 1) of Device A receives the 1st location notifying data from Host H in a wireless fashion and outputs the data from Speaker 216 (FIG. 1) and LCD 201 (FIG. 1) of Device A (S21).

The following paragraphs illustrate another embodiment wherein Device A plays the major role in implementing the present function.

This paragraph illustrate(s) 1st Location Notifying Time Data Producing Software 206A551c1 of Device A, which produce(s) the 1st location notifying time data. In this embodiment, CPU 211 (FIG. 1) of Device A displays the 1st location notifying time data entering area on LCD 201 (FIG. 1) of Device A (S1). Here, the 1st location notifying time data entering area is the area to input the 1st location notifying time data. The user of Device A inputs, by utilizing Input Device 210 (FIG. 1) or via voice recognition system, the 1st location notifying time data in the 1st location notifying time data entering area displayed in the previous step (S2). CPU 211 (FIG. 1) of Device A stores the 1st location notifying time data input in the previous step in 1st Location Notifying Time Data Storage Area 206A551b2a (S3).

This paragraph illustrate(s) 1st Location Notifying Time Data Producing Software 206B551c1 of Device B, which produce(s) the 1st location notifying time data. In this embodiment, CPU 211 (FIG. 1) of Device B displays the 1st location notifying time data entering area on LCD 201 (FIG. 1) of Device B (S1). Here, the 1st location notifying time data entering area is the area to input the 1st location notifying time data. The user of Device B inputs, by utilizing Input Device 210 (FIG. 1) or via voice recognition system, the 1st location notifying time data in the 1st location notifying time data entering area displayed in the previous step (S2). CPU 211 (FIG. 1) of Device B stores the 1st location notifying time data input in the previous step in 1st Location Notifying Time Data Storage Area 206B551b2a (S3).

This paragraph illustrate(s) 2nd Location Notifying Time Data Producing Software 206A551c2 of Device A, which produces) the 2nd location notifying time data. In this embodiment, CPU 211 (FIG. 1) of Device A displays the 2nd location notifying time data entering area on LCD 201 (FIG. 1) of Device A (S1). Here, the 2nd location notifying time data entering area is the area to input the 2nd location notifying time data. The user of Device A inputs, by utilizing Input Device 210 (FIG. 1) or via voice recognition system, the 2nd location notifying time data in the 2nd location notifying time data entering area displayed in the previous step (S2). CPU 211 (FIG. 1) of Device A stores the 2nd location notifying time data input in the previous step in 2nd Location Notifying Time Data Storage Area 206A551b2b (S3).

This paragraph illustrate(s) 2nd Location Notifying Time Data Producing Software 206B551c2 of Device B, which produce(s) the 2nd location notifying time data. In this embodiment, CPU 211 (FIG. 1) of Device B displays the 2nd location notifying time data entering area on LCD 201 (FIG. 1) of Device B (S1). Here, the 2nd location notifying time data entering area is the area to input the 2nd location notifying time data. The user of Device B inputs, by utilizing Input Device 210 (FIG. 1) or via voice recognition system, the 2nd location notifying time data in the 2nd location notifying time data entering area displayed in the previous step (S2). CPU 211 (FIG. 1) of Device B stores the 2nd location notifying time data input in the previous step in 2nd Location Notifying Time Data Storage Area 206B551b2b (S3).

This paragraph illustrate(s) Both Location Notifying Time Data Producing Software 206A551c3 of Device A, which produce(s) the both location notifying time data. In this embodiment, CPU 211 (FIG. 1) of Device A displays the both location notifying time data entering area on LCD 201 (FIG. 1) of Device A (S1). Here, the both location notifying time data entering area is the area to input the both location notifying time data. The user of Device A inputs, by utilizing Input Device 210 (FIG. 1) or via voice recognition system, the both location notifying time data in the both location notifying time data entering area displayed in the previous step (S2). CPU 211 (FIG. 1) of Device A stores the both location notifying time data input in the previous step in Both Location Notifying Time Data Storage Area 206A551b2c (S3).

This paragraph illustrate(s) Both Location Notifying Time Data Producing Software 206B551c3 of Device B, which produce(s) the both location notifying time data. In this embodiment, CPU 211 (FIG. 1) of Device B displays the both location notifying time data entering area on LCD 201 (FIG. 1) of Device B (S1). Here, the both location notifying time data entering area is the area to input the both location notifying time data. The user of Device B inputs, by utilizing Input Device 210 (FIG. 1) or via voice recognition system, the both location notifying time data in the both location notifying time data entering area displayed in the previous step (S2).

CPU 211 (FIG. 1) of Device B stores the both location notifying time data input in the previous step in Both Location Notifying Time Data Storage Area 206B551b2c (S3).

This paragraph illustrate(s) 1st Location Data Producing Software 206A551c4 of Device A, which produce(s) the 1st location data. In this embodiment, CPU 211 (FIG. 1) of Device A identifies the current location of Device A (S1). CPU 211 (FIG. 1) of Device A produces the 1st location data by utilizing the current location identified in the previous step (S2). CPU 211 (FIG. 1) of Device A stores the 1st location data produced in the previous step in 1st Location Data Storage Area 206A551b1a (S3). The foregoing sequence is repeated periodically.

This paragraph illustrate(s) 2nd Location Data Producing Software 206B551c5 of Device B, which produce(s) the 2nd location data. In this embodiment, CPU 211 (FIG. 1) of Device B identifies the current location of Device B (S1). CPU 211 (FIG. 1) of Device B produces the 2nd location data by utilizing the current location identified in the previous step (S2). CPU 211 (FIG. 1) of Device B stores the 2nd location data produced in the previous step in 2nd Location Data Storage Area 206B551b1b (S3). The foregoing sequence is repeated periodically.

This paragraph illustrate(s) 1st Location Data Notifying Software 206A551c6 of Device A, which notify(s) the 1st location data. In this embodiment, CPU 211 (FIG. 1) of Device A identifies the current time (S1). CPU 211 (FIG. 1) of Device A retrieves the 1st location notifying time data from 1st Location Notifying Time Data Storage Area 206A551b2a (S2). If the current time identified in S1 matches with the 1st location notifying time data retrieved in the previous step, CPU 211 (FIG. 1) of Device A proceeds to the next step (S3). CPU 211 (FIG. 1) of Device A retrieves the map data from Map Data Storage Area 206A551b3 (S4). CPU 211 (FIG. 1) of Device A displays the map data retrieved in the previous step on LCD 201 (FIG. 1) of Device A (S5). CPU 211 (FIG. 1) of Device A retrieves the 1st location data from 1st Location Data Storage Area 206A551b1a (S6). CPU 211 (FIG. 1) of Device A retrieves the 1st icon image data from 1st Icon Image Data Storage Area 206A551b4a (S7). CPU 211 (FIG. 1) of Device A displays the 1st icon image data retrieved in the previous step at the location indicated by the 1st location data retrieved in S6 on the map data displayed in S5 (S8). CPU 211 (FIG. 1) of Device A retrieves the 1st location notifying data from 1st Location Notifying Data Storage Area 206A551b5a (S9). CPU 211 (FIG. 1) of Device A outputs the 1st location notifying data retrieved in the previous step from Speaker 216 (FIG. 1) and LCD 201 (FIG. 1) of Device A (S10).

This paragraph illustrate(s) 1st Location Data Notifying Software 206A551c6 of Device A and 1st Location Data Notifying Software 206B551c6 of Device B, which notify(s) the 1st location data. In this embodiment, CPU 211 (FIG. 1) of Device B identifies the current time (S1). CPU 211 (FIG. 1) of Device B retrieves the 1st location notifying time data from 1st Location Notifying Time Data Storage Area 206B551b2a (S2). If the current time identified in S1 matches with the 1st location notifying time data retrieved in the previous step, CPU 211 (FIG. 1) of Device B proceeds to the next step (S3). CPU 211 (FIG. 1) of Device B sends the 1st location data transferring request to Device A in a wireless fashion (S4). Here, the 1st location data transferring request is the request to transfer the 1st location data. CPU 211 (FIG. 1) of Device A receives the 1st location data transferring request from Device B in a wireless fashion (S5). CPU 211 (FIG. 1) of Device A retrieves the 1st location data from 1st Location Data Storage Area 206A551b1a and sends the data to Device B in a wireless fashion (S6). CPU 211 (FIG. 1) of Device B receives the 1st location data from Device A in a wireless fashion and stores the data in 1st Location Data Storage Area 206B551b1a (S7). CPU 211 (FIG. 1) of Device B retrieves the map data from Map Data Storage Area 206B551b3 (S8). CPU 211 (FIG. 1) of Device B displays the map data retrieved in the previous step on LCD 201 (FIG. 1) of Device B (S9). CPU 211 (FIG. 1) of Device B retrieves the 1st location data from 1st Location Data Storage Area 206B551b1a (S10). CPU 211 (FIG. 1) of Device B retrieves the 1st icon image data from 1st Icon Image Data Storage Area 206B551b4a (S11). CPU 211 (FIG. 1) of Device B displays the 1st icon image data retrieved in the previous step at the location indicated by the 1st location data retrieved in S10 on the map data displayed in S9 (S12). CPU 211 (FIG. 1) of Device B retrieves the 1st location notifying data from 1st Location Notifying Data Storage Area 206B551b5a (S13). CPU 211 (FIG. 1) of Device B outputs the 1st location notifying data retrieved in the previous step from Speaker 216 (FIG. 1) and LCD 201 (FIG. 1) of Device B (S14). CPU 211 (FIG. 1) of Device B sends the 1st location notifying notice to Device A in a wireless fashion (S15). Here, the 1st location notifying notice indicates that the current geographic location of Device A is displayed on Device B. CPU 211 (FIG. 1) of Device A receives the 1st location notifying notice from Device B in a wireless fashion (S16). CPU 211 (FIG. 1) of Device A retrieves the 1st location notifying data from 1st Location Notifying Data Storage Area 206A551b5a (S17). CPU 211 (FIG. 1) of Device A outputs the 1st location notifying data retrieved in the previous step from Speaker 216 (FIG. 1) and LCD 201 (FIG. 1) of Device A (S18).

This paragraph illustrate(s) 2nd Location Data Notifying Software 206A551c7 of Device A and 2nd Location Data Notifying Software 206B551c7 of Device B, which notify(s) the 2nd location data. In this embodiment, CPU 211 (FIG. 1) of Device A identifies the current time (S1). CPU 211 (FIG. 1) of Device A retrieves the 2nd location notifying time data from 2nd Location Notifying Time Data Storage Area 206A551b2b (S2). If the current time identified in S1 matches with the 2nd location notifying time data retrieved in the previous step, CPU 211 (FIG. 1) of Device A proceeds to the next step (S3). CPU 211 (FIG. 1) of Device A sends the 2nd location data transferring request to Device B in a wireless fashion (S4). Here, the 2nd location data transferring request is the request to transfer the 2nd location data. CPU 211 (FIG. 1) of Device B receives the 2nd location data transferring request from Device A in a wireless fashion (S5). CPU 211 (FIG. 1) of Device B retrieves the 2nd location data from 2nd Location Data Storage Area 206B551b1b and sends the data to Device A in a wireless fashion (S6). CPU 211 (FIG. 1) of Device A receives the 2nd location data from Device B in a wireless fashion and stores the data in 2nd Location Data Storage Area 206A551b1b (S7). CPU 211 (FIG. 1) of Device A retrieves the map data from Map Data Storage Area 206A551b3 (S8). CPU 211 (FIG. 1) of Device A displays the map data retrieved in the previous step on LCD 201 (FIG. 1) of Device A (S9). CPU 211 (FIG. 1) of Device A retrieves the 2nd location data from 2nd Location Data Storage Area 206A551b1b (S10). CPU 211 (FIG. 1) of Device A retrieves the 2nd icon image data from 2nd Icon Image Data Storage Area 206A551b4b (S11). CPU 211 (FIG. 1) of Device A displays the 2nd icon image data retrieved in the previous step at the location indicated by the 2nd location data retrieved in S10 on the map data displayed in S9 (S12). CPU 211 (FIG. 1) of Device A retrieves the 2nd location notifying data from 2nd Location Notifying Data Storage Area 206A551b5b (S13). CPU 211 (FIG. 1) of Device A outputs the 2nd location notifying data retrieved in the previous step from Speaker 216 (FIG. 1) and LCD 201 (FIG. 1) of Device A (S14). CPU 211 (FIG. 1) of Device A sends the 2nd location notifying notice to Device B in a wireless fashion (S15). Here, the 2nd location notifying notice indicates that the current geographic location of Device B is displayed on Device A. CPU 211 (FIG. 1) of Device B receives the 2nd location notifying notice from Device A in a wireless fashion (S16). CPU 211 (FIG. 1) of Device B retrieves the 2nd location notifying data from 2nd Location Notifying Data Storage Area 206B551b5b (S17). CPU 211 (FIG. 1) of Device B outputs the 2nd location notifying data retrieved in the previous step from Speaker 216 (FIG. 1) and LCD 201 (FIG. 1) of Device B (S18).

This paragraph illustrate(s) 2nd Location Data Notifying Software 206B551c7 of Device B, which notify(s) the 2nd location data. In this embodiment, CPU 211 (FIG. 1) of Device B identifies the current time (S1). CPU 211 (FIG. 1) of Device B retrieves the 2nd location notifying time data from 2nd Location Notifying Time Data Storage Area 206B551b2b (S2). If the current time identified in S1 matches with the 2nd location notifying time data retrieved in the previous step, CPU 211 (FIG. 1) of Device B proceeds to the next step (S3). CPU 211 (FIG. 1) of Device B retrieves the map data from Map Data Storage Area 206B551b3 (S4). CPU 211 (FIG. 1) of Device B displays the map data retrieved in the previous step on LCD 201 (FIG. 1) of Device B (S5). CPU 211 (FIG. 1) of Device B retrieves the 2nd location data from 2nd Location Data Storage Area 206B551b1b (S6). CPU 211 (FIG. 1) of Device B retrieves the 2nd icon image data from 2nd Icon Image Data Storage Area 206B551b4b (S7). CPU 211 (FIG. 1) of Device B displays the 2nd icon image data retrieved in the previous step at the location indicated by the 2nd location data retrieved in S6 on the map data displayed in S5 (S8). CPU 211 (FIG. 1) of Device B retrieves the 2nd location notifying data from 2nd Location Notifying Data Storage Area 206B551b5b (S9). CPU 211 (FIG. 1) of Device B outputs the 2nd location notifying data retrieved in the previous step from Speaker 216 (FIG. 1) and LCD 201 (FIG. 1) of Device B (S10).

This paragraph illustrate(s) Both Location Data Notifying Software 206A551c8 of Device A and Both Location Data Notifying Software 206B551c8 of Device B, which notify(s) the both location data. In this embodiment, CPU 211 (FIG. 1) of Device A identifies the current time (S1). CPU 211 (FIG. 1) of Device A retrieves the both location notifying time data from Both Location Notifying Time Data Storage Area 206A551b2c (S2). If the current time identified in S1 matches with the both location notifying time data retrieved in the previous step, CPU 211 (FIG. 1) of Device A proceeds to the next step (S3). CPU 211 (FIG. 1) of Device A sends the 2nd location data transferring request to Device B in a wireless fashion (S4). Here, the 2nd location data transferring request is the request to transfer the 2nd location data. CPU 211 (FIG. 1) of Device B receives the 2nd location data transferring request from Device A in a wireless fashion (S5). CPU 211 (FIG. 1) of Device B retrieves the 2nd location data from 2nd Location Data Storage Area 206B551b1b and sends the data to Device A in a wireless fashion (S6). CPU 211 (FIG. 1) of Device A receives the 2nd location data from Device B in a wireless fashion and stores the data in 2nd Location Data Storage Area 206A551b1b (S7). CPU 211 (FIG. 1) of Device A retrieves the map data from Map Data Storage Area 206A551b3 (S8). CPU 211 (FIG. 1) of Device A displays the map data retrieved in the previous step on LCD 201 (FIG. 1) of Device A (S9). CPU 211 (FIG. 1) of Device A retrieves the 1st location data from 1st Location Data Storage Area 206A551b1a (S10). CPU 211 (FIG. 1) of Device A retrieves the 1st icon image data from 1st Icon Image Data Storage Area 206A551b4a (S11). CPU 211 (FIG. 1) of Device A displays the 1st icon image data retrieved in the previous step at the location indicated by the 1st location data retrieved in S10 on the map data displayed in S9 (S12). CPU 211 (FIG. 1) of Device A retrieves the 2nd location data from 2nd Location Data Storage Area 206A551b1b (S13). CPU 211 (FIG. 1) of Device A retrieves the 2nd icon image data from 2nd Icon Image Data Storage Area 206A551b4b (S14). CPU 211 (FIG. 1) of Device A displays the 2nd icon image data retrieved in the previous step at the location indicated by the 2nd location data retrieved in S13 on the map data displayed in S9 (S15). Thus, the 1st icon image data and the 2nd icon image data are displayed simultaneously on the map data. CPU 211 (FIG. 1) of Device A retrieves the both location notifying data from Both Location Notifying Data Storage Area 206A551b5c (S16). CPU 211 (FIG. 1) of Device A outputs the both location notifying data retrieved in the previous step from Speaker 216 (FIG. 1) and LCD 201 (FIG. 1) of Device A (S17). CPU 211 (FIG. 1) of Device A sends the 2nd location notifying notice to Device B in a wireless fashion (S18). Here, the 2nd location notifying notice indicates that the current geographic location of Device B is displayed on Device A. CPU 211 (FIG. 1) of Device B receives the 2nd location notifying notice from Device A in a wireless fashion (S19). CPU 211 (FIG. 1) of Device B retrieves the 2nd location notifying data from 2nd Location Notifying Data Storage Area 206B551b5b (S20). CPU 211 (FIG. 1) of Device B outputs the 2nd location notifying data retrieved in the previous step from Speaker 216 (FIG. 1) and LCD 201 (FIG. 1) of Device B (S21).

This paragraph illustrate(s) Both Location Data Notifying Software 206A551c8 of Device A and Both Location Data Notifying Software 206B551c8 of Device B, which notify(s) the both location data. In this embodiment, CPU 211 (FIG. 1) of Device B identifies the current time (S1). CPU 211 (FIG. 1) of Device B retrieves the both location notifying time data from Both Location Notifying Time Data Storage Area 206B551b2c (S2). If the current time identified in S1 matches with the both location notifying time data retrieved in the previous step, CPU 211 (FIG. 1) of Device B proceeds to the next step (S3). CPU 211 (FIG. 1) of Device B sends the 1st location data transferring request to Device A in a wireless fashion (S4). Here, the 1st location data transferring request is the request to transfer the 1st location data. CPU 211 (FIG. 1) of Device A receives the 1st location data transferring request from Device B in a wireless fashion (S5). CPU 211 (FIG. 1) of Device A retrieves the 1st location data from 1st Location Data Storage Area 206A551b1a and sends the data to Device B in a wireless fashion (S6). CPU 211 (FIG. 1) of Device B receives the 1st location data from Device A in a wireless fashion and stores the data in 1st Location Data Storage Area 206B551b1a (S7). CPU 211 (FIG. 1) of Device B retrieves the map data from Map Data Storage Area 206B551b3 (S8). CPU 211 (FIG. 1) of Device B displays the map data retrieved in the previous step on LCD 201 (FIG. 1) of Device B (S9). CPU 211 (FIG. 1) of Device B retrieves the 1st location data from 1st Location Data Storage Area 206B551b1a (S10). CPU 211 (FIG. 1) of Device B retrieves the 1st icon image data from 1st Icon Image Data Storage Area 206B551b4a (S11). CPU 211 (FIG. 1) of Device B displays the 1st icon image data retrieved in the previous step at the location indicated by the 1st location data retrieved in S10 on the map data displayed in S9 (S12). CPU 211 (FIG. 1) of Device B retrieves the 2nd location data from 2nd Location Data Storage Area 206B551b1b (S13). CPU 211 (FIG. 1) of Device B retrieves the 2nd icon image data from 2nd Icon Image Data Storage Area 206B551b4b (S14). CPU 211 (FIG. 1) of Device B displays the 2nd icon image data retrieved in the previous step at the location indicated by the 2nd location data retrieved in S13 on the map data displayed in S9 (S15). Thus, the 1st icon image data and the 2nd icon image data are displayed simultaneously on the map data. CPU 211 (FIG. 1) of Device B retrieves the both location notifying data from Both Location Notifying Data Storage Area 206B551b5c (S16). CPU 211 (FIG. 1) of Device B outputs the both location notifying data retrieved in the previous step from Speaker 216 (FIG. 1) and LCD 201 (FIG. 1) of Device B (S17). CPU 211 (FIG. 1) of Device B sends the 1st location notifying notice to Device A in a wireless fashion (S18). Here, the 1st location notifying notice indicates that the current geographic location of Device A is displayed on Device B. CPU 211 (FIG. 1) of Device A receives the 1st location notifying notice from Device B in a wireless fashion (S19). CPU 211 (FIG. 1) of Device A retrieves the 1st location notifying data from 1st Location Notifying Data Storage Area 206A551b5a (S20). CPU 211 (FIG. 1) of Device A outputs the 1st location notifying data retrieved in the previous step from Speaker 216 (FIG. 1) and LCD 201 (FIG. 1) of Device A (S21).

<<Zone Leaving Notifying Function>>

The following paragraphs illustrate the zone leaving notifying function, wherein when Device A leaves from a specific geographic zone identified by Device A, a notice is output from Device A. The notice is further output from Device B. In addition, when Device B leaves from a specific geographic zone identified by Device A, a notice is output from Device A.

This paragraph illustrates the major elements utilized to implement the present function. In this embodiment, Host H is connected to Network NT (e.g., the Internet). Device A, a Communication Device 200, is connected to Network NT (e.g., the Internet) in a wireless fashion. Device B, another Communication Device 200, is connected to Network NT (e.g., the Internet) in a wireless fashion. Host H, Device A, and Device B are capable to communicate with each other via Network NT (e.g., the Internet) to implement the present function. Device A and Device B are also capable to communicate with each other directly in a wireless fashion to implement the present function.

This paragraph illustrates the storage area included in Host H. In this embodiment, Host H includes Zone Leaving Notifying Information Storage Area H552a of which the data and the software program(s) stored therein are described hereinafter.

This paragraph illustrates the storage area(s) included in Zone Leaving Notifying Information Storage Area H552a. In this embodiment, Zone Leaving Notifying Information Storage Area H552a includes Zone Leaving Notifying Data Storage Area H552b and Zone Leaving Notifying Software Storage Area H552c. Zone Leaving Notifying Data Storage Area H552b stores the data necessary to implement the present function on the side of Host H, such as the one(s) described hereinafter. Zone Leaving Notifying Software Storage Area H552c stores the software program(s) necessary to implement the present function on the side of Host H, such as the one(s) described hereinafter.

This paragraph illustrates the storage area(s) included in Zone Leaving Notifying Data Storage Area H552b. In this embodiment, Zone Leaving Notifying Data Storage Area H552b includes Map Data Storage Area H552b1, Party Zone Data Storage Area H552b2, Party Location Data Storage Area H552b3, Party Zone Leaving Notice Data Storage Area H552b4, Party Icon Image Data Storage Area H552b5, Party Location Notifying Data Storage Area H552b6, and Work Area H552b7. Map Data Storage Area H552b1 stores the map data which is the image data indicating a map. Party Zone Data Storage Area H552b2 stores the data described hereinafter. Party Location Data Storage Area H552b3 stores the data described hereinafter. Party Zone Leaving Notice Data Storage Area H552b4 stores the data described hereinafter. Party Icon Image Data Storage Area H552b5 stores the data described hereinafter. Party Location Notifying Data Storage Area H552b6 stores the data described hereinafter. Work Area H552b7 is utilized as a work area to perform calculation and temporarily store data.

This paragraph illustrates the storage area(s) included in Party Zone Data Storage Area H552b2. In this embodiment, Party Zone Data Storage Area H552b2 includes 1st Zone Data Storage Area H552b2a, 2nd Zone Data Storage Area H552b2b, 3rd Zone Data Storage Area H552b2c, and 4th Zone Data Storage Area H552b2d. 1st Zone Data Storage Area H552b2a stores the 1st zone data which indicates a certain geographic zone or area. 2nd Zone Data Storage Area H552b2b stores the 2nd zone data which indicates a certain geographic zone or area. 3rd Zone Data Storage Area H552b2c stores the 3rd zone data which indicates a certain geographic zone or area. 4th Zone Data Storage Area H552b2d stores the 4th zone data which indicates a certain geographic zone or area.

This paragraph illustrates the storage area(s) included in Party Location Data Storage Area H552b3. In this embodiment, Party Location Data Storage Area H552b3 includes Device A Location Data Storage Area H552b3a and Device B Location Data Storage Area H552b3b. Device A Location Data Storage Area H552b3a stores the Device A location data which indicates the current geographic location of Device A in (x,y,z) format. Device B Location Data Storage Area H552b3b stores the Device B location data which indicates the current geographic location of Device B in (x,y,z) format.

This paragraph illustrates the storage area(s) included in Party Zone Leaving Notice Data Storage Area H552b4. In this embodiment, Party Zone Leaving Notice Data Storage Area H552b4 includes 1st Zone Leaving Notice Data Storage Area H552b4a, 2nd Zone Leaving Notice Data Storage Area H552b4b, 3rd Zone Leaving Notice Data Storage Area H552b4c, and 4th Zone Leaving Notice Data Storage Area H552b4d. 1st Zone Leaving Notice Data Storage Area H552b4a stores the 1st zone leaving notice data which is the audiovisual data indicating that Device A left the zone indicated by the 1st zone data. 2nd Zone Leaving Notice Data Storage Area H552b4b stores the 2nd zone leaving notice data which is the audiovisual data indicating that Device A left the zone indicated by the 2nd zone data. 3rd Zone Leaving Notice Data Storage Area H552b4c stores the 3rd zone leaving notice data which is the audiovisual data indicating that Device B left the zone indicated by the 3rd zone data. 4th Zone Leaving Notice Data Storage Area H552b4d stores the 4th zone leaving notice data which is the audiovisual data indicating that Device B left the zone indicated by the 4th zone data.

This paragraph illustrates the storage area(s) included in Party Icon Image Data Storage Area H552b5. In this embodiment, Party Icon Image Data Storage Area H552b5 includes Device A Icon Image Data Storage Area H552b5a and Device B Icon Image Data Storage Area H552b5b. Device A Icon Image Data Storage Area H552b5a stores the Device A icon image data which is the image data of the icon indicating the current geographic location of Device A on the map data. Device B Icon Image Data Storage Area H552b5b stores the Device B icon image data which is the image data of the icon indicating the current geographic location of Device B on the map data.

This paragraph illustrates the storage area(s) included in Party Location Notifying Data Storage Area H552b6. In this embodiment, Party Location Notifying Data Storage Area H552b6 includes Device A Location Notifying Data Storage Area H552b6a and Device B Location Notifying Data Storage Area H552b6b. Device A Location Notifying Data Storage Area H552b6a stores the Device A location notifying data which is the audiovisual data notifying that the current geographic location of Device A is notified. Device B Location Notifying Data Storage Area H552b6b stores the Device B location notifying data which is the audiovisual data notifying that the current geographic location of Device B is notified.

This paragraph illustrates the software program(s) stored in Zone Leaving Notifying Software Storage Area H552c. In this embodiment, Zone Leaving Notifying Software Storage Area H552c stores 1st Zone Data Producing Software H552c1, 2nd Zone Data Producing Software H552c2, 3rd Zone Data Producing Software H552c3, 4th Zone Data Producing Software H552c4, Device A Location Data Producing Software H552c5, 1st Zone Leaving Notice Data Outputting Software H552c7, 2nd Zone Leaving Notice Data Outputting Software H552c8, 3rd Zone Leaving Notice Data Outputting Software H552c9, and 4th Zone Leaving Notice Data Outputting Software H552c10. 1st Zone Data Producing Software H552c1 is the software program described hereinafter. 2nd Zone Data Producing Software H552c2 is the software program described hereinafter. 3rd Zone Data Producing Software H552c3 is the software program described hereinafter. 4th Zone Data Producing Software H552c4 is the software program described hereinafter. Device A Location Data Producing Software H552c5 is the software program described hereinafter. 1st Zone Leaving Notice Data Outputting Software H552c7 is the software program described hereinafter. 2nd Zone Leaving Notice Data Outputting Software H552c8 is the software program described hereinafter. 3rd Zone Leaving Notice Data Outputting Software H552c9 is the software program described hereinafter. 4th Zone Leaving Notice Data Outputting Software H552c10 is the software program described hereinafter.

This paragraph illustrates the storage area included in RAM 206 (FIG. 1) of Device A. In this embodiment, RAM 206 includes Zone Leaving Notifying Information Storage Area 206A552a of which the data and the software program(s) stored therein are described hereinafter.

The data and/or the software program(s) necessary to implement the present function may be downloaded from Host H to Device A.

This paragraph illustrates the storage area(s) included in Zone Leaving Notifying Information Storage Area 206A552a. In this embodiment, Zone Leaving Notifying Information Storage Area 206A552a includes Zone Leaving Notifying Data Storage Area 206A552b and Zone Leaving Notifying Software Storage Area 206A552c. Zone Leaving Notifying Data Storage Area 206A552b stores the data necessary to implement the present function on the side of Device A, such as the one(s) described hereinafter. Zone Leaving Notifying Software Storage Area 206A552c stores the software program(s) necessary to implement the present function on the side of Device A, such as the one(s) described hereinafter.

This paragraph illustrates the storage area(s) included in Zone Leaving Notifying Data Storage Area 206A552b. In this embodiment, Zone Leaving Notifying Data Storage Area 206A552b includes Map Data Storage Area 206A552b1, Party Zone Data Storage Area 206A552b2, Party Location Data Storage Area 206A552b3, Party Zone Leaving Notice Data Storage Area 206A552b4, Party Icon Image Data Storage Area 206A552b5, Party Location Notifying Data Storage Area 206A552b6, and Work Area 206A552b7. Map Data Storage Area 206A552b1 stores the map data which is the image data indicating a map. Party Zone Data Storage Area 206A552b2 stores the data described hereinafter. Party Location Data Storage Area 206A552b3 stores the data described hereinafter. Party Zone Leaving Notice Data Storage Area 206A552b4 stores the data described hereinafter. Party Icon Image Data Storage Area 206A552b5 stores the data described hereinafter. Party Location Notifying Data Storage Area 206A552b6 stores the data described hereinafter. Work Area 206A552b7 is utilized as a work area to perform calculation and temporarily store data.

This paragraph illustrates the storage area(s) included in Party Zone Data Storage Area 206A552b2. In this embodiment, Party Zone Data Storage Area 206A552b2 includes 1st Zone Data Storage Area 206A552b2a, 2nd Zone Data Storage Area 206A552b2b, 3rd Zone Data Storage Area 206A552b2c, and 4th Zone Data Storage Area 206A552b2d. 1st Zone Data Storage Area 206A552b2a stores the 1st zone data which indicates a certain geographic zone or area. 2nd Zone Data Storage Area 206A552b2b stores the 2nd zone data which indicates a certain geographic zone or area. 3rd Zone Data Storage Area 206A552b2c stores the 3rd zone data which indicates a certain geographic zone or area. 4th Zone Data Storage Area 206A552b2d stores the 4th zone data which indicates a certain geographic zone or area.

This paragraph illustrates the storage area(s) included in Party Location Data Storage Area 206A552b3. In this embodiment, Party Location Data Storage Area 206A552b3 includes Device A Location Data Storage Area 206A552b3a and Device B Location Data Storage Area 206A552b3b. Device A Location Data Storage Area 206A552b3a stores the Device A location data which indicates the current geographic location of Device A in (x,y,z) format. Device B Location Data Storage Area 206A552b3b stores the Device B location data which indicates the current geographic location of Device B in (x,y,z) format.

This paragraph illustrates the storage area(s) included in Party Zone Leaving Notice Data Storage Area 206A552b4. In this embodiment, Party Zone Leaving Notice Data Storage Area 206A552b4 includes 1st Zone Leaving Notice Data Storage Area 206A552b4a, 2nd Zone Leaving Notice Data Storage Area 206A552b4b, 3rd Zone Leaving Notice Data Storage Area 206A552b4c, and 4th Zone Leaving Notice Data Storage Area 206A552b4d. 1st Zone Leaving Notice Data Storage Area 206A552b4a stores the 1st zone leaving notice data which is the audiovisual data indicating that Device A left the zone indicated by the 1st zone data. 2nd Zone Leaving Notice Data Storage Area 206A552b4b stores the 2nd zone leaving notice data which is the audiovisual data indicating that Device A left the zone indicated by the 2nd zone data. 3rd Zone Leaving Notice Data Storage Area 206A552b4c stores the 3rd zone leaving notice data which is the audiovisual data indicating that Device B left the zone indicated by the 3rd zone data. 4th Zone Leaving Notice Data Storage Area 206A552b4d stores the 4th zone leaving notice data which is the audiovisual data indicating that Device B left the zone indicated by the 4th zone data.

This paragraph illustrates the storage area(s) included in Party Icon Image Data Storage Area 206A552b5. In this embodiment, Party Icon Image Data Storage Area 206A552b5 includes Device A Icon Image Data Storage Area 206A552b5a and Device B Icon Image Data Storage Area 206A552b5b. Device A Icon Image Data Storage Area 206A552b5a stores the Device A icon image data which is the image data of the icon indicating the current geographic location of Device A on the map data. Device B Icon Image Data Storage Area 206A552b5b stores the Device B icon image data which is the image data of the icon indicating the current geographic location of Device B on the map data.

This paragraph illustrates the storage area(s) included in Party Location Notifying Data Storage Area 206A552b6. In this embodiment, Party Location Notifying Data Storage Area 206A552b6 includes Device A Location Notifying Data Storage Area 206A552b6a and Device B Location Notifying Data Storage Area 206A552b6b. Device A Location Notifying Data Storage Area 206A552b6a stores the Device A location notifying data which is the audiovisual data notifying that the current geographic location of Device A is notified. Device B Location Notifying Data Storage Area 206A552b6b stores the Device B location notifying data which is the audiovisual data notifying that the current geographic location of Device B is notified.

This paragraph illustrates the software program(s) stored in Zone Leaving Notifying Software Storage Area 206A552c. In this embodiment, Zone Leaving Notifying Software Storage Area 206A552c stores 1st Zone Data Producing Software 206A552c1, 2nd Zone Data Producing Software 206A552c2, 3rd Zone Data Producing Software 206A552c3, 4th Zone Data Producing Software 206A552c4, Device A Location Data Producing Software 206A552c5, 1st Zone Leaving Notice Data Outputting Software 206A552c7, 2nd Zone Leaving Notice Data Outputting Software 206A552c8, 3rd Zone Leaving Notice Data Outputting Software 206A552c9, and 4th Zone Leaving Notice Data Outputting Software 206A552c10. 1st Zone Data Producing Software 206A552c1 is the software program described hereinafter. 2nd Zone Data Producing Software 206A552c2 is the software program described hereinafter. 3rd Zone Data Producing Software 206A552c3 is the software program described hereinafter. 4th Zone Data Producing Software 206A552c4 is the software program described hereinafter. Device A Location Data Producing Software 206A552c5 is the software program described hereinafter. 1st Zone Leaving Notice Data Outputting Software 206A552c7 is the software program described hereinafter. 2nd Zone Leaving Notice Data Outputting Software 206A552c8 is the software program described hereinafter. 3rd Zone Leaving Notice Data Outputting Software 206A552c9 is the software program described hereinafter. 4th Zone Leaving Notice Data Outputting Software 206A552c10 is the software program described hereinafter.

This paragraph illustrates the storage area included in RAM 206 (FIG. 1) of Device B. In this embodiment, RAM 206 includes Zone Leaving Notifying Information Storage Area 206B552a of which the data and the software program(s) stored therein are described hereinafter.

The data and/or the software program(s) necessary to implement the present function may be downloaded from Host H to Device B.

This paragraph illustrates the storage area(s) included in Zone Leaving Notifying Information Storage Area 206B552a. In this embodiment, Zone Leaving Notifying Information Storage Area 206B552a includes Zone Leaving Notifying Data Storage Area 206B552b and Zone Leaving Notifying Software Storage Area 206B552c. Zone Leaving Notifying Data Storage Area 206B552b stores the data necessary to implement the present function on the side of Device B, such as the one(s) described hereinafter. Zone Leaving Notifying Software Storage Area 206B552c stores the software program(s) necessary to implement the present function on the side of Device B, such as the one(s) described hereinafter.

This paragraph illustrates the storage area(s) included in Zone Leaving Notifying Data Storage Area 206B552b. In this embodiment, Zone Leaving Notifying Data Storage Area 206B552b includes Map Data Storage Area 206B552b1, Party Zone Data Storage Area 206B552b2, Party Location Data Storage Area 206B552b3, Party Zone Leaving Notice Data Storage Area 206B552b4, Party Icon Image Data Storage Area 206B552b5, Party Location Notifying Data Storage Area 206B552b6, and Work Area 206B552b7. Map Data Storage Area 206B552b1 stores the map data which is the image data indicating a map. Party Zone Data Storage Area 206B552b2 stores the data described hereinafter. Party Location Data Storage Area 206B552b3 stores the data described hereinafter. Party Zone Leaving Notice Data Storage Area 206B552b4 stores the data described hereinafter. Party Icon Image Data Storage Area 206B552b5 stores the data described hereinafter. Party Location Notifying Data Storage Area 206B552b6 stores the data described hereinafter. Work Area 206B552b7 is utilized as a work area to perform calculation and temporarily store data.

This paragraph illustrates the storage area(s) included in Party Zone Data Storage Area 206B552b2. In this embodiment, Party Zone Data Storage Area 206B552b2 includes 1st Zone Data Storage Area 206B552b2a, 2nd Zone Data Storage Area 206B552b2b, 3rd Zone Data Storage Area 206B552b2c, and 4th Zone Data Storage Area 206B552b2d. 1st Zone Data Storage Area 206B552b2a stores the 1st zone data which indicates a certain geographic zone or area. 2nd Zone Data Storage Area 206B552b2b stores the 2nd zone data which indicates a certain geographic zone or area. 3rd Zone Data Storage Area 206B552b2c stores the 3rd zone data which indicates a certain geographic zone or area. 4th Zone Data Storage Area 206B552b2d stores the 4th zone data which indicates a certain geographic zone or area.

This paragraph illustrates the storage area(s) included in Party Location Data Storage Area 206B552b3. In this embodiment, Party Location Data Storage Area 206B552b3 includes Device A Location Data Storage Area 206B552b3a and Device B Location Data Storage Area 206B552b3b. Device A Location Data Storage Area 206B552b3a stores the Device A location data which indicates the current geographic location of Device A in (x,y,z) format. Device B Location Data Storage Area 206B552b3b stores the Device B location data which indicates the current geographic location of Device B in (x,y,z) format.

This paragraph illustrates the storage area(s) included in Party Zone Leaving Notice Data Storage Area 206B552b4. In this embodiment, Party Zone Leaving Notice Data Storage Area 206B552b4 includes 1st Zone Leaving Notice Data Storage Area 206B552b4a, 2nd Zone Leaving Notice Data Storage Area 206B552b4b, 3rd Zone Leaving Notice Data Storage Area 206B552b4c, and 4th Zone Leaving Notice Data Storage Area 206B552b4d. 1st Zone Leaving Notice Data Storage Area 206B552b4a stores the 1st zone leaving notice data which is the audiovisual data indicating that Device A left the zone indicated by the 1st zone data. 2nd Zone Leaving Notice Data Storage Area 206B552b4b stores the 2nd zone leaving notice data which is the audiovisual data indicating that Device A left the zone indicated by the 2nd zone data. 3rd Zone Leaving Notice Data Storage Area 206B552b4c stores the 3rd zone leaving notice data which is the audiovisual data indicating that Device B left the zone indicated by the 3rd zone data. 4th Zone Leaving Notice Data Storage Area 206B552b4d stores the 4th zone leaving notice data which is the audiovisual data indicating that Device B left the zone indicated by the 4th zone data.

This paragraph illustrates the storage area(s) included in Party Icon Image Data Storage Area 206B552b5. In this embodiment, Party Icon Image Data Storage Area 206B552b5 includes Device A Icon Image Data Storage Area 206B552b5a and Device B Icon Image Data Storage Area 206B552b5b. Device A Icon Image Data Storage Area 206B552b5a stores the Device A icon image data which is the image data of the icon indicating the current geographic location of Device A on the map data. Device B Icon Image Data Storage Area 206B552b5b stores the Device B icon image data which is the image data of the icon indicating the current geographic location of Device B on the map data.

This paragraph illustrates the storage area(s) included in Party Location Notifying Data Storage Area 206B552b6. In this embodiment, Party Location Notifying Data Storage Area 206B552b6 includes Device A Location Notifying Data Storage Area 206B552b6a and Device B Location Notifying Data Storage Area 206B552b6b. Device A Location Notifying Data Storage Area 206B552b6a stores the Device A location notifying data which is the audiovisual data notifying that the current geographic location of Device A is notified. Device B Location Notifying Data Storage Area 206B552b6b stores the Device B location notifying data which is the audiovisual data notifying that the current geographic location of Device B is notified.

This paragraph illustrates the software program(s) stored in Zone Leaving Notifying Software Storage Area 206B552c. In this embodiment, Zone Leaving Notifying Software Storage Area 206B552c stores 1st Zone Data Producing Software 206B552c1, 2nd Zone Data Producing Software 206B552c2, 3rd Zone Data Producing Software 206B552c3, 4th Zone Data Producing Software 206B552c4, Device B Location Data Producing Software 206B552c6, 1st Zone Leaving Notice Data Outputting Software 206B552c7, 2nd Zone Leaving Notice Data Outputting Software 206B552c8, 3rd Zone Leaving Notice Data Outputting Software 206B552c9, and 4th Zone Leaving Notice Data Outputting Software 206B552c10. 1st Zone Data Producing Software 206B552c1 is the software program described hereinafter. 2nd Zone Data Producing Software 206B552c2 is the software program described hereinafter. 3rd Zone Data Producing Software 206B552c3 is the software program described hereinafter. 4th Zone Data Producing Software 206B552c4 is the software program described hereinafter. Device B Location Data Producing Software 206B552c6 is the software program described hereinafter. 1st Zone Leaving Notice Data Outputting Software 206B552c7 is the software program described hereinafter. 2nd Zone Leaving Notice Data Outputting Software 206B552c8 is the software program described hereinafter. 3rd Zone Leaving Notice Data Outputting Software 206B552c9 is the software program described hereinafter. 4th Zone Leaving Notice Data Outputting Software 206B552c10 is the software program described hereinafter.

This paragraph illustrate(s) 1st Zone Data Producing Software H552c1 of Host H and 1st Zone Data Producing Software 206A552c1 of Device A, which produce(s) the 1st zone data. In this embodiment, Host H retrieves the map data from Map Data Storage Area H552b1 and sends the data to Device A (S1). CPU 211 (FIG. 1) of Device A receives the map data from Host H in a wireless fashion and displays the data on LCD 201 (FIG. 1) of Device A (S2). The user of Device A selects, by utilizing Input Device 210 (FIG. 1) or via voice recognition system, a specific zone on the map data displayed in the previous step (S3). CPU 211 (FIG. 1) of Device A produces the 1st zone data by referring to the specific zone selected in the previous step and sends the data to Host H in a wireless fashion (S4). Host H receives the 1st zone data from Device A and stores the data in 1st Zone Data Storage Area H552b2a (S5).

This paragraph illustrate(s) 2nd Zone Data Producing Software H552c2 of Host H and 2nd Zone Data Producing Software 206A552c2 of Device A, which produce(s) the 2nd zone data. In this embodiment, Host H retrieves the map data from Map Data Storage Area H552b1 and sends the data to Device A (S1). CPU 211 (FIG. 1) of Device A receives the map data from Host H in a wireless fashion and displays the data on LCD 201 (FIG. 1) of Device A (S2). The user of Device A selects, by utilizing Input Device 210 (FIG. 1) or via voice recognition system, a specific zone on the map data displayed in the previous step (S3). CPU 211 (FIG. 1) of Device A produces the 2nd zone data by referring to the specific zone selected in the previous step and sends the data to Host H in a wireless fashion (S4). Host H receives the 2nd zone data from Device A and stores the data in 2nd Zone Data Storage Area H552b2b (S5).

This paragraph illustrate(s) 3rd Zone Data Producing Software H552c3 of Host H and 3rd Zone Data Producing Software 206A552c3 of Device A, which produce(s) the 3rd zone data. In this embodiment, Host H retrieves the map data from Map Data Storage Area H552b1 and sends the data to Device A (S1). CPU 211 (FIG. 1) of Device A receives the map data from Host H in a wireless fashion and displays the data on LCD 201 (FIG. 1) of Device A (S2). The user of Device A selects, by utilizing Input Device 210 (FIG. 1) or via voice recognition system, a specific zone on the map data displayed in the previous step (S3). CPU 211 (FIG. 1) of Device A produces the 3rd zone data by referring to the specific zone selected in the previous step and sends the data to Host H in a wireless fashion (S4). Host H receives the 3rd zone data from Device A and stores the data in 3rd Zone Data Storage Area H552b2c (S5).

This paragraph illustrate(s) 4th Zone Data Producing Software H552c4 of Host H and 4th Zone Data Producing Software 206A552c4 of Device A, which produce(s) the 4th zone data. In this embodiment, Host H retrieves the map data from Map Data Storage Area H552b1 and sends the data to Device A (S1). CPU 211 (FIG. 1) of Device A receives the map data from Host H in a wireless fashion and displays the data on LCD 201 (FIG. 1) of Device A (S2). The user of Device A selects, by utilizing Input Device 210 (FIG. 1) or via voice recognition system, a specific zone on the map data displayed in the previous step (S3). CPU 211 (FIG. 1) of Device A produces the 4th zone data by referring to the specific zone selected in the previous step and sends the data to Host H in a wireless fashion (S4). Host H receives the 4th zone data from Device A and stores the data in 4th Zone Data Storage Area H552b2d (S5).

This paragraph illustrate(s) 1st Zone Data Producing Software 206B552$c_1$ of Device B, which produce(s) the 1st zone data. In this embodiment, CPU 211 (FIG. 1) of Device B retrieves the map data from Map Data Storage Area 206B552b1 (S1). CPU 211 (FIG. 1) of Device B displays the map data retrieved in the previous step on LCD 201 (FIG. 1) of Device B (S2). The user of Device B selects, by utilizing Input Device 210 (FIG. 1) or via voice recognition system, a specific zone on the map data displayed in the previous step (S3). CPU 211 (FIG. 1) of Device B produces the 1st zone data by referring to the specific zone selected in the previous step (S4). CPU 211 (FIG. 1) of Device B stores the 1st zone data produced in the previous step in 1st Zone Data Storage Area 206B552b2a (S5).

This paragraph illustrate(s) 2nd Zone Data Producing Software 206B552c2 of Device B, which produce(s) the 2nd zone data. In this embodiment, CPU 211 (FIG. 1) of Device B retrieves the map data from Map Data Storage Area 206B552b1 (S1). CPU 211 (FIG. 1) of Device B displays the map data retrieved in the previous step on LCD 201 (FIG. 1) of Device B (S2). The user of Device B selects, by utilizing Input Device 210 (FIG. 1) or via voice recognition system, a specific zone on the map data displayed in the previous step (S3). CPU 211 (FIG. 1) of Device B produces the 2nd zone data by referring to the specific zone selected in the previous step (S4). CPU 211 (FIG. 1) of Device B stores the 2nd zone data produced in the previous step in 2nd Zone Data Storage Area 206B552b2b (S5).

This paragraph illustrate(s) 3rd Zone Data Producing Software 206B552c3 of Device B, which produce(s) the 3rd zone data. In this embodiment, CPU 211 (FIG. 1) of Device B retrieves the map data from Map Data Storage Area 206B552b1 (S1). CPU 211 (FIG. 1) of Device B displays the map data retrieved in the previous step on LCD 201 (FIG. 1) of Device B (S2). The user of Device B selects, by utilizing Input Device 210 (FIG. 1) or via voice recognition system, a specific zone on the map data displayed in the previous step (S3). CPU 211 (FIG. 1) of Device B produces the 3rd zone data by referring to the specific zone selected in the previous step (S4). CPU 211 (FIG. 1) of Device B stores the 3rd zone data produced in the previous step in 3rd Zone Data Storage Area 206B552b2c (S5).

This paragraph illustrate(s) 4th Zone Data Producing Software 206B552c4 of Device B, which produce(s) the 4th zone data. In this embodiment, CPU 211 (FIG. 1) of Device B retrieves the map data from Map Data Storage Area 206B552b1 (S1). CPU 211 (FIG. 1) of Device B displays the map data retrieved in the previous step on LCD 201 (FIG. 1) of Device B (S2). The user of Device B selects, by utilizing Input Device 210 (FIG. 1) or via voice recognition system, a specific zone on the map data displayed in the previous step (S3). CPU 211 (FIG. 1) of Device B produces the 4th zone data by referring to the specific zone selected in the previous step (S4). CPU 211 (FIG. 1) of Device B stores the 4th zone data produced in the previous step in 4th Zone Data Storage Area 206B552b2d (S5).

This paragraph illustrate(s) Device A Location Data Producing Software H552c5 of Host H and Device A Location Data Producing Software 206A552c5 of Device A, which produce(s) Device A location data. In this embodiment, CPU 211 (FIG. 1) of Device A identifies the current location of Device A (S1). CPU 211 (FIG. 1) of Device A produces the Device A location data by utilizing the current location identified in the previous step and sends the data to Host H in a wireless fashion (S2). Host H receives the Device A location data from Device A and stores the data in Device A Location Data Storage Area H552b3a (S3). The foregoing sequence is repeated periodically.

This paragraph illustrate(s) Device B Location Data Producing Software 206B552c6 of Device B, which produce(s) Device B location data. In this embodiment, CPU 211 (FIG. 1) of Device B identifies the current location of Device B (S1). CPU 211 (FIG. 1) of Device B produces the Device B location data by utilizing the current location identified in the previous step (S2). CPU 211 (FIG. 1) of Device B stores the Device B location data produced in the previous step in Device B Location Data Storage Area 206B552b3b (S3). The foregoing sequence is repeated periodically.

This paragraph illustrate(s) 1st Zone Leaving Notice Data Outputting Software H552c7 of Host H, 1st Zone Leaving Notice Data Outputting Software 206A552c7 of Device A, and 1st Zone Leaving Notice Data Outputting Software 206B552c7 of Device B, which output(s) the 1st zone leaving notice data. In this embodiment, Host H retrieves the Device A location data from Device A Location Data Storage Area H552b3a (S1). Host H retrieves the 1st zone data from 1st Zone Data Storage Area H552b2a (S2). If the Device A location data retrieved in S1 is located outside of the 1st zone data retrieved in the previous step, Host H proceeds to the next step (S3). Host H retrieves the 1st zone leaving notice data from 1st Zone Leaving Notice Data Storage Area H552*b*4*a* and sends the data to Device A (S4). CPU 211 (FIG. 1) of Device A receives the 1st zone leaving notice data from Host H in a wireless fashion and outputs the data from Speaker 216 (FIG. 1) and LCD 201 (FIG. 1) of Device A (S5). Host H sends the Device B location data transferring request to Device B (S6). Here, the Device B location data transferring request is the request to transfer the Device B location data. CPU 211 (FIG. 1) of Device B receives the Device B location data transferring request from Host H in a wireless fashion (S7). CPU 211 (FIG. 1) of Device B retrieves the Device B location data from Device B Location Data Storage Area 206B552*b*3*b* and sends the data to Host H in a wireless fashion (S8). Host H receives the Device B location data from Device B and stores the data in Device B Location Data Storage Area H552*b*3*b* (S9). Host H retrieves the map data from Map Data Storage Area H552*b*1 and sends the data to Device A (S10). CPU 211 (FIG. 1) of Device A receives the map data from Host H in a wireless fashion and displays the data on LCD 201 (FIG. 1) of Device A (S11). Host H retrieves the Device A location data from Device A Location Data Storage Area H552*b*3*a* and sends the data to Device A (S12). CPU 211 (FIG. 1) of Device A receives the Device A location data from Host H in a wireless fashion (S13). Host H retrieves the Device A icon image data from Device A Icon Image Data Storage Area H552*b*5*a* and sends the data to Device A (S14). CPU 211 (FIG. 1) of Device A receives the Device A icon image data from Host H in a wireless fashion (S15). CPU 211 (FIG. 1) of Device A displays the Device A icon image data received in the previous step at the location corresponding to the Device A location data received in S13 on the map data displayed in S11 (S16). Host H retrieves the Device B location data from Device B Location Data Storage Area H552*b*3*b* and sends the data to Device A (S17). CPU 211 (FIG. 1) of Device A receives the Device B location data from Host H in a wireless fashion (S18). Host H retrieves the Device B icon image data from Device B Icon Image Data Storage Area H552*b*5*b* and sends the data to Device A (S19). CPU 211 (FIG. 1) of Device A receives the Device B icon image data from Host H in a wireless fashion (S20). CPU 211 (FIG. 1) of Device A displays the Device B icon image data received in the previous step at the location corresponding to the Device B location data received in S18 on the map data displayed in S11 (S21). Thus, the current geographic locations of Device A and Device B are displayed simultaneously on the map data. The foregoing sequence is repeated periodically.

This paragraph illustrate(s) 2nd Zone Leaving Notice Data Outputting Software H552*c*8 of Host H, 2nd Zone Leaving Notice Data Outputting Software 206A552*c*8 of Device A, and 2nd Zone Leaving Notice Data Outputting Software 206B552*c*8 of Device B, which output(s) the 2nd zone leaving notice data. In this embodiment, Host H retrieves the Device A location data from Device A Location Data Storage Area H552*b*3*a* (S1). Host H retrieves the 2nd zone data from 2nd Zone Data Storage Area H552*b*2*b* (S2). If the Device A location data retrieved in S1 is located outside of the 2nd zone data retrieved in the previous step, Host H proceeds to the next step (S3). Host H retrieves the 2nd zone leaving notice data from 2nd Zone Leaving Notice Data Storage Area H552*b*4*b* and sends the data to Device A (S4). CPU 211 (FIG. 1) of Device A receives the 2nd zone leaving notice data from Host H in a wireless fashion and outputs the data from Speaker 216 (FIG. 1) and LCD 201 (FIG. 1) of Device A (S5). Host H sends the Device B location data transferring request to Device B (S6). Here, the Device B location data transferring request is the request to transfer the Device B location data. CPU 211 (FIG. 1) of Device B receives the Device B location data transferring request from Host H in a wireless fashion (S7). CPU 211 (FIG. 1) of Device B retrieves the Device B location data from Device B Location Data Storage Area 206B552*b*3*b* and sends the data to Host H in a wireless fashion (S8). Host H receives the Device B location data from Device B and stores the data in Device B Location Data Storage Area H552*b*3*b* (S9). Host H retrieves the map data from Map Data Storage Area H552*b*1 and sends the data to Device A (S10). CPU 211 (FIG. 1) of Device A receives the map data from Host H in a wireless fashion and displays the data on LCD 201 (FIG. 1) of Device A (S11). Host H retrieves the Device A location data from Device A Location Data Storage Area H552*b*3*a* and sends the data to Device A (S12). CPU 211 (FIG. 1) of Device A receives the Device A location data from Host H in a wireless fashion (S13). Host H retrieves the Device A icon image data from Device A Icon Image Data Storage Area H552*b*5*a* and sends the data to Device A (S14). CPU 211 (FIG. 1) of Device A receives the Device A icon image data from Host H in a wireless fashion (S15). CPU 211 (FIG. 1) of Device A displays the Device A icon image data received in the previous step at the location corresponding to the Device A location data received in S13 on the map data displayed in S11 (S16). Host H retrieves the Device B location data from Device B Location Data Storage Area H552*b*3*b* and sends the data to Device A (S17). CPU 211 (FIG. 1) of Device A receives the Device B location data from Host H in a wireless fashion (S18). Host H retrieves the Device B icon image data from Device B Icon Image Data Storage Area H552*b*5*b* and sends the data to Device A (S19). CPU 211 (FIG. 1) of Device A receives the Device B icon image data from Host H in a wireless fashion (S20). CPU 211 (FIG. 1) of Device A displays the Device B icon image data received in the previous step at the location corresponding to the Device B location data received in S18 on the map data displayed in S11 (S21). Thus, the current geographic locations of Device A and Device B are displayed simultaneously on the map data. The foregoing sequence is repeated periodically.

This paragraph illustrate(s) 3rd Zone Leaving Notice Data Outputting Software H552*c*9 of Host H, 3rd Zone Leaving Notice Data Outputting Software 206A552*c*9 of Device A, and 3rd Zone Leaving Notice Data Outputting Software 206B552*c*9 of Device B, which output(s) the 3rd zone leaving notice data. In this embodiment, Host H sends the Device B location data transferring request to Device B (S1). Here, the Device B location data transferring request is the request to transfer the Device B location data. CPU 211 (FIG. 1) of Device B receives the Device B location data transferring request from Host H in a wireless fashion (S2). CPU 211 (FIG. 1) of Device B retrieves the Device B location data from Device B Location Data Storage Area 206B552*b*3*b* and sends the data to Host H in a wireless fashion (S3). Host H receives the Device B location data from Device B and stores the data in Device B Location Data Storage Area H552*b*3*b* (S4). Host H retrieves the Device B location data from Device B Location Data Storage Area H552*b*3*b* (S5). Host H retrieves the 3rd zone data from 3rd Zone Data Storage Area H552*b*2*c* (S6). If the Device B location data retrieved in S5 is located outside of the 3rd zone data retrieved in the previous step, Host H proceeds to the next step (S7). Host H retrieves the 3rd zone leaving notice data from 3rd Zone Leaving Notice Data Storage Area H552*b*4*c* and sends the data to Device A (S8). CPU 211 (FIG. 1) of Device A receives the 3rd zone leaving notice data from Host H in a wireless fashion and outputs the data from Speaker 216 (FIG. 1) and LCD 201 (FIG. 1) of Device A (S9). Host H retrieves the map data from Map Data Storage Area H552b1 and sends the data to Device A (S10). CPU 211 (FIG. 1) of Device A receives the map data from Host H in a wireless fashion and displays the data on LCD 201 (FIG. 1) of Device A (S11). Host H retrieves the Device A location data from Device A Location Data Storage Area H552b3a and sends the data to Device A (S12). CPU 211 (FIG. 1) of Device A receives the Device A location data from Host H in a wireless fashion (S13). Host H retrieves the Device A icon image data from Device A Icon Image Data Storage Area H552b5a and sends the data to Device A (S14). CPU 211 (FIG. 1) of Device A receives the Device A icon image data from Host H in a wireless fashion (S15). CPU 211 (FIG. 1) of Device A displays the Device A icon image data received in the previous step at the location corresponding to the Device A location data received in S13 on the map data displayed in S11 (S16). Host H retrieves the Device B location data from Device B Location Data Storage Area H552b3b and sends the data to Device A (S17). CPU 211 (FIG. 1) of Device A receives the Device B location data from Host H in a wireless fashion (S18). Host H retrieves the Device B icon image data from Device B Icon Image Data Storage Area H552b5b and sends the data to Device A (S19). CPU 211 (FIG. 1) of Device A receives the Device B icon image data from Host H in a wireless fashion (S20). CPU 211 (FIG. 1) of Device A displays the Device B icon image data received in the previous step at the location corresponding to the Device B location data received in S18 on the map data displayed in S11 (S21). Thus, the current geographic locations of Device A and Device B are displayed simultaneously on the map data. The foregoing sequence is repeated periodically.

This paragraph illustrate(s) 4th Zone Leaving Notice Data Outputting Software H552c10 of Host H, 4th Zone Leaving Notice Data Outputting Software 206A552c10 of Device A, and 4th Zone Leaving Notice Data Outputting Software 206B552$c_{10}$ of Device B, which output(s) the 4th zone leaving notice data. In this embodiment, Host H sends the Device B location data transferring request to Device B (S1). Here, the Device B location data transferring request is the request to transfer the Device B location data. CPU 211 (FIG. 1) of Device B receives the Device B location data transferring request from Host H in a wireless fashion (S2). CPU 211 (FIG. 1) of Device B retrieves the Device B location data from Device B Location Data Storage Area 206B552b3b and sends the data to Host H in a wireless fashion (S3). Host H receives the Device B location data from Device B and stores the data in Device B Location Data Storage Area H552b3b (S4). Host H retrieves the Device B location data from Device B Location Data Storage Area H552b3b (S5). Host H retrieves the 4th zone data from 4th Zone Data Storage Area H552b2d (S6). If the Device B location data retrieved in S5 is located outside of the 4th zone data retrieved in the previous step, Host H proceeds to the next step (S7). Host H retrieves the 4th zone leaving notice data from 4th Zone Leaving Notice Data Storage Area H552b4d and sends the data to Device A (S8). CPU 211 (FIG. 1) of Device A receives the 4th zone leaving notice data from Host H in a wireless fashion and outputs the data from Speaker 216 (FIG. 1) and LCD 201 (FIG. 1) of Device A (S9). Host H retrieves the map data from Map Data Storage Area H552b1 and sends the data to Device A (S10). CPU 211 (FIG. 1) of Device A receives the map data from Host H in a wireless fashion and displays the data on LCD 201 (FIG. 1) of Device A (S11). Host H retrieves the Device A location data from Device A Location Data Storage Area H552b3a and sends the data to Device A (S12). CPU 211 (FIG. 1) of Device A receives the Device A location data from Host H in a wireless fashion (S13). Host H retrieves the Device A icon image data from Device A Icon Image Data Storage Area H552b5a and sends the data to Device A (S14). CPU 211 (FIG. 1) of Device A receives the Device A icon image data from Host H in a wireless fashion (S15). CPU 211 (FIG. 1) of Device A displays the Device A icon image data received in the previous step at the location corresponding to the Device A location data received in S13 on the map data displayed in S11 (S16). Host H retrieves the Device B location data from Device B Location Data Storage Area H552b3b and sends the data to Device A (S17). CPU 211 (FIG. 1) of Device A receives the Device B location data from Host H in a wireless fashion (S18). Host H retrieves the Device B icon image data from Device B Icon Image Data Storage Area H552b5b and sends the data to Device A (S19). CPU 211 (FIG. 1) of Device A receives the Device B icon image data from Host H in a wireless fashion (S20). CPU 211 (FIG. 1) of Device A displays the Device B icon image data received in the previous step at the location corresponding to the Device B location data received in S18 on the map data displayed in S11 (S21). Thus, the current geographic locations of Device A and Device B are displayed simultaneously on the map data. The foregoing sequence is repeated periodically.

This paragraph illustrate(s) 1st Zone Leaving Notice Data Outputting Software H552c7 of Host H and 1st Zone Leaving Notice Data Outputting Software 206B552c7 of Device B, which output(s) the 1st zone leaving notice data. In this embodiment, CPU 211 (FIG. 1) of Device B sends the Device A location data transferring request to Host H in a wireless fashion (S1). Here, the Device A location data transferring request is the request to transfer the Device A location data. Host H receives the Device A location data transferring request from Device B (S2). Host H retrieves the Device A location data from Device A Location Data Storage Area H552b3a and sends the data to Device B (S3). CPU 211 (FIG. 1) of Device B receives the Device A location data from Host H in a wireless fashion and stores the data in Device A Location Data Storage Area 206B552b3a (S4). CPU 211 (FIG. 1) of Device B retrieves the Device A location data from Device A Location Data Storage Area 206B552b3a (S5). CPU 211 (FIG. 1) of Device B retrieves the 1st zone data from 1st Zone Data Storage Area 206B552b2a (S6). If the Device A location data retrieved in S5 is located outside of the 1st zone data retrieved in the previous step, CPU 211 (FIG. 1) of Device B proceeds to the next step (S7). CPU 211 (FIG. 1) of Device B retrieves the 1st zone leaving notice data from 1st Zone Leaving Notice Data Storage Area 206B552b4a (S8). CPU 211 (FIG. 1) of Device B outputs the 1st zone leaving notice data retrieved in the previous step from Speaker 216 (FIG. 1) and LCD 201 (FIG. 1) of Device B (S9). CPU 211 (FIG. 1) of Device B retrieves the map data from Map Data Storage Area 206B552b1 (S10). CPU 211 (FIG. 1) of Device B displays the map data retrieved in the previous step on LCD 201 (FIG. 1) of Device B (S11). CPU 211 (FIG. 1) of Device B retrieves the Device A location data from Device A Location Data Storage Area 206B552b3a (S12). CPU 211 (FIG. 1) of Device B retrieves the Device A icon image data from Device A Icon Image Data Storage Area 206B552b5a (S13). CPU 211 (FIG. 1) of Device B displays the Device A icon image data retrieved in the previous step at the location corresponding to the Device A location data retrieved in S12 on the map data displayed in S11 (S14). CPU 211 (FIG. 1) of Device B retrieves the Device B location data from Device B Location Data Storage Area 206B552b3b (S15). CPU 211 (FIG. 1) of Device B retrieves the Device B icon image data from Device B Icon Image Data Storage Area 206B552b5b (S16). CPU 211 (FIG. 1) of Device B displays the Device B icon image data retrieved in the previous step at the location corresponding to the Device B location data retrieved in S15 on the map data displayed in S11 (S17). Thus, the current geographic locations of Device A and Device B are displayed simultaneously on the map data. The foregoing sequence is repeated periodically.

This paragraph illustrate(s) 2nd Zone Leaving Notice Data Outputting Software H552c8 of Host H and 2nd Zone Leaving Notice Data Outputting Software 206B552c8 of Device B, which output(s) the 2nd zone leaving notice data. In this embodiment, CPU 211 (FIG. 1) of Device B sends the Device A location data transferring request to Host H in a wireless fashion (S1). Here, the Device A location data transferring request is the request to transfer the Device A location data. Host H receives the Device A location data transferring request from Device B (S2). Host H retrieves the Device A location data from Device A Location Data Storage Area H552b3a and sends the data to Device B (S3). CPU 211 (FIG. 1) of Device B receives the Device A location data from Host H in a wireless fashion and stores the data in Device A Location Data Storage Area 206B552b3a (S4). CPU 211 (FIG. 1) of Device B retrieves the Device A location data from Device A Location Data Storage Area 206B552b3a (S5). CPU 211 (FIG. 1) of Device B retrieves the 2nd zone data from 2nd Zone Data Storage Area 206B552b2b (S6). If the Device A location data retrieved in S5 is located outside of the 2nd zone data retrieved in the previous step, CPU 211 (FIG. 1) of Device B proceeds to the next step (S7). CPU 211 (FIG. 1) of Device B retrieves the 2nd zone leaving notice data from 2nd Zone Leaving Notice Data Storage Area 206B552b4b (S8). CPU 211 (FIG. 1) of Device B outputs the 2nd zone leaving notice data retrieved in the previous step from Speaker 216 (FIG. 1) and LCD 201 (FIG. 1) of Device B (S9). CPU 211 (FIG. 1) of Device B retrieves the map data from Map Data Storage Area 206B552b1 (S10). CPU 211 (FIG. 1) of Device B displays the map data retrieved in the previous step on LCD 201 (FIG. 1) of Device B (S11). CPU 211 (FIG. 1) of Device B retrieves the Device A location data from Device A Location Data Storage Area 206B552b3a (S12). CPU 211 (FIG. 1) of Device B retrieves the Device A icon image data from Device A Icon Image Data Storage Area 206B552b5a (S13). CPU 211 (FIG. 1) of Device B displays the Device A icon image data retrieved in the previous step at the location corresponding to the Device A location data retrieved in S12 on the map data displayed in S11 (S14). CPU 211 (FIG. 1) of Device B retrieves the Device B location data from Device B Location Data Storage Area 206B552b3b (S15). CPU 211 (FIG. 1) of Device B retrieves the Device B icon image data from Device B Icon Image Data Storage Area 206B552b5b (S16). CPU 211 (FIG. 1) of Device B displays the Device B icon image data retrieved in the previous step at the location corresponding to the Device B location data retrieved in S15 on the map data displayed in S11 (S17). Thus, the current geographic locations of Device A and Device B are displayed simultaneously on the map data. The foregoing sequence is repeated periodically.

This paragraph illustrate(s) 3rd Zone Leaving Notice Data Outputting Software H552c9 of Host H and 3rd Zone Leaving Notice Data Outputting Software 206B552c9 of Device B, which output(s) the 3rd zone leaving notice data. In this embodiment, CPU 211 (FIG. 1) of Device B retrieves the Device B location data from Device B Location Data Storage Area 206B552b3b (S1). CPU 211 (FIG. 1) of Device B retrieves the 3rd zone data from 3rd Zone Data Storage Area 206B552b2c (S2). If the Device B location data retrieved in 51 is located outside of the 3rd zone data retrieved in the previous step, CPU 211 (FIG. 1) of Device B proceeds to the next step (S3). CPU 211 (FIG. 1) of Device B retrieves the 3rd zone leaving notice data from 3rd Zone Leaving Notice Data Storage Area 206B552b4c (S4). CPU 211 (FIG. 1) of Device B outputs the 3rd zone leaving notice data retrieved in the previous step from Speaker 216 (FIG. 1) and LCD 201 (FIG. 1) of Device B (S5). CPU 211 (FIG. 1) of Device B retrieves the map data from Map Data Storage Area 206B552b1 (S6). CPU 211 (FIG. 1) of Device B displays the map data retrieved in the previous step on LCD 201 (FIG. 1) of Device B (S7). CPU 211 (FIG. 1) of Device B sends the Device A location data transferring request to Host H in a wireless fashion (S8). Here, the Device A location data transferring request is the request to transfer the Device A location data. Host H receives the Device A location data transferring request from Device B (S9). Host H retrieves the Device A location data from Device A Location Data Storage Area H552b3a and sends the data to Device B (S10). CPU 211 (FIG. 1) of Device B receives the Device A location data from Host H in a wireless fashion and stores the data in Device A Location Data Storage Area 206B552b3a (S11). CPU 211 (FIG. 1) of Device B retrieves the Device A location data from Device A Location Data Storage Area 206B552b3a (S12). CPU 211 (FIG. 1) of Device B retrieves the Device A icon image data from Device A Icon Image Data Storage Area 206B552b5a (S13). CPU 211 (FIG. 1) of Device B displays the Device A icon image data retrieved in the previous step at the location corresponding to the Device A location data retrieved in S12 on the map data displayed in S7 (S14). CPU 211 (FIG. 1) of Device B retrieves the Device B location data from Device B Location Data Storage Area 206B552b3b (S15). CPU 211 (FIG. 1) of Device B retrieves the Device B icon image data from Device B Icon Image Data Storage Area 206B552b5b (S16). CPU 211 (FIG. 1) of Device B displays the Device B icon image data retrieved in the previous step at the location corresponding to the Device B location data retrieved in S15 on the map data displayed in S7 (S17). Thus, the current geographic locations of Device A and Device B are displayed simultaneously on the map data. The foregoing sequence is repeated periodically.

This paragraph illustrate(s) 4th Zone Leaving Notice Data Outputting Software H552c10 of Host H and 4th Zone Leaving Notice Data Outputting Software 206B552c10 of Device B, which output(s) the 4th zone leaving notice data. In this embodiment, CPU 211 (FIG. 1) of Device B retrieves the Device B location data from Device B Location Data Storage Area 206B552b3b (S1). CPU 211 (FIG. 1) of Device B retrieves the 4th zone data from 4th Zone Data Storage Area 206B552b2d (S2). If the Device B location data retrieved in S1 is located outside of the 4th zone data retrieved in the previous step, CPU 211 (FIG. 1) of Device B proceeds to the next step (S3). CPU 211 (FIG. 1) of Device B retrieves the 4th zone leaving notice data from 4th Zone Leaving Notice Data Storage Area 206B552b4d (S4). CPU 211 (FIG. 1) of Device B outputs the 4th zone leaving notice data retrieved in the previous step from Speaker 216 (FIG. 1) and LCD 201 (FIG. 1) of Device B (S5). CPU 211 (FIG. 1) of Device B retrieves the map data from Map Data Storage Area 206B552b1 (S6). CPU 211 (FIG. 1) of Device B displays the map data retrieved in the previous step on LCD 201 (FIG. 1) of Device B (S7). CPU 211 (FIG. 1) of Device B sends the Device A location data transferring request to Host H in a wireless fashion (S8). Here, the Device A location data transferring request is the request to transfer the Device A location data. Host H receives the Device A location data transferring request from Device B (S9). Host H retrieves the Device A location data from Device A Location Data Storage Area H552b3a and sends the data to Device B (S10). CPU 211 (FIG. 1) of Device B receives the Device A location data from Host H in a wireless fashion and stores the data in Device A Location Data Storage Area 206B552*b3a* (S11). CPU 211 (FIG. 1) of Device B retrieves the Device A location data from Device A Location Data Storage Area 206B552*b3a* (S12). CPU 211 (FIG. 1) of Device B retrieves the Device A icon image data from Device A Icon Image Data Storage Area 206B552*b5a* (S13). CPU 211 (FIG. 1) of Device B displays the Device A icon image data retrieved in the previous step at the location corresponding to the Device A location data retrieved in S12 on the map data displayed in S7 (S14). CPU 211 (FIG. 1) of Device B retrieves the Device B location data from Device B Location Data Storage Area 206B552*b3b* (S15). CPU 211 (FIG. 1) of Device B retrieves the Device B icon image data from Device B Icon Image Data Storage Area 206B552*b5b* (S16). CPU 211 (FIG. 1) of Device B displays the Device B icon image data retrieved in the previous step at the location corresponding to the Device B location data retrieved in S15 on the map data displayed in S7 (S17). Thus, the current geographic locations of Device A and Device B are displayed simultaneously on the map data. The foregoing sequence is repeated periodically.

The following paragraphs illustrate another embodiment wherein Device A plays the major role in implementing the present function.

This paragraph illustrate(s) 1st Zone Data Producing Software 206A552*c1* of Device A, which produces) the 1st zone data. In this embodiment, CPU 211 (FIG. 1) of Device A retrieves the map data from Map Data Storage Area 206A552*b1* (S1). CPU 211 (FIG. 1) of Device A displays the map data retrieved in the previous step on LCD 201 (FIG. 1) of Device A (S2). The user of Device A selects, by utilizing Input Device 210 (FIG. 1) or via voice recognition system, a specific zone on the map data displayed in the previous step (S3). CPU 211 (FIG. 1) of Device A produces the 1st zone data by referring to the specific zone selected in the previous step (S4). CPU 211 (FIG. 1) of Device A stores the 1st zone data produced in the previous step in 1st Zone Data Storage Area 206A552*b2a* (S5).

This paragraph illustrate(s) 2nd Zone Data Producing Software 206A552*c2* of Device A, which produces) the 2nd zone data. In this embodiment, CPU 211 (FIG. 1) of Device A retrieves the map data from Map Data Storage Area 206A552*b1* (S1). CPU 211 (FIG. 1) of Device A displays the map data retrieved in the previous step on LCD 201 (FIG. 1) of Device A (S2). The user of Device A selects, by utilizing Input Device 210 (FIG. 1) or via voice recognition system, a specific zone on the map data displayed in the previous step (S3). CPU 211 (FIG. 1) of Device A produces the 2nd zone data by referring to the specific zone selected in the previous step (S4). CPU 211 (FIG. 1) of Device A stores the 2nd zone data produced in the previous step in 2nd Zone Data Storage Area 206A552*b2b* (S5).

This paragraph illustrate(s) 3rd Zone Data Producing Software 206A552*c3* of Device A, which produces) the 3rd zone data. In this embodiment, CPU 211 (FIG. 1) of Device A retrieves the map data from Map Data Storage Area 206A552*b1* (S1). CPU 211 (FIG. 1) of Device A displays the map data retrieved in the previous step on LCD 201 (FIG. 1) of Device A (S2). The user of Device A selects, by utilizing Input Device 210 (FIG. 1) or via voice recognition system, a specific zone on the map data displayed in the previous step (S3). CPU 211 (FIG. 1) of Device A produces the 3rd zone data by referring to the specific zone selected in the previous step (S4). CPU 211 (FIG. 1) of Device A stores the 3rd zone data produced in the previous step in 3rd Zone Data Storage Area 206A552*b2c* (S5).

This paragraph illustrate(s) 4th Zone Data Producing Software 206A552*c4* of Device A, which produce(s) the 4th zone data. In this embodiment, CPU 211 (FIG. 1) of Device A retrieves the map data from Map Data Storage Area 206A552*b1* (S1). CPU 211 (FIG. 1) of Device A displays the map data retrieved in the previous step on LCD 201 (FIG. 1) of Device A (S2). The user of Device A selects, by utilizing Input Device 210 (FIG. 1) or via voice recognition system, a specific zone on the map data displayed in the previous step (S3). CPU 211 (FIG. 1) of Device A produces the 4th zone data by referring to the specific zone selected in the previous step (S4). CPU 211 (FIG. 1) of Device A stores the 4th zone data produced in the previous step in 4th Zone Data Storage Area 206A552*b2d* (S5).

This paragraph illustrate(s) 1st Zone Data Producing Software 206B552*c1* of Device B, which produce(s) the 1st zone data. In this embodiment, CPU 211 (FIG. 1) of Device B retrieves the map data from Map Data Storage Area 206B552*b1* (S1). CPU 211 (FIG. 1) of Device B displays the map data retrieved in the previous step on LCD 201 (FIG. 1) of Device B (S2). The user of Device B selects, by utilizing Input Device 210 (FIG. 1) or via voice recognition system, a specific zone on the map data displayed in the previous step (S3). CPU 211 (FIG. 1) of Device B produces the 1st zone data by referring to the specific zone selected in the previous step (S4). CPU 211 (FIG. 1) of Device B stores the 1st zone data produced in the previous step in 1st Zone Data Storage Area 206B552*b2a* (S5).

This paragraph illustrate(s) 2nd Zone Data Producing Software 206B552*c2* of Device B, which produce(s) the 2nd zone data. In this embodiment, CPU 211 (FIG. 1) of Device B retrieves the map data from Map Data Storage Area 206B552*b1* (S1). CPU 211 (FIG. 1) of Device B displays the map data retrieved in the previous step on LCD 201 (FIG. 1) of Device B (S2). The user of Device B selects, by utilizing Input Device 210 (FIG. 1) or via voice recognition system, a specific zone on the map data displayed in the previous step (S3). CPU 211 (FIG. 1) of Device B produces the 2nd zone data by referring to the specific zone selected in the previous step (S4). CPU 211 (FIG. 1) of Device B stores the 2nd zone data produced in the previous step in 2nd Zone Data Storage Area 206B552*b2b* (S5).

This paragraph illustrate(s) 3rd Zone Data Producing Software 206B552*c3* of Device B, which produce(s) the 3rd zone data. In this embodiment, CPU 211 (FIG. 1) of Device B retrieves the map data from Map Data Storage Area 206B552*b1* (S1). CPU 211 (FIG. 1) of Device B displays the map data retrieved in the previous step on LCD 201 (FIG. 1) of Device B (S2). The user of Device B selects, by utilizing Input Device 210 (FIG. 1) or via voice recognition system, a specific zone on the map data displayed in the previous step (S3). CPU 211 (FIG. 1) of Device B produces the 3rd zone data by referring to the specific zone selected in the previous step (S4). CPU 211 (FIG. 1) of Device B stores the 3rd zone data produced in the previous step in 3rd Zone Data Storage Area 206B552*b2c* (S5).

This paragraph illustrate(s) 4th Zone Data Producing Software 206B552*c4* of Device B, which produce(s) the 4th zone data. In this embodiment, CPU 211 (FIG. 1) of Device B retrieves the map data from Map Data Storage Area 206B552*b1* (S1). CPU 211 (FIG. 1) of Device B displays the map data retrieved in the previous step on LCD 201 (FIG. 1) of Device B (S2). The user of Device B selects, by utilizing Input Device 210 (FIG. 1) or via voice recognition system, a specific zone on the map data displayed in the previous step (S3). CPU 211 (FIG. 1) of Device B produces the 4th zone data by referring to the specific zone selected in the previous step (S4). CPU 211 (FIG. 1) of Device B stores the 4th zone data produced in the previous step in 4th Zone Data Storage Area 206B552b2d (S5).

This paragraph illustrate(s) Device A Location Data Producing Software 206A552c5 of Device A, which produce(s) Device A location data. In this embodiment, CPU 211 (FIG. 1) of Device A identifies the current location of Device A (S1). CPU 211 (FIG. 1) of Device A produces the Device A location data by utilizing the current location identified in the previous step (S2). CPU 211 (FIG. 1) of Device A stores the Device A location data produced in the previous step in Device A Location Data Storage Area 206A552b3a (S3). The foregoing sequence is repeated periodically.

This paragraph illustrate(s) Device B Location Data Producing Software 206B552c6 of Device B, which produce(s) Device B location data. In this embodiment, CPU 211 (FIG. 1) of Device B identifies the current location of Device B (S1). CPU 211 (FIG. 1) of Device B produces the Device B location data by utilizing the current location identified in the previous step (S2). CPU 211 (FIG. 1) of Device B stores the Device B location data produced in the previous step in Device B Location Data Storage Area 206B552b3b (S3). The foregoing sequence is repeated periodically.

This paragraph illustrate(s) 1st Zone Leaving Notice Data Outputting Software 206A552c7 of Device A and 1st Zone Leaving Notice Data Outputting Software 206B552c7 of Device B, which output(s) the 1st zone leaving notice data. In this embodiment, CPU 211 (FIG. 1) of Device A retrieves the Device A location data from Device A Location Data Storage Area 206A552b3a (S1). CPU 211 (FIG. 1) of Device A retrieves the 1st zone data from 1st Zone Data Storage Area 206A552b2a (S2). If the Device A location data retrieved in S1 is located outside of the 1st zone data retrieved in the previous step, CPU 211 (FIG. 1) of Device A proceeds to the next step (S3). CPU 211 (FIG. 1) of Device A retrieves the 1st zone leaving notice data from 1st Zone Leaving Notice Data Storage Area 206A552b4a (S4). CPU 211 (FIG. 1) of Device A outputs the 1st zone leaving notice data retrieved in the previous step from Speaker 216 (FIG. 1) and LCD 201 (FIG. 1) of Device A (S5). CPU 211 (FIG. 1) of Device A sends the Device B location data transferring request to Device B in a wireless fashion (S6). Here, the Device B location data transferring request is the request to transfer the Device B location data. CPU 211 (FIG. 1) of Device B receives the Device B location data transferring request from Device A in a wireless fashion (S7). CPU 211 (FIG. 1) of Device B retrieves the Device B location data from Device B Location Data Storage Area 206B552b3b and sends the data to Device A in a wireless fashion (S8). CPU 211 (FIG. 1) of Device A receives the Device B location data from Device B in a wireless fashion and stores the data in Device B Location Data Storage Area 206A552b3b (S9). CPU 211 (FIG. 1) of Device A retrieves the map data from Map Data Storage Area 206A552b1 (S10). CPU 211 (FIG. 1) of Device A displays the map data retrieved in the previous step on LCD 201 (FIG. 1) of Device A (S11). CPU 211 (FIG. 1) of Device A retrieves the Device A location data from Device A Location Data Storage Area 206A552b3a (S12). CPU 211 (FIG. 1) of Device A retrieves the Device A icon image data from Device A Icon Image Data Storage Area 206A552b5a (S13). CPU 211 (FIG. 1) of Device A displays the Device A icon image data retrieved in the previous step at the location corresponding to the Device A location data retrieved in S12 on the map data displayed in S11 (S14). CPU 211 (FIG. 1) of Device A retrieves the Device B location data from Device B Location Data Storage Area 206A552b3b (S15). CPU 211 (FIG. 1) of Device A retrieves the Device B icon image data from Device B Icon Image Data Storage Area 206A552b5b (S16). CPU 211 (FIG. 1) of Device A displays the Device B icon image data retrieved in the previous step at the location corresponding to the Device B location data retrieved in S15 on the map data displayed in S11 (S17). Thus, the current geographic locations of Device A and Device B are displayed simultaneously on the map data. The foregoing sequence is repeated periodically.

This paragraph illustrate(s) 2nd Zone Leaving Notice Data Outputting Software 206A552c8 of Device A and 2nd Zone Leaving Notice Data Outputting Software 206B552c8 of Device B, which output(s) the 2nd zone leaving notice data. In this embodiment, CPU 211 (FIG. 1) of Device A retrieves the Device A location data from Device A Location Data Storage Area 206A552b3a (S1). CPU 211 (FIG. 1) of Device A retrieves the 2nd zone data from 2nd Zone Data Storage Area 206A552b2b (S2). If the Device A location data retrieved in S1 is located outside of the 2nd zone data retrieved in the previous step, CPU 211 (FIG. 1) of Device A proceeds to the next step (S 3). CPU 211 (FIG. 1) of Device A retrieves the 2nd zone leaving notice data from 2nd Zone Leaving Notice Data Storage Area 206A552b4b (S4). CPU 211 (FIG. 1) of Device A outputs the 2nd zone leaving notice data retrieved in the previous step from Speaker 216 (FIG. 1) and LCD 201 (FIG. 1) of Device A (S5). CPU 211 (FIG. 1) of Device A sends the Device B location data transferring request to Device B in a wireless fashion (S6). Here, the Device B location data transferring request is the request to transfer the Device B location data. CPU 211 (FIG. 1) of Device B receives the Device B location data transferring request from Device A in a wireless fashion (S7). CPU 211 (FIG. 1) of Device B retrieves the Device B location data from Device B Location Data Storage Area 206B552b3b and sends the data to Device A in a wireless fashion (S8). CPU 211 (FIG. 1) of Device A receives the Device B location data from Device B in a wireless fashion and stores the data in Device B Location Data Storage Area 206A552b3b (S9). CPU 211 (FIG. 1) of Device A retrieves the map data from Map Data Storage Area 206A552b1 (S10). CPU 211 (FIG. 1) of Device A displays the map data retrieved in the previous step on LCD 201 (FIG. 1) of Device A (S11). CPU 211 (FIG. 1) of Device A retrieves the Device A location data from Device A Location Data Storage Area 206A552b3a (S12). CPU 211 (FIG. 1) of Device A retrieves the Device A icon image data from Device A Icon Image Data Storage Area 206A552b5a (S13). CPU 211 (FIG. 1) of Device A displays the Device A icon image data retrieved in the previous step at the location corresponding to the Device A location data retrieved in S12 on the map data displayed in S11 (S14). CPU 211 (FIG. 1) of Device A retrieves the Device B location data from Device B Location Data Storage Area 206A552b3b (S15). CPU 211 (FIG. 1) of Device A retrieves the Device B icon image data from Device B Icon Image Data Storage Area 206A552b5b (S16). CPU 211 (FIG. 1) of Device A displays the Device B icon image data retrieved in the previous step at the location corresponding to the Device B location data retrieved in S15 on the map data displayed in S11 (S17). Thus, the current geographic locations of Device A and Device B are displayed simultaneously on the map data. The foregoing sequence is repeated periodically.

This paragraph illustrate(s) 3rd Zone Leaving Notice Data Outputting Software 206A552c9 of Device A and 3rd Zone Leaving Notice Data Outputting Software 206B552c9 of Device B, which output(s) the 3rd zone leaving notice data. In this embodiment, CPU 211 (FIG. 1) of Device A sends the Device B location data transferring request to Device B in a wireless fashion (S1). Here, the Device B location data transferring request is the request to transfer the Device B location data. CPU 211 (FIG. 1) of Device B receives the Device B location data transferring request from Device A in a wireless fashion (S2). CPU 211 (FIG. 1) of Device B retrieves the Device B location data from Device B Location Data Storage Area 206B552b3b and sends the data to Device A in a wireless fashion (S3). CPU 211 (FIG. 1) of Device A receives the Device B location data from Device B in a wireless fashion and stores the data in Device B Location Data Storage Area 206A552b3b (S4). CPU 211 (FIG. 1) of Device A retrieves the Device B location data from Device B Location Data Storage Area 206A552b3b (S5). CPU 211 (FIG. 1) of Device A retrieves the 3rd zone data from 3rd Zone Data Storage Area 206A552b2c (S6). If the Device B location data retrieved in S5 is located outside of the 3rd zone data retrieved in the previous step, CPU 211 (FIG. 1) of Device A proceeds to the next step (S7). CPU 211 (FIG. 1) of Device A retrieves the 3rd zone leaving notice data from 3rd Zone Leaving Notice Data Storage Area 206A552b4c (S8). CPU 211 (FIG. 1) of Device A outputs the 3rd zone leaving notice data retrieved in the previous step from Speaker 216 (FIG. 1) and LCD 201 (FIG. 1) of Device A (S9). CPU 211 (FIG. 1) of Device A retrieves the map data from Map Data Storage Area 206A552b1 (S10). CPU 211 (FIG. 1) of Device A displays the map data retrieved in the previous step on LCD 201 (FIG. 1) of Device A (S11). CPU 211 (FIG. 1) of Device A retrieves the Device A location data from Device A Location Data Storage Area 206A552b3a (S12). CPU 211 (FIG. 1) of Device A retrieves the Device A icon image data from Device A Icon Image Data Storage Area 206A552b5a (S13). CPU 211 (FIG. 1) of Device A displays the Device A icon image data retrieved in the previous step at the location corresponding to the Device A location data retrieved in S12 on the map data displayed in S11 (S14). CPU 211 (FIG. 1) of Device A retrieves the Device B location data from Device B Location Data Storage Area 206A552b3b (S15). CPU 211 (FIG. 1) of Device A retrieves the Device B icon image data from Device B Icon Image Data Storage Area 206A552b5b (S16). CPU 211 (FIG. 1) of Device A displays the Device B icon image data retrieved in the previous step at the location corresponding to the Device B location data retrieved in S15 on the map data displayed in S11 (S17). Thus, the current geographic locations of Device A and Device B are displayed simultaneously on the map data. The foregoing sequence is repeated periodically.

This paragraph illustrate(s) 4th Zone Leaving Notice Data Outputting Software 206A552c10 of Device A and 4th Zone Leaving Notice Data Outputting Software 206B552c10 of Device B, which output(s) the 4th zone leaving notice data. In this embodiment, CPU 211 (FIG. 1) of Device A sends the Device B location data transferring request to Device B in a wireless fashion (S1). Here, the Device B location data transferring request is the request to transfer the Device B location data. CPU 211 (FIG. 1) of Device B receives the Device B location data transferring request from Device A in a wireless fashion (S2). CPU 211 (FIG. 1) of Device B retrieves the Device B location data from Device B Location Data Storage Area 206B552b3b and sends the data to Device A in a wireless fashion (S3). CPU 211 (FIG. 1) of Device A receives the Device B location data from Device B in a wireless fashion and stores the data in Device B Location Data Storage Area 206A552b3b (S4). CPU 211 (FIG. 1) of Device A retrieves the Device B location data from Device B Location Data Storage Area 206A552b3b (S5). CPU 211 (FIG. 1) of Device A retrieves the 4th zone data from 4th Zone Data Storage Area 206A552b2d (S6). If the Device B location data retrieved in S5 is located outside of the 4th zone data retrieved in the previous step, CPU 211 (FIG. 1) of Device A proceeds to the next step (S7). CPU 211 (FIG. 1) of Device A retrieves the 4th zone leaving notice data from 4th Zone Leaving Notice Data Storage Area 206A552b4d (S8). CPU 211 (FIG. 1) of Device A outputs the 4th zone leaving notice data retrieved in the previous step from Speaker 216 (FIG. 1) and LCD 201 (FIG. 1) of Device A (S9). CPU 211 (FIG. 1) of Device A retrieves the map data from Map Data Storage Area 206A552b1 (S10). CPU 211 (FIG. 1) of Device A displays the map data retrieved in the previous step on LCD 201 (FIG. 1) of Device A (S11). CPU 211 (FIG. 1) of Device A retrieves the Device A location data from Device A Location Data Storage Area 206A552b3a (S12). CPU 211 (FIG. 1) of Device A retrieves the Device A icon image data from Device A Icon Image Data Storage Area 206A552b5a (S13). CPU 211 (FIG. 1) of Device A displays the Device A icon image data retrieved in the previous step at the location corresponding to the Device A location data retrieved in S12 on the map data displayed in S11 (S14). CPU 211 (FIG. 1) of Device A retrieves the Device B location data from Device B Location Data Storage Area 206A552b3b (S15). CPU 211 (FIG. 1) of Device A retrieves the Device B icon image data from Device B Icon Image Data Storage Area 206A552b5b (S16). CPU 211 (FIG. 1) of Device A displays the Device B icon image data retrieved in the previous step at the location corresponding to the Device B location data retrieved in S15 on the map data displayed in S11 (S17). Thus, the current geographic locations of Device A and Device B are displayed simultaneously on the map data. The foregoing sequence is repeated periodically.

This paragraph illustrate(s) 1st Zone Leaving Notice Data Outputting Software 206A552c7 of Device A and 1st Zone Leaving Notice Data Outputting Software 206B552c7 of Device B, which output(s) the 1st zone leaving notice data. In this embodiment, CPU 211 (FIG. 1) of Device B sends the Device A location data transferring request to Device A in a wireless fashion (S1). Here, the Device A location data transferring request is the request to transfer the Device A location data. CPU 211 (FIG. 1) of Device A receives the Device A location data transferring request from Device B in a wireless fashion (S2). CPU 211 (FIG. 1) of Device A retrieves the Device A location data from Device A Location Data Storage Area 206A552b3a and sends the data to Device B in a wireless fashion (S3). CPU 211 (FIG. 1) of Device B receives the Device A location data from Device A in a wireless fashion and stores the data in Device A Location Data Storage Area 206B552b3a (S4). CPU 211 (FIG. 1) of Device B retrieves the Device A location data from Device A Location Data Storage Area 206B552b3a (S5). CPU 211 (FIG. 1) of Device B retrieves the 1st zone data from 1st Zone Data Storage Area 206B552b2a (S6). If the Device A location data retrieved in S5 is located outside of the 1st zone data retrieved in the previous step, CPU 211 (FIG. 1) of Device B proceeds to the next step (S7). CPU 211 (FIG. 1) of Device B retrieves the 1st zone leaving notice data from 1st Zone Leaving Notice Data Storage Area 206B552b4a (S8). CPU 211 (FIG. 1) of Device B outputs the 1st zone leaving notice data retrieved in the previous step from Speaker 216 (FIG. 1) and LCD 201 (FIG. 1) of Device B (S9). CPU 211 (FIG. 1) of Device B retrieves the map data from Map Data Storage Area 206B552b1 (S10). CPU 211 (FIG. 1) of Device B displays the map data retrieved in the previous step on LCD 201 (FIG. 1) of Device B (S11). CPU 211 (FIG. 1) of Device B retrieves the Device B location data from Device B Location Data Storage Area 206B552b3b (S12). CPU 211 (FIG. 1) of Device B retrieves the Device B icon image data from Device B Icon Image Data Storage Area 206B552*b*5*b* (S13). CPU 211 (FIG. 1) of Device B displays the Device B icon image data retrieved in the previous step at the location corresponding to the Device B location data retrieved in S12 on the map data displayed in S11 (S14). CPU 211 (FIG. 1) of Device B retrieves the Device A location data from Device A Location Data Storage Area 206B552*b*3*a* (S15). CPU 211 (FIG. 1) of Device B retrieves the Device A icon image data from Device A Icon Image Data Storage Area 206B552*b*5*a* (S16). CPU 211 (FIG. 1) of Device B displays the Device A icon image data retrieved in the previous step at the location corresponding to the Device A location data retrieved in S15 on the map data displayed in S11 (S17). Thus, the current geographic locations of Device A and Device B are displayed simultaneously on the map data. The foregoing sequence is repeated periodically.

This paragraph illustrate(s) 2nd Zone Leaving Notice Data Outputting Software 206A552*c*8 of Device A and 2nd Zone Leaving Notice Data Outputting Software 206B552*c*8 of Device B, which output(s) the 2nd zone leaving notice data. In this embodiment, CPU 211 (FIG. 1) of Device B sends the Device A location data transferring request to Device A in a wireless fashion (S1). Here, the Device A location data transferring request is the request to transfer the Device A location data. CPU 211 (FIG. 1) of Device A receives the Device A location data transferring request from Device B in a wireless fashion (S2). CPU 211 (FIG. 1) of Device A retrieves the Device A location data from Device A Location Data Storage Area 206A552*b*3*a* and sends the data to Device B in a wireless fashion (S3). CPU 211 (FIG. 1) of Device B receives the Device A location data from Device A in a wireless fashion and stores the data in Device A Location Data Storage Area 206B552*b*3*a* (S4). CPU 211 (FIG. 1) of Device B retrieves the Device A location data from Device A Location Data Storage Area 206B552*b*3*a* (S5). CPU 211 (FIG. 1) of Device B retrieves the 2nd zone data from 2nd Zone Data Storage Area 206B552*b*2*b* (S6). If the Device A location data retrieved in S5 is located outside of the 2nd zone data retrieved in the previous step, CPU 211 (FIG. 1) of Device B proceeds to the next step (S7). CPU 211 (FIG. 1) of Device B retrieves the 2nd zone leaving notice data from 2nd Zone Leaving Notice Data Storage Area 206B552*b*4*b* (S8). CPU 211 (FIG. 1) of Device B outputs the 2nd zone leaving notice data retrieved in the previous step from Speaker 216 (FIG. 1) and LCD 201 (FIG. 1) of Device B (S9). CPU 211 (FIG. 1) of Device B retrieves the map data from Map Data Storage Area 206B552*b*1 (S10). CPU 211 (FIG. 1) of Device B displays the map data retrieved in the previous step on LCD 201 (FIG. 1) of Device B (S11). CPU 211 (FIG. 1) of Device B retrieves the Device B location data from Device B Location Data Storage Area 206B552*b*3*b* (S12). CPU 211 (FIG. 1) of Device B retrieves the Device B icon image data from Device B Icon Image Data Storage Area 206B552*b*5*b* (S13). CPU 211 (FIG. 1) of Device B displays the Device B icon image data retrieved in the previous step at the location corresponding to the Device B location data retrieved in S12 on the map data displayed in S11 (S14). CPU 211 (FIG. 1) of Device B retrieves the Device A location data from Device A Location Data Storage Area 206B552*b*3*a* (S15). CPU 211 (FIG. 1) of Device B retrieves the Device A icon image data from Device A Icon Image Data Storage Area 206B552*b*5*a* (S16). CPU 211 (FIG. 1) of Device B displays the Device A icon image data retrieved in the previous step at the location corresponding to the Device A location data retrieved in S15 on the map data displayed in S11 (S17). Thus, the current geographic locations of Device A and Device B are displayed simultaneously on the map data. The foregoing sequence is repeated periodically.

This paragraph illustrate(s) 3rd Zone Leaving Notice Data Outputting Software 206A552*c*9 of Device A and 3rd Zone Leaving Notice Data Outputting Software 206B552*c*9 of Device B, which output(s) the 3rd zone leaving notice data. In this embodiment, CPU 211 (FIG. 1) of Device B retrieves the Device B location data from Device B Location Data Storage Area 206B552*b*3*b* (S1). CPU 211 (FIG. 1) of Device B retrieves the 3rd zone data from 3rd Zone Data Storage Area 206B552*b*2*c* (S2). If the Device B location data retrieved in 51 is located outside of the 3rd zone data retrieved in the previous step, CPU 211 (FIG. 1) of Device B proceeds to the next step (S3). CPU 211 (FIG. 1) of Device B retrieves the 3rd zone leaving notice data from 3rd Zone Leaving Notice Data Storage Area 206B552*b*4*c* (S4). CPU 211 (FIG. 1) of Device B outputs the 3rd zone leaving notice data retrieved in the previous step from Speaker 216 (FIG. 1) and LCD 201 (FIG. 1) of Device B (S5). CPU 211 (FIG. 1) of Device B sends the Device A location data transferring request to Device A in a wireless fashion (S6). Here, the Device A location data transferring request is the request to transfer the Device A location data. CPU 211 (FIG. 1) of Device A receives the Device A location data transferring request from Device B in a wireless fashion (S7). CPU 211 (FIG. 1) of Device A retrieves the Device A location data from Device A Location Data Storage Area 206A552*b*3*a* and sends the data to Device B in a wireless fashion (S8). CPU 211 (FIG. 1) of Device B receives the Device A location data from Device A in a wireless fashion and stores the data in Device A Location Data Storage Area 206B552*b*3*a* (S9). CPU 211 (FIG. 1) of Device B retrieves the map data from Map Data Storage Area 206B552*b*1 (S10). CPU 211 (FIG. 1) of Device B displays the map data retrieved in the previous step on LCD 201 (FIG. 1) of Device B (S11). CPU 211 (FIG. 1) of Device B retrieves the Device A location data from Device A Location Data Storage Area 206B552*b*3*a* (S12). CPU 211 (FIG. 1) of Device B retrieves the Device A icon image data from Device A Icon Image Data Storage Area 206B552*b*5*a* (S13). CPU 211 (FIG. 1) of Device B displays the Device A icon image data retrieved in the previous step at the location corresponding to the Device A location data retrieved in S12 on the map data displayed in S11 (S14). CPU 211 (FIG. 1) of Device B retrieves the Device B location data from Device B Location Data Storage Area 206B552*b*3*b* (S15). CPU 211 (FIG. 1) of Device B retrieves the Device B icon image data from Device B Icon Image Data Storage Area 206B552*b*5*b* (S16). CPU 211 (FIG. 1) of Device B displays the Device B icon image data retrieved in the previous step at the location corresponding to the Device B location data retrieved in S15 on the map data displayed in S11 (S17). Thus, the current geographic locations of Device A and Device B are displayed simultaneously on the map data. The foregoing sequence is repeated periodically.

This paragraph illustrate(s) 4th Zone Leaving Notice Data Outputting Software 206A552*c*10 of Device A and 4th Zone Leaving Notice Data Outputting Software 206B552*c*10 of Device B, which output(s) the 4th zone leaving notice data. In this embodiment, CPU 211 (FIG. 1) of Device B retrieves the Device B location data from Device B Location Data Storage Area 206B552*b*3*b* (S1). CPU 211 (FIG. 1) of Device B retrieves the 4th zone data from 4th Zone Data Storage Area 206B552*b*2*d* (S2). If the Device B location data retrieved in S1 is located outside of the 4th zone data retrieved in the previous step, CPU 211 (FIG. 1) of Device B proceeds to the next step (S3). CPU 211 (FIG. 1) of Device B retrieves the 4th zone leaving notice data from 4th Zone Leaving Notice Data Storage Area 206B552*b*4*d* (S4). CPU 211 (FIG. 1) of Device B outputs the 4th zone leaving notice data retrieved in the previous step from Speaker 216 (FIG. 1) and LCD 201 (FIG.

1) of Device B (S5). CPU 211 (FIG. 1) of Device B sends the Device A location data transferring request to Device A in a wireless fashion (S6). Here, the Device A location data transferring request is the request to transfer the Device A location data. CPU 211 (FIG. 1) of Device A receives the Device A location data transferring request from Device B in a wireless fashion (S7). CPU 211 (FIG. 1) of Device A retrieves the Device A location data from Device A Location Data Storage Area 206A552b3a and sends the data to Device B in a wireless fashion (S8). CPU 211 (FIG. 1) of Device B receives the Device A location data from Device A in a wireless fashion and stores the data in Device A Location Data Storage Area 206B552b3a (S9). CPU 211 (FIG. 1) of Device B retrieves the map data from Map Data Storage Area 206B552b1 (S10). CPU 211 (FIG. 1) of Device B displays the map data retrieved in the previous step on LCD 201 (FIG. 1) of Device B (S11). CPU 211 (FIG. 1) of Device B retrieves the Device A location data from Device A Location Data Storage Area 206B552b3a (S12). CPU 211 (FIG. 1) of Device B retrieves the Device A icon image data from Device A Icon Image Data Storage Area 206B552b5a (S13). CPU 211 (FIG. 1) of Device B displays the Device A icon image data retrieved in the previous step at the location corresponding to the Device A location data retrieved in S12 on the map data displayed in S11 (S14). CPU 211 (FIG. 1) of Device B retrieves the Device B location data from Device B Location Data Storage Area 206B552b3b (S15). CPU 211 (FIG. 1) of Device B retrieves the Device B icon image data from Device B Icon Image Data Storage Area 206B552b5b (S16). CPU 211 (FIG. 1) of Device B displays the Device B icon image data retrieved in the previous step at the location corresponding to the Device B location data retrieved in S15 on the map data displayed in S11 (S17). Thus, the current geographic locations of Device A and Device B are displayed simultaneously on the map data. The foregoing sequence is repeated periodically.

<<Zone Entering Notifying Function>>

The following paragraphs illustrate the zone entering notifying function, wherein when Device A enters a specific geographic zone identified by Device A, a notice is output from Device A. The notice is further output from Device B. In addition, when Device B enters a specific geographic zone identified by Device A, a notice is output from Device A.

This paragraph illustrates the major elements utilized to implement the present function. In this embodiment, Host H is connected to Network NT (e.g., the Internet). Device A, a Communication Device 200, is connected to Network NT (e.g., the Internet) in a wireless fashion. Device B, another Communication Device 200, is connected to Network NT (e.g., the Internet) in a wireless fashion. Host H, Device A, and Device B are capable to communicate with each other via Network NT (e.g., the Internet) to implement the present function. Device A and Device B are also capable to communicate with each other directly in a wireless fashion to implement the present function.

This paragraph illustrates the storage area included in Host H. In this embodiment, Host H includes Zone Entering Notifying Information Storage Area H553a of which the data and the software program(s) stored therein are described hereinafter.

This paragraph illustrates the storage area(s) included in Zone Entering Notifying Information Storage Area H553a. In this embodiment, Zone Entering Notifying Information Storage Area H553a includes Zone Entering Notifying Data Storage Area H553b and Zone Entering Notifying Software Storage Area H553c. Zone Entering Notifying Data Storage Area H553b stores the data necessary to implement the present function on the side of Host H, such as the one(s) described hereinafter. Zone Entering Notifying Software Storage Area H553c stores the software program(s) necessary to implement the present function on the side of Host H, such as the one(s) described hereinafter.

This paragraph illustrates the storage area(s) included in Zone Entering Notifying Data Storage Area H553b. In this embodiment, Zone Entering Notifying Data Storage Area H553b includes Map Data Storage Area H553b1, Party Zone Data Storage Area H553b2, Party Location Data Storage Area H553b3, Party Zone Entering Notice Data Storage Area H553b4, Party Icon Image Data Storage Area H553b5, Party Location Notifying Data Storage Area H553b6, and Work Area H553b7. Map Data Storage Area H553b1 stores the map data which is the image data indicating a map. Party Zone Data Storage Area H553b2 stores the data described hereinafter. Party Location Data Storage Area H553b3 stores the data described hereinafter. Party Zone Entering Notice Data Storage Area H553b4 stores the data described hereinafter. Party Icon Image Data Storage Area H553b5 stores the data described hereinafter. Party Location Notifying Data Storage Area H553b6 stores the data described hereinafter. Work Area H553b7 is utilized as a work area to perform calculation and temporarily store data.

This paragraph illustrates the storage area(s) included in Party Zone Data Storage Area H553b2. In this embodiment, Party Zone Data Storage Area H553b2 includes 1st Zone Data Storage Area H553b2a, 2nd Zone Data Storage Area H553b2b, 3rd Zone Data Storage Area H553b2c, and 4th Zone Data Storage Area H553b2d. 1st Zone Data Storage Area H553b2a stores the 1st zone data which indicates a certain geographic zone or area. 2nd Zone Data Storage Area H553b2b stores the 2nd zone data which indicates a certain geographic zone or area. 3rd Zone Data Storage Area H553b2c stores the 3rd zone data which indicates a certain geographic zone or area. 4th Zone Data Storage Area H553b2d stores the 4th zone data which indicates a certain geographic zone or area.

This paragraph illustrates the storage area(s) included in Party Location Data Storage Area H553b3. In this embodiment, Party Location Data Storage Area H553b3 includes Device A Location Data Storage Area H553b3a and Device B Location Data Storage Area H553b3b. Device A Location Data Storage Area H553b3a stores the Device A location data which indicates the current geographic location of Device A in (x,y,z) format. Device B Location Data Storage Area H553b3b stores the Device B location data which indicates the current geographic location of Device B in (x,y,z) format.

This paragraph illustrates the storage area(s) included in Party Zone Entering Notice Data Storage Area H553b4. In this embodiment, Party Zone Entering Notice Data Storage Area H553b4 includes 1st Zone Entering Notice Data Storage Area H553b4a, 2nd Zone Entering Notice Data Storage Area H553b4b, 3rd Zone Entering Notice Data Storage Area H553b4c, and 4th Zone Entering Notice Data Storage Area H553b4d. 1st Zone Entering Notice Data Storage Area H553b4a stores the 1st zone entering notice data which is the audiovisual data indicating that Device A entered the zone indicated by the 1st zone data. 2nd Zone Entering Notice Data Storage Area H553b4b stores the 2nd zone entering notice data which is the audiovisual data indicating that Device A entered the zone indicated by the 2nd zone data. 3rd Zone Entering Notice Data Storage Area H553b4c stores the 3rd zone entering notice data which is the audiovisual data indicating that Device B entered the zone indicated by the 3rd zone data. 4th Zone Entering Notice Data Storage Area H553b4d stores the 4th zone entering notice data which is the audiovisual data indicating that Device B entered the zone indicated by the 4th zone data.

This paragraph illustrates the storage area(s) included in Party Icon Image Data Storage Area H553b5. In this embodiment, Party Icon Image Data Storage Area H553b5 includes Device A Icon Image Data Storage Area H553b5a and Device B Icon Image Data Storage Area H553b5b. Device A Icon Image Data Storage Area H553b5a stores the Device A icon image data which is the image data of the icon indicating the current geographic location of Device A on the map data. Device B Icon Image Data Storage Area H553b5b stores the Device B icon image data which is the image data of the icon indicating the current geographic location of Device B on the map data.

This paragraph illustrates the storage area(s) included in Party Location Notifying Data Storage Area H553b6. In this embodiment, Party Location Notifying Data Storage Area H553b6 includes Device A Location Notifying Data Storage Area H553b6a and Device B Location Notifying Data Storage Area H553b6b. Device A Location Notifying Data Storage Area H553b6a stores the Device A location notifying data which is the audiovisual data notifying that the current geographic location of Device A is notified. Device B Location Notifying Data Storage Area H553b6b stores the Device B location notifying data which is the audiovisual data notifying that the current geographic location of Device B is notified.

This paragraph illustrates the software program(s) stored in Zone Entering Notifying Software Storage Area H553c. In this embodiment, Zone Entering Notifying Software Storage Area H553c stores 1st Zone Data Producing Software H553c1, 2nd Zone Data Producing Software H553c2, 3rd Zone Data Producing Software H553c3, 4th Zone Data Producing Software H553c4, Device A Location Data Producing Software H553c5, 1st Zone Entering Notice Data Outputting Software H553c7, 2nd Zone Entering Notice Data Outputting Software H553c8, 3rd Zone Entering Notice Data Outputting Software H553c9, and 4th Zone Entering Notice Data Outputting Software H553c10. 1st Zone Data Producing Software H553c1 is the software program described hereinafter. 2nd Zone Data Producing Software H553c2 is the software program described hereinafter. 3rd Zone Data Producing Software H553c3 is the software program described hereinafter. 4th Zone Data Producing Software H553c4 is the software program described hereinafter. Device A Location Data Producing Software H553c5 is the software program described hereinafter. 1st Zone Entering Notice Data Outputting Software H553c7 is the software program described hereinafter. 2nd Zone Entering Notice Data Outputting Software H553c8 is the software program described hereinafter. 3rd Zone Entering Notice Data Outputting Software H553c9 is the software program described hereinafter. 4th Zone Entering Notice Data Outputting Software H553c10 is the software program described hereinafter.

This paragraph illustrates the storage area included in RAM 206 (FIG. 1) of Device A. In this embodiment, RAM 206 includes Zone Entering Notifying Information Storage Area 206A553a of which the data and the software program(s) stored therein are described hereinafter.

The data and/or the software program(s) necessary to implement the present function may be downloaded from Host H to Device A.

This paragraph illustrates the storage area(s) included in Zone Entering Notifying Information Storage Area 206A553a. In this embodiment, Zone Entering Notifying Information Storage Area 206A553a includes Zone Entering Notifying Data Storage Area 206A553b and Zone Entering Notifying Software Storage Area 206A553c. Zone Entering Notifying Data Storage Area 206A553b stores the data necessary to implement the present function on the side of Device A, such as the one(s) described hereinafter. Zone Entering Notifying Software Storage Area 206A553c stores the software program(s) necessary to implement the present function on the side of Device A, such as the one(s) described hereinafter.

This paragraph illustrates the storage area(s) included in Zone Entering Notifying Data Storage Area 206A553b. In this embodiment, Zone Entering Notifying Data Storage Area 206A553b includes Map Data Storage Area 206A553b1, Party Zone Data Storage Area 206A553b2, Party Location Data Storage Area 206A553b3, Party Zone Entering Notice Data Storage Area 206A553b4, Party Icon Image Data Storage Area 206A553b5, Party Location Notifying Data Storage Area 206A553b6, and Work Area 206A553b7. Map Data Storage Area 206A553b1 stores the map data which is the image data indicating a map. Party Zone Data Storage Area 206A553b2 stores the data described hereinafter. Party Location Data Storage Area 206A553b3 stores the data described hereinafter. Party Zone Entering Notice Data Storage Area 206A553b4 stores the data described hereinafter. Party Icon Image Data Storage Area 206A553b5 stores the data described hereinafter. Party Location Notifying Data Storage Area 206A553b6 stores the data described hereinafter. Work Area 206A553b7 is utilized as a work area to perform calculation and temporarily store data.

This paragraph illustrates the storage area(s) included in Party Zone Data Storage Area 206A553b2. In this embodiment, Party Zone Data Storage Area 206A553b2 includes 1st Zone Data Storage Area 206A553b2a, 2nd Zone Data Storage Area 206A553b2b, 3rd Zone Data Storage Area 206A553b2c, and 4th Zone Data Storage Area 206A553b2d. 1st Zone Data Storage Area 206A553b2a stores the 1st zone data which indicates a certain geographic zone or area. 2nd Zone Data Storage Area 206A553b2b stores the 2nd zone data which indicates a certain geographic zone or area. 3rd Zone Data Storage Area 206A553b2c stores the 3rd zone data which indicates a certain geographic zone or area. 4th Zone Data Storage Area 206A553b2d stores the 4th zone data which indicates a certain geographic zone or area.

This paragraph illustrates the storage area(s) included in Party Location Data Storage Area 206A553b3. In this embodiment, Party Location Data Storage Area 206A553b3 includes Device A Location Data Storage Area 206A553b3a and Device B Location Data Storage Area 206A553b3b. Device A Location Data Storage Area 206A553b3a stores the Device A location data which indicates the current geographic location of Device A in (x,y,z) format. Device B Location Data Storage Area 206A553b3b stores the Device B location data which indicates the current geographic location of Device B in (x,y,z) format.

This paragraph illustrates the storage area(s) included in Party Zone Entering Notice Data Storage Area 206A553b4. In this embodiment, Party Zone Entering Notice Data Storage Area 206A553b4 includes 1st Zone Entering Notice Data Storage Area 206A553b4a, 2nd Zone Entering Notice Data Storage Area 206A553b4b, 3rd Zone Entering Notice Data Storage Area 206A553b4c, and 4th Zone Entering Notice Data Storage Area 206A553b4d. 1st Zone Entering Notice Data Storage Area 206A553b4a stores the 1st zone entering notice data which is the audiovisual data indicating that Device A entered the zone indicated by the 1st zone data. 2nd Zone Entering Notice Data Storage Area 206A553b4b stores the 2nd zone entering notice data which is the audiovisual data indicating that Device A entered the zone indicated by the 2nd zone data. 3rd Zone Entering Notice Data Storage Area 206A553b4c stores the 3rd zone entering notice data which is the audiovisual data indicating that Device B entered the zone indicated by the 3rd zone data. 4th Zone Entering Notice Data Storage Area 206A553b4d stores the 4th zone entering notice data which is the audiovisual data indicating that Device B entered the zone indicated by the 4th zone data.

This paragraph illustrates the storage area(s) included in Party Icon Image Data Storage Area 206A553b5. In this embodiment, Party Icon Image Data Storage Area 206A553b5 includes Device A Icon Image Data Storage Area 206A553b5a and Device B Icon Image Data Storage Area 206A553b5b. Device A Icon Image Data Storage Area 206A553b5a stores the Device A icon image data which is the image data of the icon indicating the current geographic location of Device A on the map data. Device B Icon Image Data Storage Area 206A553b5b stores the Device B icon image data which is the image data of the icon indicating the current geographic location of Device B on the map data.

This paragraph illustrates the storage area(s) included in Party Location Notifying Data Storage Area 206A553b6. In this embodiment, Party Location Notifying Data Storage Area 206A553b6 includes Device A Location Notifying Data Storage Area 206A553b6a and Device B Location Notifying Data Storage Area 206A553b6b. Device A Location Notifying Data Storage Area 206A553b6a stores the Device A location notifying data which is the audiovisual data notifying that the current geographic location of Device A is notified. Device B Location Notifying Data Storage Area 206A553b6b stores the Device B location notifying data which is the audiovisual data notifying that the current geographic location of Device B is notified.

This paragraph illustrates the software program(s) stored in Zone Entering Notifying Software Storage Area 206A553c. In this embodiment, Zone Entering Notifying Software Storage Area 206A553c stores 1st Zone Data Producing Software 206A553c1, 2nd Zone Data Producing Software 206A553c2, 3rd Zone Data Producing Software 206A553c3, 4th Zone Data Producing Software 206A553c4, Device A Location Data Producing Software 206A553c5, 1st Zone Entering Notice Data Outputting Software 206A553c7, 2nd Zone Entering Notice Data Outputting Software 206A553c8, 3rd Zone Entering Notice Data Outputting Software 206A553c9, and 4th Zone Entering Notice Data Outputting Software 206A553c10. 1st Zone Data Producing Software 206A553c1 is the software program described hereinafter. 2nd Zone Data Producing Software 206A553c2 is the software program described hereinafter. 3rd Zone Data Producing Software 206A553c3 is the software program described hereinafter. 4th Zone Data Producing Software 206A553c4 is the software program described hereinafter. Device A Location Data Producing Software 206A553c5 is the software program described hereinafter. 1st Zone Entering Notice Data Outputting Software 206A553c7 is the software program described hereinafter. 2nd Zone Entering Notice Data Outputting Software 206A553c8 is the software program described hereinafter. 3rd Zone Entering Notice Data Outputting Software 206A553c9 is the software program described hereinafter. 4th Zone Entering Notice Data Outputting Software 206A553c10 is the software program described hereinafter.

This paragraph illustrates the storage area included in RAM 206 (FIG. 1) of Device B. In this embodiment, RAM 206 includes Zone Entering Notifying Information Storage Area 206B553a of which the data and the software program(s) stored therein are described hereinafter.

The data and/or the software program(s) necessary to implement the present function may be downloaded from Host H to Device B.

This paragraph illustrates the storage area(s) included in Zone Entering Notifying Information Storage Area 206B553a. In this embodiment, Zone Entering Notifying Information Storage Area 206B553a includes Zone Entering Notifying Data Storage Area 206B553b and Zone Entering Notifying Software Storage Area 206B553c. Zone Entering Notifying Data Storage Area 206B553b stores the data necessary to implement the present function on the side of Device B, such as the one(s) described hereinafter. Zone Entering Notifying Software Storage Area 206B553c stores the software program(s) necessary to implement the present function on the side of Device B, such as the one(s) described hereinafter.

This paragraph illustrates the storage area(s) included in Zone Entering Notifying Data Storage Area 206B553b. In this embodiment, Zone Entering Notifying Data Storage Area 206B553b includes Map Data Storage Area 206B553b1, Party Zone Data Storage Area 206B553b2, Party Location Data Storage Area 206B553b3, Party Zone Entering Notice Data Storage Area 206B553b4, Party Icon Image Data Storage Area 206B553b5, Party Location Notifying Data Storage Area 206B553b6, and Work Area 206B553b7. Map Data Storage Area 206B553b1 stores the map data which is the image data indicating a map. Party Zone Data Storage Area 206B553b2 stores the data described hereinafter. Party Location Data Storage Area 206B553b3 stores the data described hereinafter. Party Zone Entering Notice Data Storage Area 206B553b4 stores the data described hereinafter. Party Icon Image Data Storage Area 206B553b5 stores the data described hereinafter. Party Location Notifying Data Storage Area 206B553b6 stores the data described hereinafter. Work Area 206B553b7 is utilized as a work area to perform calculation and temporarily store data.

This paragraph illustrates the storage area(s) included in Party Zone Data Storage Area 206B553b2. In this embodiment, Party Zone Data Storage Area 206B553b2 includes 1st Zone Data Storage Area 206B553b2a, 2nd Zone Data Storage Area 206B553b2b, 3rd Zone Data Storage Area 206B553b2c, and 4th Zone Data Storage Area 206B553b2d. 1st Zone Data Storage Area 206B553b2a stores the 1st zone data which indicates a certain geographic zone or area. 2nd Zone Data Storage Area 206B553b2b stores the 2nd zone data which indicates a certain geographic zone or area. 3rd Zone Data Storage Area 206B553b2c stores the 3rd zone data which indicates a certain geographic zone or area. 4th Zone Data Storage Area 206B553b2d stores the 4th zone data which indicates a certain geographic zone or area.

This paragraph illustrates the storage area(s) included in Party Location Data Storage Area 206B553b3. In this embodiment, Party Location Data Storage Area 206B553b3 includes Device A Location Data Storage Area 206B553b3a and Device B Location Data Storage Area 206B553b3b. Device A Location Data Storage Area 206B553b3a stores the Device A location data which indicates the current geographic location of Device A in (x,y,z) format. Device B Location Data Storage Area 206B553b3b stores the Device B location data which indicates the current geographic location of Device B in (x,y,z) format.

This paragraph illustrates the storage area(s) included in Party Zone Entering Notice Data Storage Area 206B553b4. In this embodiment, Party Zone Entering Notice Data Storage Area 206B553b4 includes 1st Zone Entering Notice Data Storage Area 206B553b4a, 2nd Zone Entering Notice Data Storage Area 206B553b4b, 3rd Zone Entering Notice Data Storage Area 206B553*b*4*c*, and 4th Zone Entering Notice Data Storage Area 206B553*b*4*d*. 1st Zone Entering Notice Data Storage Area 206B553*b*4*a* stores the 1st zone entering notice data which is the audiovisual data indicating that Device A entered the zone indicated by the 1st zone data. 2nd Zone Entering Notice Data Storage Area 206B553*b*4*b* stores the 2nd zone entering notice data which is the audiovisual data indicating that Device A entered the zone indicated by the 2nd zone data. 3rd Zone Entering Notice Data Storage Area 206B553*b*4*c* stores the 3rd zone entering notice data which is the audiovisual data indicating that Device B entered the zone indicated by the 3rd zone data. 4th Zone Entering Notice Data Storage Area 206B553*b*4*d* stores the 4th zone entering notice data which is the audiovisual data indicating that Device B entered the zone indicated by the 4th zone data.

This paragraph illustrates the storage area(s) included in Party Icon Image Data Storage Area 206B553*b*5. In this embodiment, Party Icon Image Data Storage Area 206B553*b*5 includes Device A Icon Image Data Storage Area 206B553*b*5*a* and Device B Icon Image Data Storage Area 206B553*b*5*b*. Device A Icon Image Data Storage Area 206B553*b*5*a* stores the Device A icon image data which is the image data of the icon indicating the current geographic location of Device A on the map data. Device B Icon Image Data Storage Area 206B553*b*5*b* stores the Device B icon image data which is the image data of the icon indicating the current geographic location of Device B on the map data.

This paragraph illustrates the storage area(s) included in Party Location Notifying Data Storage Area 206B553*b*6. In this embodiment, Party Location Notifying Data Storage Area 206B553*b*6 includes Device A Location Notifying Data Storage Area 206B553*b*6*a* and Device B Location Notifying Data Storage Area 206B553*b*6*b*. Device A Location Notifying Data Storage Area 206B553*b*6*a* stores the Device A location notifying data which is the audiovisual data notifying that the current geographic location of Device A is notified. Device B Location Notifying Data Storage Area 206B553*b*6*b* stores the Device B location notifying data which is the audiovisual data notifying that the current geographic location of Device B is notified.

This paragraph illustrates the software program(s) stored in Zone Entering Notifying Software Storage Area 206B553*c*. In this embodiment, Zone Entering Notifying Software Storage Area 206B553*c* stores 1st Zone Data Producing Software 206B553*c*1, 2nd Zone Data Producing Software 206B553*c*2, 3rd Zone Data Producing Software 206B553*c*3, 4th Zone Data Producing Software 206B553*c*4, Device B Location Data Producing Software 206B553*c*6, 1st Zone Entering Notice Data Outputting Software 206B553*c*7, 2nd Zone Entering Notice Data Outputting Software 206B553*c*8, 3rd Zone Entering Notice Data Outputting Software 206B553*c*9, and 4th Zone Entering Notice Data Outputting Software 206B553*c*10. 1st Zone Data Producing Software 206B553*c*1 is the software program described hereinafter. 2nd Zone Data Producing Software 206B553*c*2 is the software program described hereinafter. 3rd Zone Data Producing Software 206B553*c*3 is the software program described hereinafter. 4th Zone Data Producing Software 206B553*c*4 is the software program described hereinafter. Device B Location Data Producing Software 206B553*c*6 is the software program described hereinafter. 1st Zone Entering Notice Data Outputting Software 206B553*c*7 is the software program described hereinafter. 2nd Zone Entering Notice Data Outputting Software 206B553*c*8 is the software program described hereinafter. 3rd Zone Entering Notice Data Outputting Software 206B553*c*9 is the software program described hereinafter. 4th Zone Entering Notice Data Outputting Software 206B553*c*10 is the software program described hereinafter.

This paragraph illustrate(s) 1st Zone Data Producing Software H553*c*1 of Host H and 1st Zone Data Producing Software 206A553*c*1 of Device A, which produce(s) the 1st zone data. In this embodiment, Host H retrieves the map data from Map Data Storage Area H553*b*1 and sends the data to Device A (S1). CPU 211 (FIG. 1) of Device A receives the map data from Host H in a wireless fashion and displays the data on LCD 201 (FIG. 1) of Device A (S2). The user of Device A selects, by utilizing Input Device 210 (FIG. 1) or via voice recognition system, a specific zone on the map data displayed in the previous step (S3). CPU 211 (FIG. 1) of Device A produces the 1st zone data by referring to the specific zone selected in the previous step and sends the data to Host H in a wireless fashion (S4). Host H receives the 1st zone data from Device A and stores the data in 1st Zone Data Storage Area H553*b*2*a* (S5).

This paragraph illustrate(s) 2nd Zone Data Producing Software H553*c*2 of Host H and 2nd Zone Data Producing Software 206A553*c*2 of Device A, which produce(s) the 2nd zone data. In this embodiment, Host H retrieves the map data from Map Data Storage Area H553*b*1 and sends the data to Device A (S1). CPU 211 (FIG. 1) of Device A receives the map data from Host H in a wireless fashion and displays the data on LCD 201 (FIG. 1) of Device A (S2). The user of Device A selects, by utilizing Input Device 210 (FIG. 1) or via voice recognition system, a specific zone on the map data displayed in the previous step (S3). CPU 211 (FIG. 1) of Device A produces the 2nd zone data by referring to the specific zone selected in the previous step and sends the data to Host H in a wireless fashion (S4). Host H receives the 2nd zone data from Device A and stores the data in 2nd Zone Data Storage Area H553*b*2*b* (S5).

This paragraph illustrate(s) 3rd Zone Data Producing Software H553*c*3 of Host H and 3rd Zone Data Producing Software 206A553*c*3 of Device A, which produce(s) the 3rd zone data. In this embodiment, Host H retrieves the map data from Map Data Storage Area H553*b*1 and sends the data to Device A (S1). CPU 211 (FIG. 1) of Device A receives the map data from Host H in a wireless fashion and displays the data on LCD 201 (FIG. 1) of Device A (S2). The user of Device A selects, by utilizing Input Device 210 (FIG. 1) or via voice recognition system, a specific zone on the map data displayed in the previous step (S3). CPU 211 (FIG. 1) of Device A produces the 3rd zone data by referring to the specific zone selected in the previous step and sends the data to Host H in a wireless fashion (S4). Host H receives the 3rd zone data from Device A and stores the data in 3rd Zone Data Storage Area H553*b*2*c* (S5).

This paragraph illustrate(s) 4th Zone Data Producing Software H553*c*4 of Host H and 4th Zone Data Producing Software 206A553*c*4 of Device A, which produce(s) the 4th zone data. In this embodiment, Host H retrieves the map data from Map Data Storage Area H553*b*1 and sends the data to Device A (S1). CPU 211 (FIG. 1) of Device A receives the map data from Host H in a wireless fashion and displays the data on LCD 201 (FIG. 1) of Device A (S2). The user of Device A selects, by utilizing Input Device 210 (FIG. 1) or via voice recognition system, a specific zone on the map data displayed in the previous step (S3). CPU 211 (FIG. 1) of Device A produces the 4th zone data by referring to the specific zone selected in the previous step and sends the data to Host H in a wireless fashion (S4). Host H receives the 4th zone data from Device A and stores the data in 4th Zone Data Storage Area H553*b*2*d* (S5).

This paragraph illustrate(s) 1st Zone Data Producing Software 206B553c1 of Device B, which produces) the 1st zone data. In this embodiment, CPU 211 (FIG. 1) of Device B retrieves the map data from Map Data Storage Area 206B553b1 (S1). CPU 211 (FIG. 1) of Device B displays the map data retrieved in the previous step on LCD 201 (FIG. 1) of Device B (S2). The user of Device B selects, by utilizing Input Device 210 (FIG. 1) or via voice recognition system, a specific zone on the map data displayed in the previous step (S3). CPU 211 (FIG. 1) of Device B produces the 1st zone data by referring to the specific zone selected in the previous step (S4). CPU 211 (FIG. 1) of Device B stores the 1st zone data produced in the previous step in 1st Zone Data Storage Area 206B553b2a (S5).

This paragraph illustrate(s) 2nd Zone Data Producing Software 206B553c2 of Device B, which produce(s) the 2nd zone data. In this embodiment, CPU 211 (FIG. 1) of Device B retrieves the map data from Map Data Storage Area 206B553b1 (S1). CPU 211 (FIG. 1) of Device B displays the map data retrieved in the previous step on LCD 201 (FIG. 1) of Device B (S2). The user of Device B selects, by utilizing Input Device 210 (FIG. 1) or via voice recognition system, a specific zone on the map data displayed in the previous step (S3). CPU 211 (FIG. 1) of Device B produces the 2nd zone data by referring to the specific zone selected in the previous step (S4). CPU 211 (FIG. 1) of Device B stores the 2nd zone data produced in the previous step in 2nd Zone Data Storage Area 206B553b2b (S5).

This paragraph illustrate(s) 3rd Zone Data Producing Software 206B553c3 of Device B, which produce(s) the 3rd zone data. In this embodiment, CPU 211 (FIG. 1) of Device B retrieves the map data from Map Data Storage Area 206B553b1 (S1). CPU 211 (FIG. 1) of Device B displays the map data retrieved in the previous step on LCD 201 (FIG. 1) of Device B (S2). The user of Device B selects, by utilizing Input Device 210 (FIG. 1) or via voice recognition system, a specific zone on the map data displayed in the previous step (S3). CPU 211 (FIG. 1) of Device B produces the 3rd zone data by referring to the specific zone selected in the previous step (S4). CPU 211 (FIG. 1) of Device B stores the 3rd zone data produced in the previous step in 3rd Zone Data Storage Area 206B553b2c (S5).

This paragraph illustrate(s) 4th Zone Data Producing Software 206B553c4 of Device B, which produce(s) the 4th zone data. In this embodiment, CPU 211 (FIG. 1) of Device B retrieves the map data from Map Data Storage Area 206B553b1 (S1). CPU 211 (FIG. 1) of Device B displays the map data retrieved in the previous step on LCD 201 (FIG. 1) of Device B (S2). The user of Device B selects, by utilizing Input Device 210 (FIG. 1) or via voice recognition system, a specific zone on the map data displayed in the previous step (S3). CPU 211 (FIG. 1) of Device B produces the 4th zone data by referring to the specific zone selected in the previous step (S4). CPU 211 (FIG. 1) of Device B stores the 4th zone data produced in the previous step in 4th Zone Data Storage Area 206B553b2d (S5).

This paragraph illustrate(s) Device A Location Data Producing Software H553c5 of Host H and Device A Location Data Producing Software 206A553c5 of Device A, which produces) Device A location data. In this embodiment, CPU 211 (FIG. 1) of Device A identifies the current location of Device A (S1). CPU 211 (FIG. 1) of Device A produces the Device A location data by utilizing the current location identified in the previous step and sends the data to Host H in a wireless fashion (S2). Host H receives the Device A location data from Device A and stores the data in Device A Location Data Storage Area H553b3a (S3). The foregoing sequence is repeated periodically.

This paragraph illustrate(s) Device B Location Data Producing Software 206B553c6 of Device B, which produce(s) Device B location data. In this embodiment, CPU 211 (FIG. 1) of Device B identifies the current location of Device B (S1). CPU 211 (FIG. 1) of Device B produces the Device B location data by utilizing the current location identified in the previous step (S2). CPU 211 (FIG. 1) of Device B stores the Device B location data produced in the previous step in Device B Location Data Storage Area 206B553b3b (S3). The foregoing sequence is repeated periodically.

This paragraph illustrate(s) 1st Zone Entering Notice Data Outputting Software H553c7 of Host H, 1st Zone Entering Notice Data Outputting Software 206A553c7 of Device A, and 1st Zone Entering Notice Data Outputting Software 206B553c7 of Device B, which output(s) the 1st zone entering notice data. In this embodiment, Host H retrieves the Device A location data from Device A Location Data Storage Area H553b3a (S1). Host H retrieves the 1st zone data from 1st Zone Data Storage Area H553b2a (S2). If the Device A location data retrieved in S1 is located inside of the 1st zone data retrieved in the previous step, Host H proceeds to the next step (S3). Host H retrieves the 1st zone entering notice data from 1st Zone Entering Notice Data Storage Area H553b4a and sends the data to Device A (S4). CPU 211 (FIG. 1) of Device A receives the 1st zone entering notice data from Host H in a wireless fashion and outputs the data from Speaker 216 (FIG. 1) and LCD 201 (FIG. 1) of Device A (S5). Host H sends the Device B location data transferring request to Device B (S6). Here, the Device B location data transferring request is the request to transfer the Device B location data. CPU 211 (FIG. 1) of Device B receives the Device B location data transferring request from Host H in a wireless fashion (S7). CPU 211 (FIG. 1) of Device B retrieves the Device B location data from Device B Location Data Storage Area 206B553b3b and sends the data to Host H in a wireless fashion (S8). Host H receives the Device B location data from Device B and stores the data in Device B Location Data Storage Area H553b3b (S9). Host H retrieves the map data from Map Data Storage Area H553b1 and sends the data to Device A (S10). CPU 211 (FIG. 1) of Device A receives the map data from Host H in a wireless fashion and displays the data on LCD 201 (FIG. 1) of Device A (S11). Host H retrieves the Device A location data from Device A Location Data Storage Area H553b3a and sends the data to Device A (S12). CPU 211 (FIG. 1) of Device A receives the Device A location data from Host H in a wireless fashion (S13). Host H retrieves the Device A icon image data from Device A Icon Image Data Storage Area H553b5a and sends the data to Device A (S14). CPU 211 (FIG. 1) of Device A receives the Device A icon image data from Host H in a wireless fashion (S15). CPU 211 (FIG. 1) of Device A displays the Device A icon image data received in the previous step at the location corresponding to the Device A location data received in S13 on the map data displayed in S11 (S16). Host H retrieves the Device B location data from Device B Location Data Storage Area H553b3b and sends the data to Device A (S17). CPU 211 (FIG. 1) of Device A receives the Device B location data from Host H in a wireless fashion (S18). Host H retrieves the Device B icon image data from Device B Icon Image Data Storage Area H553b5b and sends the data to Device A (S19). CPU 211 (FIG. 1) of Device A receives the Device B icon image data from Host H in a wireless fashion (S20). CPU 211 (FIG. 1) of Device A displays the Device B icon image data received in the previous step at the location corresponding to the Device B location data received in S18 on the map data displayed in S11 (S21). Thus, the current geographic locations of Device A and Device B are displayed simultaneously on the map data. The foregoing sequence is repeated periodically.

This paragraph illustrate(s) 2nd Zone Entering Notice Data Outputting Software H553c8 of Host H, 2nd Zone Entering Notice Data Outputting Software 206A553c8 of Device A, and 2nd Zone Entering Notice Data Outputting Software 206B553c8 of Device B, which output(s) the 2nd zone entering notice data. In this embodiment, Host H retrieves the Device A location data from Device A Location Data Storage Area H553b3a (S1). Host H retrieves the 2nd zone data from 2nd Zone Data Storage Area H553b2b (S2). If the Device A location data retrieved in S1 is located inside of the 2nd zone data retrieved in the previous step, Host H proceeds to the next step (S3). Host H retrieves the 2nd zone entering notice data from 2nd Zone Entering Notice Data Storage Area H553b4b and sends the data to Device A (S4). CPU 211 (FIG. 1) of Device A receives the 2nd zone entering notice data from Host H in a wireless fashion and outputs the data from Speaker 216 (FIG. 1) and LCD 201 (FIG. 1) of Device A (S5). Host H sends the Device B location data transferring request to Device B (S6). Here, the Device B location data transferring request is the request to transfer the Device B location data. CPU 211 (FIG. 1) of Device B receives the Device B location data transferring request from Host H in a wireless fashion (S7). CPU 211 (FIG. 1) of Device B retrieves the Device B location data from Device B Location Data Storage Area 206B553b3b and sends the data to Host H in a wireless fashion (S8). Host H receives the Device B location data from Device B and stores the data in Device B Location Data Storage Area H553b3b (S9). Host H retrieves the map data from Map Data Storage Area H553b1 and sends the data to Device A (S10). CPU 211 (FIG. 1) of Device A receives the map data from Host H in a wireless fashion and displays the data on LCD 201 (FIG. 1) of Device A (S11). Host H retrieves the Device A location data from Device A Location Data Storage Area H553b3a and sends the data to Device A (S12). CPU 211 (FIG. 1) of Device A receives the Device A location data from Host H in a wireless fashion (S13). Host H retrieves the Device A icon image data from Device A Icon Image Data Storage Area H553b5a and sends the data to Device A (S14). CPU 211 (FIG. 1) of Device A receives the Device A icon image data from Host H in a wireless fashion (S15). CPU 211 (FIG. 1) of Device A displays the Device A icon image data received in the previous step at the location corresponding to the Device A location data received in S13 on the map data displayed in S11 (S16). Host H retrieves the Device B location data from Device B Location Data Storage Area H553b3b and sends the data to Device A (S17). CPU 211 (FIG. 1) of Device A receives the Device B location data from Host H in a wireless fashion (S18). Host H retrieves the Device B icon image data from Device B Icon Image Data Storage Area H553b5b and sends the data to Device A (S19). CPU 211 (FIG. 1) of Device A receives the Device B icon image data from Host H in a wireless fashion (S20). CPU 211 (FIG. 1) of Device A displays the Device B icon image data received in the previous step at the location corresponding to the Device B location data received in S18 on the map data displayed in S11 (S21). Thus, the current geographic locations of Device A and Device B are displayed simultaneously on the map data. The foregoing sequence is repeated periodically.

This paragraph illustrate(s) 3rd Zone Entering Notice Data Outputting Software H553c9 of Host H, 3rd Zone Entering Notice Data Outputting Software 206A553c9 of Device A, and 3rd Zone Entering Notice Data Outputting Software 206B553c9 of Device B, which output(s) the 3rd zone entering notice data. In this embodiment, Host H sends the Device B location data transferring request to Device B (S1). Here, the Device B location data transferring request is the request to transfer the Device B location data. CPU 211 (FIG. 1) of Device B receives the Device B location data transferring request from Host H in a wireless fashion (S2). CPU 211 (FIG. 1) of Device B retrieves the Device B location data from Device B Location Data Storage Area 206B553b3b and sends the data to Host H in a wireless fashion (S3). Host H receives the Device B location data from Device B and stores the data in Device B Location Data Storage Area H553b3b (S4). Host H retrieves the Device B location data from Device B Location Data Storage Area H553b3b (S5). Host H retrieves the 3rd zone data from 3rd Zone Data Storage Area H553b2c (S6). If the Device B location data retrieved in S5 is located inside of the 3rd zone data retrieved in the previous step, Host H proceeds to the next step (S7). Host H retrieves the 3rd zone entering notice data from 3rd Zone Entering Notice Data Storage Area H553b4c and sends the data to Device A (S8). CPU 211 (FIG. 1) of Device A receives the 3rd zone entering notice data from Host H in a wireless fashion and outputs the data from Speaker 216 (FIG. 1) and LCD 201 (FIG. 1) of Device A (S9). Host H retrieves the map data from Map Data Storage Area H553b1 and sends the data to Device A (S10). CPU 211 (FIG. 1) of Device A receives the map data from Host H in a wireless fashion and displays the data on LCD 201 (FIG. 1) of Device A (S11). Host H retrieves the Device A location data from Device A Location Data Storage Area H553b3a and sends the data to Device A (S12). CPU 211 (FIG. 1) of Device A receives the Device A location data from Host H in a wireless fashion (S13). Host H retrieves the Device A icon image data from Device A Icon Image Data Storage Area H553b5a and sends the data to Device A (S14). CPU 211 (FIG. 1) of Device A receives the Device A icon image data from Host H in a wireless fashion (S15). CPU 211 (FIG. 1) of Device A displays the Device A icon image data received in the previous step at the location corresponding to the Device A location data received in S13 on the map data displayed in S11 (S16). Host H retrieves the Device B location data from Device B Location Data Storage Area H553b3b and sends the data to Device A (S17). CPU 211 (FIG. 1) of Device A receives the Device B location data from Host H in a wireless fashion (S18). Host H retrieves the Device B icon image data from Device B Icon Image Data Storage Area H553b5b and sends the data to Device A (S19). CPU 211 (FIG. 1) of Device A receives the Device B icon image data from Host H in a wireless fashion (S20). CPU 211 (FIG. 1) of Device A displays the Device B icon image data received in the previous step at the location corresponding to the Device B location data received in S18 on the map data displayed in S11 (S21). Thus, the current geographic locations of Device A and Device B are displayed simultaneously on the map data. The foregoing sequence is repeated periodically.

This paragraph illustrate(s) 4th Zone Entering Notice Data Outputting Software H553c10 of Host H, 4th Zone Entering Notice Data Outputting Software 206A553c10 of Device A, and 4th Zone Entering Notice Data Outputting Software 206B553c10 of Device B, which output(s) the 4th zone entering notice data. In this embodiment, Host H sends the Device B location data transferring request to Device B (S1). Here, the Device B location data transferring request is the request to transfer the Device B location data. CPU 211 (FIG. 1) of Device B receives the Device B location data transferring request from Host H in a wireless fashion (S2). CPU 211

(FIG. 1) of Device B retrieves the Device B location data from Device B Location Data Storage Area 206B553b3b and sends the data to Host H in a wireless fashion (S3). Host H receives the Device B location data from Device B and stores the data in Device B Location Data Storage Area H553b3b (S4). Host H retrieves the Device B location data from Device B Location Data Storage Area H553b3b (S5). Host H retrieves the 4th zone data from 4th Zone Data Storage Area H553b2d (S6). If the Device B location data retrieved in S5 is located inside of the 4th zone data retrieved in the previous step, Host H proceeds to the next step (S7). Host H retrieves the 4th zone entering notice data from 4th Zone Entering Notice Data Storage Area H553b4d and sends the data to Device A (S8). CPU 211 (FIG. 1) of Device A receives the 4th zone entering notice data from Host H in a wireless fashion and outputs the data from Speaker 216 (FIG. 1) and LCD 201 (FIG. 1) of Device A (S9). Host H retrieves the map data from Map Data Storage Area H553b1 and sends the data to Device A (S10). CPU 211 (FIG. 1) of Device A receives the map data from Host H in a wireless fashion and displays the data on LCD 201 (FIG. 1) of Device A (S11). Host H retrieves the Device A location data from Device A Location Data Storage Area H553b3a and sends the data to Device A (S12). CPU 211 (FIG. 1) of Device A receives the Device A location data from Host H in a wireless fashion (S13). Host H retrieves the Device A icon image data from Device A Icon Image Data Storage Area H553b5a and sends the data to Device A (S14). CPU 211 (FIG. 1) of Device A receives the Device A icon image data from Host H in a wireless fashion (S15). CPU 211 (FIG. 1) of Device A displays the Device A icon image data received in the previous step at the location corresponding to the Device A location data received in S13 on the map data displayed in S11 (S16). Host H retrieves the Device B location data from Device B Location Data Storage Area H553b3b and sends the data to Device A (S17). CPU 211 (FIG. 1) of Device A receives the Device B location data from Host H in a wireless fashion (S18). Host H retrieves the Device B icon image data from Device B Icon Image Data Storage Area H553b5b and sends the data to Device A (S19). CPU 211 (FIG. 1) of Device A receives the Device B icon image data from Host H in a wireless fashion (S20). CPU 211 (FIG. 1) of Device A displays the Device B icon image data received in the previous step at the location corresponding to the Device B location data received in S18 on the map data displayed in S11 (S21). Thus, the current geographic locations of Device A and Device B are displayed simultaneously on the map data. The foregoing sequence is repeated periodically.

This paragraph illustrate(s) 1st Zone Entering Notice Data Outputting Software H553c7 of Host H and 1st Zone Entering Notice Data Outputting Software 206B553c7 of Device B, which output(s) the 1st zone entering notice data. In this embodiment, CPU 211 (FIG. 1) of Device B sends the Device A location data transferring request to Host H in a wireless fashion (S1). Here, the Device A location data transferring request is the request to transfer the Device A location data. Host H receives the Device A location data transferring request from Device B (S2). Host H retrieves the Device A location data from Device A Location Data Storage Area H553b3a and sends the data to Device B (S3). CPU 211 (FIG. 1) of Device B receives the Device A location data from Host H in a wireless fashion and stores the data in Device A Location Data Storage Area 206B553b3a (S4). CPU 211 (FIG. 1) of Device B retrieves the Device A location data from Device A Location Data Storage Area 206B553b3a (S5). CPU 211 (FIG. 1) of Device B retrieves the 1st zone data from 1st Zone Data Storage Area 206B553b2a (S6). If the Device A location data retrieved in S5 is located inside of the 1st zone data retrieved in the previous step, CPU 211 (FIG. 1) of Device B proceeds to the next step (S7). CPU 211 (FIG. 1) of Device B retrieves the 1st zone entering notice data from 1st Zone Entering Notice Data Storage Area 206B553b4a (S8). CPU 211 (FIG. 1) of Device B outputs the 1st zone entering notice data retrieved in the previous step from Speaker 216 (FIG. 1) and LCD 201 (FIG. 1) of Device B (S9). CPU 211 (FIG. 1) of Device B retrieves the map data from Map Data Storage Area 206B553b1 (S10). CPU 211 (FIG. 1) of Device B displays the map data retrieved in the previous step on LCD 201 (FIG. 1) of Device B (S11). CPU 211 (FIG. 1) of Device B retrieves the Device A location data from Device A Location Data Storage Area 206B553b3a (S12). CPU 211 (FIG. 1) of Device B retrieves the Device A icon image data from Device A Icon Image Data Storage Area 206B553b5a (S13). CPU 211 (FIG. 1) of Device B displays the Device A icon image data retrieved in the previous step at the location corresponding to the Device A location data retrieved in S12 on the map data displayed in S11 (S14). CPU 211 (FIG. 1) of Device B retrieves the Device B location data from Device B Location Data Storage Area 206B553b3b (S15). CPU 211 (FIG. 1) of Device B retrieves the Device B icon image data from Device B Icon Image Data Storage Area 206B553b5b (S16). CPU 211 (FIG. 1) of Device B displays the Device B icon image data retrieved in the previous step at the location corresponding to the Device B location data retrieved in S15 on the map data displayed in S11 (517). Thus, the current geographic locations of Device A and Device B are displayed simultaneously on the map data. The foregoing sequence is repeated periodically.

This paragraph illustrate(s) 2nd Zone Entering Notice Data Outputting Software H553c8 of Host H and 2nd Zone Entering Notice Data Outputting Software 206B553c8 of Device B, which output(s) the 2nd zone entering notice data. In this embodiment, CPU 211 (FIG. 1) of Device B sends the Device A location data transferring request to Host H in a wireless fashion (S1). Here, the Device A location data transferring request is the request to transfer the Device A location data. Host H receives the Device A location data transferring request from Device B (S2). Host H retrieves the Device A location data from Device A Location Data Storage Area H553b3a and sends the data to Device B (S3). CPU 211 (FIG. 1) of Device B receives the Device A location data from Host H in a wireless fashion and stores the data in Device A Location Data Storage Area 206B553b3a (S4). CPU 211 (FIG. 1) of Device B retrieves the Device A location data from Device A Location Data Storage Area 206B553b3a (S5). CPU 211 (FIG. 1) of Device B retrieves the 2nd zone data from 2nd Zone Data Storage Area 206B553b2b (S6). If the Device A location data retrieved in S5 is located inside of the 2nd zone data retrieved in the previous step, CPU 211 (FIG. 1) of Device B proceeds to the next step (S7). CPU 211 (FIG. 1) of Device B retrieves the 2nd zone entering notice data from 2nd Zone Entering Notice Data Storage Area 206B553b4b (S8). CPU 211 (FIG. 1) of Device B outputs the 2nd zone entering notice data retrieved in the previous step from Speaker 216 (FIG. 1) and LCD 201 (FIG. 1) of Device B (S9). CPU 211 (FIG. 1) of Device B retrieves the map data from Map Data Storage Area 206B553b1 (S10). CPU 211 (FIG. 1) of Device B displays the map data retrieved in the previous step on LCD 201 (FIG. 1) of Device B (S11). CPU 211 (FIG. 1) of Device B retrieves the Device A location data from Device A Location Data Storage Area 206B553b3a (S12). CPU 211 (FIG. 1) of Device B retrieves the Device A icon image data from Device A Icon Image Data Storage Area 206B553b5a (S13). CPU 211 (FIG. 1) of Device B displays the Device A icon image data retrieved in the previous step at the location corresponding to the Device A location data retrieved in S12 on the map data displayed in S11 (S14). CPU 211 (FIG. 1) of Device B retrieves the Device B location data from Device B Location Data Storage Area 206B553*b*3*b* (S15). CPU 211 (FIG. 1) of Device B retrieves the Device B icon image data from Device B Icon Image Data Storage Area 206B553*b*5*b* (S16). CPU 211 (FIG. 1) of Device B displays the Device B icon image data retrieved in the previous step at the location corresponding to the Device B location data retrieved in S15 on the map data displayed in S11 (S17). Thus, the current geographic locations of Device A and Device B are displayed simultaneously on the map data. The foregoing sequence is repeated periodically.

This paragraph illustrate(s) 3rd Zone Entering Notice Data Outputting Software H553*c*9 of Host H and 3rd Zone Entering Notice Data Outputting Software 206B553*c*9 of Device B, which output(s) the 3rd zone entering notice data. In this embodiment, CPU 211 (FIG. 1) of Device B retrieves the Device B location data from Device B Location Data Storage Area 206B553*b*3*b* (S1). CPU 211 (FIG. 1) of Device B retrieves the 3rd zone data from 3rd Zone Data Storage Area 206B553*b*2*c* (S2). If the Device B location data retrieved in S1 is located inside of the 3rd zone data retrieved in the previous step, CPU 211 (FIG. 1) of Device B proceeds to the next step (S3). CPU 211 (FIG. 1) of Device B retrieves the 3rd zone entering notice data from 3rd Zone Entering Notice Data Storage Area 206B553*b*4*c* (S4). CPU 211 (FIG. 1) of Device B outputs the 3rd zone entering notice data retrieved in the previous step from Speaker 216 (FIG. 1) and LCD 201 (FIG. 1) of Device B (S5). CPU 211 (FIG. 1) of Device B retrieves the map data from Map Data Storage Area 206B553*b*1 (S6). CPU 211 (FIG. 1) of Device B displays the map data retrieved in the previous step on LCD 201 (FIG. 1) of Device B (S7). CPU 211 (FIG. 1) of Device B sends the Device A location data transferring request to Host H in a wireless fashion (S8). Here, the Device A location data transferring request is the request to transfer the Device A location data. Host H receives the Device A location data transferring request from Device B (S9). Host H retrieves the Device A location data from Device A Location Data Storage Area H553*b*3*a* and sends the data to Device B (S10). CPU 211 (FIG. 1) of Device B receives the Device A location data from Host H in a wireless fashion and stores the data in Device A Location Data Storage Area 206B553*b*3*a* (S11). CPU 211 (FIG. 1) of Device B retrieves the Device A location data from Device A Location Data Storage Area 206B553*b*3*a* (S12). CPU 211 (FIG. 1) of Device B retrieves the Device A icon image data from Device A Icon Image Data Storage Area 206B553*b*5*a* (S13). CPU 211 (FIG. 1) of Device B displays the Device A icon image data retrieved in the previous step at the location corresponding to the Device A location data retrieved in S12 on the map data displayed in S7 (S14). CPU 211 (FIG. 1) of Device B retrieves the Device B location data from Device B Location Data Storage Area 206B553*b*3*b* (S15). CPU 211 (FIG. 1) of Device B retrieves the Device B icon image data from Device B Icon Image Data Storage Area 206B553*b*5*b* (S16). CPU 211 (FIG. 1) of Device B displays the Device B icon image data retrieved in the previous step at the location corresponding to the Device B location data retrieved in S15 on the map data displayed in S7 (S17). Thus, the current geographic locations of Device A and Device B are displayed simultaneously on the map data. The foregoing sequence is repeated periodically.

This paragraph illustrate(s) 4th Zone Entering Notice Data Outputting Software H553*c*10 of Host H and 4th Zone Entering Notice Data Outputting Software 206B553*c*10 of Device B, which output(s) the 4th zone entering notice data. In this embodiment, CPU 211 (FIG. 1) of Device B retrieves the Device B location data from Device B Location Data Storage Area 206B553*b*3*b* (S1). CPU 211 (FIG. 1) of Device B retrieves the 4th zone data from 4th Zone Data Storage Area 206B553*b*2*d* (S2). If the Device B location data retrieved in S1 is located inside of the 4th zone data retrieved in the previous step, CPU 211 (FIG. 1) of Device B proceeds to the next step (S3). CPU 211 (FIG. 1) of Device B retrieves the 4th zone entering notice data from 4th Zone Entering Notice Data Storage Area 206B553*b*4*d* (S4). CPU 211 (FIG. 1) of Device B outputs the 4th zone entering notice data retrieved in the previous step from Speaker 216 (FIG. 1) and LCD 201 (FIG. 1) of Device B (S5). CPU 211 (FIG. 1) of Device B retrieves the map data from Map Data Storage Area 206B553*b*1 (S6). CPU 211 (FIG. 1) of Device B displays the map data retrieved in the previous step on LCD 201 (FIG. 1) of Device B (S7). CPU 211 (FIG. 1) of Device B sends the Device A location data transferring request to Host H in a wireless fashion (S8). Here, the Device A location data transferring request is the request to transfer the Device A location data. Host H receives the Device A location data transferring request from Device B (S9). Host H retrieves the Device A location data from Device A Location Data Storage Area H553*b*3*a* and sends the data to Device B (S10). CPU 211 (FIG. 1) of Device B receives the Device A location data from Host H in a wireless fashion and stores the data in Device A Location Data Storage Area 206B553*b*3*a* (S11). CPU 211 (FIG. 1) of Device B retrieves the Device A location data from Device A Location Data Storage Area 206B553*b*3*a* (S12). CPU 211 (FIG. 1) of Device B retrieves the Device A icon image data from Device A Icon Image Data Storage Area 206B553*b*5*a* (S13). CPU 211 (FIG. 1) of Device B displays the Device A icon image data retrieved in the previous step at the location corresponding to the Device A location data retrieved in S12 on the map data displayed in S7 (S14). CPU 211 (FIG. 1) of Device B retrieves the Device B location data from Device B Location Data Storage Area 206B553*b*3*b* (S15). CPU 211 (FIG. 1) of Device B retrieves the Device B icon image data from Device B Icon Image Data Storage Area 206B553*b*5*b* (S16). CPU 211 (FIG. 1) of Device B displays the Device B icon image data retrieved in the previous step at the location corresponding to the Device B location data retrieved in S15 on the map data displayed in S7 (S17). Thus, the current geographic locations of Device A and Device B are displayed simultaneously on the map data. The foregoing sequence is repeated periodically.

The following paragraphs illustrate another embodiment wherein Device A plays the major role in implementing the present function.

This paragraph illustrate(s) 1st Zone Data Producing Software 206A553*c*1 of Device A, which produce(s) the 1st zone data. In this embodiment, CPU 211 (FIG. 1) of Device A retrieves the map data from Map Data Storage Area 206A553*b*1 (S1). CPU 211 (FIG. 1) of Device A displays the map data retrieved in the previous step on LCD 201 (FIG. 1) of Device A (S2). The user of Device A selects, by utilizing Input Device 210 (FIG. 1) or via voice recognition system, a specific zone on the map data displayed in the previous step (S3). CPU 211 (FIG. 1) of Device A produces the 1st zone data by referring to the specific zone selected in the previous step (S4). CPU 211 (FIG. 1) of Device A stores the 1st zone data produced in the previous step in 1st Zone Data Storage Area 206A553*b*2*a* (S5).

This paragraph illustrate(s) 2nd Zone Data Producing Software 206A553*c*2 of Device A, which produces) the 2nd zone data. In this embodiment, CPU 211 (FIG. 1) of Device A retrieves the map data from Map Data Storage Area 206A553*b*1 (S1). CPU 211 (FIG. 1) of Device A displays the map data retrieved in the previous step on LCD 201 (FIG. 1) of Device A (S2). The user of Device A selects, by utilizing Input Device 210 (FIG. 1) or via voice recognition system, a specific zone on the map data displayed in the previous step (S3). CPU 211 (FIG. 1) of Device A produces the 2nd zone data by referring to the specific zone selected in the previous step (S4). CPU 211 (FIG. 1) of Device A stores the 2nd zone data produced in the previous step in 2nd Zone Data Storage Area 206A553*b*2*b* (S5).

This paragraph illustrate(s) 3rd Zone Data Producing Software 206A553*c*3 of Device A, which produce(s) the 3rd zone data. In this embodiment, CPU 211 (FIG. 1) of Device A retrieves the map data from Map Data Storage Area 206A553*b*1 (S1). CPU 211 (FIG. 1) of Device A displays the map data retrieved in the previous step on LCD 201 (FIG. 1) of Device A (S2). The user of Device A selects, by utilizing Input Device 210 (FIG. 1) or via voice recognition system, a specific zone on the map data displayed in the previous step (S3). CPU 211 (FIG. 1) of Device A produces the 3rd zone data by referring to the specific zone selected in the previous step (S4). CPU 211 (FIG. 1) of Device A stores the 3rd zone data produced in the previous step in 3rd Zone Data Storage Area 206A553*b*2*c* (S5).

This paragraph illustrate(s) 4th Zone Data Producing Software 206A553*c*4 of Device A, which produce(s) the 4th zone data. In this embodiment, CPU 211 (FIG. 1) of Device A retrieves the map data from Map Data Storage Area 206A553*b*1 (S1). CPU 211 (FIG. 1) of Device A displays the map data retrieved in the previous step on LCD 201 (FIG. 1) of Device A (S2). The user of Device A selects, by utilizing Input Device 210 (FIG. 1) or via voice recognition system, a specific zone on the map data displayed in the previous step (S3). CPU 211 (FIG. 1) of Device A produces the 4th zone data by referring to the specific zone selected in the previous step (S4). CPU 211 (FIG. 1) of Device A stores the 4th zone data produced in the previous step in 4th Zone Data Storage Area 206A553*b*2*d* (S5).

This paragraph illustrate(s) 1st Zone Data Producing Software 206B553*c*1 of Device B, which produce(s) the 1st zone data. In this embodiment, CPU 211 (FIG. 1) of Device B retrieves the map data from Map Data Storage Area 206B553*b*1 (S1). CPU 211 (FIG. 1) of Device B displays the map data retrieved in the previous step on LCD 201 (FIG. 1) of Device B (S2). The user of Device B selects, by utilizing Input Device 210 (FIG. 1) or via voice recognition system, a specific zone on the map data displayed in the previous step (S3). CPU 211 (FIG. 1) of Device B produces the 1st zone data by referring to the specific zone selected in the previous step (S4). CPU 211 (FIG. 1) of Device B stores the 1st zone data produced in the previous step in 1st Zone Data Storage Area 206B553*b*2*a* (S5).

This paragraph illustrate(s) 2nd Zone Data Producing Software 206B553*c*2 of Device B, which produce(s) the 2nd zone data. In this embodiment, CPU 211 (FIG. 1) of Device B retrieves the map data from Map Data Storage Area 206B553*b*1 (S1). CPU 211 (FIG. 1) of Device B displays the map data retrieved in the previous step on LCD 201 (FIG. 1) of Device B (S2). The user of Device B selects, by utilizing Input Device 210 (FIG. 1) or via voice recognition system, a specific zone on the map data displayed in the previous step (S3). CPU 211 (FIG. 1) of Device B produces the 2nd zone data by referring to the specific zone selected in the previous step (S4). CPU 211 (FIG. 1) of Device B stores the 2nd zone data produced in the previous step in 2nd Zone Data Storage Area 206B553*b*2*b* (S5).

This paragraph illustrate(s) 3rd Zone Data Producing Software 206B553*c*3 of Device B, which produce(s) the 3rd zone data. In this embodiment, CPU 211 (FIG. 1) of Device B retrieves the map data from Map Data Storage Area 206B553*b*1 (S1). CPU 211 (FIG. 1) of Device B displays the map data retrieved in the previous step on LCD 201 (FIG. 1) of Device B (S2). The user of Device B selects, by utilizing Input Device 210 (FIG. 1) or via voice recognition system, a specific zone on the map data displayed in the previous step (S3). CPU 211 (FIG. 1) of Device B produces the 3rd zone data by referring to the specific zone selected in the previous step (S4). CPU 211 (FIG. 1) of Device B stores the 3rd zone data produced in the previous step in 3rd Zone Data Storage Area 206B553*b*2*c* (S5).

This paragraph illustrate(s) 4th Zone Data Producing Software 206B553*c*4 of Device B, which produce(s) the 4th zone data. In this embodiment, CPU 211 (FIG. 1) of Device B retrieves the map data from Map Data Storage Area 206B553*b*1 (S1). CPU 211 (FIG. 1) of Device B displays the map data retrieved in the previous step on LCD 201 (FIG. 1) of Device B (S2). The user of Device B selects, by utilizing Input Device 210 (FIG. 1) or via voice recognition system, a specific zone on the map data displayed in the previous step (S3). CPU 211 (FIG. 1) of Device B produces the 4th zone data by referring to the specific zone selected in the previous step (S4). CPU 211 (FIG. 1) of Device B stores the 4th zone data produced in the previous step in 4th Zone Data Storage Area 206B553*b*2*d* (S5).

This paragraph illustrate(s) Device A Location Data Producing Software 206A553*c*5 of Device A, which produce(s) Device A location data. In this embodiment, CPU 211 (FIG. 1) of Device A identifies the current location of Device A (S1). CPU 211 (FIG. 1) of Device A produces the Device A location data by utilizing the current location identified in the previous step (S2). CPU 211 (FIG. 1) of Device A stores the Device A location data produced in the previous step in Device A Location Data Storage Area 206A553*b*3*a* (S3). The foregoing sequence is repeated periodically.

This paragraph illustrate(s) Device B Location Data Producing Software 206B553*c*6 of Device B, which produce(s) Device B location data. In this embodiment, CPU 211 (FIG. 1) of Device B identifies the current location of Device B (S1). CPU 211 (FIG. 1) of Device B produces the Device B location data by utilizing the current location identified in the previous step (S2). CPU 211 (FIG. 1) of Device B stores the Device B location data produced in the previous step in Device B Location Data Storage Area 206B553*b*3*b* (S3). The foregoing sequence is repeated periodically.

This paragraph illustrate(s) 1st Zone Entering Notice Data Outputting Software 206A553*c*7 of Device A and 1st Zone Entering Notice Data Outputting Software 206B553*c*7 of Device B, which output(s) the 1st zone entering notice data. In this embodiment, CPU 211 (FIG. 1) of Device A retrieves the Device A location data from Device A Location Data Storage Area 206A553*b*3*a* (S1). CPU 211 (FIG. 1) of Device A retrieves the 1st zone data from 1st Zone Data Storage Area 206A553*b*2*a* (S2). If the Device A location data retrieved in 51 is located inside of the 1st zone data retrieved in the previous step, CPU 211 (FIG. 1) of Device A proceeds to the next step (S3). CPU 211 (FIG. 1) of Device A retrieves the 1st zone entering notice data from 1st Zone Entering Notice Data Storage Area 206A553*b*4*a* (S4). CPU 211 (FIG. 1) of Device A outputs the 1st zone entering notice data retrieved in the previous step from Speaker 216 (FIG. 1) and LCD 201 (FIG. 1) of Device A (S5). CPU 211 (FIG. 1) of Device A sends the Device B location data transferring request to Device B in a wireless fashion (S6). Here, the Device B location data transferring request is the request to transfer the Device B location data. CPU 211 (FIG. 1) of Device B receives the Device B location data transferring request from Device A in a wireless fashion (S7). CPU 211 (FIG. 1) of Device B retrieves the Device B location data from Device B Location Data Storage Area 206B553*b3b* and sends the data to Device A in a wireless fashion (S8). CPU 211 (FIG. 1) of Device A receives the Device B location data from Device B in a wireless fashion and stores the data in Device B Location Data Storage Area 206A553*b3b* (S9). CPU 211 (FIG. 1) of Device A retrieves the map data from Map Data Storage Area 206A553*b1* (S10). CPU 211 (FIG. 1) of Device A displays the map data retrieved in the previous step on LCD 201 (FIG. 1) of Device A (S11). CPU 211 (FIG. 1) of Device A retrieves the Device A location data from Device A Location Data Storage Area 206A553*b3a* (S12). CPU 211 (FIG. 1) of Device A retrieves the Device A icon image data from Device A Icon Image Data Storage Area 206A553*b5a* (S13). CPU 211 (FIG. 1) of Device A displays the Device A icon image data retrieved in the previous step at the location corresponding to the Device A location data retrieved in S12 on the map data displayed in S11 (S14). CPU 211 (FIG. 1) of Device A retrieves the Device B location data from Device B Location Data Storage Area 206A553*b3b* (S15). CPU 211 (FIG. 1) of Device A retrieves the Device B icon image data from Device B Icon Image Data Storage Area 206A553*b5b* (S16). CPU 211 (FIG. 1) of Device A displays the Device B icon image data retrieved in the previous step at the location corresponding to the Device B location data retrieved in S15 on the map data displayed in S11 (S17). Thus, the current geographic locations of Device A and Device B are displayed simultaneously on the map data. The foregoing sequence is repeated periodically.

This paragraph illustrate(s) 2nd Zone Entering Notice Data Outputting Software 206A553*c8* of Device A and 2nd Zone Entering Notice Data Outputting Software 206B553*c8* of Device B, which output(s) the 2nd zone entering notice data. In this embodiment, CPU 211 (FIG. 1) of Device A retrieves the Device A location data from Device A Location Data Storage Area 206A553*b3a* (S1). CPU 211 (FIG. 1) of Device A retrieves the 2nd zone data from 2nd Zone Data Storage Area 206A553*b2b* (S2). If the Device A location data retrieved in S1 is located inside of the 2nd zone data retrieved in the previous step, CPU 211 (FIG. 1) of Device A proceeds to the next step (S3). CPU 211 (FIG. 1) of Device A retrieves the 2nd zone entering notice data from 2nd Zone Entering Notice Data Storage Area 206A553*b4b* (S4). CPU 211 (FIG. 1) of Device A outputs the 2nd zone entering notice data retrieved in the previous step from Speaker 216 (FIG. 1) and LCD 201 (FIG. 1) of Device A (S5). CPU 211 (FIG. 1) of Device A sends the Device B location data transferring request to Device B in a wireless fashion (S6). Here, the Device B location data transferring request is the request to transfer the Device B location data. CPU 211 (FIG. 1) of Device B receives the Device B location data transferring request from Device A in a wireless fashion (S7). CPU 211 (FIG. 1) of Device B retrieves the Device B location data from Device B Location Data Storage Area 206B553*b3b* and sends the data to Device A in a wireless fashion (S8). CPU 211 (FIG. 1) of Device A receives the Device B location data from Device B in a wireless fashion and stores the data in Device B Location Data Storage Area 206A553*b3b* (S9). CPU 211 (FIG. 1) of Device A retrieves the map data from Map Data Storage Area 206A553*b1* (S10). CPU 211 (FIG. 1) of Device A displays the map data retrieved in the previous step on LCD 201 (FIG. 1) of Device A (S11). CPU 211 (FIG. 1) of Device A retrieves the Device A location data from Device A Location Data Storage Area 206A553*b3a* (S12). CPU 211 (FIG. 1) of Device A retrieves the Device A icon image data from Device A Icon Image Data Storage Area 206A553*b5a* (S13). CPU 211 (FIG. 1) of Device A displays the Device A icon image data retrieved in the previous step at the location corresponding to the Device A location data retrieved in S12 on the map data displayed in S11 (S14). CPU 211 (FIG. 1) of Device A retrieves the Device B location data from Device B Location Data Storage Area 206A553*b3b* (S15). CPU 211 (FIG. 1) of Device A retrieves the Device B icon image data from Device B Icon Image Data Storage Area 206A553*b5b* (S16). CPU 211 (FIG. 1) of Device A displays the Device B icon image data retrieved in the previous step at the location corresponding to the Device B location data retrieved in S15 on the map data displayed in S11 (S17). Thus, the current geographic locations of Device A and Device B are displayed simultaneously on the map data. The foregoing sequence is repeated periodically.

This paragraph illustrate(s) 3rd Zone Entering Notice Data Outputting Software 206A553*c9* of Device A and 3rd Zone Entering Notice Data Outputting Software 206B553*c9* of Device B, which output(s) the 3rd zone entering notice data. In this embodiment, CPU 211 (FIG. 1) of Device A sends the Device B location data transferring request to Device B in a wireless fashion (S1). Here, the Device B location data transferring request is the request to transfer the Device B location data. CPU 211 (FIG. 1) of Device B receives the Device B location data transferring request from Device A in a wireless fashion (S2). CPU 211 (FIG. 1) of Device B retrieves the Device B location data from Device B Location Data Storage Area 206B553*b3b* and sends the data to Device A in a wireless fashion (S3). CPU 211 (FIG. 1) of Device A receives the Device B location data from Device B in a wireless fashion and stores the data in Device B Location Data Storage Area 206A553*b3b* (S4). CPU 211 (FIG. 1) of Device A retrieves the Device B location data from Device B Location Data Storage Area 206A553*b3b* (S5). CPU 211 (FIG. 1) of Device A retrieves the 3rd zone data from 3rd Zone Data Storage Area 206A553*b2c* (S6). If the Device B location data retrieved in S5 is located inside of the 3rd zone data retrieved in the previous step, CPU 211 (FIG. 1) of Device A proceeds to the next step (S7). CPU 211 (FIG. 1) of Device A retrieves the 3rd zone entering notice data from 3rd Zone Entering Notice Data Storage Area 206A553*b4c* (S8). CPU 211 (FIG. 1) of Device A outputs the 3rd zone entering notice data retrieved in the previous step from Speaker 216 (FIG. 1) and LCD 201 (FIG. 1) of Device A (S9). CPU 211 (FIG. 1) of Device A retrieves the map data from Map Data Storage Area 206A553*b1* (S10). CPU 211 (FIG. 1) of Device A displays the map data retrieved in the previous step on LCD 201 (FIG. 1) of Device A (S11). CPU 211 (FIG. 1) of Device A retrieves the Device A location data from Device A Location Data Storage Area 206A553*b3a* (S12). CPU 211 (FIG. 1) of Device A retrieves the Device A icon image data from Device A Icon Image Data Storage Area 206A553*b5a* (S13). CPU 211 (FIG. 1) of Device A displays the Device A icon image data retrieved in the previous step at the location corresponding to the Device A location data retrieved in S12 on the map data displayed in S11 (S14). CPU 211 (FIG. 1) of Device A retrieves the Device B location data from Device B Location Data Storage Area 206A553*b3b* (S15). CPU 211 (FIG. 1) of Device A retrieves the Device B icon image data from Device B Icon Image Data Storage Area 206A553*b5b* (S16). CPU 211 (FIG. 1) of Device A displays the Device B icon image data retrieved in the previous step at the location corresponding to the Device B location data retrieved in S15 on the map data displayed in S11 (S17). Thus, the current geographic locations of Device A and Device B are displayed simultaneously on the map data. The foregoing sequence is repeated periodically.

This paragraph illustrate(s) 4th Zone Entering Notice Data Outputting Software 206A553c10 of Device A and 4th Zone Entering Notice Data Outputting Software 206B553c10 of Device B, which output(s) the 4th zone entering notice data. In this embodiment, CPU 211 (FIG. 1) of Device A sends the Device B location data transferring request to Device B in a wireless fashion (S1). Here, the Device B location data transferring request is the request to transfer the Device B location data. CPU 211 (FIG. 1) of Device B receives the Device B location data transferring request from Device A in a wireless fashion (S2). CPU 211 (FIG. 1) of Device B retrieves the Device B location data from Device B Location Data Storage Area 206B553b3b and sends the data to Device A in a wireless fashion (S3). CPU 211 (FIG. 1) of Device A receives the Device B location data from Device B in a wireless fashion and stores the data in Device B Location Data Storage Area 206A553b3b (S4). CPU 211 (FIG. 1) of Device A retrieves the Device B location data from Device B Location Data Storage Area 206A553b3b (S5). CPU 211 (FIG. 1) of Device A retrieves the 4th zone data from 4th Zone Data Storage Area 206A553b2d (S6). If the Device B location data retrieved in S5 is located inside of the 4th zone data retrieved in the previous step, CPU 211 (FIG. 1) of Device A proceeds to the next step (S7). CPU 211 (FIG. 1) of Device A retrieves the 4th zone entering notice data from 4th Zone Entering Notice Data Storage Area 206A553b4d (S8). CPU 211 (FIG. 1) of Device A outputs the 4th zone entering notice data retrieved in the previous step from Speaker 216 (FIG. 1) and LCD 201 (FIG. 1) of Device A (S9). CPU 211 (FIG. 1) of Device A retrieves the map data from Map Data Storage Area 206A553b1 (S10). CPU 211 (FIG. 1) of Device A displays the map data retrieved in the previous step on LCD 201 (FIG. 1) of Device A (S11). CPU 211 (FIG. 1) of Device A retrieves the Device A location data from Device A Location Data Storage Area 206A553b3a (S12). CPU 211 (FIG. 1) of Device A retrieves the Device A icon image data from Device A Icon Image Data Storage Area 206A553b5a (S13). CPU 211 (FIG. 1) of Device A displays the Device A icon image data retrieved in the previous step at the location corresponding to the Device A location data retrieved in S12 on the map data displayed in S11 (S14). CPU 211 (FIG. 1) of Device A retrieves the Device B location data from Device B Location Data Storage Area 206A553b3b (S15). CPU 211 (FIG. 1) of Device A retrieves the Device B icon image data from Device B Icon Image Data Storage Area 206A553b5b (S16). CPU 211 (FIG. 1) of Device A displays the Device B icon image data retrieved in the previous step at the location corresponding to the Device B location data retrieved in S15 on the map data displayed in S11 (S17). Thus, the current geographic locations of Device A and Device B are displayed simultaneously on the map data. The foregoing sequence is repeated periodically.

This paragraph illustrate(s) 1st Zone Entering Notice Data Outputting Software 206A553c7 of Device A and 1st Zone Entering Notice Data Outputting Software 206B553c7 of Device B, which output(s) the 1st zone entering notice data. In this embodiment, CPU 211 (FIG. 1) of Device B sends the Device A location data transferring request to Device A in a wireless fashion (S1). Here, the Device A location data transferring request is the request to transfer the Device A location data. CPU 211 (FIG. 1) of Device A receives the Device A location data transferring request from Device B in a wireless fashion (S2). CPU 211 (FIG. 1) of Device A retrieves the Device A location data from Device A Location Data Storage Area 206A553b3a and sends the data to Device B in a wireless fashion (S3). CPU 211 (FIG. 1) of Device B receives the Device A location data from Device A in a wireless fashion and stores the data in Device A Location Data Storage Area 206B553b3a (S4). CPU 211 (FIG. 1) of Device B retrieves the Device A location data from Device A Location Data Storage Area 206B553b3a (S5). CPU 211 (FIG. 1) of Device B retrieves the 1st zone data from 1st Zone Data Storage Area 206B553b2a (S6). If the Device A location data retrieved in S5 is located inside of the 1st zone data retrieved in the previous step, CPU 211 (FIG. 1) of Device B proceeds to the next step (S7). CPU 211 (FIG. 1) of Device B retrieves the 1st zone entering notice data from 1st Zone Entering Notice Data Storage Area 206B553b4a (S8). CPU 211 (FIG. 1) of Device B outputs the 1st zone entering notice data retrieved in the previous step from Speaker 216 (FIG. 1) and LCD 201 (FIG. 1) of Device B (S9). CPU 211 (FIG. 1) of Device B retrieves the map data from Map Data Storage Area 206B553b1 (S10). CPU 211 (FIG. 1) of Device B displays the map data retrieved in the previous step on LCD 201 (FIG. 1) of Device B (S11). CPU 211 (FIG. 1) of Device B retrieves the Device B location data from Device B Location Data Storage Area 206B553b3b (S12). CPU 211 (FIG. 1) of Device B retrieves the Device B icon image data from Device B Icon Image Data Storage Area 206B553b5b (S13). CPU 211 (FIG. 1) of Device B displays the Device B icon image data retrieved in the previous step at the location corresponding to the Device B location data retrieved in S12 on the map data displayed in S11 (S14). CPU 211 (FIG. 1) of Device B retrieves the Device A location data from Device A Location Data Storage Area 206B553b3a (S15). CPU 211 (FIG. 1) of Device B retrieves the Device A icon image data from Device A Icon Image Data Storage Area 206B553b5a (S16). CPU 211 (FIG. 1) of Device B displays the Device A icon image data retrieved in the previous step at the location corresponding to the Device A location data retrieved in S15 on the map data displayed in S11 (S17). Thus, the current geographic locations of Device A and Device B are displayed simultaneously on the map data. The foregoing sequence is repeated periodically.

This paragraph illustrate(s) 2nd Zone Entering Notice Data Outputting Software 206A553c8 of Device A and 2nd Zone Entering Notice Data Outputting Software 206B553c8 of Device B, which output(s) the 2nd zone entering notice data. In this embodiment, CPU 211 (FIG. 1) of Device B sends the Device A location data transferring request to Device A in a wireless fashion (S1). Here, the Device A location data transferring request is the request to transfer the Device A location data. CPU 211 (FIG. 1) of Device A receives the Device A location data transferring request from Device B in a wireless fashion (S2). CPU 211 (FIG. 1) of Device A retrieves the Device A location data from Device A Location Data Storage Area 206A553b3a and sends the data to Device B in a wireless fashion (S3). CPU 211 (FIG. 1) of Device B receives the Device A location data from Device A in a wireless fashion and stores the data in Device A Location Data Storage Area 206B553b3a (S4). CPU 211 (FIG. 1) of Device B retrieves the Device A location data from Device A Location Data Storage Area 206B553b3a (S5). CPU 211 (FIG. 1) of Device B retrieves the 2nd zone data from 2nd Zone Data Storage Area 206B553b2b (S6). If the Device A location data retrieved in S5 is located inside of the 2nd zone data retrieved in the previous step, CPU 211 (FIG. 1) of Device B proceeds to the next step (S7). CPU 211 (FIG. 1) of Device B retrieves the 2nd zone entering notice data from 2nd Zone Entering Notice Data Storage Area 206B553b4b (S8). CPU 211 (FIG. 1) of Device B outputs the 2nd zone entering notice data retrieved in the previous step from Speaker 216 (FIG. 1) and LCD 201 (FIG. 1) of Device B (S9). CPU 211 (FIG. 1) of Device B retrieves the map data from Map Data Storage Area 206B553*b*1 (S10). CPU 211 (FIG. 1) of Device B displays the map data retrieved in the previous step on LCD 201 (FIG. 1) of Device B (S11). CPU 211 (FIG. 1) of Device B retrieves the Device B location data from Device B Location Data Storage Area 206B553*b*3*b* (S12). CPU 211 (FIG. 1) of Device B retrieves the Device B icon image data from Device B Icon Image Data Storage Area 206B553*b*5*b* (S13). CPU 211 (FIG. 1) of Device B displays the Device B icon image data retrieved in the previous step at the location corresponding to the Device B location data retrieved in S12 on the map data displayed in S11 (S14). CPU 211 (FIG. 1) of Device B retrieves the Device A location data from Device A Location Data Storage Area 206B553*b*3*a* (S15). CPU 211 (FIG. 1) of Device B retrieves the Device A icon image data from Device A Icon Image Data Storage Area 206B553*b*5*a* (S16). CPU 211 (FIG. 1) of Device B displays the Device A icon image data retrieved in the previous step at the location corresponding to the Device A location data retrieved in S15 on the map data displayed in S11 (S17). Thus, the current geographic locations of Device A and Device B are displayed simultaneously on the map data. The foregoing sequence is repeated periodically.

This paragraph illustrate(s) 3rd Zone Entering Notice Data Outputting Software 206A553*c*9 of Device A and 3rd Zone Entering Notice Data Outputting Software 206B553*c*9 of Device B, which output(s) the 3rd zone entering notice data. In this embodiment, CPU 211 (FIG. 1) of Device B retrieves the Device B location data from Device B Location Data Storage Area 206B553*b*3*b* (S1). CPU 211 (FIG. 1) of Device B retrieves the 3rd zone data from 3rd Zone Data Storage Area 206B553*b*2*c* (S2). If the Device B location data retrieved in 51 is located inside of the 3rd zone data retrieved in the previous step, CPU 211 (FIG. 1) of Device B proceeds to the next step (S3). CPU 211 (FIG. 1) of Device B retrieves the 3rd zone entering notice data from 3rd Zone Entering Notice Data Storage Area 206B553*b*4*c* (S4). CPU 211 (FIG. 1) of Device B outputs the 3rd zone entering notice data retrieved in the previous step from Speaker 216 (FIG. 1) and LCD 201 (FIG. 1) of Device B (S5). CPU 211 (FIG. 1) of Device B sends the Device A location data transferring request to Device A in a wireless fashion (S6). Here, the Device A location data transferring request is the request to transfer the Device A location data. CPU 211 (FIG. 1) of Device A receives the Device A location data transferring request from Device B in a wireless fashion (S7). CPU 211 (FIG. 1) of Device A retrieves the Device A location data from Device A Location Data Storage Area 206A553*b*3*a* and sends the data to Device B in a wireless fashion (S8). CPU 211 (FIG. 1) of Device B receives the Device A location data from Device A in a wireless fashion and stores the data in Device A Location Data Storage Area 206B553*b*3*a* (S9). CPU 211 (FIG. 1) of Device B retrieves the map data from Map Data Storage Area 206B553*b*1 (S10). CPU 211 (FIG. 1) of Device B displays the map data retrieved in the previous step on LCD 201 (FIG. 1) of Device B (S11). CPU 211 (FIG. 1) of Device B retrieves the Device A location data from Device A Location Data Storage Area 206B553*b*3*a* (S12). CPU 211 (FIG. 1) of Device B retrieves the Device A icon image data from Device A Icon Image Data Storage Area 206B553*b*5*a* (S13). CPU 211 (FIG. 1) of Device B displays the Device A icon image data retrieved in the previous step at the location corresponding to the Device A location data retrieved in S12 on the map data displayed in S11 (S14). CPU 211 (FIG. 1) of Device B retrieves the Device B location data from Device B Location Data Storage Area 206B553*b*3*b* (S15). CPU 211 (FIG. 1) of Device B retrieves the Device B icon image data from Device B Icon Image Data Storage Area 206B553*b*5*b* (S16). CPU 211 (FIG. 1) of Device B displays the Device B icon image data retrieved in the previous step at the location corresponding to the Device B location data retrieved in S15 on the map data displayed in S11 (S17). Thus, the current geographic locations of Device A and Device B are displayed simultaneously on the map data. The foregoing sequence is repeated periodically.

This paragraph illustrate(s) 4th Zone Entering Notice Data Outputting Software 206A553*c*10 of Device A and 4th Zone Entering Notice Data Outputting Software 206B553*c*10 of Device B, which output(s) the 4th zone entering notice data. In this embodiment, CPU 211 (FIG. 1) of Device B retrieves the Device B location data from Device B Location Data Storage Area 206B553*b*3*b* (S1). CPU 211 (FIG. 1) of Device B retrieves the 4th zone data from 4th Zone Data Storage Area 206B553*b*2*d* (S2). If the Device B location data retrieved in 51 is located inside of the 4th zone data retrieved in the previous step, CPU 211 (FIG. 1) of Device B proceeds to the next step (S3). CPU 211 (FIG. 1) of Device B retrieves the 4th zone entering notice data from 4th Zone Entering Notice Data Storage Area 206B553*b*4*d* (S4). CPU 211 (FIG. 1) of Device B outputs the 4th zone entering notice data retrieved in the previous step from Speaker 216 (FIG. 1) and LCD 201 (FIG. 1) of Device B (S5). CPU 211 (FIG. 1) of Device B sends the Device A location data transferring request to Device A in a wireless fashion (S6). Here, the Device A location data transferring request is the request to transfer the Device A location data. CPU 211 (FIG. 1) of Device A receives the Device A location data transferring request from Device B in a wireless fashion (S7). CPU 211 (FIG. 1) of Device A retrieves the Device A location data from Device A Location Data Storage Area 206A553*b*3*a* and sends the data to Device B in a wireless fashion (S8). CPU 211 (FIG. 1) of Device B receives the Device A location data from Device A in a wireless fashion and stores the data in Device A Location Data Storage Area 206B553*b*3*a* (S9). CPU 211 (FIG. 1) of Device B retrieves the map data from Map Data Storage Area 206B553*b*1 (S10). CPU 211 (FIG. 1) of Device B displays the map data retrieved in the previous step on LCD 201 (FIG. 1) of Device B (S11). CPU 211 (FIG. 1) of Device B retrieves the Device A location data from Device A Location Data Storage Area 206B553*b*3*a* (S12). CPU 211 (FIG. 1) of Device B retrieves the Device A icon image data from Device A Icon Image Data Storage Area 206B553*b*5*a* (S13). CPU 211 (FIG. 1) of Device B displays the Device A icon image data retrieved in the previous step at the location corresponding to the Device A location data retrieved in S12 on the map data displayed in S11 (S14). CPU 211 (FIG. 1) of Device B retrieves the Device B location data from Device B Location Data Storage Area 206B553*b*3*b* (S15). CPU 211 (FIG. 1) of Device B retrieves the Device B icon image data from Device B Icon Image Data Storage Area 206B553*b*5*b* (S16). CPU 211 (FIG. 1) of Device B displays the Device B icon image data retrieved in the previous step at the location corresponding to the Device B location data retrieved in S15 on the map data displayed in S11 (S17). Thus, the current geographic locations of Device A and Device B are displayed simultaneously on the map data. The foregoing sequence is repeated periodically.

<<Power Off Notifying Function>>

The following paragraphs illustrate the power off notifying function, wherein when the power of Communication Device 200 is being turned off, the geographic location of Communication Device 200 is notified to another device. The map is displayed on another device and the geographic location of Communication Device 200 is indicated on the map. Further, the notification indicating that the power of Communication Device 200 is being turned off is output from another device.

This paragraph illustrates the major elements utilized to implement the present function. In this embodiment, Host H is connected to Network NT (e.g., the Internet). Device A, a Communication Device 200, is connected to Network NT (e.g., the Internet) in a wireless fashion. Device B, another Communication Device 200, is connected to Network NT (e.g., the Internet) in a wireless fashion. Host H, Device A, and Device B are capable to communicate with each other via Network NT (e.g., the Internet) to implement the present function. Device A and Device B are also capable to communicate with each other directly in a wireless fashion to implement the present function.

This paragraph illustrates the storage area included in Host H. In this embodiment, Host H includes Power Off Notifying Information Storage Area H554a of which the data and the software program(s) stored therein are described hereinafter.

This paragraph illustrates the storage area(s) included in Power Off Notifying Information Storage Area H554a. In this embodiment, Power Off Notifying Information Storage Area H554a includes Power Off Notifying Data Storage Area H554b and Power Off Notifying Software Storage Area H554c. Power Off Notifying Data Storage Area H554b stores the data necessary to implement the present function on the side of Host H, such as the one(s) described hereinafter. Power Off Notifying Software Storage Area H554c stores the software program(s) necessary to implement the present function on the side of Host H, such as the one(s) described hereinafter.

This paragraph illustrates the storage area(s) included in Power Off Notifying Data Storage Area H554b. In this embodiment, Power Off Notifying Data Storage Area H554b includes Map Data Storage Area H554b1, Party Location Data Storage Area H554b2, Party Icon Image Data Storage Area H554b3, Device Power Off Notice Data Storage Area H554b4, Party Location Notifying Data Storage Area H554b5, and Work Area H554b6. Map Data Storage Area H554b1 stores the map data which is the image data indicating a map. Party Location Data Storage Area H554b2 stores the data described hereinafter. Party Icon Image Data Storage Area H554b3 stores the data described hereinafter. Device Power Off Notice Data Storage Area H554b4 stores the data described hereinafter. Party Location Notifying Data Storage Area H554b5 stores the data described hereinafter. Work Area H554b6 is utilized as a work area to perform calculation and temporarily store data.

This paragraph illustrates the storage area(s) included in Party Location Data Storage Area H554b2. In this embodiment, Party Location Data Storage Area H554b2 includes 1st Location Data Storage Area H554b2a and 2nd Location Data Storage Area H554b2b. 1st Location Data Storage Area H554b2a stores the 1st location data which indicates the current geographic location of Device A in (x,y,z) format. 2nd Location Data Storage Area H554b2b stores the 2nd location data which indicates the current geographic location of Device B in (x,y,z) format.

This paragraph illustrates the storage area(s) included in Party Icon Image Data Storage Area H554b3. In this embodiment, Party Icon Image Data Storage Area H554b3 includes 1st Icon Image Data Storage Area H554b3a and 2nd Icon Image Data Storage Area H554b3b. 1st Icon Image Data Storage Area H554b3a stores the 1st icon image data which is the image data of the icon indicating the current geographic location of Device A on the map data. 2nd Icon Image Data Storage Area H554b3b stores the 2nd icon image data which is the image data of the icon indicating the current geographic location of Device B on the map data.

This paragraph illustrates the storage area(s) included in Device Power Off Notice Data Storage Area H554b4. In this embodiment, Device Power Off Notice Data Storage Area H554b4 includes 1st Power Off Notice Data Storage Area H554b4a and 2nd Power Off Notice Data Storage Area H554b4b. 1st Power Off Notice Data Storage Area H554b4a stores the 1st power off notice data which is the audiovisual data indicating that the power of Device A is turned off. 2nd Power Off Notice Data Storage Area H554b4b stores the 2nd power off notice data which is the audiovisual data indicating that the power of Device B is turned off.

This paragraph illustrates the storage area(s) included in Party Location Notifying Data Storage Area H554b5. In this embodiment, Party Location Notifying Data Storage Area H554b5 includes 1st Location Notifying Data Storage Area H554b5a and 2nd Location Notifying Data Storage Area H554b5b. 1st Location Notifying Data Storage Area H554b5a stores the 1st location notifying data which is the audiovisual data notifying that the current geographic location of Device A is displayed on Device B. 2nd Location Notifying Data Storage Area H554b5b stores the 2nd location notifying data which is the audiovisual data notifying that the current geographic location of Device B is displayed on Device A.

This paragraph illustrates the software program(s) stored in Power Off Notifying Software Storage Area H554c. In this embodiment, Power Off Notifying Software Storage Area H554c stores 1st Location Data Producing Software H554c1, 1st Power Off Notice Data Outputting Software H554c3, 2nd Power Off Notice Data Outputting Software H554c4, 1st Location Data Displaying Software H554c5, and 2nd Location Data Displaying Software H554c6. 1st Location Data Producing Software H554c1 is the software program described hereinafter. 1st Power Off Notice Data Outputting Software H554c3 is the software program described hereinafter. 2nd Power Off Notice Data Outputting Software H554c4 is the software program described hereinafter. 1st Location Data Displaying Software H554c5 is the software program described hereinafter. 2nd Location Data Displaying Software H554c6 is the software program described hereinafter.

This paragraph illustrates the storage area included in RAM 206 (FIG. 1) of Device A. In this embodiment, RAM 206 includes Power Off Notifying Information Storage Area 206A554a of which the data and the software program(s) stored therein are described hereinafter.

The data and/or the software program(s) necessary to implement the present function may be downloaded from Host H to Device A.

This paragraph illustrates the storage area(s) included in Power Off Notifying Information Storage Area 206A554a. In this embodiment, Power Off Notifying Information Storage Area 206A554a includes Power Off Notifying Data Storage Area 206A554b and Power Off Notifying Software Storage Area 206A554c. Power Off Notifying Data Storage Area 206A554b stores the data necessary to implement the present function on the side of Device A, such as the one(s) described hereinafter. Power Off Notifying Software Storage Area 206A554c stores the software program(s) necessary to implement the present function on the side of Device A, such as the one(s) described hereinafter.

This paragraph illustrates the storage area(s) included in Power Off Notifying Data Storage Area 206A554b. In this embodiment, Power Off Notifying Data Storage Area 206A554b includes Map Data Storage Area 206A554b1, Party Location Data Storage Area 206A554b2, Party Icon Image Data Storage Area 206A554b3, Device Power Off Notice Data Storage Area 206A554b4, Party Location Notifying Data Storage Area 206A554b5, and Work Area 206A554b6. Map Data Storage Area 206A554b1 stores the map data which is the image data indicating a map. Party Location Data Storage Area 206A554b2 stores the data described hereinafter. Party Icon Image Data Storage Area 206A554b3 stores the data described hereinafter. Device Power Off Notice Data Storage Area 206A554b4 stores the data described hereinafter. Party Location Notifying Data Storage Area 206A554b5 stores the data described hereinafter. Work Area 206A554b6 is utilized as a work area to perform calculation and temporarily store data.

This paragraph illustrates the storage area(s) included in Party Location Data Storage Area 206A554b2. In this embodiment, Party Location Data Storage Area 206A554b2 includes 1st Location Data Storage Area 206A554b2a and 2nd Location Data Storage Area 206A554b2b. 1st Location Data Storage Area 206A554b2a stores the 1st location data which indicates the current geographic location of Device A in (x,y,z) format. 2nd Location Data Storage Area 206A554b2b stores the 2nd location data which indicates the current geographic location of Device B in (x,y,z) format.

This paragraph illustrates the storage area(s) included in Party Icon Image Data Storage Area 206A554b3. In this embodiment, Party Icon Image Data Storage Area 206A554b3 includes 1st Icon Image Data Storage Area 206A554b3a and 2nd Icon Image Data Storage Area 206A554b3b. 1st Icon Image Data Storage Area 206A554b3a stores the 1st icon image data which is the image data of the icon indicating the current geographic location of Device A on the map data. 2nd Icon Image Data Storage Area 206A554b3b stores the 2nd icon image data which is the image data of the icon indicating the current geographic location of Device B on the map data.

This paragraph illustrates the storage area(s) included in Device Power Off Notice Data Storage Area 206A554b4. In this embodiment, Device Power Off Notice Data Storage Area 206A554b4 includes 1st Power Off Notice Data Storage Area 206A554b4a and 2nd Power Off Notice Data Storage Area 206A554b4b. 1st Power Off Notice Data Storage Area 206A554b4a stores the 1st power off notice data which is the audiovisual data indicating that the power of Device A is turned off. 2nd Power Off Notice Data Storage Area 206A554b4b stores the 2nd power off notice data which is the audiovisual data indicating that the power of Device B is turned off. This paragraph illustrates the storage area(s) included in Party Location Notifying Data Storage Area 206A554b5. In this embodiment, Party Location Notifying Data Storage Area 206A554b5 includes 1st Location Notifying Data Storage Area 206A554b5a and 2nd Location Notifying Data Storage Area 206A554b5b. 1st Location Notifying Data Storage Area 206A554b5a stores the 1st location notifying data which is the audiovisual data notifying that the current geographic location of Device A is displayed on Device B. 2nd Location Notifying Data Storage Area 206A554b5b stores the 2nd location notifying data which is the audiovisual data notifying that the current geographic location of Device B is displayed on Device A.

This paragraph illustrates the software program(s) stored in Power Off Notifying Software Storage Area 206A554c. In this embodiment, Power Off Notifying Software Storage Area 206A554c stores 1st Location Data Producing Software 206A554c1, 1st Power Off Notice Data Outputting Software 206A554c3, 2nd Power Off Notice Data Outputting Software 206A554c4, 1st Location Data Displaying Software 206A554c5, and 2nd Location Data Displaying Software 206A554c6. 1st Location Data Producing Software 206A554c1 is the software program described hereinafter. 1st Power Off Notice Data Outputting Software 206A554c3 is the software program described hereinafter. 2nd Power Off Notice Data Outputting Software 206A554c4 is the software program described hereinafter. 1st Location Data Displaying Software 206A554c5 is the software program described hereinafter. 2nd Location Data Displaying Software 206A554c6 is the software program described hereinafter.

This paragraph illustrates the storage area included in RAM 206 (FIG. 1) of Device B. In this embodiment, RAM 206 includes Power Off Notifying Information Storage Area 206B554a of which the data and the software program(s) stored therein are described hereinafter.

The data and/or the software program(s) necessary to implement the present function may be downloaded from Host H to Device B.

This paragraph illustrates the storage area(s) included in Power Off Notifying Information Storage Area 206B554a. In this embodiment, Power Off Notifying Information Storage Area 206B554a includes Power Off Notifying Data Storage Area 206B554b and Power Off Notifying Software Storage Area 206B554c. Power Off Notifying Data Storage Area 206B554b stores the data necessary to implement the present function on the side of Device B, such as the one(s) described hereinafter. Power Off Notifying Software Storage Area 206B554c stores the software program(s) necessary to implement the present function on the side of Device B, such as the one(s) described hereinafter.

This paragraph illustrates the storage area(s) included in Power Off Notifying Data Storage Area 206B554b. In this embodiment, Power Off Notifying Data Storage Area 206B554b includes Map Data Storage Area 206B554b1, Party Location Data Storage Area 206B554b2, Party Icon Image Data Storage Area 206B554b3, Device Power Off Notice Data Storage Area 206B554b4, Party Location Notifying Data Storage Area 206B554b5, and Work Area 206B554b6. Map Data Storage Area 206B554b1 stores the map data which is the image data indicating a map. Party Location Data Storage Area 206B554b2 stores the data described hereinafter. Party Icon Image Data Storage Area 206B554b3 stores the data described hereinafter. Device Power Off Notice Data Storage Area 206B554b4 stores the data described hereinafter. Party Location Notifying Data Storage Area 206B554b5 stores the data described hereinafter. Work Area 206B554b6 is utilized as a work area to perform calculation and temporarily store data.

This paragraph illustrates the storage area(s) included in Party Location Data Storage Area 206B554b2. In this embodiment, Party Location Data Storage Area 206B554b2 includes 1st Location Data Storage Area 206B554b2a and 2nd Location Data Storage Area 206B554b2b. 1st Location Data Storage Area 206B554b2a stores the 1st location data which indicates the current geographic location of Device A in (x,y,z) format. 2nd Location Data Storage Area 206B554b2b stores the 2nd location data which indicates the current geographic location of Device B in (x,y,z) format.

This paragraph illustrates the storage area(s) included in Party Icon Image Data Storage Area 206B554b3. In this embodiment, Party Icon Image Data Storage Area 206B554b3 includes 1st Icon Image Data Storage Area 206B554b3a and 2nd Icon Image Data Storage Area 206B554b3b. 1st Icon Image Data Storage Area 206B554b3a stores the 1st icon image data which is the image data of the icon indicating the current geographic location of Device A on the map data. 2nd Icon Image Data Storage Area 206B554b3b stores the 2nd icon image data which is the image data of the icon indicating the current geographic location of Device B on the map data.

This paragraph illustrates the storage area(s) included in Device Power Off Notice Data Storage Area 206B554b4. In this embodiment, Device Power Off Notice Data Storage Area 206B554b4 includes 1st Power Off Notice Data Storage Area 206B554b4a and 2nd Power Off Notice Data Storage Area 206B554b4b. 1st Power Off Notice Data Storage Area 206B554b4a stores the 1st power off notice data which is the audiovisual data indicating that the power of Device A is turned off. 2nd Power Off Notice Data Storage Area 206B554b4b stores the 2nd power off notice data which is the audiovisual data indicating that the power of Device B is turned off.

This paragraph illustrates the storage area(s) included in Party Location Notifying Data Storage Area 206B554b5. In this embodiment, Party Location Notifying Data Storage Area 206B554b5 includes 1st Location Notifying Data Storage Area 206B554b5a and 2nd Location Notifying Data Storage Area 206B554b5b. 1st Location Notifying Data Storage Area 206B554b5a stores the 1st location notifying data which is the audiovisual data notifying that the current geographic location of Device A is displayed on Device B. 2nd Location Notifying Data Storage Area 206B554b5b stores the 2nd location notifying data which is the audiovisual data notifying that the current geographic location of Device B is displayed on Device A.

This paragraph illustrates the software program(s) stored in Power Off Notifying Software Storage Area 206B554c. In this embodiment, Power Off Notifying Software Storage Area 206B554c stores 2nd Location Data Producing Software 206B554c2, 1st Power Off Notice Data Outputting Software 206B554c3, 2nd Power Off Notice Data Outputting Software 206B554c4, 1st Location Data Displaying Software 206B554c5, and 2nd Location Data Displaying Software 206B554c6. 2nd Location Data Producing Software 206B554c2 is the software program described hereinafter. 1st Power Off Notice Data Outputting Software 206B554c3 is the software program described hereinafter. 2nd Power Off Notice Data Outputting Software 206B554c4 is the software program described hereinafter. 1st Location Data Displaying Software 206B554c5 is the software program described hereinafter. 2nd Location Data Displaying Software 206B554c6 is the software program described hereinafter.

This paragraph illustrate(s) 1st Location Data Producing Software H554c1 of Host H and 1st Location Data Producing Software 206A554c1 of Device A, which produces) the 1st location data. In this embodiment, CPU 211 (FIG. 1) of Device A identifies the current location of Device A (S1). CPU 211 (FIG. 1) of Device A produces the 1st location data by utilizing the current location identified in the previous step and sends the data to Host H in a wireless fashion (S2). Host H receives the 1st location data from Device A and stores the data in 1st Location Data Storage Area H554b2a (S3). The foregoing sequence is repeated periodically.

This paragraph illustrate(s) 2nd Location Data Producing Software 206B554c2 of Device B, which produce(s) the 2nd location data. In this embodiment, CPU 211 (FIG. 1) of Device B identifies the current location of Device B (S1). CPU 211 (FIG. 1) of Device B produces the 2nd location data by utilizing the current location identified in the previous step (S2). CPU 211 (FIG. 1) of Device B stores the 2nd location data produced in the previous step in 2nd Location Data Storage Area 206B554b2b (S3). The foregoing sequence is repeated periodically.

This paragraph illustrate(s) 1st Power Off Notice Data Outputting Software H554c3 of Host H, 1st Power Off Notice Data Outputting Software 206A554c3 of Device A, and 1st Power Off Notice Data Outputting Software 206B554c3 of Device B, which output(s) the 1st power off notice data. In this embodiment, CPU 211 (FIG. 1) of Device A identifies the current status of power management of Device A (S1). If the power of Device A is in the process of being turned off, CPU 211 (FIG. 1) of Device A proceeds to the next step (S2). CPU 211 (FIG. 1) of Device A sends the 1st power off notification to Host H in a wireless fashion (S3). Here, the 1st power off notification indicates that Device A is turning off its power. Host H receives the 1st power off notification from Device A (S4). Host H retrieves the 1st power off notice data from 1st Power Off Notice Data Storage Area H554b4a and sends the data to Device A (S5). CPU 211 (FIG. 1) of Device A receives the 1st power off notice data from Host H in a wireless fashion and outputs the data from Speaker 216 (FIG. 1) and LCD 201 (FIG. 1) of Device A (S6). Host H sends the 1st power off notification to Device B (S7). Here, the 1st power off notification indicates that Device A is turning off its power. CPU 211 (FIG. 1) of Device B receives the 1st power off notification from Host H in a wireless fashion (S8). CPU 211 (FIG. 1) of Device B retrieves the 1st power off notice data from 1st Power Off Notice Data Storage Area 206B554b4a (S9). CPU 211 (FIG. 1) of Device B outputs the 1st power off notice data retrieved in the previous step from Speaker 216 (FIG. 1) and LCD 201 (FIG. 1) of Device B (S10). The foregoing sequence is repeated periodically.

This paragraph illustrate(s) 2nd Power Off Notice Data Outputting Software H554c4 of Host H, 2nd Power Off Notice Data Outputting Software 206A554c4 of Device A, and 2nd Power Off Notice Data Outputting Software 206B554c4 of Device B, which output(s) the 2nd power off notice data. In this embodiment, CPU 211 (FIG. 1) of Device B identifies the current status of power management of Device B (S1). If the power of Device B is in the process of being turned off, CPU 211 (FIG. 1) of Device B proceeds to the next step (S2). CPU 211 (FIG. 1) of Device B retrieves the 2nd power off notice data from 2nd Power Off Notice Data Storage Area 206B554b4b (S3). CPU 211 (FIG. 1) of Device B outputs the 2nd power off notice data retrieved in the previous step from Speaker 216 (FIG. 1) and LCD 201 (FIG. 1) of Device B (S4). CPU 211 (FIG. 1) of Device B sends the 2nd power off notification to Host H in a wireless fashion (S5). Here, the 2nd power off notification indicates that Device B is turning off its power. Host H receives the 2nd power off notification from Device B (S6). Host H retrieves the 2nd power off notice data from 2nd Power Off Notice Data Storage Area H554b4b and sends the data to Device A (S7). CPU 211 (FIG. 1) of Device A receives the 2nd power off notice data from Host H in a wireless fashion and outputs the data from Speaker 216 (FIG. 1) and LCD 201 (FIG. 1) of Device A (S8). The foregoing sequence is repeated periodically.

This paragraph illustrate(s) 1st Location Data Displaying Software H554c5 of Host H, 1st Location Data Displaying Software 206A554c5 of Device A, and 1st Location Data Displaying Software 206B554c5 of Device B, which display(s) the 1st location data. In this embodiment, CPU 211 (FIG. 1) of Device A identifies the current status of power management of Device A (S1). If the power of Device A is in the process of being turned of CPU 211 (FIG. 1) of Device A proceeds to the next step (S2). CPU 211 (FIG. 1) of Device A sends the 1st power off notification to Host H in a wireless fashion (S3). Here, the 1st power off notification indicates that Device A is turning off its power. Host H receives the 1st power off notification from Device A (S4). Host H retrieves the map data from Map Data Storage Area H554b1 and sends the data to Device A (S5). CPU 211 (FIG. 1) of Device A receives the map data from Host H in a wireless fashion and displays the data on LCD 201 (FIG. 1) of Device A (S6). Host H retrieves the 1st location data from 1st Location Data Storage Area H554b2a and sends the data to Device A (S7). CPU 211 (FIG. 1) of Device A receives the 1st location data from Host H in a wireless fashion (S8). Host H retrieves the 1st icon image data from 1st Icon Image Data Storage Area H554b3a and sends the data to Device A (S9). CPU 211 (FIG. 1) of Device A receives the 1st icon image data from Host H in a wireless fashion (S10). CPU 211 (FIG. 1) of Device A displays the 1st icon image data received in the previous step at the location corresponding to the 1st location data received in S8 on the map data displayed in S6 (S11). Host H retrieves the 1st location data from 1st Location Data Storage Area H554b2a and sends the data to Device B (S12). CPU 211 (FIG. 1) of Device B receives the 1st location data from Host H in a wireless fashion and stores the data in 1st Location Data Storage Area 206B554b2a (S13). CPU 211 (FIG. 1) of Device B retrieves the map data from Map Data Storage Area 206B554b1 (S14). CPU 211 (FIG. 1) of Device B displays the map data retrieved in the previous step on LCD 201 (FIG. 1) of Device B (S15). CPU 211 (FIG. 1) of Device B retrieves the 1st location data from 1st Location Data Storage Area 206B554b2a (S16). CPU 211 (FIG. 1) of Device B retrieves the 1st icon image data from 1st Icon Image Data Storage Area 206B554b3a (S17). CPU 211 (FIG. 1) of Device B displays the 1st icon image data retrieved in the previous step at the location corresponding to the 1st location data retrieved in S16 on the map data displayed in S15 (S18). CPU 211 (FIG. 1) of Device B retrieves the 1st location notifying data from 1st Location Notifying Data Storage Area 206B554b5a (S19). CPU 211 (FIG. 1) of Device B outputs the 1st location notifying data retrieved in the previous step from Speaker 216 (FIG. 1) and LCD 201 (FIG. 1) of Device B (S20). CPU 211 (FIG. 1) of Device B sends the 1st location notification to Host H in a wireless fashion (S21). Here, the 1st location notification indicates that the current geographic location of Device A is displayed on Device B. Host H receives the 1st location notification from Device B (S22). Host H retrieves the 1st location notifying data from 1st Location Notifying Data Storage Area H554b5a and sends the data to Device A (S23). CPU 211 (FIG. 1) of Device A receives the 1st location notifying data from Host H in a wireless fashion and outputs the data from Speaker 216 (FIG. 1) and LCD 201 (FIG. 1) of Device A (S24). The foregoing sequence is repeated periodically.

This paragraph illustrate(s) 2nd Location Data Displaying Software H554c6 of Host H, 2nd Location Data Displaying Software 206A554c6 of Device A, and 2nd Location Data Displaying Software 206B554c6 of Device B, which display(s) the 2nd location data. In this embodiment, CPU 211 (FIG. 1) of Device B identifies the current status of power management of Device B (S1). If the power of Device B is in the process of being turned of CPU 211 (FIG. 1) of Device B proceeds to the next step (S2). CPU 211 (FIG. 1) of Device B retrieves the map data from Map Data Storage Area 206B554b1 (S3). CPU 211 (FIG. 1) of Device B displays the map data retrieved in the previous step on LCD 201 (FIG. 1) of Device B (S4). CPU 211 (FIG. 1) of Device B retrieves the 2nd location data from 2nd Location Data Storage Area 206B554b2b (S5). CPU 211 (FIG. 1) of Device B retrieves the 2nd icon image data from 2nd Icon Image Data Storage Area 206B554b3b (S6). CPU 211 (FIG. 1) of Device B displays the 2nd icon image data retrieved in the previous step at the location corresponding to the 2nd location data retrieved in S5 on the map data displayed in S4 (S7). CPU 211 (FIG. 1) of Device B retrieves the 2nd location data from 2nd Location Data Storage Area 206B554b2b and sends the data to Host H in a wireless fashion (S 8). Host H receives the 2nd location data from Device B and stores the data in 2nd Location Data Storage Area H554b2b (S9). Host H retrieves the map data from Map Data Storage Area H554b1 and sends the data to Device A (S10). CPU 211 (FIG. 1) of Device A receives the map data from Host H in a wireless fashion and displays the data on LCD 201 (FIG. 1) of Device A (S11). Host H retrieves the 2nd location data from 2nd Location Data Storage Area H554b2b and sends the data to Device A (S12). CPU 211 (FIG. 1) of Device A receives the 2nd location data from Host H in a wireless fashion (S13). Host H retrieves the 2nd icon image data from 2nd Icon Image Data Storage Area H554b3b and sends the data to Device A (S14). CPU 211 (FIG. 1) of Device A receives the 2nd icon image data from Host H in a wireless fashion (S15). CPU 211 (FIG. 1) of Device A displays the 2nd icon image data received in the previous step at the location corresponding to the 2nd location data received in S13 on the map data displayed in S11 (S16). Host H retrieves the 2nd location notifying data from 2nd Location Notifying Data Storage Area H554b5b and sends the data to Device A (S17). CPU 211 (FIG. 1) of Device A receives the 2nd location notifying data from Host H in a wireless fashion and outputs the data from Speaker 216 (FIG. 1) and LCD 201 (FIG. 1) of Device A (S18). Host H sends the 2nd location notification to Device B (S19). Here, the 2nd location notification indicates that the current geographic location of Device B is displayed on Device A. CPU 211 (FIG. 1) of Device B receives the 2nd location notification from Host H in a wireless fashion (S20). CPU 211 (FIG. 1) of Device B retrieves the 2nd location notifying data from 2nd Location Notifying Data Storage Area 206B554b5b (S21). CPU 211 (FIG. 1) of Device B outputs the 2nd location notifying data retrieved in the previous step from Speaker 216 (FIG. 1) and LCD 201 (FIG. 1) of Device B (S22). The foregoing sequence is repeated periodically.

The following paragraphs illustrate another embodiment wherein Device A plays the major role in implementing the present function.

This paragraph illustrate(s) 1st Location Data Producing Software 206A554c1 of Device A, which produce(s) the 1st location data. In this embodiment, CPU 211 (FIG. 1) of Device A identifies the current location of Device A (S1). CPU 211 (FIG. 1) of Device A produces the 1st location data by utilizing the current location identified in the previous step (S2). CPU 211 (FIG. 1) of Device A stores the 1st location data produced in the previous step in 1st Location Data Storage Area 206A554b2a (S3). The foregoing sequence is repeated periodically.

This paragraph illustrate(s) 2nd Location Data Producing Software 206B554c2 of Device B, which produce(s) the 2nd location data. In this embodiment, CPU 211 (FIG. 1) of Device B identifies the current location of Device B (S1). CPU 211 (FIG. 1) of Device B produces the 2nd location data by utilizing the current location identified in the previous step (S2). CPU 211 (FIG. 1) of Device B stores the 2nd location data produced in the previous step in 2nd Location Data Storage Area 206B554b2b (S3). The foregoing sequence is repeated periodically.

This paragraph illustrate(s) 1st Power Off Notice Data Outputting Software 206A554c3 of Device A and 1st Power Off Notice Data Outputting Software 206B554c3 of Device B, which output(s) the 1st power off notice data. In this embodiment, CPU 211 (FIG. 1) of Device A identifies the current status of power management of Device A (S1). If the power of Device A is in the process of being turned off, CPU 211 (FIG. 1) of Device A proceeds to the next step (S2). CPU 211 (FIG. 1) of Device A retrieves the 1st power off notice data from 1st Power Off Notice Data Storage Area 206A554b4a (S3). CPU 211 (FIG. 1) of Device A outputs the 1st power off notice data retrieved in the previous step from Speaker 216 (FIG. 1) and LCD 201 (FIG. 1) of Device A (S4). CPU 211 (FIG. 1) of Device A sends the 1st power off notification to Device B in a wireless fashion (S5). Here, the 1st power off notification indicates that Device A is turning off its power. CPU 211 (FIG. 1) of Device B receives the 1st power off notification from Device A in a wireless fashion (S6). CPU 211 (FIG. 1) of Device B retrieves the 1st power off notice data from 1st Power Off Notice Data Storage Area 206B554b4a (S7). CPU 211 (FIG. 1) of Device B outputs the 1st power off notice data retrieved in the previous step from Speaker 216 (FIG. 1) and LCD 201 (FIG. 1) of Device B (S8). The foregoing sequence is repeated periodically.

This paragraph illustrate(s) 2nd Power Off Notice Data Outputting Software 206A554c4 of Device A and 2nd Power Off Notice Data Outputting Software 206B554c4 of Device B, which output(s) the 2nd power off notice data. In this embodiment, CPU 211 (FIG. 1) of Device B identifies the current status of power management of Device B (S1). If the power of Device B is in the process of being turned off, CPU 211 (FIG. 1) of Device B proceeds to the next step (S2). CPU 211 (FIG. 1) of Device B retrieves the 2nd power off notice data from 2nd Power Off Notice Data Storage Area 206B554b4b (S3). CPU 211 (FIG. 1) of Device B outputs the 2nd power off notice data retrieved in the previous step from Speaker 216 (FIG. 1) and LCD 201 (FIG. 1) of Device B (S4). CPU 211 (FIG. 1) of Device B sends the 2nd power off notification to Device A in a wireless fashion (S5). Here, the 2nd power off notification indicates that Device B is turning off its power. CPU 211 (FIG. 1) of Device A receives the 2nd power off notification from Device B in a wireless fashion (S6). CPU 211 (FIG. 1) of Device A retrieves the 2nd power off notice data from 2nd Power Off Notice Data Storage Area 206A554b4b (S7). CPU 211 (FIG. 1) of Device A outputs the 2nd power off notice data retrieved in the previous step from Speaker 216 (FIG. 1) and LCD 201 (FIG. 1) of Device A (S8). The foregoing sequence is repeated periodically.

This paragraph illustrate(s) 1st Location Data Displaying Software 206A554c5 of Device A and 1st Location Data Displaying Software 206B554c5 of Device B, which display(s) the 1st location data. In this embodiment, CPU 211 (FIG. 1) of Device A identifies the current status of power management of Device A (S1). If the power of Device A is in the process of being turned of CPU 211 (FIG. 1) of Device A proceeds to the next step (S2). CPU 211 (FIG. 1) of Device A retrieves the map data from Map Data Storage Area 206A554b1 (S3). CPU 211 (FIG. 1) of Device A displays the map data retrieved in the previous step on LCD 201 (FIG. 1) of Device A (S4). CPU 211 (FIG. 1) of Device A retrieves the 1st location data from 1st Location Data Storage Area 206A554b2a (S5). CPU 211 (FIG. 1) of Device A retrieves the 1st icon image data from 1st Icon Image Data Storage Area 206A554b3a (S6). CPU 211 (FIG. 1) of Device A displays the 1st icon image data retrieved in the previous step at the location corresponding to the 1st location data retrieved in S5 on the map data displayed in S4 (S7). CPU 211 (FIG. 1) of Device A retrieves the 1st location data from 1st Location Data Storage Area 206A554b2a and sends the data to Device B in a wireless fashion (S8). CPU 211 (FIG. 1) of Device B receives the 1st location data from Device A in a wireless fashion and stores the data in 1st Location Data Storage Area 206B554b2a (S9). CPU 211 (FIG. 1) of Device B retrieves the map data from Map Data Storage Area 206B554b1 (S10).

CPU 211 (FIG. 1) of Device B displays the map data retrieved in the previous step on LCD 201 (FIG. 1) of Device B (S11). CPU 211 (FIG. 1) of Device B retrieves the 1st location data from 1st Location Data Storage Area 206B554b2a (S12). CPU 211 (FIG. 1) of Device B retrieves the 1st icon image data from 1st Icon Image Data Storage Area 206B554b3a (S13). CPU 211 (FIG. 1) of Device B displays the 1st icon image data retrieved in the previous step at the location corresponding to the 1st location data retrieved in S12 on the map data displayed in S11 (S14). CPU 211 (FIG. 1) of Device B retrieves the 1st location notifying data from 1st Location Notifying Data Storage Area 206B554b5a (S15). CPU 211 (FIG. 1) of Device B outputs the 1st location notifying data retrieved in the previous step from Speaker 216 (FIG. 1) and LCD 201 (FIG. 1) of Device B (S16). CPU 211 (FIG. 1) of Device B sends the 1st location notification to Device A in a wireless fashion (S17). Here, the 1st location notification indicates that the current geographic location of Device A is displayed on Device B. CPU 211 (FIG. 1) of Device A receives the 1st location notification from Device B in a wireless fashion (S18). CPU 211 (FIG. 1) of Device A retrieves the 1st location notifying data from 1st Location Notifying Data Storage Area 206A554b5a (S19). CPU 211 (FIG. 1) of Device A outputs the 1st location notifying data retrieved in the previous step from Speaker 216 (FIG. 1) and LCD 201 (FIG. 1) of Device A (S20). The foregoing sequence is repeated periodically.

This paragraph illustrate(s) 2nd Location Data Displaying Software 206A554c6 of Device A and 2nd Location Data Displaying Software 206B554c6 of Device B, which display(s) the 2nd location data. In this embodiment, CPU 211 (FIG. 1) of Device B identifies the current status of power management of Device B (S1). If the power of Device B is in the process of being turned of CPU 211 (FIG. 1) of Device B proceeds to the next step (S2). CPU 211 (FIG. 1) of Device B retrieves the map data from Map Data Storage Area 206B554b1 (S3). CPU 211 (FIG. 1) of Device B displays the map data retrieved in the previous step on LCD 201 (FIG. 1) of Device B (S4). CPU 211 (FIG. 1) of Device B retrieves the 2nd location data from 2nd Location Data Storage Area 206B554b2b (S5). CPU 211 (FIG. 1) of Device B retrieves the 2nd icon image data from 2nd Icon Image Data Storage Area 206B554b3b (S6). CPU 211 (FIG. 1) of Device B displays the 2nd icon image data retrieved in the previous step at the location corresponding to the 2nd location data retrieved in S5 on the map data displayed in S4 (S7). CPU 211 (FIG. 1) of Device B retrieves the 2nd location data from 2nd Location Data Storage Area 206B554b2b and sends the data to Device A in a wireless fashion (S8). CPU 211 (FIG. 1) of Device A receives the 2nd location data from Device B in a wireless fashion and stores the data in 2nd Location Data Storage Area 206A554b2b (S9). CPU 211 (FIG. 1) of Device A retrieves the map data from Map Data Storage Area 206A554b1 (S10). CPU 211 (FIG. 1) of Device A displays the map data retrieved in the previous step on LCD 201 (FIG. 1) of Device A (S11). CPU 211 (FIG. 1) of Device A retrieves the 2nd location data from 2nd Location Data Storage Area 206A554b2b (S12). CPU 211 (FIG. 1) of Device A retrieves the 2nd icon image data from 2nd Icon Image Data Storage Area 206A554b3b (S13). CPU 211 (FIG. 1) of Device A displays the 2nd icon image data retrieved in the previous step at the location corresponding to the 2nd location data retrieved in S12 on the map data displayed in S11 (S14). CPU 211 (FIG. 1) of Device A retrieves the 2nd location notifying data from 2nd Location Notifying Data Storage Area 206A554b5b (S15). CPU 211 (FIG. 1) of Device A outputs the 2nd location notifying data retrieved in the previous step from Speaker 216 (FIG. 1) and LCD 201 (FIG. 1) of Device A (S16). CPU 211 (FIG. 1) of Device A sends the 2nd location notification to Device B in a wireless fashion (S17). Here, the 2nd location notification indicates that the current geographic location of Device B is displayed on Device A. CPU 211 (FIG. 1) of Device B receives the 2nd location notification from Device A in a wireless fashion (S18). CPU 211 (FIG. 1) of Device B retrieves the 2nd location notifying data from 2nd Location Notifying Data Storage Area 206B554*b*5*b* (S19). CPU 211 (FIG. 1) of Device B outputs the 2nd location notifying data retrieved in the previous step from Speaker 216 (FIG. 1) and LCD 201 (FIG. 1) of Device B (S20). The foregoing sequence is repeated periodically.

<<Multiple Mode Implementing Function>>

The following paragraphs illustrate the multiple mode implementing function of Communication Device 200 which enables to activate and implement a plurality of modes, functions, and/or systems described in this specification simultaneously.

This paragraph illustrates the software programs stored in RAM 206 (FIG. 1) to implement the multiple mode implementing function (FIG. 1). In this embodiment, RAM 206 includes Multiple Mode Implementer Storage Area 20690*a*. Multiple Mode Implementer Storage Area 20690*a* stores Multiple Mode Implementer 20690*b*, Mode List Displaying Software 20690*c*, Mode Selecting Software 20690*d*, Mode Activating Software 20690*e*, and Mode Implementation Repeater 20690*f*, all of which are software programs. Multiple Mode Implementer 20690*b* administers the overall implementation of the present function. One of the major tasks of Multiple Mode Implementer 20690*b* is to administer and control the timing and sequence of Mode List Displaying Software 20690*c*, Mode Selecting Software 20690*d*, Mode Activating Software 20690*e*, and Mode Implementation Repeater 20690*f*. For example, Multiple Mode Implementer 20690*b* executes them in the following order: Mode List Displaying Software 20690*c*, Mode Selecting Software 20690*d*, Mode Activating Software 20690*e*, and Mode Implementation Repeater 20690*f*. Mode List Displaying Software 20690*c* displays on LCD 201 (FIG. 1) a list of a certain amount or all modes, functions, and/or systems explained in this specification of which the sequence is explained hereinafter. Mode Selecting Software 20690*d* selects a certain amount or all modes, functions, and/or systems explained in this specification of which the sequence is explained hereinafter. Mode Activating Software 20690*e* activates a certain amount or all modes, functions, and/or systems selected by the Mode Selecting Software 20690*d* of which the sequence is explained hereinafter. Mode Implementation Repeater 20690*f* executes Multiple Mode Implementer 20690*b* which reactivates Mode List Displaying Software 20690*c*, Mode Selecting Software 20690*d*, Mode Activating Software 20690*e* of which the sequence is explained hereinafter.

This paragraph illustrates the sequence of Mode List Displaying Software 20690*c*. In this embodiment, CPU 211 (FIG. 1), under the command of Mode List Displaying Software 20690*c*, displays a list of a certain amount or all modes, functions, and/or systems described in this specification on LCD 201 (FIG. 1).

This paragraph illustrates the sequence of Mode Selecting Software 20690*d*. In this embodiment, the user of Communication Device 200 inputs an input signal by utilizing Input Device 210 (FIG. 1) or via voice recognition system identifying one of the modes, functions, and/or systems displayed on LCD 201 (FIG. 1) (S1), and CPU 211 (FIG. 1), under the command of Mode Selecting Software 20690*d*, interprets the input signal and selects the corresponding mode, function, or system (S2).

This paragraph illustrates the sequence of Mode Activating Software 20690*e*. In this embodiment, CPU 211 (FIG. 1), under the command of Mode Activating Software 20690*e*, activates the mode, function, or, system selected in S2 described in the previous paragraph. CPU 211 thereafter implements the activated mode, function, or system as described in the relevant paragraphs in this specification.

This paragraph illustrates the sequence of Mode Implementation Repeater 20690*f*. In this embodiment, the user of Communication Device 200 inputs an input signal by utilizing Input Device 210 (FIG. 1) or via voice recognition system (S1). Once the activation of the selected mode, function, or system described hereinbefore is completed, and if the input signal indicates to repeat the process to activate another mode, function, or system (S2), CPU 211 (FIG. 1), under the command of Mode Implementation Repeater 20690*f*, executes Multiple Mode Implementer 20690*b*, which reactivates Mode List Displaying Software 20690*c*, Mode Selecting Software 20690*d*, and Mode Activating Software 20690*e* to activate the second mode, function, or system while the first mode, function, or system is implemented by utilizing the method of so-called 'time sharing' (S3). Mode List Displaying Software 20690*c*, Mode Selecting Software 20690*d*, and Mode Activating Software 20690*e* can be repeatedly executed until all modes, function, and systems displayed on LCD 201 (FIG. 1) are selected and activated. The activation of modes, functions, and/or systems is not repeated if the input signal explained in S2 so indicates.

As another embodiment, Multiple Mode Implementer 20690*b*, Mode List Displaying Software 20690*c*, Mode Selecting Software 20690*d*, Mode Activating Software 20690*e*, and Mode Implementation Repeater 20690*f* described hereinbefore may be integrated into one software program, Multiple Mode Implementer 20690*b*. In this embodiment, CPU 211 (FIG. 1), first of all, displays a list of a certain amount or all modes, functions, and/or systems described in this specification on LCD 201 (FIG. 1) (S1). Next, the user of Communication Device 200 inputs an input signal by utilizing Input Device 210 (FIG. 1) or via voice recognition system identifying one of the modes, functions, and/or systems displayed on LCD 201 (S2), and CPU 211 interprets the input signal and selects the corresponding mode, function, or system (S3). CPU 211 activates the mode, function, or system selected in S3, and thereafter implements the activated mode, function, or system as described in the relevant paragraphs in this specification (S4). Once the activation of the selected mode, function, or system described in S4 is completed, the user of Communication Device 200 inputs an input signal by utilizing Input Device 210 or via voice recognition system (S5). If the input signal indicates to repeat the process to activate another mode, function, or system (S6), CPU 211 repeats the steps S1 through S4 to activate the second mode, function, or system while the first mode, function, or system is implemented by utilizing the method so-called 'time sharing'. The steps of S1 though S4 can be repeatedly executed until all modes, function, and systems displayed on LCD 201 are selected and activated. The activation of modes, functions, and/or systems is not repeated if the input signal explained in S5 so indicates. As another embodiment, before or at the time one software program is activated, CPU 211 may, either automatically or manually (i.e., by a signal input by the user of Communication Device), terminate the other software programs already activated or prohibit other software programs to be activated while one software program is implemented in order to save the limited space of RAM 206, thereby allowing only one software program implemented at a time. For the avoidance of doubt, the meaning of each term 'mode(s)', 'function(s)', and 'system(s)' is equivalent to the others in this specification. Namely, the meaning of 'mode(s)' includes and is equivalent to that of 'function(s)' and 'system(s)', the meaning of 'function(s)' includes and is equivalent to that of 'mode(s)' and 'system(s)', and the meaning of 'system(s)' includes and is equivalent to that of 'mode(s)' and 'function(s)'. Therefore, even only mode(s) is expressly utilized in this specification, it impliedly includes function(s) and/or system(s) by its definition.

<<Incorporation By Reference>>

The following paragraphs and drawings described in U.S. Ser. No. 11/423,432 filed 2006-06-10 are incorporated to this application by reference: the preamble described in paragraph [2149] (no drawings); Communication Device 200 (Voice Communication Mode) described in paragraphs [2150] through [2155] (FIGS. 1 through 2c); Voice Recognition System described in paragraphs [2156] through [2188] (FIGS. 3 through 19); Positioning System described in paragraphs [2189] through [2220] (FIGS. 20a through 32e); Auto Backup System described in paragraphs [2221] through [2230] (FIGS. 33 through 37); Signal Amplifier described in paragraphs [2231] through [2236] (FIG. 38); Audio/Video Data Capturing System described in paragraphs [2237] through [2249] (FIGS. 39 through 44b); Digital Mirror Function (1) described in paragraphs [2250] through [2258] (FIGS. 44c through 44e); Caller ID System described in paragraphs [2259] through [2266] (FIGS. 45 through 47); Stock Purchasing Function described in paragraphs [2267] through [2276] (FIGS. 48 through 52); Timer Email Function described in paragraphs [2277] through [2283] (FIGS. 53a and 53b); Call Blocking Function described in paragraphs [2284] through [2297] (FIGS. 54 through 59); Online Payment Function described in paragraphs [2298] through [2307] (FIGS. 60 through 64); Navigation System described in paragraphs [2308] through [2330] (FIGS. 65 through 74a); Remote Controlling System described in paragraphs [2331] through [2349] (FIGS. 75 through 85); Auto Emergency Calling System described in paragraphs [2350] through [2358] (FIGS. 86 and 87); Cellular TV Function described in paragraphs [2359] through [2443] (FIGS. 88 through 135); 3D Video Game Function described in paragraphs [2444] through [2456] (FIGS. 136 through 144); Digital Mirror Function (2) described in paragraphs [2457] through [2466] (FIGS. 145 through 155); Voice Recognition Sys-E-mail (2) described in paragraphs [2467] through [2475] (FIGS. 156 through 160); Positioning System—GPS Search Engine described in paragraphs [2476] through [2518] (FIGS. 161 through 182); Mobile Ignition Key Function described in paragraphs [2519] through [2541] (FIGS. 183 through 201); Voice Print Authentication System described in paragraphs [2542] through [2552] (FIGS. 202 through 211); Fingerprint Authentication System described in paragraphs [2553] through [2565] (FIGS. 212 through 221); Auto Time Adjust Function described in paragraphs [2566] through [2570] (FIGS. 222 through 224); Video/Photo Mode described in paragraphs [2571] through [2599] (FIGS. 225 through 242); Call Taxi Function described in paragraphs [2600] through [2640] (FIGS. 243 through 269); Shooting Video Game Function described in paragraphs [2641] through [2657] (FIGS. 270 through 283); Driving Video Game Function described in paragraphs [2658] through [2671] (FIGS. 284 through 294); Address Book Updating Function described in paragraphs [2672] through [2692] (FIGS. 295 through 312); Batch Address Book Updating Function—With Host described in paragraphs [2693] through [2714] (FIGS. 313 through 329); Batch Address Book Updating Function—Peer-To-Peer Connection described in paragraphs [2715] through [2719] (FIGS. 329a through 329c); Batch Scheduler Updating Function—With Host described in paragraphs [2720] through [2743] (FIGS. 330 through 350); Batch Scheduler Updating Function—Peer-To-Peer Connection described in paragraphs [2744] through [2748] (FIGS. 351 and 352); Calculator Function described in paragraphs [2749] through [2754] (FIGS. 353 through 356); Spreadsheet Function described in paragraphs [2755] through [2762] (FIGS. 357 through 360); Word Processing Function described in paragraphs [2763] through [2778] (FIGS. 361 through 373); TV Remote Controller Function described in paragraphs [2779] through [2801] (FIGS. 374 through 394); CD/PC Inter-communicating Function described in paragraphs [2802] through [2826] (FIGS. 413 through 427); PDWR Sound Selecting Function described in paragraphs [2827] through [2863] (FIGS. 428 through 456); Start Up Software Function described in paragraphs [2864] through [2880] (FIGS. 457 through 466); Another Embodiment Of Communication Device 200 described in paragraphs [2881] through [2885] (FIGS. 467a through 467d); Stereo Audio Data Output Function described in paragraphs [2886] through [2905] (FIGS. 468 through 479); Stereo Visual Data Output Function described in paragraphs [2906] through [2925] (FIGS. 480 through 491); Multiple Signal Processing Function described in paragraphs [2926] through [2998] (FIGS. 492 through 529); Positioning System—Pin-pointing Function described in paragraphs [2999] through [3032] (FIGS. 530 through 553); Artificial Satellite Host described in paragraphs [3033] through [3051] (FIGS. 554 through 567); CCD Bar Code Reader Function described in paragraphs [3052] through [3073] (FIGS. 568 through 579); Online Renting Function described in paragraphs [3074] through [3151] (FIGS. 580 through 633); SOS Calling Function described in paragraphs [3152] through [3172] (FIGS. 634 through 645); Input Device described in paragraphs [3173] through [3178] (FIGS. 646 through 650); PC Remote Controlling Function described in paragraphs [3179] through [3214] (FIGS. 651 through 670); PC Remote Downloading Function described in paragraphs [3215] through [3264] (FIGS. 671 through 701); Audiovisual Playback Function described in paragraphs [3265] through [3290] (FIGS. 702 through 716); Audio Playback Function described in paragraphs [3291] through [3315] (FIGS. 717 through 731); Ticket Purchasing Function described in paragraphs [3316] through [3345] (FIGS. 732 through 753); Remote Data Erasing Function described in paragraphs [3346] through [3375] (FIGS. 754 through 774); Business Card Function described in paragraphs [3376] through [3392] (FIGS. 775 through 783); Game Vibrating Function described in paragraphs [3393] through [3403] (FIGS. 784 through 786); Part-time Job Finding Function described in paragraphs [3404] through [3424] (FIGS. 787 through 801); Parking Lot Finding Function described in paragraphs [3425] through [3464] (FIGS. 802 through 832); Parts Upgradable Communication Device described in paragraphs [3465] through [3490] (FIGS. 833a through 833x); On Demand TV Function described in paragraphs [3491] through [3521] (FIGS. 834 through 855); Inter-communicating TV Function described in paragraphs [3522] through [3556] (FIGS. 856 through 882); Display Controlling Function described in paragraphs [3557] through [3574] (FIGS. 883 through 894); Multiple Party Communicating Function described in paragraphs [3575] through [3608] (FIGS. 894a through 917); Display Brightness Controlling Function described in paragraphs [3609] through [3618] (FIGS. 918 through 923); Multiple Party Pin-pointing Function described in paragraphs [3619] through [3666] (FIGS. 924 through 950*f*); Digital Camera Function described in paragraphs [3667] through [3694] (FIGS. 951 through 968); Phone Number Linking Function described in paragraphs [3695] through [3718] (FIGS. 968*a* through 983); Multiple Window Displaying Function described in paragraphs [3719] through [3737] (FIGS. 984 through 995); Mouse Pointer Displaying Function described in paragraphs [3738] through [3775] (FIGS. 996 through 1021); House Item Pin-pointing Function described in paragraphs [3776] through [3935] (FIGS. 1022 through 1152); Membership Administrating Function described in paragraphs [3936] through [3978] (FIGS. 1153 through 1188); Keyword Search Timer Recording Function described in paragraphs [3979] through [4070] (FIGS. 1189 through 1254); Weather Forecast Displaying Function described in paragraphs [4071] through [4112] (FIGS. 1255 through 1288); Multiple Language Displaying Function described in paragraphs [4113] through [4170] (FIGS. 1289 through 1331); Caller's Information Displaying Function described in paragraphs [4171] through [4224] (FIGS. 1332 through 1375); Communication Device Remote Controlling Function (By Phone) described in paragraphs [4225] through [4265] (FIGS. 1394 through 1415); Communication Device Remote Controlling Function (By Web) described in paragraphs [4266] through [4306] (FIGS. 1416 through 1437); Shortcut Icon Displaying Function described in paragraphs [4307] through [4334] (FIGS. 1438 through 1455); Task Tray Icon Displaying Function described in paragraphs [4335] through [4357] (FIGS. 1456 through 1470); Multiple Channel Processing Function described in paragraphs [4358] through [4405] (FIGS. 1471 through 1498); Solar Battery Charging Function described in paragraphs [4406] through [4419] (FIGS. 1499 through 1509); OS Updating Function described in paragraphs [4420] through [4487] (FIGS. 1510 through 1575); Device Managing Function described in paragraphs [4488] through [4505] (FIGS. 1576 through 1587); Automobile Controlling Function described in paragraphs [4506] through [4554] (FIGS. 1588 through 1627); OCR Function described in paragraphs [4555] through [4590] (FIGS. 1628 through 1652); Real-time GPS Function described in paragraphs [4591] through [4660] (FIGS. 1653 through 1712); CCD Video Stabilizing Function described in paragraphs [4661] through [4692] (FIGS. 1713 through 1736); DVD Remote Controlling Function described in paragraphs [4693] through [4731] (FIGS. 1737 through 1757); Dual Frame Buffer Implementing Function described in paragraphs [4732] through [4748] (FIGS. 1758 through 1767); Mouse Pointer Image Auto Changing Function described in paragraphs [4749] through [4762] (FIGS. 1768 through 1774); Dual CCD Camera Function described in paragraphs [4763] through [4783] (FIGS. 1775*a* through 1786); Radio Tuner Function described in paragraphs [4784] through [4814] (FIGS. 1787 through 1812); Registered Voice Recognizing Function described in paragraphs [4815] through [4854] (FIGS. 1813 through 1842); Host's TV Resolution Converting Function described in paragraphs [4855] through [4884] (FIGS. 1843 through 1864); Voice Shortcut Recognizing Function described in paragraphs [4885] through [4919] (FIGS. 1865 through 1889); Vital Sign Monitoring Function described in paragraphs [4920] through [5009] (FIGS. 1890*a* through 1954); Three-Dimensional Map described in (FIGS. 2 and 3); Auto Collision Avoiding Function described in (FIGS. 4 through 7); Remote Controlling System described in (FIGS. 8*a* through FIG. 10); Emergency Landing System described in (FIGS. 11 through FIG. 12*b*); Connection Between Host H And Carrier 300 described in (FIG. 13); 3D Map Data Updating Function described in (FIGS. 16 through 30); Auto Collision Avoiding Function—Other Embodiments described in (FIGS. 31 through 34); Satellite TV Function described in (FIGS. 35 through 50); Wireless Communication Facilitating System described in (FIGS. 51 through 64*b*); Three-Dimensional Map described in (??); Attached File Emailing Function described in paragraphs [5009.1] through [5009.13] (FIGS. 1955 through 1961); Movie eTicket Function described in paragraphs [5009.14] through [5009.66] (FIGS. 1962 through 2002); Carrier Prepaid eCard Function described in paragraphs [5009.67] through [5009.104] (FIGS. 2003 through 2032); Carrier ePass Function described in paragraphs [5009.105] through [5009.144] (FIGS. 2033 through 2061*b*); Communication Device 200 Installed In Carrier described in paragraphs [5009.145] and [5009.146] (FIG. 2062); Wireless Communication Facilitating System described in paragraphs [5009.147] through [5009.176] (FIGS. 2063 through 2076*b*); In-Carrier Notifying Function described in paragraphs [5009.177] through [5009.207] (FIGS. 2077 through 2093); Station Name Notifying Function described in paragraphs [5009.208] through [5009.237] (FIGS. 2094 through 2110); Restaurant eMenu Function described in paragraphs [5009.238] through [5009.280] (FIGS. 2111 through 2144); Geographic Location Recording Function described in paragraphs [5009.281] through [5009.322] (FIGS. 2145 through 2176*b*); CCD Dictionary Function described in paragraphs [5009.323] through [5009.347] (FIGS. 2177 through 2195*b*); Schedule Notifying Function described in paragraphs [5009.348] through [5009.374] (FIGS. 2196 through 2215); Customized Device Purchasing System described in paragraphs [5009.375] through [5009.415] (FIGS. 2216 through 2250); Multiple Type TV Program Distributing System described in paragraphs [5009.416] through [5009A46] (FIGS. 2251 through 2274); Multiple TV Screen Displaying Function described in paragraphs [5009.447] through [5009.478] (FIGS. 2275 through 2297); Touch Panel Function described in paragraphs [5009.479] through [5009.504] (FIGS. 2298 through 2315); Communication Device Finding Function described in paragraphs [5009.505] through [5009.516] (FIGS. 2316 through 2322); Carrier Safety Measure Controlling Function described in paragraphs [5009.517] through [5009.551] (FIGS. 2323 through 2342); Product Information Retrieving Function (CCD) described in paragraphs [5009.552] through [5009.580] (FIGS. 2343 through 2360); Product Information Stored Chip Function described in paragraphs [5009.581] through [5009.618] (FIGS. 2361 through 2385); Karaoke Playing Function described in paragraphs [5009.619] through [5009.647] (FIGS. 2386 through 2406); Performing Pattern Identifying Anti-Virus Function described in paragraphs [5009.648] through [5009.670] (FIGS. 2407 through 2421); Continue Enabled Video Game Function described in paragraphs [5009.671] through [5009.693] (FIGS. 2422 through 2436); Resume Enabled Video Game Function described in paragraphs [5009.694] through [5009.716] (FIGS. 2437 through 2451); Signal Forwarding Function described in paragraphs [5009.717] through [5009.745] (FIGS. 2452 through 2472); In-Carrier Auto Implementing Mode Function described in paragraphs [5009.746] through [5009.775] (FIGS. 2473 through 2492); Voice Message Displaying Function described in paragraphs [5009.776] through [5009.796] (FIGS. 2493 through 2503*c*); Human Toes Displaying Function described in paragraphs [5009.797] through [5009.814] (FIGS. 2504 through 2521); Wrinkles/Muscles Displaying Function described in paragraphs [5009.815] through [5009.856] (FIGS. 2522*a* through 2552*e*); Protruded Body Part Displaying Function described in paragraphs [5009.857] through [5009.876] (FIGS. 2553 through 2566b); Satellite TV Program Displaying Function described in paragraphs [5009.877] through [5009.921] (FIGS. 2567 through 2601); Definition of Communication Device 200 described in paragraphs [5009.922] and [5009.923] (no drawings); Remote Parameter Setting Function described in paragraphs [5009.924] through [5009.1017] (FIGS. 2602 through 2682); Multiple Sender's Email Address Function described in paragraphs [5009.1018] through [5009.1035] (FIGS. 2683 through 2695); Multiple Phone Number Function described in paragraphs [5009.1036] through [5009.1055] (FIGS. 2696 through 2709); TV Commercial Customizing Function described in paragraphs [5009.1056] through [5009.1085] (FIGS. 2710 through 2732c); Common Video Game Platform Function described in paragraphs [5009.1086] through [5009.1102] (FIGS. 2733 through 2741); Directory Displaying Function described in paragraphs [5009.1103] through [5009.1130] (FIGS. 2742 through 2761); Directory Customizing Function described in paragraphs [5009.1131] through [5009.1186] (FIGS. 2762 through 2807); Host's Directory Customizing Function described in paragraphs [5009.1187] through [5009.1246] (FIGS. 2808 through 2853); Trash Can Function described in paragraphs [5009.1247] through [5009.1295] (FIGS. 2854 through 2895); Motion Character Displaying Function described in paragraphs [5009.1296] through [5009.1318] (FIGS. 2896 through 2909); Bookmark Displaying Function described in paragraphs [5009.1319] through [5009.1374] (FIGS. 2910 through 2955); CCD/LCD Function described in paragraphs [5009.1375] through [5009.1387] (FIGS. 2956 through 2959b); Pop Up Window Blocking Function described in paragraphs [5009.1388] through [5009.1401] (FIGS. 2960 through 2965); Map Heading Up Function described in paragraphs [5009.1402] through [5009.1421] (FIGS. 2966 through 2976); Copy Once Function described in paragraphs [5009.1422] through [5009.1443] (FIGS. 2977 through 2991); Copy Restricted Software Integrated Data described in paragraphs [5009.1444] through [5009.1457] (FIGS. 2992 through 2998); Folder Sharing Function described in paragraphs [5009.1458] through [5009.1508] (FIGS. 2999 through 3038c); Email Folder Managing Function described in paragraphs [5009.1509] through [5009.1577] (FIGS. 3039 through 3092e); Power On Auto Software Executing Function described in paragraphs [5009.1578] through [5009.1594] (FIGS. 3093 through 3103); Enhanced TV Remote Controlling Function described in paragraphs [5009.1595] through [5009.1639] (FIGS. 3104 through 3137c); 3 CCD Unit Function described in paragraphs [5009.1640] through [5009.1660] (FIGS. 3138 through 3150c); Multiple Direction Scrolling Function described in paragraphs [5009.1661] through [5009.1762] (FIGS. 3151 through 3238); Radio Frequency Soft Handover Function described in paragraphs [5009.1763] through [5009.1793] (FIGS. 3239 through 3262); Inter Com Function described in paragraphs [5009.1794] through [5009.1816] (FIGS. 3263 through 3277c); Website History Recording Function described in paragraphs [5009.1817] through [5009.1870] (FIGS. 3278 through 3324); Motion Picture Thumbnail Displaying Function described in paragraphs [5009.1871] through [5009.1908] (FIGS. 3325 through 3353b); 2D/3D Map Displaying Function described in paragraphs [5009.1909] through [5009.1952] (FIGS. 3354 through 3380b); Remote Schedule Notifying Function described in paragraphs [5009.1953] through [5009.1975] (FIGS. 3381 through 3393); Remote Email Notifying Function described in paragraphs [5009.1976] through [5009.2000] (FIGS. 3394 through 3406); Remote Document Printing Function described in paragraphs [5009.2001] through [5009.2022] (FIGS. 3407 through 3419b); Anti-virus Protection Identifying Function described in paragraphs [5009.2023] through [5009.2043] (FIGS. 3420 through 3431c); Alphanumeric Phone Number Dialing Function described in paragraphs [5009.2044] through [5009.2076] (FIGS. 3432 through 3453b); Automobile License Number Dialing Function described in paragraphs [5009.2077] through [5009.2109] (FIGS. 3454 through 3475b); Point Card Function described in paragraphs [50092110] through [5009.2147] (FIGS. 3476 through 3504c); Display Sharing Function described in paragraphs [5009.2148] through [5009.2169] (FIGS. 3505 through 3516); Email Filtering Function described in paragraphs [5009.2170] through [5009.2212] (FIGS. 3517 through 3549); Received Email Auto Sorting Function described in paragraphs [5009.2213] through [5009.2238] (FIGS. 3550 through 3565b); Sent Email Auto Sorting Function described in paragraphs [5009.2239] through [5009.2264] (FIGS. 3566 through 3581b); Country Name Displaying Function described in paragraphs [5009.2265] through [5009.2286] (FIGS. 3582 through 3595); Email Attached File Splitting Function described in paragraphs [5009.2287] through [5009.2300] (FIGS. 3596 through 3603c); Auto TV Starting Function described in paragraphs [5009.2301] through [5009.2329] (FIGS. 3604 through 3623); Enhanced TV Program Replaying Function (Communication Device 200) described in paragraphs [5009.2330] through [5009.2361] (FIGS. 3624 through 3648b); Enhanced TV Program Replaying Function (Host H) described in paragraphs [5009.2362] through [5009.2400] (FIGS. 3649 through 3680b); Enhanced TV Program Replaying Function (Devices A and B) described in paragraphs [5009.2401] through [5009.2440] (FIGS. 3681 through 3712b); Enhanced TV Program Replaying Function (Host H, and Devices A and B) described in paragraphs [5009.2441] through [5009.2491] (FIGS. 3713 through 3754b); TV Commercial Skipping Function described in paragraphs [5009.2492] through [5009.2516] (FIGS. 3755 through 3772); Timer Schedule Auto Changing Function described in paragraphs [5009.2517] through [5009.2542] (FIGS. 3773 through 3789); Remote Alarm Setting Function described in paragraphs [5009.2543] through [5009.2585] (FIGS. 3789a through 3817b); Current Location Non-notifying Function described in paragraphs [5009.2586] through [5009.2612] (FIGS. 3818 through 3833); Device Remotely Locking Function described in paragraphs [5009.2613] through [5009.2644] (FIGS. 3834 through 3857); EZ Macro Function described in paragraphs [5009.2645] through [5009.2668] (FIGS. 3858 through 3873b); Alcohol Level Identifying Function described in paragraphs [5009.2669] through [5009.2694] (FIGS. 3874 through 3889b); Displayed Visual Data Size Modifying Function described in paragraphs [5009.2695] through [5009.2729] (FIGS. 3890 through 3915); Button Size Changing Function described in paragraphs [5009.2730] through [5009.2758] (FIGS. 3916 through 3937); Epayment Sound Selecting Function described in paragraphs [5009.2759] through [5009.2778] (FIGS. 3938 through 3950c); Multiple TV Program Recording Function described in paragraphs [5009.2779] through [5009.2823] (FIGS. 3951 through 3988); TV Program Data Trashcan Function described in paragraphs [5009.2824] through [5009.2856] (FIGS. 3989 through 4010b); Ereceipt Producing Function described in paragraphs [5009.2857] through [5009.2888] (FIGS. 4011 through 4033); Memo Sharing Function described in paragraphs [5009.2889] through [5009.2930] (FIGS. 4034 through 4064); Selected Function Remotely Freezing Function described in paragraphs [5009.2931] through [5009.2964] (FIGS. 4065 through 4085); Selected Software Remotely Activating Function described in paragraphs [5009.2965] through [5009.2998] (FIGS. 4086 through 4106); Selected Function Remotely Activating Function described in paragraphs [5009.2999] through [5009.3032] (FIGS. 4107 through 4127); Selected Software Remotely Freezing Function described in paragraphs [5009.3033] through [5009.3066] (FIGS. 4128 through 4148); Selected Data Remotely Deleting Function described in paragraphs [5009.3067] through [5009.3100] (FIGS. 4149 through 4169); Web Cash Memory Function described in paragraphs [5009.3101] through [5009.3122] (FIGS. 4170 through 4183b); Keypad Auto Unlocking Function described in paragraphs [5009.3123] through [5009.3145] (FIGS. 4184 through 4199); Voice Recog Sys Auto Unlocking Function described in paragraphs [5009.3146] through [5009.3168] (FIGS. 4200 through 4215); Upgraded Voice Recog Sys Auto Unlocking Function described in paragraphs [5009.3169] through [5009.3192] (FIGS. 4216 through 4231); TV Program Information Displaying Function described in paragraphs [5009.3193] through [5009.3215] (FIGS. 4232 through 4247b); Best Signal Auto Selecting Function described in paragraphs [5009.3216] through [5009.3269] (FIGS. 4248 through 4291); Software Timer Activating Function described in paragraphs [5009.3270] through [5009.3295] (FIGS. 4292 through 4305b); Software Timer Terminating Function described in paragraphs [5009.3296] through [5009.3321] (FIGS. 4306 through 4319b); Software Timer Deleting Function described in paragraphs [5009.3322] through [5009.3347] (FIGS. 4320 through 4333b); TV Phone Recording Function described in paragraphs [5009.3348] through [5009.3381] (FIGS. 4334 through 4358b); Hybrid GPS Function described in paragraphs [5009.3382] through [5009.3421] (FIGS. 4359 through 4381); Elevator Controlling Function described in paragraphs [5009.3422] through [5009.3447] (FIGS. 4382 through 4397); Device Migrating Function described in paragraphs [5009.3448] through [5009.3509] (FIGS. 4398 through 4445b); Cordless Phone Connecting Function described in paragraphs [5009.3510] through [5009.3547] (FIGS. 4446 through 4474b); Cash Deposit Function described in paragraphs [5009.3548] through [5009.3585] (FIGS. 4475 through 4497d); Highway Fee Auto Paying Function described in paragraphs [5009.3586] through [5009.3616] (FIGS. 4498 through 4518f); By Distance Auto Action Function described in paragraphs [5009.3617] through [5009.3639] (FIGS. 4519 through 4532); Emoney Transferring Function described in paragraphs [5009.3640] through [5009.3666] (FIGS. 4533 through 4548c); Coupon Disposing Function described in paragraphs [5009.3667] through [5009.3698] (FIGS. 4549 through 4569); Multiple Device Searching Function described in paragraphs [5009.3699] through [5009.3717] (FIGS. 4570 through 4581b); Battery Meter Notifying Function described in paragraphs [5009.3718] through [5009.3737] (FIGS. 4582 through 4593b); Software Infrared Transmitting Function described in paragraphs [5009.3738] through [5009.3759] (FIGS. 4594 through 4606); Electronic Key Function described in paragraphs [5009.3760] through [5009.3824] (FIGS. 4607 through 4647b); Automobile Status Monitoring Function described in paragraphs [5009.3825] through [5009.3885] (FIGS. 4648 through 4691); Enhanced Business Card Transferring Function described in paragraphs [5009.3886] through [5009.3928] (FIGS. 4692 through 4720c); Removal Media Data Transferring Function described in paragraphs [5009.3929] through [5009.3954] (FIGS. 4721 through 4737c); Audiovisual Data Sharing Function described in paragraphs [5009.3955] through [5009.3992] (FIGS. 4738 through 4763b); Email Attachment Supplementing Function described in paragraphs [5009.3993] through [5009.4012] (FIGS. 4764 through 4775c); Other Device File Emailing Function described in paragraphs [5009.4013] through [5009.4043] (FIGS. 4776 through 4799b); Slide Authoring Function described in paragraphs [5009.4044] through [5009.4082] (FIGS. 4800 through 4828); Remote/Local Credit Card Transaction Function described in paragraphs [5009.4083] through [5009.4119] (FIGS. 4829 through 4855d); Unread Email Sorting Function described in paragraphs [5009.4120] through [5009.4166] (FIGS. 4856 through 4890); TV Program Replying Function described in paragraphs [5009.4167] through [5009.4200] (FIGS. 4891 through 4914); PC Keyboard Function described in paragraphs [5009.4201] through [5009.4212] (FIGS. 4915 through 4920b); Antenna Mark Displaying Function described in paragraphs [5009.4213] through [5009.4228] (FIGS. 4921 through 4928b); Enhanced Caller ID Displaying Function described in paragraphs [5009.4229] through [5009.4264] (FIGS. 4929 through 4951c); Enhanced Call Waiting Function described in paragraphs [5009.4265] through [5009.4300] (FIGS. 4952 through 4974c); Phonebook Auto Icon Displaying Function described in paragraphs [5009.4301] through [5009.4332] (FIGS. 4975 through 4996); One Click Call Back Function described in paragraphs [5009.4333] through [5009.4357] (FIGS. 4997 through 5014); Phone Conversation Storing Function described in paragraphs [5009.4358] through [5009.4386] (FIGS. 5015 through 5031c); Caller ID Requesting Function described in paragraphs [5009.4387] through [5009.4410] (FIGS. 5032 through 5045c); Phone Call Audio Notifying Function described in paragraphs [5009.4411] through [5009.4433] (FIGS. 5046 through 5059c); Entry Phone Function described in paragraphs [5009.4434] through [5009.4459] (FIGS. 5060 through 5074b); FAX Sending/Receiving Function described in paragraphs [5009.4460] through [5009.4505] (FIGS. 5075 through 5108b); Other Device's Phone Book Utilizing Function described in paragraphs [5009.4506] through [5009.4536] (FIGS. 5109 through 5128); Multiple Program Executing Function described in paragraphs [5009.4537] through [5009.4564] (FIGS. 5129 through 5148); Removal Medium Operating Function described in paragraphs [5009.4565] through [5009.4601] (FIGS. 5149 through 5178); Removal Medium Audiovisual Data Recording Function described in paragraphs [5009.4602] through [5009.4629] (FIGS. 5178a through 5199); Nearest Printer Selecting Function described in paragraphs [5009.4630] through [5009.4656] (FIGS. 5200 through 5216d); In-Cabin Com Function described in paragraphs [5009.4657] through [5009.4680] (FIGS. 5217 through 5233c); Carrier Current Condition Notifying Function described in paragraphs [5009.4681] through [5009.4710] (FIGS. 5234 through 5251b); Virtual Space Creating Function described in paragraphs [5009.4711] through [5009.4743] (FIGS. 5252 through 5274); Security Camera Function described in paragraphs [5009.4744] through [5009.4778] (FIGS. 5275 through 5295); Remote Camera Controlling Function described in paragraphs [5009.4779] through [5009.4820] (FIGS. 5296 through 5326); Day/Night Camera Function described in paragraphs [5009.4821] through [5009.4851] (FIGS. 5327 through 5346); Multiple Wireless Signal Handover Function described in paragraphs [5009.4852] through [5009.4897] (FIGS. 5347 through 5365); Multiple Tab Web Browsing Function described in paragraphs [5009.4898] through [5009.4926] (FIGS. 5366 through 5388); Multiple Tab Visual Data Viewing Function described in paragraphs [5009.4927] through [5009.4955] (FIGS. 5389 through 5411); Multiple Tab Document Data Viewing Function described in paragraphs [5009.4956] through [5009.4984] (FIGS. 5412 through 5434); Multiple Tab Email Data Viewing Function described in paragraphs [5009.4985] through [5009.5013] (FIGS. 5435 through 5457); Convenient TV Remote Controlling Function described in paragraphs [5009.5014] through [5009.5034] (FIGS. 5458 through 5471); Form Auto Filling Function described in paragraphs [5009.5035] through [5009.5072] (FIGS. 5472 through 5495*e*); Hybrid Carrier Function described in paragraphs [5009.5073] through [5009.5105] (FIGS. 5496 through 5522*b*); Carrier Current Condition Monitoring Function described in paragraphs [5009.5106] through [5009.5141] (FIGS. 5523 through 5546*c*); Memory Defragmenting Function described in paragraphs [5009.5142] through [5009.5175] (FIGS. 5547 through 5568); Memory Formatting Function described in paragraphs [5009.5176] through [5009.5209] (FIGS. 5569 through 5590); Memory Partitioning Function described in paragraphs [5009.5210] through [5009.5243] (FIGS. 5591 through 5612); TV Phone Pausing Function described in paragraphs [5009.5244] through [5009.5268] (FIGS. 5613 through 5629); Reflecting Object Displaying Function described in paragraphs [5009.5269] through [5009.5294] (FIGS. 5630 through 5648*c*); Alternative TV Program Receiving Function described in paragraphs [5009.5295] through [5009.5325] (FIGS. 5649 through 5670*c*); Alternative Radio Program Receiving Function described in paragraphs [5009.5326] through [5009.5356] (FIGS. 5671 through 5692*c*); Audiovisual Auto Fading Function described in paragraphs [5009.5357] through [5009.5377] (FIGS. 5693 through 5706); Audio Auto Fading Function described in paragraphs [5009.5378] through [5009.5398] (FIGS. 5707 through 5720); Video-In-Video Displaying Function described in paragraphs [5009.5399] through [5009.5431] (FIGS. 5721 through 5747*b*); Pre-Installed Item Purchasing Function described in paragraphs [5009.5432] through [5009.5470] (FIGS. 5748 through 5775*b*); Multiple CPU Function described in paragraphs [5009.5471] through [5009.5476] (FIGS. 5776 and 5777); Radio Music Downloading Function described in paragraphs [5009.5477] through [5009.5516] (FIGS. 5778 through 5807); File Auto Saving Function described in paragraphs [5009.5517] through [5009.5559] (FIGS. 5808 through 5837*b*); TV Tuner Function described in paragraphs [5009.5560] through [5009.5600] (FIGS. 5838 through 5866); GPS Receiver's Log Function described in paragraphs [5009.5601] through [5009.5629] (FIGS. 5867 through 5884*b*); Remote Room Light Controlling Function described in paragraphs [5009.5630] through [5009.5662] (FIGS. 5885 through 5906*b*); Remote Kitchen Stove Controlling Function described in paragraphs [5009.5663] through [5009.5695] (FIGS. 5907 through 5928*b*); Remote Refrigerator Controlling Function described in paragraphs [5009.5696] through [5009.5728] (FIGS. 5929 through 5950*b*); Remote Washing Machine Controlling Function described in paragraphs [5009.5729] through [5009.5761] (FIGS. 5951 through 5972*b*); Remote Faucet Controlling Function described in paragraphs [5009.5762] through [5009.5794] (FIGS. 5973 through 5994*b*); Remote Door Lock Controlling Function described in paragraphs [5009.5795] through [5009.5827] (FIGS. 5995 through 6016*b*); Remote Air Conditioner Controlling Function described in paragraphs [5009.5828] through [5009.5860] (FIGS. 6017 through 6038*b*); Remote Vending Machine Controlling Function described in paragraphs [5009.5861] through [5009.5893] (FIGS. 6039 through 6060*b*); Remote Video Recorder Controlling Function described in paragraphs [5009.5894] through [5009.5926] (FIGS. 6061 through 6082*b*); Remote Printer Controlling Function described in paragraphs [5009.5927] through [5009.5959] (FIGS. 6083 through 6104*b*); Remote Camera Controlling Function described in paragraphs [5009.5960] through [5009.5992] (FIGS. 6105 through 6126*b*); Remote TV Tuner Controlling Function described in paragraphs [5009.5993] through [5009.6025] (FIGS. 6127 through 6148*b*); Remote Radio Tuner Controlling Function described in paragraphs [5009.6026] through [5009.6058] (FIGS. 6149 through 6170*b*); Remote Computer Controlling Function described in paragraphs [5009.6059] through [5009.6091] (FIGS. 6171 through 6192*b*); Remote Carrier Controlling Function described in paragraphs [5009.6092] through [5009.6124] (FIGS. 6193 through 6214*b*); Remote Food Processor Controlling Function described in paragraphs [5009.6125] through [5009.6157] (FIGS. 6215 and 6236*b*); Remote Dryer Controlling Function described in paragraphs [5009.6158] through [5009.6190] (FIGS. 6237 and 6258*b*); Remote Rice Cooker Controlling Function described in paragraphs [5009.6191] through [5009.6223] (FIGS. 6259 and 6280*b*); Remote Sound Outputting Device Controlling Function described in paragraphs [5009.6224] through [5009.6256] (FIGS. 6281 and 6302*b*); Remote Vacuum Cleaner Controlling Function described in paragraphs [5009.6257] through [5009.6289] (FIGS. 6303 and 6324*b*); Remote FAX Machine Controlling Function described in paragraphs [5009.6290] through [5009.6322] (FIGS. 6325 and 6346*b*); Remote Copying Machine Controlling Function described in paragraphs [5009.6323] through [5009.6355] (FIGS. 6347 and 6368*b*); Remote Coffee Maker Controlling Function described in paragraphs [5009.6356] through [5009.6388] (FIGS. 6369 and 6390*b*); Remote Scanner Controlling Function described in paragraphs [5009.6389] through [5009.6421] (FIGS. 6391 and 6412*b*); Remote Clothes Iron Controlling Function described in paragraphs [5009.6422] through [5009.6454] (FIGS. 6413 and 6434*b*); Remote Escalator Controlling Function described in paragraphs [5009.6455] through [5009.6487] (FIGS. 6435 and 6456*b*); Vending Machine Accessing Function described in paragraphs [5009.6488] through [5009.6527] (FIGS. 6457 through 6485*d*); Audiovisual Data Shuffling Function described in paragraphs [5009.6528] through [5009.6551] (FIGS. 6486 through 6503*b*); Unknown File Icon Displaying Function described in paragraphs [5009.6552] through [5009.6575] (FIGS. 6504 through 6521*c*); Audiovisual Document Producing Function described in paragraphs [5009.6576] through [5009.6601] (FIGS. 6522 through 6539*b*); Audiovisual Data Searching Function described in paragraphs [5009.6602] through [5009.6626] (FIGS. 6540 through 6558*b*); Finger Print Log-on Function described in paragraphs [5009.6627] through [5009.6645] (FIGS. 6559 through 6571*c*); Voice Print Log-on Function described in paragraphs [5009.6646] through [5009.6663] (FIGS. 6572 through 6583*c*); Finger Print Screen Saver Deactivating Function described in paragraphs [5009.6664] through [5009.6682] (FIGS. 6584 through 6596*c*); Voice Print Screen Saver Deactivating Function described in paragraphs [5009.6683] through [5009.6700] (FIGS. 6597 through 6608*c*); Finger Print Folder Accessing Function described in paragraphs [5009.6701] through [5009.6719] (FIGS. 6609 through 6621*c*); Voice Print Folder Accessing Function described in paragraphs [5009.6720] through [5009.6737] (FIGS. 6622 through 6633*c*); Finger Print File Accessing Function described in paragraphs [5009.6738] through [5009.6756] (FIGS. 6634 through 6646c); Voice Print File Accessing Function described in paragraphs [5009.6757] through [5009.6774] (FIGS. 6647 through 6658c); Finger Print Internet Accessing Function described in paragraphs [5009.6775] through [5009.6793] (FIGS. 6659 through 6671c); Voice Print Internet Accessing Function described in paragraphs [5009.6794] through [5009.6811] (FIGS. 6672 through 6683c); Finger Print PC Log-on Function described in paragraphs [5009.6812] through [5009.6838] (FIGS. 6684 through 6703b); Voice Print PC Log-on Function described in paragraphs [5009.6839] through [5009.6864] (FIGS. 6704 through 6722b); Finger Print PC Screen Saver Deactivating Function described in paragraphs [5009.6865] through [5009.6891] (FIGS. 6723 through 6742b); Voice Print PC Screen Saver Deactivating Function described in paragraphs [5009.6892] through [5009.6917] (FIGS. 6743 through 6761b); Finger Print PC Folder Accessing Function described in paragraphs [5009.6918] through [5009.6944] (FIGS. 6762 through 6781b); Voice Print PC Folder Accessing Function described in paragraphs [5009.6945] through [5009.6970] (FIGS. 6782 through 6800b); Finger Print PC File Accessing Function described in paragraphs [5009.6971] through [5009.6997] (FIGS. 6801 through 6820b); Voice Print PC File Accessing Function described in paragraphs [5009.6998] through [5009.7023] (FIGS. 6821 through 6839b); Finger Print PC Internet Accessing Function described in paragraphs [5009.7024] through [5009.7050] (FIGS. 6840 through 6859b); Voice Print PC Internet Accessing Function described in paragraphs [5009.7051] through [5009.7076] (FIGS. 6860 through 6878b); Shock Proof Memory Function described in paragraphs [5009.7077] through [5009.7093] (FIGS. 6879 through 6889b); Remote Audiovisual Device Controlling Function described in paragraphs [5009.7094] through [5009.7133] (FIGS. 6890 through 6916); Direct TV-Audio Phone Switching Function described in paragraphs [5009.7134] through [5009.7157] (FIGS. 6917 through 6932b); Audiovisual Data Downloading Function described in paragraphs [5009.7158] through [5009.7218] (FIGS. 6933 through 6972); Audio Data Downloading Function described in paragraphs [5009.7219] through [5009.7279] (FIGS. 6973 through 7012); Self-Active Encrypted Image Reader Function described in paragraphs [5009.7280] through [5009.7301] (FIGS. 7013 through 7028c); Robot Remote Controlling Function described in paragraphs [5009.7302] through [5009.7371] (FIGS. 7029 through 7071b); Home Page Displaying Function described in paragraphs [5009.7372] through [5009.7396] (FIGS. 7072 through 7090); Multiple OS Operating Function described in paragraphs [5009.7397] through [5009.7442] (FIGS. 7091 through 7130c); Audiovisual Conversation Data Forwarding Function described in paragraphs [5009.7443] through [5009.7465] (FIGS. 7131 through 7146b); Audio Conversation Data Forwarding Function described in paragraphs [5009.7466] through [5009.7488] (FIGS. 7147 through 7162b); Phone Call Auto Forwarding Function described in paragraphs [5009.7489] through [5009.7514] (FIGS. 7163 through 7180c); Wireless Communication Method Switching Function described in paragraphs [5009.7515] through [5009.7535] (FIGS. 7181 through 7194e); Drafted Email Viewing Function described in paragraphs [5009.7536] through [5009.7585] (FIGS. 7195 through 7236); Email Replying Function described in paragraphs [5009.7586] through [5009.7617] (FIGS. 7237 through 7262b); Attached File Editing Function described in paragraphs [5009.7618] through [5009.7649] (FIGS. 7263 through 7288b); Email Audiovisual Data Auto Blocking Function described in paragraphs [5009.7650] through [5009.7673] (FIGS. 7289 through 7306); HDD Stored TV Program Replaying Function described in paragraphs [5009.7674] through [5009.7695] (FIGS. 7307 through 7322b); Cooking Menu Auto Implementing Function described in paragraphs [5009.7696] through [5009.7722] (FIGS. 7323 through 7343b); Micro Wave Oven Auto Alarm Function described in paragraphs [5009.7723] through [5009.7776] (FIGS. 7344 through 7387b); Oven Temperature Remote Controlling Function described in paragraphs [5009.7777] through [5009.7830] (FIGS. 7388 through 7431c); Audio Amplifying Function described in paragraphs [5009.7831] through [5009.7848] (FIGS. 7432 through 7443b); Calorie Calculating Function described in paragraphs [5009.7849] through [5009.7868] (FIGS. 7444 through 7457b); Sickness Identifying Function described in paragraphs [5009.7869] through [5009.7902] (FIGS. 7458 through 7481b); Weather Hazard Auto Notifying Function described in paragraphs [5009.7903] through [5009.7955] (FIGS. 7482 through 7517d); Phone Call Auto Forwarding Function described in paragraphs [5009.7956] through [5009.7981] (FIGS. 7518 through 7535c); Multiple Massaging Function described in paragraphs [5009.7982] through [5009.8022] (FIGS. 7536 through 7566); Microscope Function described in paragraphs [5009.8023] through [5009.8097] (FIGS. 7567 through 7629); Door Auto Lock/Unlock Function described in paragraphs [5009.8098] through [5009.8139] (FIGS. 7630 through 7658b); Door Auto Close/Open Function described in paragraphs [5009.8140] through [5009.8181] (FIGS. 7659 through 7687b); Room Light Auto On/Off Function described in paragraphs [5009.8182] through [5009.8223] (FIGS. 7688 through 7716b); Air Conditioner Auto On/Off Function described in paragraphs [5009.8224] through [5009.8265] (FIGS. 7717 through 7745b); Heater Auto On/Off Function described in paragraphs [5009.8266] through [5009.8307] (FIGS. 7746 through 7774b); Faucet Auto On/Off Function described in paragraphs [5009.8308] through [5009.8349] (FIGS. 7775 through 7803b); Sound Outputting Device Auto On/Off Function described in paragraphs [5009.8350] through [5009.8391] (FIGS. 7804 through 7832b); Vein Print Log-on Function described in paragraphs [5009.8392] through [5009.8410] (FIGS. 7833 through 7845c); Vein Print Screen Saver Deactivating Function described in paragraphs [5009.8411] through [5009.8429] (FIGS. 7846 through 7858c); Vein Print Folder Accessing Function described in paragraphs [5009.8430] through [5009.8448] (FIGS. 7859 through 7871c); Vein Print File Accessing Function described in paragraphs [5009.8449] through [5009.8467] (FIGS. 7872 through 7884c); Vein Print Internet Accessing Function described in paragraphs [5009.8468] through [5009.8486] (FIGS. 7885 through 7897c); Vein Print PC Log-on Function described in paragraphs [5009.8487] through [5009.8513] (FIGS. 7898 through 7917b); Vein Print PC Screen Saver Deactivating Function described in paragraphs [5009.8514] through [5009.8540] (FIGS. 7918 through 7937b); Vein Print PC Folder Accessing Function described in paragraphs [5009.8541] through [5009.8567] (FIGS. 7938 through 7957b); Vein Print PC File Accessing Function described in paragraphs [5009.8568] through [5009.8594] (FIGS. 7958 through 7977b); Vein Print PC Internet Accessing Function described in paragraphs [5009.8595] through [5009.8621] (FIGS. 7978 through 7997b); Ringtone Auto Updating Function described in paragraphs [5009.8622] through [5009.8643] (FIGS. 7998 through 8013b); Time Limited Current Location Identifying Function described in paragraphs [5009.8644] through [5009.8673] (FIGS. 8014 through 8035b); In Carrier Message Inserting Function described in paragraphs [5009.8674] through [5009.8695] (FIGS. 8036 through 8050*b*); Electric Cable Networking Function described in paragraphs [5009.8696] through [5009.8707] (FIGS. 8051 through 8057); Shoe Sole Pressure Adjusting Function described in paragraphs [5009.8708] through [5009.8741] (FIGS. 8058 through 8080*b*); Finger Print Removal Media Accessing Function described in paragraphs [5009.8742] through [5009.8762] (FIGS. 8081 through 8095*b*); Voice Print Removal Media Accessing Function described in paragraphs [5009.8763] through [5009.8783] (FIGS. 8096 through 8110*b*); Vein Print Removal Media Accessing Function described in paragraphs [5009.8784] through [5009.8804] (FIGS. 8111 through 8125*b*); Finger Print PC Removal Media Accessing Function described in paragraphs [5009.8805] through [5009.8833] (FIGS. 8126 through 8145*b*); Voice Print PC Removal Media Accessing Function described in paragraphs [5009.8834] through [5009.8862] (FIGS. 8146 through 8165*b*); Vein Print PC Removal Media Accessing Function described in paragraphs [5009.8863] through [5009.8891] (FIGS. 8166 through 8185*b*); Printer Function described in paragraphs [5009.8892] through [5009.8967] (FIGS. 8186 through 8245*f*); Scanner Function described in paragraphs [5009.8968] through [5009.9016] (FIGS. 8246 through 8284*b*); Multiple Signal Transferring Function described in paragraphs [5009.9017] through [5009.9205] (FIGS. 8285 through 8453); Free Access Point Function described in paragraphs [5009.9206] through [5009.9245] (FIGS. 8454 through 8482); Partial BCC Email Function described in paragraphs [5009.9246] through [5009.9273] (FIGS. 8483 through 8504*b*); Noise Reversing Function described in paragraphs [5009.9274] through [5009.9291] (FIGS. 8505 through 8516); Door Status Sensing Function described in paragraphs [5009.9292] through [5009.9345] (FIGS. 8517 through 8557); Drawer Status Sensing Function described in paragraphs [5009.9346] through [5009.9399] (FIGS. 8558 through 8598); Window Status Sensing Function described in paragraphs [5009.9400] through [5009.9453] (FIGS. 8599 through 8639); Curtain Status Sensing Function described in paragraphs [5009.9454] through [5009.9509] (FIGS. 8640 through 8680); Gate Status Sensing Function described in paragraphs [5009.9510] through [5009.9563] (FIGS. 8681 through 8721); Stop Watch Function described in paragraphs [5009.9564] through [5009.9584] (FIGS. 8722 through 8736*b*); Decrementing Time Function described in paragraphs [5009.9585] through [5009.9607] (FIGS. 8737 through 8753*b*); Energy Efficient Multiple CPU Function described in paragraphs [5009.9608] through [5009.9636] (FIGS. 8754 through 8776*b*); Content Notifying Function described in paragraphs [5009.9637] through [5009.9681] (FIGS. 8777 through 8809); Virtual Tilting Function described in paragraphs [5009.9682] through [5009.9720] (FIGS. 8810 through 8840); Virtual Vehicle Tilting Function described in paragraphs [5009.9721] through [5009.9758] (FIGS. 8841 through 8871); Device Approach Notifying Function described in paragraphs [5009.9759] through [5009.9801] (FIGS. 8872 through 8904); Clock Alarm Snooze Function described in paragraphs [5009.9802] through [5009.9829] (FIGS. 8905 through 8926); News Auto Outputting Function described in paragraphs [5009.9830] through [5009.9867] (FIGS. 8927 through 8958*b*); Advertisement Auto Outputting Function described in paragraphs [5009.9868] through [5009.9905] (FIGS. 8959 through 8990*b*); Online RPG Function described in paragraphs [5009.9906] through [5009.10028] (FIGS. 8991 through 9098*b*); Inter Device Distance Notifying Function described in paragraphs [5009.10029] through [5009.10065] (FIGS. 9099 through 9126); Link Embedded Motion Picture Displaying Function described in paragraphs [5009.10066] through [5009.10089] (FIGS. 9127 through 9141); Audiovisual Meta Data Producing Function described in paragraphs [5009.10090] through [5009.10128] (FIGS. 9142 through 9171*c*); Audiovisual Highlight Producing Function described in paragraphs [5009.10129] through [5009.10163] (FIGS. 9172 through 9197); Enhanced Audiovisual Highlight Producing Function described in paragraphs [5009.10164] through [5009.10196] (FIGS. 9198 through 9221); Wireless Power Off Function described in paragraphs [5009.10197] through [5009.10227] (FIGS. 9222 through 9240); Screen Layout Changing Function described in paragraphs [5009.10228] through [5009.10255] (FIGS. 9241 through 9258*b*); Face Feature Log-on Function described in paragraphs [5009.10256] through [5009.10273] (FIGS. 9259 through 9270*c*); Face Feature Screen Saver Deactivating Function described in paragraphs [5009.10274] through [5009.10291] (FIGS. 9271 through 9282*c*); Face Feature Folder Accessing Function described in paragraphs [5009.10292] through [5009.10309] (FIGS. 9283 through 9294*c*); Face Feature File Accessing Function described in paragraphs [5009.10310] through [5009.10327] (FIGS. 9295 through 9306*c*); Face Feature Internet Accessing Function described in paragraphs [5009.10328] through [5009.10345] (FIGS. 9307 through 9318*c*); Face Feature PC Log-on Function described in paragraphs [5009.10346] through [5009.10371] (FIGS. 9319 through 9337*b*); Face Feature PC Screen Saver Deactivating Function described in paragraphs [5009.10372] through [5009.10397] (FIGS. 9338 through 9356*b*); Face Feature PC Folder Accessing Function described in paragraphs [5009.10398] through [5009.10423] (FIGS. 9357 through 9375*b*); Face Feature PC File Accessing Function described in paragraphs [5009.10424] through [5009.10449] (FIGS. 9376 through 9394*b*); Face Feature PC Internet Accessing Function described in paragraphs [5009.10450] through [5009.10475] (FIGS. 9395 through 9413*b*); Face Feature Removal Media Accessing Function described in paragraphs [5009.10476] through [5009.10496] (FIGS. 9414 through 9428*b*); Face Feature PC Removal Media Accessing Function described in paragraphs [5009.10497] through [5009.10524] (FIGS. 9429 through 9448*b*); Security Formatted Removal Media Function described in paragraphs [5009.10525] through [5009.10545] (FIGS. 9449 through 9463*b*); Lite Security Formatted Removal Media Function described in paragraphs [5009.10546] through [5009.10568] (FIGS. 9464 through 9480*b*); Security Formatted Folder Function described in paragraphs [5009.10569] through [5009.10605] (FIGS. 9481 through 9509*b*); Host Host Security Formatted Folder Function described in paragraphs [5009.10606] through [5009.10631] (FIGS. 9510 through 9528); Email Security Formatted Folder Function described in paragraphs [5009.10632] through [5009.10668] (FIGS. 9529 through 9557*b*); Host Email Security Formatted Folder Function described in paragraphs [5009.10669] through [5009.10694] (FIGS. 9558 through 9576); Secured Email Sending Function described in paragraphs [5009.10695] through [5009.10726] (FIGS. 9577 through 9599*c*); Secured Email Receiving Function described in paragraphs [5009.10727] through [5009.10746] (FIGS. 9600 through 9613); Received Email Security Auto Sorting Function described in paragraphs [5009.10747] through [5009.10770] (FIGS. 9614 through 9629*b*); Secured Email Opening Function described in paragraphs [5009.10771] through [5009.10793] (FIGS. 9630 through 9645*b*); Secured Email Attached File Opening Function described in paragraphs [5009.10794] through

[5009.10818] (FIGS. 9646 through 9663b); Secured Email Attached File Deleting Function described in paragraphs [5009.10819] through [5009.10845] (FIGS. 9664 through 9679b); Unsafe Email Host Handled Function described in paragraphs [5009.10846] through [5009.10873] (FIGS. 9680 through 9701b); Unsafe Attached File Host Handled Function described in paragraphs [5009.10874] through [5009.10901] (FIGS. 9702 through 9723c); Com Stored Email Viewing Function described in paragraphs [5009.10902] through [5009.10925] (FIGS. 9724 through 9741c); Non-secured Email Forwarding Function described in paragraphs [5009.10926] through [5009.10950] (FIGS. 9742 through 9759b); Electronic Money Transferring Function described in paragraphs [5009.10951] through [5009.10993] (FIGS. 9760 through 9790b); Electronic Money Time Identified Transferring Function described in paragraphs [5009.10994] through [5009.11051] (FIGS. 9791 through 9835b); Electronic Money Repeatedly Transferring Function described in paragraphs [5009.11052] through [5009.11117] (FIGS. 9836 through 9888b); Electronic Money Transfer Canceling Function described in paragraphs [5009.11118] through [5009.11194] (FIGS. 9889 through 9952b); Electronic Money Email Transferring Function described in paragraphs [5009.11195] through [5009.11238] (FIGS. 9953 through 9985c); Money Email Time Identified Transferring Function described in paragraphs [5009.11239] through [5009.11286] (FIGS. 9986 through 10022c); Money Email Repeatedly Transferring Function described in paragraphs [5009.11287] through [5009.11338] (FIGS. 10023 through 10063c); Electronic Money Email Transfer Canceling Function described in paragraphs [5009.11339] through [5009.11405] (FIGS. 10064 through 10119c); Address Book Administrating Function described in paragraphs [5009.11406] through [5009.11451] (FIGS. 10120 through 10152b); File Synchronizing Function described in paragraphs [5009.11452] through [5009.11578] (FIGS. 10153 through 10263b); Folder Synchronizing Function described in paragraphs [5009.11579] through [5009.11671] (FIGS. 10264 through 10342b); Area Dependent Software Activating Function described in paragraphs [5009.11672] through [5009.11702] (FIGS. 10343 through 10366b); Area Dependent Message Displaying Function described in paragraphs [5009.11703] through [5009.11730] (FIGS. 10367 through 10388); Visible Light Schedule Communicating Function described in paragraphs [5009.11731] through [5009.11796] (FIGS. 10389 through 10437b); Visible Light Web Address Communicating Function described in paragraphs [5009.11797] through [5009.11862] (FIGS. 10438 through 10486b); Visible Light Software Program Communicating Function described in paragraphs [5009.11863] through [5009.11928] (FIGS. 10487 through 10535b); Visible Light Restaurant Menu Communicating Function described in paragraphs [5009.11929] through [5009.11994] (FIGS. 10536 through 10584b); Visible Light TV Listing Communicating Function described in paragraphs [5009.11995] through [5009.12060] (FIGS. 10585 through 10633b); Visible Light Movie Listing Communicating Function described in paragraphs [5009.12061] through [5009.12126] (FIGS. 10634 through 10682b); Visible Light Product Advertisement Communicating Function described in paragraphs [5009.12127] through [5009.12192] (FIGS. 10683 through 10731b); Visible Light Message Communicating Function described in paragraphs [5009.12193] through [5009.12258] (FIGS. 10732 through 10780b); Visible Light Visual Clip Communicating Function described in paragraphs [5009.12259] through [5009.12324] (FIGS. 10781 through 10829b); Visible Light Weather Forecast Communicating Function described in paragraphs [5009.12325] through [5009.12390] (FIGS. 10830 through 10878b); Visible Light News Clip Communicating Function described in paragraphs [5009.12391] through [5009.12456] (FIGS. 10879 through 10927b); Visible Light Map Clip Communicating Function described in paragraphs [5009.12457] through [5009.12522] (FIGS. 10928 through 10976b); File Thumbnail Preview Function described in paragraphs [5009.12523] through [5009.12555] (FIGS. 10977 through 11002b); Taxi Fare Credit Card Payment Function described in paragraphs [5009.12556] through [5009.12632] (FIGS. 11003 through 11067); Taxi Fare Electronic Money Payment Function described in paragraphs [5009.12633] through [5009.12712] (FIGS. 11068 through 11132); Taxi Destination Identifying Function described in paragraphs [5009.12713] through [5009.12783] (FIGS. 11133 through 11194); Taxi Destination Map Displaying Function described in paragraphs [5009.12784] through [5009.12860] (FIGS. 11195 through 11262); QR Code Schedule Communicating Function described in paragraphs [5009.12861] through [5009.12906] (FIGS. 11263 through 11298b); QR Code Web Address Communicating Function described in paragraphs [5009.12907] through [5009.12952] (FIGS. 11299 through 11334b); QR Code Software Program Communicating Function described in paragraphs [5009.12953] through [5009.12998] (FIGS. 11335 through 11370b); QR Code Restaurant Menu Communicating Function described in paragraphs [5009.12999] through [5009.13044] (FIGS. 11371 through 11406b); QR Code TV Listing Communicating Function described in paragraphs [5009.13045] through [5009.13090] (FIGS. 11407 through 11442b); QR Code Movie Listing Communicating Function described in paragraphs [5009.13091] through [5009.13136] (FIGS. 11443 through 11478b); QR Code Product Advertisement Communicating Function described in paragraphs [5009.13137] through [5009.13182] (FIGS. 11479 through 11514b); QR Code Message Communicating Function described in paragraphs [5009.13183] through [5009.13228] (FIGS. 11515 through 11550b); QR Code Visual Clip Communicating Function described in paragraphs [5009.13229] through [5009.13274] (FIGS. 11551 through 11586b); QR Code Weather Forecast Communicating Function described in paragraphs [5009.13275] through [5009.13320] (FIGS. 11587 through 11622b); QR Code News Clip Communicating Function described in paragraphs [5009.13321] through [5009.13366] (FIGS. 11623 through 11658b); QR Code Map Clip Communicating Function described in paragraphs [5009.13367] through [5009.13412] (FIGS. 11659 through 11694b); QR Code Software Activating Function described in paragraphs [5009.13413] through [5009.13458] (FIGS. 11695 through 11730b); RFID Schedule Communicating Function described in paragraphs [5009.13459] through [5009.13508] (FIGS. 11731 through 11770b); RFID Web Address Communicating Function described in paragraphs [5009.13509] through [5009.13558] (FIGS. 11771 through 11810b); RFID Software Program Communicating Function described in paragraphs [5009.13559] through [5009.13608] (FIGS. 11811 through 11850b); RFID Restaurant Menu Communicating Function described in paragraphs [5009.13609] through [5009.13658] (FIGS. 11851 through 11890b); RFID TV Listing Communicating Function described in paragraphs [5009.13659] through [5009.13708] (FIGS. 11891 through 11930b); RFID Movie Listing Communicating Function described in paragraphs [5009.13709] through [5009.13758] (FIGS. 11931 through 11970b); RFID Product Advertisement Communicating Function described in paragraphs [5009.13759] through [5009.13808] (FIGS. 11971 through 12010b); RFID Message Communicating Function described in paragraphs [5009.13809] through [5009.13858] (FIGS. 12011 through 12050*b*); RFID Visual Clip Communicating Function described in paragraphs [5009.13859] through [5009.13908] (FIGS. 12051 through 12090*b*); RFID Weather Forecast Communicating Function described in paragraphs [5009.13909] through [5009.13958] (FIGS. 12091 through 12130*b*); RFID News Clip Communicating Function described in paragraphs [5009.13959] through [5009.14008] (FIGS. 12131 through 12170*b*); RFID Map Clip Communicating Function described in paragraphs [5009.14009] through [5009.14058] (FIGS. 12171 through 12210*b*); RFID Software Activating Function described in paragraphs [5009.14059] through [5009.14108] (FIGS. 12211 through 12250*b*); RFID Software Auto Activating Function described in paragraphs [5009.14109] through [5009.14158] (FIGS. 12251 through 12290*b*); Carrier Arrival Time Displaying Function described in paragraphs [5009.14159] through [5009.14283] (FIGS. 12291 through 12401); Multiple Audio Outputting Function described in paragraphs [5009.14284] through [5009.14310] (FIGS. 12402 through 12419); Closest Device Notifying Function described in paragraphs [5009.14311] through [5009.14416] (FIGS. 12420 through 12515); Print Screen Function described in paragraphs [5009.14417] through [5009.14474] (FIGS. 12516 through 12559*b*); Caller Answering Machine Activating Function described in paragraphs [5009.14475] through [5009.14513] (FIGS. 12560 through 12587); Audiovisual Answering Machine Function described in paragraphs [5009.14514] through [5009.14546] (FIGS. 12588 through 12611); Answering Machine Message Forwarding Function described in paragraphs [5009.14547] through [5009.14607] (FIGS. 12612 through 12657); Area Map Displaying Function described in paragraphs [5009.14608] through [5009.14679] (FIGS. 12658 through 12721*b*); Road Map Displaying Function described in paragraphs [5009.14680] through [5009.14752] (FIGS. 12722 through 12785*b*); Email Reading Function described in paragraphs [5009.14753] through [5009.14781] (FIGS. 12786 through 12805*c*); Stand Alone Email Function described in paragraphs [5009.14782] through [5009.14850] (FIGS. 12806 through 12857*b*); TV Seamless Viewing Function described in paragraphs [5009.14851] through [5009.14896] (FIGS. 12858 through 12895); Multiple Movable Tab Web Browsing Function described in paragraphs [5009.14897] through [5009.14975] (FIGS. 12896 through 12966); Multiple Movable Tab Visual Data Viewing Function described in paragraphs [5009.14976] through [5009.15054] (FIGS. 12967 through 13037); Multiple Movable Tab Document Data Viewing Function described in paragraphs [5009.15055] through [5009.15133] (FIGS. 13038 through 13108); Multiple Movable Tab Email Data Viewing Function described in paragraphs [5009.15134] through [5009.15212] (FIGS. 13109 through 13179); Lost Com Device Memory Erasing/Rescuing Function described in paragraphs [5009.15213] through [5009.15275] (FIGS. 13180 through 13231*c*); Lost Com Device Beaconing Function described in paragraphs [5009.15276] through [5009.15353] (FIGS. 13232 through 13296); Area & Country Name Displaying Function described in paragraphs [5009.15354] through [5009.15437] (FIGS. 13297 through 13371); 3D Desktop Function described in paragraphs [5009.15438] through [5009.15536] (FIGS. 13372 through 13457); Carrier Auto Announcing Function described in paragraphs [5009.15537] through [5009.15586] (FIGS. 13458 through 13497*b*); Virtual Folder Displaying Function described in paragraphs [5009.15587] through [5009.15647] (FIGS. 13498 through 13548*b*); In-carrier Location Notifying Function described in paragraphs [5009.15648] through [5009.15703] (FIGS. 13549 through 13595*c*); Address Map Auto Displaying Function described in paragraphs [5009.15704] through [5009.15771] (FIGS. 13596 through 13650*c*); Brain Wave Device Controlling Function described in paragraphs [5009.15772] through [5009.15806] (FIGS. 13651 through 13679*b*); Brain Wave Sentence Composing Function described in paragraphs [5009.15807] through [5009.15829] (FIGS. 13680 through 13696); Wheel Standing Function described in paragraphs [5009.15830] through [5009.15858] (FIGS. 13697 through 13719); Robot Body Balancing Function described in paragraphs [5009.15859] through [5009.15905] (FIGS. 13720 through 13760); Robot Leg Balancing Function described in paragraphs [5009.15906] through [5009.15952] (FIGS. 13761 through 13801); Robot Head Balancing Function described in paragraphs [5009.15953] through [5009.15999] (FIGS. 13802 through 13842); Robot Upper Body Balancing Function described in paragraphs [5009.16000] through [5009.16045] (FIGS. 13843 through 13883); Digital Television Function described in paragraphs [5009.16046] through [5009.16075] (FIGS. 13884 through 13906); Total Price Calculating Function described in paragraphs [5009.16076] through [5009.16166] (FIGS. 13907 through 13985*c*); Brain Wave Carrier Controlling Function described in paragraphs [5009.16167] through [5009.16202] (FIGS. 13986 through 14015*b*); Electronic Billboard Controlling Function described in paragraphs [5009.16203] through [5009.16323] (FIGS. 14016 through 14123*e*); Common Phone Number Function described in paragraphs [5009.16324] through [5009.16424] (FIGS. 14124 through 14212*c*); Hybrid Common Phone Number Function described in paragraphs [5009.16425] through [5009.16525] (FIGS. 14213 through 14301*c*); Ringtone Volume Auto Adjusting Function described in paragraphs [5009.16526] through [5009.16547] (FIGS. 14302 through 14317*b*); Ringtone Type Auto Selecting Function described in paragraphs [5009.16548] through [5009.16575] (FIGS. 14318 through 14339*b*); Television Chatting Function described in paragraphs [5009.16576] through [5009.16650] (FIGS. 14340 through 14405); Device Battery Charging Function described in paragraphs [5009.16651] through [5009.16726] (FIGS. 14406 through 14471*b*); Hybrid Battery Solar Operating Function described in paragraphs [5009.16727] through [5009.16829] (FIGS. 14472 through 14561); Backup Solar Battery Operating Function described in paragraphs [5009.16830] through [5009.16932] (FIGS. 14562 through 14651); Hybrid Access Point Function described in paragraphs [5009.16933] through [5009.17169] (FIGS. 14652 through 14878*g*); Earphone Location Identifying Function described in paragraphs [5009.17170] through [5009.17266] (FIGS. 14879 through 14961); Microphone Location Identifying Function described in paragraphs [5009.17267] through [5009.17355] (FIGS. 14962 through 15036); Event Triggered Auto Audiovisual Recording Function described in paragraphs [5009.17356] through [5009.17402] (FIGS. 15037 through 15072*b*); Event Triggered Auto Audio Recording Function described in paragraphs [5009.17403] through [5009.17449] (FIGS. 15073 through 15108*b*); Audiovisual Message Bulk Transferring Function described in paragraphs [5009.17450] through [5009.17501] (FIGS. 15109 through 15150*b*); Multiple Party Conversing Function described in paragraphs [5009.17502] through [5009.17670] (FIGS. 15151 through 15299); Window Monitoring Function described in paragraphs [5009.17671] through [5009.17700] (FIGS. 15300 through 15321*b*); Window Status Monitoring Function described in paragraphs [5009.17701] through [5009.17730]

(FIGS. 15322 through 15343*b*); Door Monitoring Function described in paragraphs [5009.17731] through [5009.17760] (FIGS. 15344 through 15365*b*); Door Monitoring Function described in paragraphs [5009.17761] through [5009.17790] (FIGS. 15366 through 15387*b*); Push-To-Talk Function described in paragraphs [5009.17791] through [5009.18008] (FIGS. 15388 through 15586*c*Push-To-T); Door Open Monitoring Function described in paragraphs [5009.18009] through [5009.18065] (FIGS. 15587 through 15633*b*); Window Open Monitoring Function described in paragraphs [5009.18066] through [5009.18122] (FIGS. 15634 through 15680*b*); Lock Open Monitoring Function described in paragraphs [5009.18123] through [5009.18179] (FIGS. 15681 through 15727*b*); Destination Proceeding Function described in paragraphs [5009.18180] through [5009.18265] (FIGS. 15728 through 15803*d*); Driver's Eye Monitoring Safety Function described in paragraphs [5009.18266] through [5009.18316] (FIGS. 15804 through 15845); Driver's Head Monitoring Safety Function described in paragraphs [5009.18317] through [5009.18365] (FIGS. 15846 through 15885); Drawer Open Monitoring Function described in paragraphs [5009.18366] through [5009.18422] (FIGS. 15886 through 15932*b*); Curtain Open Monitoring Function described in paragraphs [5009.18423] through [5009.18479] (FIGS. 15933 through 15979*b*); Gate Open Monitoring Function described in paragraphs [5009.18480] through [5009.18536] (FIGS. 15980 through 16026*b*); Faucet Open Monitoring Function described in paragraphs [5009.18537] through [5009.18593] (FIGS. 16027 through 16073*b*); Hybrid Refrigerator Function described in paragraphs [5009.18594] through [5009.18695] (FIGS. 16074 through 16159*b*); Multiple Purpose Chamber Function described in paragraphs [5009.18696] through [5009.18869] (FIGS. 16160 through 16312*c*); Audiovisual Quality Auto Adjusting Function described in paragraphs [5009.18870] through [5009.18930] (FIGS. 16313 through 16363*b*); Audio Quality Auto Adjusting Function described in paragraphs [5009.18931] through [5009.18991] (FIGS. 16364 through 16414*b*); TV Phone Quality Auto Adjusting Function described in paragraphs [5009.18992] through [5009.19100] (FIGS. 16415 through 16512); Voice Phone Quality Auto Adjusting Function described in paragraphs [5009.19101] through [5009.19209] (FIGS. 16513 through 16610); Television Related Audiovisual Downloading Function described in paragraphs [5009.19210] through [5009.19299] (FIGS. 16611 through 16687); Radio Related Audio Downloading Function described in paragraphs [5009.19300] through [5009.19389] (FIGS. 16688 through 16764); Header Displaying Function described in paragraphs [5009.19390] through [5009.19464] (FIG. 16765 through FIG. 16826*b*); Footer Displaying Function described in paragraphs [5009.19465] through [5009.19539] (FIG. 16827 through FIG. 16888*b*); Location Scheduled Notifying Function described in paragraphs [5009.19540] through [5009.19602] (FIG. 16889 through FIG. 16941*e*); Zone Leaving Notifying Function described in paragraphs [5009.19603] through [5009.19675] (FIG. 16942 through FIG. 17005*d*); Zone Entering Notifying Function described in paragraphs [5009.19676] through [5009.19748] (FIG. 17006 through FIG. 17069*d*); Power Off Notifying Function described in paragraphs [5009.19749] through [5009.19794] (FIG. 17070 through FIG. 17106*d*); Power On Notifying Function described in paragraphs [5009.19795] through [5009.19840] (FIG. 17107 through FIG. 17143*d*); Security Alarm On Notifying Function described in paragraphs [5009.19841] through [5009.19886] (FIG. 17144 through FIG. 17180*d*); Security Alarm Off Notifying Function described in paragraphs [5009.19887] through [5009.19932] (FIG. 17181 through FIG. 17217*d*); Email Transfer Notifying Function described in paragraphs [5009.19933] through [5009.19978] (FIG. 17218 through FIG. 17254*d*); Email Reception Notifying Function described in paragraphs [5009.19979] through [5009.20024] (FIG. 17255 through FIG. 17291*d*); Making Phone Call Notifying Function described in paragraphs [5009.20025] through [5009.20070] (FIG. 17292 through FIG. 17328*d*); Phone Call Reception Notifying Function described in paragraphs [5009.20071] through [5009.20116] (FIG. 17329 through FIG. 17365*d*); Key Pressed Notifying Function described in paragraphs [5009.20117] through [5009.20162] (FIG. 17366 through FIG. 17402*d*); Software Activation Notifying Function described in paragraphs [5009.20163] through [5009.20208] (FIG. 17403 through FIG. 17439*d*); Document Opening Notifying Function described in paragraphs [5009.20209] through [5009.20254] (FIG. 17440 through FIG. 17476*d*); Specified Event Notifying Function described in paragraphs [5009.20255] through [5009.20315] (FIG. 17477 through FIG. 17527*d*); Television Phone Auto Backup Function described in paragraphs [5009.20316] through [5009.20447] (FIG. 17528 through FIG. 17645*b*); File Auto Saving Function described in paragraphs [5009.20448] through [5009.20495] (FIG. 17646 through FIG. 17678*b*); File Compressing Function described in paragraphs [5009.20496] through [5009.20559] (FIG. 17679 through FIG. 17727*e*); Multiple Phone Number Billing Function described in paragraphs [5009.20560] through [5009.20609] (FIG. 17728 through FIG. 17771); Multiple Device Door Unlocking Function described in paragraphs [5009.20610] through [5009.20685] (FIG. 17772 through FIG. 17832*c*); Multiple Device Door Locking Function described in paragraphs [5009.20686] through [5009.20761] (FIG. 17833 through FIG. 17893*c*); Phone Call Making Log Recording Function described in paragraphs [5009.20762] through [5009.20815] (FIG. 17894 through FIG. 17938*d*); Phone Call Receiving Log Recording Function described in paragraphs [5009.20816] through [5009.20867] (FIG. 17939 through FIG. 17981*d*); Phone Call Making Log Exporting Function described in paragraphs [5009.20868] through [5009.20917] (FIG. 17982 through FIG. 18022*d*); Phone Call Receiving Log Exporting Function described in paragraphs [5009.20918] through [5009.20967] (FIG. 18023 through FIG. 18063*d*); Phone Call Making Log Synchronizing Function described in paragraphs [5009.20968] through [5009.21021] (FIG. 18064 through FIG. 181060; Phone Call Receiving Log Synchronizing Function described in paragraphs [5009.21022] through [5009.21075] (FIG. 18107 through FIG. 181490; 3D Advertisement Displaying Function described in paragraphs [5009.21076] through [5009.21217] (FIG. 18150 through FIG. 18277); Audiovisual Location Capability Function described in paragraphs [5009.21218] through [5009.21276] (FIG. 18278 through FIG. 18325*c*); Location Audio Notifying Function described in paragraphs [5009.21277] through [5009.21319] (FIG. 18326 through FIG. 18359*b*); Answering Machine Location Recording Function described in paragraphs [5009.21320] through [5009.21388] (FIG. 18360 through FIG. 18417*e*); Visual Phone File Sharing Function described in paragraphs [5009.21389] through [5009.21526] (FIG. 18418 through FIG. 18540*b*); Visual Phone Magnifying Function described in paragraphs [5009.21527] through [5009.21629] (FIG. 18541 through FIG. 18631); Multiple Home Page Displaying Function described in paragraphs [5009.21630] through [5009.21700] (FIG. 18632 through FIG. 18693*b* FIG. 18632 through FIG. 18693*b*); Multiple Visual Phone Party Location Identifying Function described in paragraphs [5009.21701] through [5009.21796] (FIG. 18694 through FIG. 18778*g*); Individual Party Conversation Replaying Function described in paragraphs [5009.21797] through [5009.21962] (FIG. 18779 through FIG. 18929*d*); Multiple Phone Notifying Function described in paragraphs [5009.21963] through [5009.22050] (FIG. 18930 through FIG. 19004*i*); Multiple Phone Dial Tone Function described in paragraphs [5009.22051] through [5009.22160] (FIG. 19005 through FIG. 19101*f*); Multiple Phone New Party Joining Function described in paragraphs [5009.22161] through [5009.22276] (FIG. 19102 through FIG. 19206*j*); and Music Property Setting Function described in paragraphs [5009.22277] through [5009.22302] (FIG. 19207 through FIG. 19226*b*).

The invention claimed is:

1. A communication device comprising:
a microphone;
a speaker;
an input device;
a display;
an antenna;
a power-off notification implementer, wherein upon the power of another device is identified to be turned off, a power-off notification is retrieved and provided to the user of said communication device;
a power-off location notifying implementer, wherein a power-off location which is the location of said another device at which the power of said another device is turned off is retrieved and provided to the user of said communication device;
a header displaying implementer, wherein when a first document is transferred from said another device to said communication device, a header relevant data is transferred from said another device to said communication device together with said first document, wherein said header relevant data indicates the text, font type, font size, font color, and/or location of a header of said first document, wherein when said first document is retrieved and displayed on said communication device, said header is retrieved and displayed in accordance with said text, said font type, said font size, said font color, and/or said location of said header, which are identified by said another device in advance to transferring said header relevant data from said another device to said communication device;
a footer displaying implementer, wherein when a second document is transferred from said another device to said communication device, a footer relevant data is transferred from said another device to said communication device together with said second document, wherein said footer relevant data indicates the text, font type, font size, font color, and/or location of a footer of said second document, wherein when said second document is retrieved and displayed on said communication device, said footer is retrieved and displayed in accordance with said text, said font type, said font size, said font color, and/or said location of said footer, which are identified by said another device in advance to transferring said footer relevant data from said another device to said communication device;
a zone leaving notifying implementer, wherein when said another device is identified to be leaving from a specific geographic zone identified by said communication device, a zone leaving notice is retrieved and provided to the user of said communication device; and
a zone entering notifying implementer, wherein when said another device is identified to be entering into said specific geographic zone identified by said communication device, a zone entering notice is retrieved and provided to the user of said communication device.

2. The communication device of claim 1, wherein said communication device is a handheld device.

3. The communication device of claim 1, wherein said communication device is operable to implement voice communication.

4. The communication device of claim 1, wherein said communication device is operable to implement voice communication via said antenna.

5. The communication device of claim 1, wherein said communication device is connected with said another device via a network.

6. The communication device of claim 1, wherein said power-off notification is provided to the user of said communication device by displaying a specific message on said communication device.

7. A system comprising:
a communication device comprising a microphone, a speaker, an input device, a display, and an antenna;
a power-off notification implementer, wherein upon the power of another device is identified to be turned off, a power-off notification is retrieved and provided to the user of said communication device;
a power-off location notifying implementer, wherein a power-off location which is the location of said another device at which the power of said another device is turned off is retrieved and provided to the user of said communication device;
a header displaying implementer, wherein when a first document is transferred from said another device to said communication device, a header relevant data is transferred from said another device to said communication device together with said first document, wherein said header relevant data indicates the text, font type, font size, font color, and/or location of a header of said first document, wherein when said first document is retrieved and displayed on said communication device, said header is retrieved and displayed in accordance with said text, said font type, said font size, said font color, and/or said location of said header, which are identified by said another device in advance to transferring said header relevant data from said another device to said communication device;
a footer displaying implementer, wherein when a second document is transferred from said another device to said communication device, a footer relevant data is transferred from said another device to said communication device together with said second document, wherein said footer relevant data indicates the text, font type, font size, font color, and/or location of a footer of said second document, wherein when said second document is retrieved and displayed on said communication device, said footer is retrieved and displayed in accordance with said text, said font type, said font size, said font color, and/or said location of said footer, which are identified by said another device in advance to transferring said footer relevant data from said another device to said communication device;
a zone leaving notifying implementer, wherein when said another device is identified to be leaving from a specific geographic zone identified by said communication device, a zone leaving notice is retrieved and provided to the user of said communication device; and
a zone entering notifying implementer, wherein when said another device is identified to be entering into said specific geographic zone identified by said communication device, a zone entering notice is retrieved and provided to the user of said communication device.

8. The system of claim 7, wherein said communication device is a handheld device.

9. The system of claim 7, wherein said communication device is operable to implement voice communication.

10. The system of claim 7, wherein said communication device is operable to implement voice communication via said antenna.

11. The system of claim 7, wherein said communication device is connected with said another device via a network.

12. The system of claim 7, wherein said power-off notification is provided to the user of said communication device by displaying a specific message on said communication device.

13. A method for a communication device comprising a microphone, a speaker, an input device, a display, and an antenna, said method comprising:

a power-off notification implementing step, wherein upon the power of another device is identified to be turned off, a power-off notification is retrieved and provided to the user of said communication device;

a power-off location notifying implementing step, wherein a power-off location which is the location of said another device at which the power of said another device is turned off is retrieved and provided to the user of said communication device;

a header displaying implementing step, wherein when a first document is transferred from said another device to said communication device, a header relevant data is transferred from said another device to said communication device together with said first document, wherein said header relevant data indicates the text, font type, font size, font color, and/or location of a header of said first document, wherein when said first document is retrieved and displayed on said communication device, said header is retrieved and displayed in accordance with said text, said font type, said font size, said font color, and/or said location of said header, which are identified by said another device in advance to transferring said header relevant data from said another device to said communication device;

a footer displaying implementing step, wherein when a second document is transferred from said another device to said communication device, a footer relevant data is transferred from said another device to said communication device together with said second document, wherein said footer relevant data indicates the text, font type, font size, font color, and/or location of a footer of said second document, wherein when said second document is retrieved and displayed on said communication device, said footer is retrieved and displayed in accordance with said text, said font type, said font size, said font color, and/or said location of said footer, which are identified by said another device in advance to transferring said footer relevant data from said another device to said communication device;

a zone leaving notifying implementing step, wherein when said another device is identified to be leaving from a specific geographic zone identified by said communication device, a zone leaving notice is retrieved and provided to the user of said communication device; and a zone entering notifying implementing step, wherein when said another device is identified to be entering into said specific geographic zone identified by said communication device, a zone entering notice is retrieved and provided to the user of said communication device.

14. The method of claim 13, wherein said communication device is a handheld device.

15. The method of claim 13, wherein said communication device is operable to implement voice communication.

16. The method of claim 13, wherein said communication device is operable to implement voice communication via said antenna.

17. The method of claim 13, wherein said communication device is connected with said another device via a network.

18. The method of claim 13, wherein said power-off notification is provided to the user of said communication device by displaying a specific message on said communication device.

* * * * *